United States Patent [19]

Sherman

[11] Patent Number: 4,931,929

[45] Date of Patent: Jun. 5, 1990

[54] DESIGN COMPONENT SELECTION COMPUTER WITH SPECIFICATION OF PRODUCT CHARACTERISTICS AND OF COLOR BY MACHINE READABLE DEVICE

[75] Inventor: Robert E. Sherman, Chevy Chase, Md.

[73] Assignee: Search & Source, Incorporated, Alexandria, Va.

[21] Appl. No.: 85,338

[22] Filed: Aug. 14, 1987

Related U.S. Application Data

[63] Continuation of Ser. No. 693,721, Jan. 22, 1985, abandoned, which is a continuation-in-part of Ser. No. 599,703, Apr. 12, 1984, abandoned.

[51] Int. Cl.$^5$ ............................ G06F 15/21; G01J 3/46
[52] U.S. Cl. ..................................... 364/401; 364/521; 364/526; 235/375
[58] Field of Search ... 364/200 MS File, 900 MS File, 364/400, 401, 518, 526; 235/375, 383; 340/825.35

[56] References Cited

U.S. PATENT DOCUMENTS

| | | |
|---|---|---|
| 3,568,155 | 3/1971 | Abraham . |
| 4,029,391 | 6/1977 | French ............................. 356/418 X |
| 4,029,419 | 6/1977 | Schumann, Jr. et al. ...... 356/418 X |
| 4,318,121 | 3/1982 | Taite et al. .............................. 358/22 |
| 4,359,631 | 11/1982 | Lockwood et al. ................. 235/381 |
| 4,418,390 | 11/1983 | Smith et al. .......................... 364/526 |
| 4,445,178 | 4/1984 | Scheer et al. ........................ 364/400 |
| 4,449,198 | 5/1984 | Kroon et al. ......................... 364/900 |
| 4,488,245 | 11/1984 | Dalke et al. .......................... 364/526 |
| 4,490,810 | 12/1984 | Hon ...................................... 364/900 |
| 4,523,852 | 6/1985 | Bauer .............................. 356/421 X |

FOREIGN PATENT DOCUMENTS 2105075  3/1983  United Kingdom .

OTHER PUBLICATIONS

Gatty, B., "Setting Up Shop on Computer Screens", *Nation's Business*, vol. 72, No. 3, Mar. 1984, 57-58.
"Retailers Beginning to Tune in Video Displays", *Advertising Age*, Nov. 18, 1985, 66.
"Videodisc: Product Search Launched for Architects and Interior Designers", *Videodisc and Optical Disk*, vol. 5, No. 4, Jul./Aug. 1985, 244-247.
Yeazel, L. A., "Point-of-Purchase—The Decision to Buy", *Optical Information Systems*, vol. 6, No. 1, Jan.-/Feb. 1986, 36-37.
"Touchcom TM Interactive Videodisc Catalog Markets Furniture at Dayton's", *Videodisc & Optical Disk*, vol. 5, No. 5, Sep./Oct. 1985, 343-345.
Riggs, L., "Direct Marketing Goes Electronic", *Sales & Marketing Mgmt.*, vol. 134, No. 1, Jan. 1985, 59-60.
Hoke, P., "Comp-U-Store System Could Change Retail Economics", *Direct Marketing*, vol. 46, No. 3, Jul. 1983, 101-107.
CASPIR coding sheets, U.S. Patent & Trademark Office, 1974 and 1981.
Cavanagh, R. T., "Educational/Institutional Features of the Optical Videodisc System", *SMPTE Journal*, vol. 86, No. 4, Apr. 1977, 201-3.

*Primary Examiner*—Clark A. Jablon
*Attorney, Agent, or Firm*—John S. Hale

[57] ABSTRACT

A process for identification, description and display of design components, such as interior decoration products, selected by describing desired component characteristics to a digital computer. An image database is provided, preferably in the form of an addressable optical videodisk, each frame of which portrays an individual design component, and the images are displayed by operation of a computer-controlled archive system such as a random-access optical videodisk player. A characteristics database is provided to identify each portrayed design component by a variety of product categories including at least color, price, manufacturer and image database address. The process obtains one or more desired component characteristics, examines the characteristics database to identify design components meeting the desired product characteristics, and displays the identified component images together with a complete record of characteristics for each product. The desired color characteristic can be obtained by selection from a text dictionary of color identification terms, by machine inspection of a machine-readable color comparison sample, or by optical spectrum analysis of a pre-existing product sample.

9 Claims, 2 Drawing Sheets

DESIGN COMPONENT SELECTION COMPUTER WITH SPECIFICATION OF PRODUCT CHARACTERISTICS AND OF COLOR BY MACHINE READABLE DEVICE

RELATED APPLICATIONS

This is a continuation of application Ser. No. 693,721 filed Jan. 22, 1985, abandoned, which is a continuaton-in-part of Ser. No. 599,703 filed Apr. 12, 1984, abandoned. This application is related to application Ser. No. 665,529 filed Oct. 26, 1984, now abandoned.

BACKGROUND OF THE INVENTION

The present invention relates generally to visual display systems and, more specifically, to an apparatus and process for the selection and visual display of design components according to user-supplied criteria in a plurality of predetermined product categories.

The field of design component coordination encompasses wearing apparel, interior decoration, and a variety of other activities and relative products in which an end user selects or accepts recommendations as to harmonious visual elements. Those who work in such areas have long been burdened by complementary difficulties which inhibit growth and competition. These problems are, first, the explosion of catalog information provided by manufacturers for the use of the design consultant, and second, reticence on the part of the public concerning consultant services which the consumer perceives to be no different from what the consumer can achieve on his or her own efforts.

The sheer volume of catalog information and product samples offered to the design consultant presently makes the task of interior decoration akin to the proverbial finding of a needle in a haystack. The sheer physical volume of such materials typically overwhelms the office of the consultant and provides a misleading impression of disorganization. Morever, there is no uniform system of indexing for access to catalog information, so the design consultant is forced to rely on human memory to recall an upholstery, wallcovering or other product of appropriate visual characteristics and associate that item with a page or section in a particular manufacturer's catalog in order to locate related information as to price, fireproofing, availability and other factors. The disadvantages of such a system is readily apparent, for no human memory can encompass the hundreds of thousands of pages available to the design consultant in catalogs.

A consumer attitude survey has established that the average consumer has a negative attitude with regard to interior decoration consulting. The survey established that consumers offer two particular reasons for the negative attitude: first, that decoration consultants are perceived to charge high prices, and second, the consumer can select design elements to achieve results equally satisfying to those of a decoration consultant. The consumer attitude, of course, does not take into account the large volume of information which the design consultant is forced to maintain at hand, nor does it recognize the considerable expertise which is applied by the design consultant to extract appropriate information from the catalogs at hand suitable for a specific customer.

Therefore, to enable consumer design component selection, as well as to enhance the efficiency of design component consultants, it would be appropriate to provide a system for rapid access to the information heretofore available only through printed and material catalogs. Rather than relying on memory, which is at best inefficient and requires years of experience, such a system would allow the user to specify component criteria, for a variety of products and then rapidly display components meeting the stated criteria together with other relevant information for each displayed product component such as price, manufacturer, and catalog number. In addition, such a system may be provided for use by consumers within a retail establishment such as a department store, where the system could indicate whether a displayed item was in stock, back-ordered, or available only special order.

Until recent times, there has been no mechanism available for providing rapid access to a large selection of visual images. A design consultant might have utilized a general purpose digital computer programmed for database storage and retrieval to create an index for relevant information concerning catalog items, but heretofore such a computer system could not store or retrieve an image of each catalog item. The appearance of each item is, of course, at the core of the design process so any such computer system could find only limited use in the past.

However, the advent of random-access video disk display systems such as the optical videodisk system licensed by Phillips has made it possible to record an archive of product images for rapid collection and display under computer control. A line of videodisk players is available off-the-shelf from Pioneer Video, Inc. These and compatible systems available from Hitachi, Sylvania, Magnavox, Sony and others provide random-access of up to 54,000 still video images per disk side, with a worst-case access time as low as 2 seconds. Domestic pressing facilities for optical disks compatible with these systems are available through Pioneer and 3M Corporation. The United States Government and many corporations have taken advantage of this technology for education and training of employees and those who use their products or services. Additionally, a number of disks have been produced for use directly by the consumer in an entertainment or educational context.

The Pergammon timesharing network now offers a videodisk-based patent drawing retrieval system. One such terminal is presently installed in the Patent Search Room of the U.S. Patent and Trademark Office. In this system, a local keyboard terminal facilitates full-text searching of text of patents recently issued, which database is maintained in a host computer remote from the terminal. The terminal displays text returned by the host, and is coupled to a videodisk player which displays a drawing corresponding to the text. This system does not permit searching for visual characteristics, such as color, pattern theme, pattern density, or texture, of the images recorded on videodisk. Thus the system has found use largely where the searcher concentrates on an abstract of each document, such as in certain chemical arts.

Among the first of the consumer-oriented disk systems as the 1981 Summer Catalog disk offered by Sears at no charge to its credit customers. This disk utilized a variety of the controls available on a typical videodisk player and illustrates the limitations as well as the advantages thereof. One limitation was the image resolution of a home television receiver on which the images were typically displayed. Due to this resolution difficulty, only a limited menu of alternatve selections could be provided on any one video frame. For the most part, the user would operate the player in a still-frame mode. The user would view a master menu frame, select a submenu and advance the player to an indicated frame for that submenu, and repeat the process until a frame or frames of actual product information display were indicated. Thus the user would normally advance through three or four levels of menu, and advancement would require manual entry of a four- or five-digit frame number, used by the player to locate and display the desired video frame bearing either menu text or product data. This system suffers from lack of flexibility in that it utilizes one prerecorded menu structure embodying a rigid presumption that the user conducted searches invariably and only by product type. Moreover, the disk displayed products only in representative colors and not in all avalable colors, so that any question of color availability, which is typically important in design coordination, could be answered only through manual inquiry with Sears employees.

Vidmax has offered another type of disk product for use on videodisk players in the home. Their Mystery Disk product series provides interactive detective fiction entertainment. In these products, a live-action play is presented in four acts. The user is directed by still-frame text to choose at random one of two paths at the beginning of each act, so that the drama structure is in effect a binary tree with sixteen possible outcomes. The path branch selection is implemented manually by directing the disk player to display a different presentation segment of live action, or a different soundtrack applied to a common live-action image sequence. At the completion of the four acts, the user is directed to select among supplemental still-frame images providing further clues to the solution of the mystery presented in the live-action play. Finally, the user is directed to compute a frame number based on his or her accusation as to a murderer, a motive, and a method, all of which are selected from still-frame menus recorded within the videodisk. By manually entering this computation into the controls of the disk player, the user is shown a frame which confirms or refutes the details of the accusation.

A similar system has been disclosed in U.S. Pat. No. 4,333,152 in which the live-action segments terminate with one or more characters therein requested direction from the user. For instance, in the context of a western drama, a cowboy surrounded by indians might ask the viewer whether it would be more prudent to fight or to run. Here again, the disk player than branches to a subsequent program segment determined by the response of the user.

A number of arcade games have recently been introduced which allow the player to direct the progress of a character or vehicle by joystick input with an approximately realtime response. In order to enhance the illusion of reality and reduce the access time between program segments on the videodisk, the disk is recorded such that the most likely move of the user is closest to the current video frame on the disk. In some games, a general purpose digital computer is provided and programmed to control two disk players so that the second disk player is positioned to access the second most likely move of the user. Among the videodisk-based arcade games currently released are "Firefox" by Atari.

The J. P. Stevens Company has also utilized videodisk players as a catalog system for their fabric products. Their system has been placed in retail stores for use to determine availability of products, and provides only a single-key selection process. Thus a user can select on the basis of color identified by text input, or on the basis of price, but not on the basis of color and price simultaneously. This system clearly suffers from the critical defect of being insufficiently precise in its selection process for the needs of either the consumer or the design consultant.

The design consultant typically selects materials and products based on a variety of criteria, which may include scale and frequency of pattern, color, material, weave, price, special treatment (e.g., fireproofing), size, level of formality, finish, and credit terms, to name but a few of many. Not only will the specifics of these criteria vary from customer to customer but some customers may demand very specific characteristics for categories in which others are willing to accept wide variations. Thus the prior art fails to provide a visual display system which accommodates the need for flexibility in both selection of criteria categories and degree of specificity within categories. Without such flexibility, the prior art has found little or no acceptance among design consultants or consumers.

SUMMARY OF THE INVENTION

Herein is disclosed an apparatus and process for the identification and visual selection of design components. The system utilizes an optical videodisk player system for retrieval of images of design component products, and a general purpose programmable digital computer configured to control the disk player. The computer is programmed to access a database of product characteristics, including color, determine which of the products match characteristics defined by the user, and then direct the disk player to provide a display of each such matching product together with a computer-generated display of the product characteristics for inspection by the user. This system provides quick, economical product identification without requiring long-term familiarity with printed or material catalogs, and so is especially suited to use by consumers as well as design consultants.

In its preferred form, the present system incorporates a computer, an optical videodisk player, a video disk mounted within the player and bearing a sequence of still-frame images portraying products, an interface between the computer and the disk player allowing the computer to control the disk player, a high-resolution video display monitor coupled to the video output of the disk player, a color input device for identification of preexisting color samples as search criteria, and a text display monitor coupled to the video output of the computer. A digital storage medium such as a hard disk drive is preferably coupled to the computer and utilized for data storage of the database incorporating the characteristics of each product and the videodisk image frame number associated with the product image.

With regard to categories of product characteristics other than color and price, the present invention preferably provides a dictionary of recognized responses which is organized according to a hierarchy of detail: that is, the most generalized responses are presented most prominently, with subdivision for a first level of detail, and subdivisions thereof for further levels of detail depending on the attributes of the desired product type. The user may thus choose a response within a category which is as general or as specific as desired, and the system will then search for products having characteristics in any divisions lying under the selected vocabulary time.

As the search of the database is completed, the present invention promotes efficiency of displaying a count of all products matching the characteristics defined by the user, as well as displaying the image of one such product for inspection by the user. Thus the user need not be forced to view all matching products, particularly where the specified characteristics were so imprecise as to result in a large number of matching products which would require a great deal of time to inspect. The present invention retains a search list of the specified characteristics provided by the user so that the user may modify the list as appropriate to expand or restrict the scope of products identified by the system. Should the user choose to inspect all or part of the images located by the system according to the specified characteristics, the present invention provides that the user may control advancement of the product images displayed on the high-resolution video monitor and the correspnding text of characteristics displayed on the computer video monitor.

Thus the present inventive system resolves the difficulties recognized in the prior art. Access to product information is provided without the need for personal familiarity with either printed or material product catalogs or vocabulary of the trade. The user is required to provide only such conditions and preferences as he or she desires in a product, rather than strictly conforming to technological constraints on the number, category or specificity of product characteristics. Moreover, the user is not required to remember, compute or enter an identifying number for each desired still-frame video image. These and other objects and advantages of the present inventive system will become more readily apparent in the following detailed description thereof together with the appended drawings.

DETAILED DESCRIPTION OF THE DRAWINGS

Figure 1:
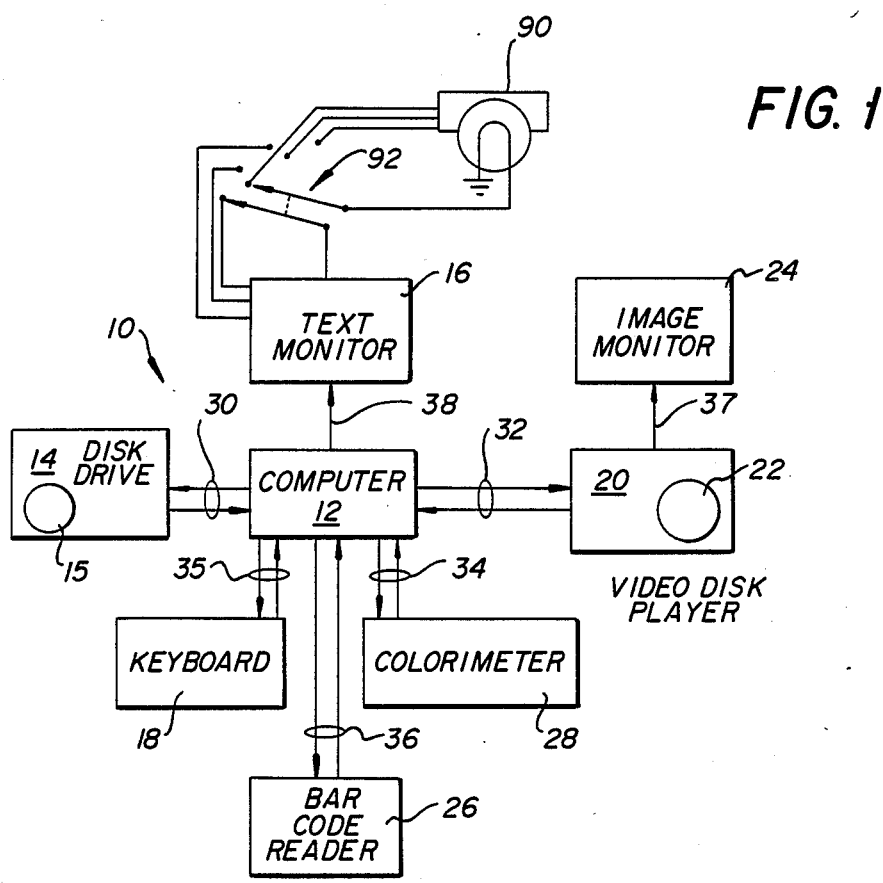
FIG. 1 is a schematic block diagram of an apparatus utilized to conduct the process of the present invention.
Figure 2:
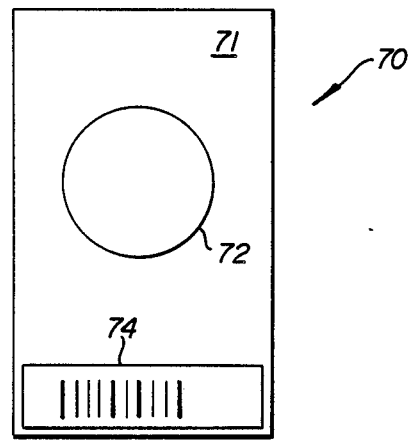
FIG. 2 is a front view of a machine-readable color sample card for identification of color as a search criterion.

The best mode and preferred embodiment of the present inventive system is illustrated in FIGS. 1 and 2. Turning first to FIG. 1, the inventive apparatus, generally indicated at 10, comprises a general-purpose digital computer 12 coupled by communication channel with a videodisk player 20 in which an image disk 22 is mounted. A video output channel 37 of the videodisk player 20 is coupled to an input of image display monitor 24. A video output channel 38 of computer 12 is coupled to an input of text display monitor 16. A disk drive 14 is coupled by communication channel 30 to computer 12, and a characteristics database disk 13 is mounted within disk drive 14.

Input devices which are coupled to computer 12 include keyboard 18 coupled through communication channel 35, bar code reader 26 coupled through communication channel 36, and colorimeter 28 coupled through communication channel 34.

Although those familiar with the art will recognize that a wide variety of devices are available off-the-shelf for use in the present inventive apparatus, one computer system which has been found adequate for the purposes described herein is the IBM Personal Computer XT, which bundles the computer 12, disk drive 14, disk 15, keyboard 18, disk drive 19 and channels 21, 30 and 35 in a single purchase. The IBM Personal Computer XT presently features 128 kilobytes of random-access memory, an Intel model 8088 microprocessor, a 10 megabyte fixed disk drive, a 360 kilobyte removable diskette drive, eight expansion slots, and the IBM Personal Computer disk operating system release 2.0. It is an obvious modification of this system to increase disk-based file capacity by adding one or more disk drives, such as are commercially available from many sources. While the IBM Personal Computer XT incorporates a monochrome composite video output channel 38, a working embodiment of the present invention utilized the optional IBM Color-Graphics Monitor Adaptor attached to the computer 12, which permits display of text in color on display monitor 16. While the presently preferred display mode for computer 12 output is video, it is acceptable to use any human-recognizable output system such as hard copy printout or synthesized voice.

The preferred videodisk player 20 is model LD-V1000 available from Pioneer Video, Inc. This system is a top-loading disk player with a moving optical sled mounted beneath the disk, so that the bottom surface of the disk is read during operation. A helium-neon laser operating at a wavelength of 68 angstroms is used as a light source, and is reflected from a track of the spinnng disk determined by the position of the optical sled. Physical indentations on the reflective surface of the disk cause modulation of the laser light. The video signal produced by the player generally corresponds to the NTSC composite video standard with a one volt peak-to-peak signal presented at a 75 ohm termination. Frequency response is 4.1 megahertz with a signal-to-noise ratio better than 40 decibels and a horizontal resolution of approximately 350 lines. The system exhibits a time base error outside of the vertical blanking interval of plus or minus 22 nanoseconds maximum. Although the player does offer two audio channels, these are not utilized in the present invention.

The LD-V1000 video disk player is designed primarily for computer control and its only manual controls are a power switch and a lid latch for disk loading. The physical interface connector for computer control is a 24 pin Amphenol series 57 connector. Of the 24 available pins, eight are defined to constitute a bidirectional data bus, three more pins are defined to constitute monodirectional control and status lines, and 7 other lines are defined to constitute ground. The precise definition of timing, sequencing and coding may be found by referring to technical publication TP107 of Pioneer Video, Inc.

The LD-V1000 player recognizes 52 different 8-bit codes on the data bus which comprises a portion of channel. For purposes of the present invention, only the commands for arguments digits 0-9 and the motion control command known as "Search" are utilized.

Each disk 22 placed within videodisk player 20 comprises a database of design component product images. Each disk 22 may portray up to 54,000 such images on one disk side. Thus the system user has access to 54,000 images without the need to manually remove the disk 22 from the player 20, reorient the disk 22 and place it within the player 20 again so that the opposite side of the disk is exposed to the optical sled. Each still-frame image on the disk 22 is referred to sequentially by number, so that any frame on a given side of the disk 22 is uniquely identified by a 5-digit number. Such disks are records on a format known as constant angular velocity (CAV), where concentric tracks on the disk each portray a single still-frame image and the disk is rotated at a constant rate of 30 revolutions per second by the player 20. It should be noted that commercial disk pressing facilities are operated domestically by Pioneer Video, Inc. and by 3M Corporation, and a large number of firms offer the service of producing and mastering video presentation for disk pressing. One such production organization is Videodisk Publishing, Inc.

Of the many command functions implemented in the LD-V1000 player, the present invention utilizes the "Search" command which is always preceded by a 5-digit argument number specifying an image frame of disk 22 to be displayed on monitor 24. Upon determination of the frame number desired, which will be explained in greater detail below, computer 12 transfers the frame number as a group of five 8-bit codes to the videodisk player 20 through channel, and then transfers a single 8-bit code representing the command "Search". Upon receipt of this sequence, player 20 adjusts the position of the optical sled until the specified frame is found, and then maintains the sled in that position to display the desired still-frame image continuously on monitor 24 until a subsequent "Search" command is received and executed. Specific interface hardware for use by computer 12 is illustrated in Pioneer Video, Inc. technical publication TP107. Pioneer Video, Inc. also sells a player controller model IU-04 which couples to the asynchronous communications adaptor of the IBM Personal Computer XT, or any RS-2C output port of any general purpose computer, and to the 24-pin control socket of the LD-V1000 player. This controller acts as a serial-to-parallel/parallel-to-serial converter. Any multiple-pin parallel output port of computer 12 may be coupled directly to the 24-pin connector of the LD-V1000 player.

The monitor 24 is preferably a model 650HR color video monitor available from Tektronix. This model was chosen for its high resolution screen imaging capability, and for its ability to compensate for ambient viewing light. However, other video monitors may prove equally useful, particularly where the source material from which the disk 22 is mastered comprises photographs, catalog excerpts or any such low-resolution images other than the original design components themselves.

Keyboard 18 preferably comprises an alphanumeric keyboard such as the IBM keyboard provided with the IBM Personal Computer XT. The IBM keyboard has 83 keys including a standard typewriter keyboard layout, 10 programmable function keys, and a 15-key pad which can implement software-defined functions. The keyboard is controlled by an Intel model 8048 microprocessor which communicates using a hand-shaking protocol with the computer 12.

Figure 3:
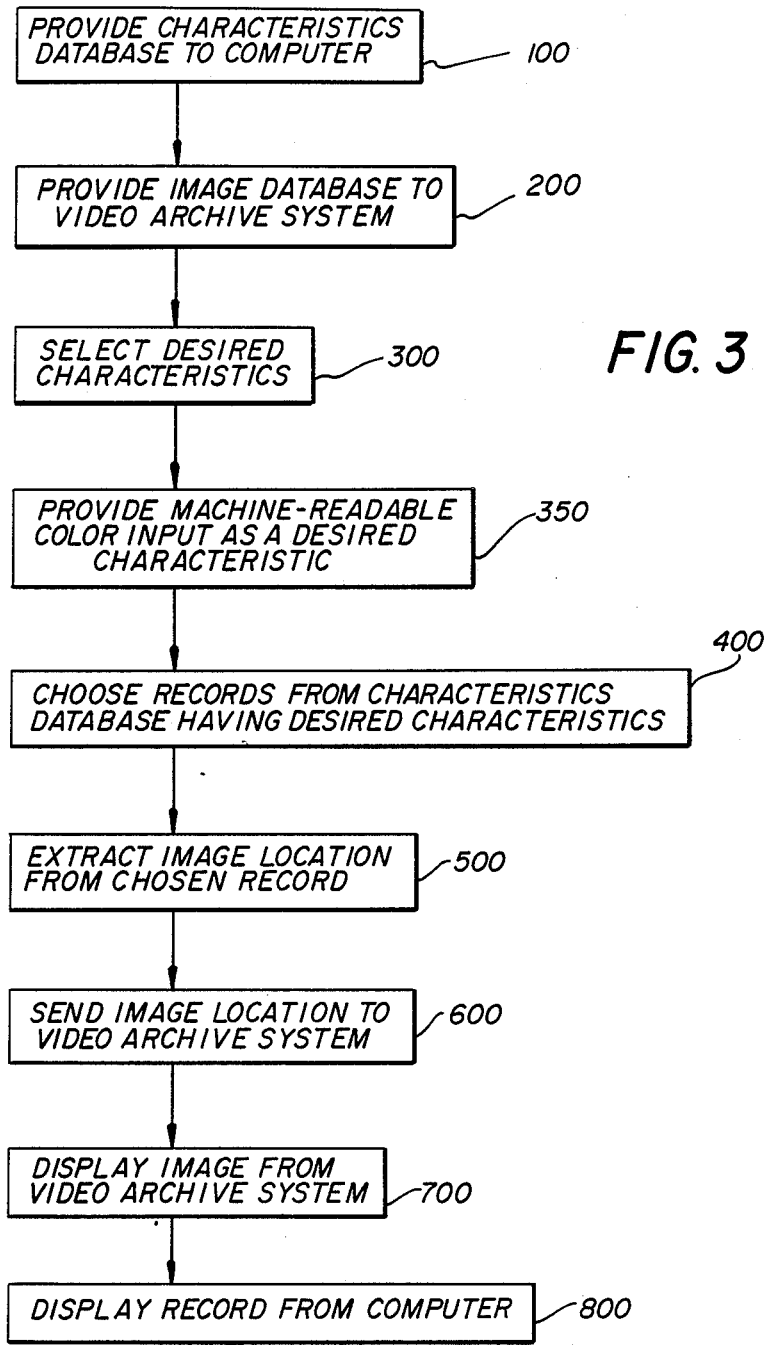
FIG. 3 is a flowchart showing the various process steps of the process of the present invention.

Turning now to FIG. 3, a process of system operation is illustrated for the selection and display of design component products meeting desired constraints of price, color and other characteristics. In step 100, a database of records corresponding to design component products is provided to the computer 12. Each record of this database identifies a plurality of characteristics of the corresponding design component product. Products are grouped into files by type, such as chairs, carpets, or wallcovering, and all products within a given type are described within their corresponding records by a common group of categories of characteristics. Products of a different type may be described by different categories. For instance, paint is described by liquid volume whereas furniture can be described by height, width and depth. However, all products, regardless of type, share at least four common categories of characteristics: price, manufacturer, color and a location of the design component image within an image database. As implemented in the preferred embodiment, the location of each design component image is identified by frame number on the disk 22.

In the IBM Personal Computer XT, as presently preferred, the database is implemented as a binary tree file structure on hard disk and is accessed by use of a file handling tool know as "Btrieve" marketed by SoftCraft of Austin, Texas. This product operates together with the disk operating system provided by IBM and with any high-level language widely available for the IBM Personal Computer XT as well as the IBM Macro assembler.

In step 200, an image database is provided to a video archive system. In the presently preferred embodiment, the image database resides on the videodisk 22 and the videodisk player 20 comprises an archive system providing access to images within the image database. It should be noted that the present invention contemplates expansion of the image database beyond the 54,000 frames available on a single side of a disk 22. For example, the archive system could comprise multiple disk players controlled by computer 12 together with a switch for selective connection of monitor 24 to a video output channel of any of the players. Pioneer and other manufacturers have announced players capable of accessing multiple videodisks in a manner analogous to a jukebox.

In step 300, a user of the present inventive system specifies a product type and is then provided with a list of predetermined categories of characteristics for that product type. The user then selects one or more desired characteristics. The user may choose to forego selections from categories, may directly supply answers through the keyboard, or may request for each category a dictionary of recognized terms. In this latter option, the user need only select from among the recognized dictionary terms, and the selection can be indicated by movement of a cursor image on monitor 16 under control of a keyboard, a light pen, a mouse, or any other well-known standard input mechanism which may be used to select from among options displayed on the video monitor 16. The dictionary method of prompting thus assures that no inadvertent spelling errors give rise to frustration and unnecessary repetition of commands or database searches.

In step 350, the user selects the category of color as one characteristic in which to specify a selection. One advantageous manner specifying such a color constraint to the system of the present invention is by exposing a pre-existing product sample bearing the desired color to a colorimeter 28, which preferably digitizes the quantities of hue, chroma and value corresponding to teh exposed color, and then transfer such values through channel 34 to computer 12. One advantage of this manner of color specification is that absolutely no prior knowledge need be required of the user, so that unexperienced and untrained consumers may utilize the present invention. No knowledge of common color names or a dictionary thereof is required. However, it is necessary that a product sample be transportable to the site of the system 10 for exposure to colorimeter 28. One commercially available colorimeter which is easily adaptable to this purpose is a portable colorimeter system offered by Minolta.

Where a portable product sample is not available, such as where the pre-existing color selection is paint applied to walls, a color reference card structure such as is illustrated in FIG. 2 may be utilized at the site of the pre-existing product. Typically a large number of such cards 70 are provided, each bearing a color field 71 having a unique combination of hue, chroma and value, and a machine-readable identification code 74 which may identify the color field by either serial number or quantification of hue, chroma and value. Each color field of each card is compared to the pre-existing product sample at the product sample site until the nearest match is determined, and the card bearing the field of nearest match is then transported to the site of the system 10. The card is exposed to bar code reader 26, which communicates the identity of the color field 71 through channel 36 to the computer 12. In the event that the code 74 comprises a serial number, then a serial number is utilized as an index and communicated through channel 30 to disk drive 14, whereupon a record of color characteristics corresponding to the serial number is retrieved from hard disk 15 and communicated through channel 30 to computer 12. Alternatively, where the code 74 expresses actual color characteristics, the computer 12 need only obtain the code through channel 36 from bar code reader 26. Thus the computer can be informed of color selection by use of comparison cards, which use is more thoroughly described in my co-pending application Ser. No. 665,529, now abandoned assigned to the assignee of the present invention. The advantage of this method is the ability to communicate color information from a remote product site without reliance on human color memory. However, typically a large number of color reference cards 70 are needed, and it is preferable that the person conducting the comparison have prior experience and training in location of the closest color match among the cards. Thus it appears that this method is not especially well suited for use by untrained consumers.

Disk drive 19 preferably facilitates use of removable diskettes 17 for data storage and retrieval by computer 12 through channel 21. Drive 19 can be used to record and recall each selection of desired component characteristics, should the user be interrupted for any reason during use of the system. Preferably the user removes and carries away a personal diskette 17 whenever interrupted, and returns diskette 17 to drive 19 when system use is resumed. Step 300 is then at least partly reconducted by loading characeristic selections from diskette 17 to computer 12.

In step 400, the present inventive system then chooses records from the database of product characteristics which indicate the characteristics specified by the user in the previous steps. As presently preferred, for each product type there is created a single file or data records, and a number of files of key records corresponding to the number of categories established for product characteristics of the product type. If the user has selected a desired chararcteristic for a given category, then the system searches the key file of the chosen category and product type and identifies all keys which match the desired characteristic. Recorded with each key is a pointer to a data record for a product having the desired characteristic. The system thus creates a list of pointers to all products of the same type and having the desired characteristic. Considering each list of pointers from each category as a set, the system then determines the intersection of all such sets. Thus, the one or more products meeting the characteristics desired by the user will be those which are found in every set of key-matched records for every category in which the user specified a characteristic.

In step 500, the present inventive system examines each record satisfying all the desired characteristic and extracts the image location information from the record. In step 600, the image location is transferred from the computer to the video archive system. As presently preferred, this is accomplished by transferring frame number digits as 8-bit parallel information from computer 12 through channel to the videodisk player 20, followed by the 8-bit command to search for the frame number just transmitted. In step 700, the video archive system thus displays each image identified by the records located in step 400. In the present preferred embodiment, the image information is transferred as a composite video signal through channel 37 to display monitor 24. Thus the user can view the product to determine its aesthetic characteristics and overall suitability for a specific application.

In step 800, the computer generates a display of product characteristics and transfers that display as composite video through channel 38 to display monitor 16. This is especially advantageous for determining characteristics not readily apparent on the monitor 24, such as prices, fireproofing, availability, and absolute size. Again, the precise categories displayed will vary from product type to product type.

Alternatively, the channels 37 and 38 can be routed to a single monitor so that the record information of product characteristics is superimposed on the product image from disk 22. It is necessary for this purpose to establish common synchronization and colorburst pulses for both channels 37 and 38. Several manufacturers now offer products for this purpose, most of which derive sync and colorburst for channel 38 from an independent channel 37. Hitachi offers an optical videodisk player which features genlock of channel 37 to an independent channel 38.

In the preferred embodiment, a great number of categories exist for each product type presently cataloged in the inventive system. In order to conserve disk and memory resources and enhance search speed, a unique number is assigned to each valid response in the dictionary of responses for each category of chararcteristics. Some characteristics, such as price and color, are easily quantified, while other characteristics such as fabric type or manufacturer, are assigned index numbers arbitrarily. Thus, in step 300, any valid response word selected from a dictionary is automatically converted by the system to an index number through a table search process. All key files then consist of numbers rather than character strings of the word responses themselves. Further, all data records consist of numbers positioned in fields corresponding to the categories, and each number can be re-converted to the corresponding word for display in step 800 by a well-known process of table lookup using the number as an offset from an initial address. Thus the technique becomes totally transparent to the user while conserving finite system resources.

However, in one category universal to all product types, the sensitivity of the user far outstrips the ability of the user to articulate or quantify the characteristic manually. This characteristic is color. Colors have been quantified according to the Munsell and CIE systems as a combination of three coordinates namely, hue, chroma, and brightness. Hue is defined as the frequency of the light comprising the color. Chroma is also referred to as the saturation of the color, and brightness is known as the degree of white or black which is combined with the other characteristics of the color. While members of the public are not generally conversant with these concepts, it is also true that even design professionals often cannot make an adequate determination of quantification on the basis of eye examination alone. Such determinations are often further obscured by the quality of ambient light available in any given examination.

A variety of colorimeters have been placed on the market which quantify coordinates of examined color samples. One such system is offered by Pacific Scientific under the name "Spectroguard Automatch", and another is offered by Minolta under the name "Chroma Meter II". These systems provide digital quantification on a realtime basis under colorimeter-supplied uniform lighting quality. In order to promote uniform and accurate determination of color characteristics, it is presently preferred that a colorimeter such as those noted above be coupled to the inventive system through a channel 34. Thus, step 350 would typically incorporate a selection of color by exposing a color sample to colorimeter 28. The data from colorimeter 28 would then be transferred through channel 34 to computer 12 and incorporated in the group of desired characteristics. Additionally, the user may decide to select products having colors corresponding to a color coordination plan other than a monochromatic match, such as complementary plan, a split complementary plan, an analogous plan, a triatic plan, or any other well-known widely recognized coordination system. The present invention preferably incorporates a model of the color spectrum which permits rapid determination of a range or block or color coordinates corresponding to colors falling within each of these plans.

Alternately, the present invention may provide a plurality of onscreen color images for the user to compare to the user's samples. Accurate color images can be recorded on image disk 22 for display on monitor 24 by player 20 under control of computer 12 through channel 30. If each color sample fills a frame of disk 22, then the computer 12 automatically advances the frames of disk 22 during color selection, with advancement speed controlled by the user through manipulation of keyboard 18 or any other well-known manual input device. Thus computer 12 retains and updates the frame number of the displayed frame from image disk 22. When the user requires detailed observation of a single color, then advancement speed is reduced to zero. If the color shown matches the sample, then the user so indicates by pressing another key to terminate the color search. According to this alternative, a color dictionary provided to computer 12 indicates the color coordinates coresponding to the color frames of disk 22. It is presently preferred that no more than about 10,000 colors be recorded, which is far less than the capacity of a single side of a disk 22.

In the event that frames on disk 22 are a scarce commodity, then more than one color can be recorded in each frame. Each frame is divided into sections with one color shown per section. In this alternative, the user advances to a desired frame as described above, and then indicates a choice of section from the frame. This can be implemented by mapping the borders of the section onto monitor 16, and then facilitating movement of a cursor image across monitor 16 to the area corresponding to the chosen color section on monitor 24. Alternatively, by using a player 20 with its video output synchronized to video output from computer 12, the cursor image can be superimposed on monitor 24 for controlled movement to the chosen section. Likewise, other well-known methods of area selection from a video image may be used, such as lightpen. In these alternatives, the color dictionary provided to computer 12 denotes the correspondence between each section of each disk frame and a color quantification.

It has long been recognized by those familiar with color technology that the quality of ambient light plays a critical role in color perception. Thus the user may perceive a color match under sunlight but not under artificial light, or vice versa. While monitor 24 is at present a radiant device, and therefore independent of ambient light in its location, it is possible to adjust monitor 24 to present images as the corresponding products would appear under various predetermined lighting conditions. A lightbox 90 is provided in which to place physical samples for viewing, and which can be adjusted by switch 92 to provide light quality alternatives such as sunlight, fluorescent light or incandescent light. Switch 92 is preferably a multiple-throw, double-pole switch also connected to monitor 24 so as to adjust monitor 24 to match the light selected in box 90 for sample viewing. Thus the user can be assured of a visual color match not at the location of the apparatus 10, but at the location being designed by the user.

In situations where color samples cannot be brought to the present inventive system, a group of color comparison samples 70 can be provided to the user for comparison to each pre-existing design component in the environment to be decorated. Each sample 70 comprises a monocolored planar element 71 having a central aperture 72 and a machine-readable block identifier 74 indicating the number of colorblock 62 in which the color of element 71 is located. It is presently preferred that identifiers 74 comprise a bar-code in any standard well-known machine-readable encryption. The user places each sample 70 on a remote pre-existing design element until a close color match is observed through aperture 72. The identifier 74 of matching sample 70 is then exposed to bar-code wand 26, which provides the primary colorblock number of sample 70 through channel 36 to computer 12.

In operation of the present invention, the computer 12 initially displays on monitor 16 a query to the user for selection of a design component product type, and preferably displays also a list of valid responses to the query. The user indicates an appropriate selection through keyboard 18 and channel 35. The computer 12 then opens access to appropriate characteristics and dictionary databases through channel 30 on disk 15 within disk drive 14. Computer 12 also displays through channel 38 on monitor 16 a request for installation of a selected image database disk 22 in videodisk player 20.

Computer 12 then displays on monitor 16 a list of categories of characteristics pertaining to the product type selected by the user. The user then indicates through keyboard 18 and channel 35 one or more categories in which the user desires to provide selected characteristics. For each category other than color, the user may elect to enter a descriptive term directly or, alternatively, to view a dictionary of valid responses and indicate a selection by positioning a cursor image adjacent a response image through manipulation of keyboard 18. When any descriptive term is entered directly by the user, rather than using a dictionary display selection alternative, the computer 12 compares the provided descriptive term to dictionary terms until a match is found, at which time a number corresponding to the found dictionary term is determined. If no match is found then the term is rejected as invalid.

If the user selects color as a category, then computer 12 displays on monitor 16 directions to use a machine-readable color input device such as colorimeter 28, videodisk player 20 or bar code reader 26, the use of which are described above. The computer 12 then obtains color quantification from the machine-readable color input device as described.

Upon completing selection of a list of desired design component characteristics for the designated design product type, computer 12 accesses the characteristics database recorded on disk 14 to locate records incorporating at least the selected list of design component characteristics. For each record satisfying this requirement, computer 12 extracts the corresponding image address from the record and provides the address through channel to videodisk player 20. The videodisk player 20 then displays the corresponding image through channel 37 on monitor 24. Computer 12 also displays all phrases corresponding to the identifier numbers in each indicated record through channel 38 to monitor 16. The user may manually control the rate at which frames are displayed with corresponding information from keyboard 18. This can be implemented simply by displaying a frame indefinitely until the user strikes a key on keyboard 18. Computer 12 preferably retains the list of desired component characteristics so that the use may refine the list upon display or termination of the characteristics database search.

With regard to the desired component characteristic of color, it is preferable to provide relative terms of refinement, such as "lighter", "darker", "more yellow", rather than reselection through the machine-readable systems. Thus, after a refined list of desired component characteristics has been provided by the user according to step 300, the present invention incorporates a dictionary of relative adjustments for color refinement when step 350 is repeated.

Thus it can be seen that the present inventive system provides rapid and convenient access to information of a visual nature together with descriptive characteristics without the need to become familiar with a plethora of component manufacturer catalogs. The system advantageously permits identification of color by a variety of methods corresponding to the most common differing information available from the user, such as common color name, actual color sample, or color comparison sample.

The following is a listing of a control program for computer 12 which implements the process of the present invention on the preferred hardware combination described above. The program is written in the widely-used high-level language called C.

```
/* File        : barcode
 * Version     : 2.0
 * Release     :
 * System      : Search & Source
 * Contact     : Matthew Weinstein
 *===================================================
 *
 * Purpose     : barcode() accepts a string. If the user delays too long
 *                barcode returns a null.
 *
 * Called
 * routines    : sysint bell
 */ include 'stdio.h'
define NEW_LN '\r'
define WAIT 20 barcode(a)
char *a;
{
        struct regval { unsigned int ax,bc,cx,dx,si,di,ds,es; } ireg,freg;
        int i,test;
```

```
        i = 0;

bell();

do{
                ireg.ax = 0x0200;
                ireg.dx = 0x0000;
                sysint(0x14,&ireg,&freg);
                if((test=freg.ax & 0x00ff) != 0)
                        *a++ = (char) (test);
        } while (i++ <= WAIT && test == 0);

i = 0;

if (test)
        {
                do {
                        ireg.ax = 0x0200;
                        ireg.dx = 0x0000;
                        sysint(0x14,&ireg,&freg);
                        if ((test =freg.ax & 0x00ff) != 0)
                                *a++ = (char) (test);
                } while(test != NEW_LN && i++ <= 9);
        } bell();

if(test == NEW_LN)
                *(--a) = '\0';
        else
                *a = '\0';

return ((test)?i+1:0);
}

/*
        setmode sets the asynch port parameters. allowed values are:
        baud: 110 150 300 600 1200 2400 4800 9600
        parity: 0 (none) 1 (odd) 2 (even)
        stopbit: 1 or 2
        wordlength: 7 or 8 exple:
                        setmode(300,0,1,7);
*/ setmode(baud,parity,stopbit,wordlength)
int baud,parity,stopbit,wordlength;
{
        struct regval { unsigned int ax,bc,cx,dx,si,di,ds,es;} ireg,freg;

ireg.dx = 0x0001;

switch (baud)
        {
                case 110:       ireg.ax = 0x0000; break;
                case 150:       ireg.ax = 0x0020; break;
                case 300:       ireg.ax = 0x0040; break;
                case 600:       ireg.ax = 0x0060; break;
                case 1200:      ireg.ax = 0x0080; break;
                case 2400:      ireg.ax = 0x00a0; break;
                case 4800:      ireg.ax = 0x00c0; break;
                case 9600:      ireg.ax = 0x00e0; break;
                default:        return(0);
        } switch (parity)
        {
                case 0:         break; /* none */
```

```
                case 1:     ireg.ax |= 0x0008; break; /* odd */
                case 2:     ireg.ax |= 0x0018; break; /* even */
                default:    return(0);
        } switch (stopbit)
        {
                case 1:     break;
                case 2:     ireg.ax |= 0x0004; break;
                default:    return(0);
        } switch (wordlength)
        {
                case 7:     ireg.ax |= 0x0002; break;
                case 8:     ireg.ax |= 0x0003; break;
                default:    return(0);
        } sysint(0x14,&ireg,&freg);
        return(1);
}
bell()
{
        static unsigned char b = 7;

putchar(b);
}
include 'stdio.h' beep()
{
        putchar(0x07);
}

/*
* File:     BTRCALL.C
* Version:  1.1
* Release:
* System:   Search & Source
* Contact:  Tom Corner or Matt Burkhardt
*-----------------------------------------------------------------
* History: (reverse chronology)
* Date (Version)   Who/Action
* -----------------------------------------------------------------
* 14-mar-84 ( 1.1 )  Tom Corner/ added btr_inser & dmp_stat
*                                updated btr_errmsg & btr_creat
* 02-feb-84 ( 1.0 )  Matt Burkhardt/ Created
*
* =================================================================
*   Abstract:
*   ---------
*   Purpose:
*         Provides an interface to Btrieve with a separate function for
*         each Btrieve operation code. Error messages are printed on stdout
*         if a non-zero status code is returned from Btrieve. These routine
*         may ease the pain of a change in data base systems.
*   Inputs:
*   Outputs:
*   Entry Points:
*              btr_close
*              btr_creat
*              btr_geteq
*              btr_getgt
*              btr_getge
*              btr_gethi
*              btr_getls
*              btr_getle
```

```
*               btr_getlw
*               btr_getnx
*               btr_getpr
*               btr_open
*               btr_stat
*               btr_inser
*               btr_errmsg
*               dmp_stat
*  Called Routines:
*  Special Notes:
*               uses include file:
*               btrstr.c structuctures for Btrieve data formats
****************************************************************
*
*  Note! !!!! position block size is increased to 115 !!!!
*    This is done to store the file name for error messages.
*
****************************************************************
* ==============================================================
*/

/*
*  The following are Btrieve operation codes.
*/
#include 'btrstr.inc'
#define B_CLOSE      1
#define B_INSERT     2
#define B_CREAT     14
#define B_GETEQ      5
#define B_GETGT      8
#define B_GETGE      9
#define B_GETHI     13
#define B_GETLS     10
#define B_GETLE     11
#define B_GETLW     12
#define B_GETNX      6
#define B_GETPR      7
#define B_OPEN       0
#define B_STAT      15

/*
*  BTR_CLOSE(pos, data, key)
*
*  PASSED:     a pointer to a position block (a 100 character array),
*              a pointer to the data buffer
*              a pointer to the key string
*
*  FUNCTION:   closes the file through Btrieve
*
*  RETURNS:    The status code from Btrieve
*
*/
btr_close(pos, data, key)
char *pos, *data, *key;
{
        int stat;

if (stat = BTRIEVE(B_CLOSE, pos, data, key, 0))
                btr_errmsg('close', &pos[100], stat);

return(stat);
}

/*
*  BTR_CREAT(pos, f_spec, name)
*
*  PASSED:     a pointer to a position block (a 100 character array)
```

```
 *                 a pointer to a file specification structure
 *                 a pointer to a file name (string)
 *
 * FUNCTION:       to create a Btrieve file
 *
 * RETURNS:        The status code returned by Btrieve.
 *
 */
btr_creat(pos, f_spec, name)
char *pos, *name;
struct file_create *f_spec;
{ int stat;

if (stat = BTRIEVE(B_CREAT, pos, f_spec, name, 0)){
                dmp_stat(f_spec);

btr_errmsg('create', name, stat);
                }
        strncpy( &pos[100], name, 14);
        return(stat);
}

/*
 * BTR_GETEQ(pos, data, key, keynum)
 *
 * PASSED:        a pointer to a position block (a 100 character array)
 *                a pointer to a data buffer
 *                a pointer to a key value
 *                an integer value to specify which index to use.
 *
 * FUNCTION:      To get a record with a specific key value.
 *
 * RETURNS:       The status code returned from Btrieve.
 *
 */
btr_geteq(pos, data, key, keynum)
char *pos, *data, *key;
int keynum;
{ int stat;
        unsigned int coreleft();

if (stat = BTRIEVE(B_GETEQ, pos, data, key, keynum)){
                btr_errmsg('geteq', &pos[100], stat);
                }
        return(stat);
}

/*
 * BTR_GETGT(pos, data, key, keynum)
 *
 * PASSED:        a pointer to a position block
 *                a pointer to the data buffer
 *                a pointer to the key value
 *                an integer for the key index to access
 *
 * FUNCTION:      To get the first record greater than the key value.
 *
 * RETURNS:       The status code returned by Btrieve.
 *
 */
btr_getgt(pos, data, key, keynum)
char *pos, *data, *key;
int keynum;
{
```

```
        int stat;

if (stat = BTRIEVE(B_GETGT, pos, data, key, keynum))
                btr_errmsg('getgt', &pos[100], stat);

return(stat);
}

/*
 *    BTR_GETGE(pos, data, key, keynum)
 *
 *    PASSED:     a pointer to a position block
 *                a pointer to the data buffer
 *                a pointer to the key value
 *                an integer for the key index to access
 *
 *    FUNCTION:   To get the first record greater than or equal to the key
 *
 *    RETURNS:    The status code returned by Btrieve.
 *
 */
btr_getge(pos, data, key, keynum)
char *pos, *data, *key;
int keynum;
{
        int stat;
        unsigned int coreleft();

if (stat = BTRIEVE(B_GETGE, pos, data, key, keynum)),
                btr_errmsg('getge', &pos[100], stat);

return(stat);
}

/*
 *    BTR_GETHI(pos, data, key, keynum)
 *
 *    PASSED:     a pointer to a position block
 *                a pointer to the data buffer
 *                a pointer to the key value
 *                an integer for the key index to access
 *
 *    FUNCTION:   To get the record with the highest key value.
 *
 *    RETURNS:    The status code returned by Btrieve.
 *
 */
btr_gethi(pos, data, key, keynum)
char *pos, *data, *key;
int keynum;
{
        int stat;

if (stat = BTRIEVE(B_GETHI, pos, data, key, keynum))
                btr_errmsg('gethi', &pos[100], stat);

return(stat);
}

/*
 *    BTR_GETLS(pos, data, key, keynum)
 *
 *    PASSED:     a pointer to a position block
 *                a pointer to the data buffer
 *                a pointer to the key value
 *                an integer for the key index to access
 *
```

```
*   FUNCTION:    To get the next record with the lesser key value.
*
*   RETURNS:     The status code returned by Btrieve.
*
*/
btr_getls(pos, data, key, keynum)
char *pos, *data, *key;
int keynum;
{
        int stat;

if(stat = BTRIEVE(B_GETLS, pos, data, key, keynum))
                btr_errmsg('getls', &pos[100], stat);

return(stat);
}

/*
*   BTR_GETLE(pos, data, key, keynum)
*
*   PASSED:      a pointer to a position block
*                a pointer to the data buffer
*                a pointer to the key value
*                an integer for the key index to access
*
*   FUNCTION:    To get the next record with a lesser or equal key value.
*
*   RETURNS:     The status code returned by Btrieve.
*
*/
btr_getle(pos, data, key, keynum)
char *pos, *data, *key;
int keynum;
{
        int stat;

if (stat = BTRIEVE(B_GETLE, pos, data, key, keynum))
                btr_errmsg('getle', &pos[100], stat);

return(stat);
}

/*
*   BTR_GETLW(pos, data, key, keynum)
*
*   PASSED:      a pointer to a position block
*                a pointer to the data buffer
*                a pointer to the key value
*                an integer for the key index to access
*
*   FUNCTION:    To get the first record of a key value.
*
*   RETURNS:     The status code returned by Btrieve.
*
*/
btr_getlw(pos, data, key, keynum)
char *pos, *data, *key;
int keynum;
        int stat;

if (stat = BTRIEVE(B_GETLW, pos, data, key, keynum))
                btr_errmsg('getlw', &pos[100], stat);

return(stat);
}

/*
```

```
/*
 *   BTR_GETNX(pos, data, key, keynum)
 *
 *   PASSED:     a pointer to a position block
 *               a pointer to the data buffer
 *               a pointer to the key value
 *               an integer for the key index to access
 *
 *   FUNCTION:   To get the next record of a key value.
 *
 *   RETURNS:    The status code returned by Btrieve.
 *
 */
btr_getnx(pos, data, key, keynum)
char *pos, *data, *key;
int keynum;
{
        int stat;

if (stat = BTRIEVE(B_GETNX, pos, data, key, keynum))
                btr_errmsg('getnx', &pos[100], stat);

return(stat);
}

/*
 *   BTR_GETPR(pos, data, key, keynum)
 *
 *   PASSED:     a pointer to a position block
 *               a pointer to the data buffer
 *               a pointer to the key value
 *               an integer for the key index to access
 *
 *   FUNCTION:   To get the previous record of a key value.
 *
 *   RETURNS:    The status code returned by Btrieve.
 *
 */
btr_getpr(pos, data, key, keynum)
char *pos, *data, *key;
int keynum;
{
        int stat;

if (stat = BTRIEVE(B_GETPR, pos, data, key, keynum))
                btr_errmsg('getpr', &pos[100], stat);

return(stat);
}

/*
 *   BTR_OPEN(pos, data, key)
 *
 *   PASSED:     a pointer to a position block
 *               a pointer to the data buffer
 *               a pointer to the name of the file
 *
 *   FUNCTION:   To open a Btrieve file.
 *
 *   RETURNS:    The status code returned by Btrieve.
 *
 */
btr_open(pos, data, name)
char *pos, *data, *name;
{
        int stat;
```

```
/* -1 key number for accelerated access */
        if (stat = BTRIEVE(B_OPEN, pos, data, name, -1))

btr_errmsg('open', name, stat);
        strncpy( &pos[100], name, 14);
        return(stat);
}

/*
*   BTR_STAT(pos, f_spec, key)
*
*   PASSED:     a pointer to a position block
*               a pointer to the file specification structure
*               a pointer to the key value
*
*   FUNCTION:   To obtain statistics about a Btrieve file.
*
*   RETURNS:    The status code returned by Btrieve.
*
*/
btr_stat(pos, f_spec, key)
char *pos, *key;
struct file_spec *f_spec;
{ int stat;

if (stat = BTRIEVE(B_STAT, pos, f_spec, key, 0))
                btr_errmsg('stat', &pos[100], stat);

return(stat);
}
/*
* btr_inser(pos,data,key,keynum)
*
* Insert new record in the file.
*
* Passed:   100 char position buffer
*           data buffer containing new record
*           key number (0-7) of key to return
*
* returned: key of record inserted
*           status code
*/
btr_inser(pos,data,key,keynum)
char *pos,*data,*key;
int keynum;
{
al
*
*   RETURNS:    Nothing
*
*/
btr_errmsg(op, fname, err)
char *op, *fname;
int err;
{ switch( err ){
          case 18:
            printf('\nBtrieve %s (File:%s), disk full\n', op,fname);
            bcp();
            break;
          case 5:
            printf('\nBtrieve %s (File:%s), Duplicate Key Not Allowed\n'
            , op,fname);
            bcp();
            break;
```

```
              case 4;       /* key not found */
              case 9;       /* end of file */
                 break;
              case 20:
                 printf('\nBtrieve inactive, Execute Btrieve and try again\n');
                 bcp();
                 break;
              case 12:
                 printf( '\nBtrieve %s, File \'%s\' not found\n',op,fname);
                 bcp();
                 break;
              default:
                 printf('\nBtrieve error, %s (File:%s) ',op,fname);
                 printf('Status = %d\n', err);
                 bcp();
                 break;
              }
        return;
}
/*
 * dump file status or specification
 */
dmp_stat(s)
struct file_stat *s;
{
int i;
printf(' record length %d\n',s->rec_len);
printf(' page size     %d\n',s->page_size);
printf(' indexes       %d\n',s->index_count);
for(i=0;i<s->index_count;i++){
   printf('\n index       %d\n',i);
   printf( ' key position %d\n',s->keys[i].key_pos);
   printf( ' key length   %d\n',s->keys[i].key_len);
   printf( ' key flag     %x\n',s->keys[i].key_flag);
   }
}
bcp()
{
  printf('Strike any key to continue. \n');
  getscan();
  return;
}
/*
* File:    BTRSTR.C
* Version: 1.0
* Release:
* System:  Search & Source
* Contact: Matt Burkhardt
*------------------------------------------------------------------
* History: (reverse chronology)
* Date (Version)   Who/Action
* -----------------------------------------------------------------
* 02-feb-84 ( 1.0 ) Matt Burkhardt/ Created
*
* ================================================================
*   Abstract:
*   ---------
*   Purpose:
*       Structures for Btrieve data formats. file_stat is used by btr_stat
*    and btr_creat.
*   Inputs:
*   Outputs:
*   Entry Points:
*   Called Routines:
*   Special Notes:
* ================================================================
*/
```

```
struct key_spec {
        int     key_pos;
        int     key_len;
        int     key_flag;
        char    notuse2[4];
        char    reserv2[6];
};

struct file_stat {
        int     rec_len;
        int     page_size;
        int     index_count;
        char    notuse1[4];
        char    reserv1[6];
        struct  key_spec keys[8];
};
/*
* File:     BUILDSL.C
* Version:  1.1
* Release:
* System:   Search & Source
* Contact:  Tom Corner
*---------------------------------------------------------------
* History: (reverse chronology)
* Date (Version)    Who/Action
* ---------------------------------------------------------------
*           ( 1.0 ) Created/Tom Corner
* 13-jun-84 ( 1.1 ) TC/ added stuffing pointer to file descriptor in
*                   search list.
*
*
* ===============================================================
* Abstract:
* ---------
* Purpose:
*       Build search list entry
* Inputs:
* Outputs:
* Entry Points:
*               buildsl
* Called Routines:
* Special Notes:
* ===============================================================
*/
/*
* buildsl - a function to build a search list. If no search list exists,
* it is created. A new entry is added to the search list ( or an existing
* one is modified ). Data is transferred from the file descriptor and
* the function parameters to the search list.
*/
#include 'search.inc'
include 'filedesc.inc'
struct search_list *buildsl( fd, v1, v2, msg, sl, comp )
struct file_descriptor *fd;
char *v1, *v2;  /* values to compare the field to */
char *msg;      /* a display message associated with this comparison */
struct search_list *sl;
{
   struct search_list *a, *v, *o;

v = fd->addr_srchlist;
   if( v==0 ){
     v = fd->addr_srchlist = malloc(SLSIZE);
     v->or_ptr = v->and_ptr = 0;
     if( sl==0 )sl = v;
     else {
       for( a=sl; a->and_ptr != 0; a = a->and_ptr );
       for( o=a; o!=0; o=o->or_ptr )o->and_ptr = v;
     }
   }
```

```
        v->sl_fd = fd;
        v->btrind = fd->f_index;
        v->field_pos = fd->f_field_pos;
        v->compare_len = comp;
        v->skip_len = fd->skip_length;
        v->repeat_count = fd->f_repeat_count;
        v->field_type = fd->f_field_type;
        v->search_action = fd->f_search_action;
        movmem( v1, v->select_value1, sizeof(v->select_value1));
        movmem( v2, v->select_value2, sizeof(v->select_value2));
        movmem( msg, v->display_msg, sizeof(v->display_msg) );
        if( v->btrind == STYLES ) { /* for style search add or all styles */
           o = v->or_ptr = malloc( SLSIZE );
           o->and_ptr = v->and_ptr;
           o->or_ptr = 0;
           o->btrind = STYLES;
           o->field_pos = v->field_pos;
           o->compare_len = 1;
           o->skip_len = v->skip_len;
           o->repeat_count = v->repeat_count;
           o->field_type = v->field_type;
           o->search_action = EQUAL;
           o->sl_fd = v->sl_fd;
           movmem('400',o->select_value1,3);
           movmem('All Styles',o->display_msg,11);
        }
     return(sl);
}
/* File      : bump_rec.c
 * Version   : 2.0
 * Release   :
 * System    : Search & Source
 * Contact   : Phil Evans
 * Date      : 4-19-84
 *==================================================================
 *
 * Purpose   : this routine bumps the display record ahead or
 *             back for all products
 *
 * Called
 * routines  : none
 */ include 'disstruc.str' int bump_rec(direction,generation,position,sel_table,sel_count)
int direction,generation,sel_count;
int *position;
struct selected_ids  sel_table[];
{
        int i,find,start,location;

find = FALSE;
        if (direction == AHEAD)
        {
                start = (*position)+1;
                for (i = start; i <= sel_count-1 && find == FALSE; i++)
                        if (sel_table[i].saved == generation ||
                              sel_table[i].saved == generation+1)
                        {
                               find = TRUE;
                               location = i;
                        }
                if (find == FALSE)
                {
                        start = 0; beep();
                        for (i = start; i <= sel_count-1 && find == FALSE; i++
                                if (sel_table[i].saved == generation
                                      || sel_table[i].saved == generation+1)
```

```
                                        {
                                        find = TRUE;
                                        location = i;
                                        }
                        }
                        *position = location;
                }
                else
                {
                        start = (*position)-1;
                        for (i = start; i )= 0 && find == FALSE; i--)
                                if (sel_table[i].saved == generation ||
                                        sel_table[i].saved == generation+1)
                                {
                                        find = TRUE;
                                        location = i;
                                }
                        if (find == FALSE)
                        {
                                start = sel_count-1; beep();
                                for (i = start; i )= 0 && find == FALSE; i--)
                                        if (sel_table[i].saved == generation ||
                                                sel_table[i].saved == generation+1
                                        {
                                                find = TRUE;
                                                location = i;
                                        }
                        }
                        *position = location;
                }
                return(0);
}
/* File      : bump_scr.c
 * Version   : 2.0
 * Release   :
 * System    : Search & Source
 * Contact   : Phil Evans
 * Date      : 4-01-84
 *================================================================
 *
 * Purpose   : this routine bumps the screen display ahead
 *             or back for all products
 *
 * Called
 * routines  : none
 */ include 'disstruc.str' int bump_scr(direction,screen,max_screen)

int direction, *screen,max_screen;
{
(*screen) += direction;
if ((*screen) < 1) *screen = max_screen;
if ((*screen) > max_screen) *screen = 1;
return(0);
}
/* C86 interface to Btrieve Record Manager */
BTRIEVE (OP, POS_BLK, DATA_BUF, KEY_BUF, KEY_NUM)
    int  OP;
    char POS_BLK[];
    char DATA_BUF[];
    char KEY_BUF[];
    int  KEY_NUM;

{
#define BTR_ERR     20           /* record manager not started */
```

```
#define BTR_VECTOR    0x7B * 4          /* offset for interrupt */
#define C_ID          0xCCCC            /* language id for C */
define POS_LEN_ERR   23                /* invalid position block length */ struct REGVAL { int AX,BX,CX,DX,SI,DI,D_SEG,E_SEG; }-REGS;

struct SEGREG { int CS,SS,DS,ES; }            SREGS;

struct BTRIEVE_PARMS                    /* structure passed to Record Man */
  {char *USER_BUF_OFFSET;               /* callers data buffer offset */
   int  USER_BUF_SEG;                   /* callers data buffer segment */
   int  USER_BUF_LEN;                   /* length of data buffer */
   char *USER_CUR_OFFSET;               /* user position block offset */
   int  USER_CUR_SEG;                   /* user position block segment */
   char *USER_FCB_OFFSET;               /* offset of disk FCB */
   int  USER_FCB_SEG;                   /* segment of disk FCB */
   int  USER_FUNCTION;                  /* requested function */
   char *USER_KEY_OFFSET;               /* offset of user's key buffer */
   int  USER_KEY_SEG;                   /* segment of user's key buffer */
   char USER_KEY_LENGTH;                /* length of user's key buffer */
   char USER_KEY_NUMBER;                /* key of reference for request */
   int  *USER_STAT_OFFSET;              /* offset of status word */
   int  USER_STAT_SEG;                  /* segment of status word */
   int  XFACE_ID;};                     /* language identifier */ struct BTRIEVE_PARMS XDATA;
int   STAT;                             /* status of Btrieve call */

/*  Read segment registers and initialize segment part of addresses to  */
/*  user's data segment.                                                */
/*                                                                      */
segread(&SREGS);
XDATA.USER_BUF_SEG = XDATA.USER_CUR_SEG = XDATA.USER_FCB_SEG =
   XDATA.USER_KEY_SEG = XDATA.USER_STAT_SEG = SREGS.DS;
/*                                                                      */
/*  Move user parameters to XDATA, the block where Btrieve expects them.*/
/*                                                                      */
XDATA.USER_FUNCTION = OP;
XDATA.USER_STAT_OFFSET = &STAT;
XDATA.USER_FCB_OFFSET = POS_BLK;
XDATA.USER_CUR_OFFSET = POS_BLK + 38;
XDATA.USER_BUF_OFFSET = DATA_BUF;
XDATA.USER_BUF_LEN = 4096;              /* use max since we don't know */
XDATA.USER_KEY_OFFSET = KEY_BUF;
XDATA.USER_KEY_LENGTH = 255;            /* use max since we don't know */
XDATA.USER_KEY_NUMBER = KEY_NUM;
XDATA.XFACE_ID = C_ID;
/*                                                                      */
/*  Check to see that the Btrieve Record Manager has been started.      */
/*                                                                      */
if (peek(BTR_VECTOR, 0) != 0x33)
   return (BTR_ERR);
/*                                                                      */
/*  Make call to Btrieve Record Manager                                 */
/*                                                                      */
REGS.DX = &XDATA;
REGS.D_SEG = SREGS.DS;
REGS.E_SEG = SREGS.ES;
sysint(0x7B, ®S,®S);
return(STAT);}
/* File         : CIN (color input)
 * Version      : 2.0
 * Release      :
 * System       : Search & Source
 * Contact      : Matthew Weinstein
 *===================================================
 *
 * Purpose      : Opens the color table and fetches(depending on a menu cho
```

```
 *                      either the block number or the description
 *
 * Called
 * routines     : typ_in, btr_call, ibmcolor, critcall, getcur
 */

/*
        link with btrcall.o
*/

/*
        need to place row and column
*/ include 'stdio.h'
include 'filedesc.inc'
include 'screen.inc'
#define ESC '\033'
#define DISPLAY 0
define SEARCH 0 char    *s_fnstub;      /* File name stub                */
} ;

static struct screen_defs window = { TOPLINE, BOTLINE, LTMARGIN, 1 };

color_input(choice,msg)
char *msg;
struct {
        int ichoice;
        char cchoice;
        } *choice;
{
/*
        crec or color_record is a structure containing all the information
        in order as it is found in the btreive color structure
*/ struct crec {
        int blk_num;
        char description[25];
        int cent_hue;
        int cent_val;
        int cent_chr;
        int low_hue;
        int up_hue;
        int low_val;
        int up_val;
        int low_chr;
        int up_chr;

btr_open (pos,&color_buff,'color.tab');

/*
        The following loop continues to execute until
        the enduser decides to escape from the first
        menu
*/ do{
        clrwindow(&window);
        ans1 = menu1();         /* color_input */
        if (ans1 == ESC)
        {
                btr_close(pos,&color_buff,0);
                moveto(irow,icol);
```

```
                *msg='\0';
                return(0);
        } clrwindow(&window);
        while((ans2 = menu2(&row,&col)) != ESC)
        {
        /*
                {
                        tbl->high_value = 9999; /* set the typin parameter
                        tbl->low_value = 0;
                        tbl->prompt_format = 1;
                        tbl->convert_type_in=1;
                        if(typ_in(tbl,row,col,choice,msg))
                        {
                                color_rec.blk_num= choice->ichoice;
                                if ((nfound = btr_geteq(pos,&color_buff,
                                        &(color_rec.blk_num),SEARCH))
                                        == NOT_FOUND)
                                {
                                        clearendline();
                                        whiteonred();
                                        printf('INVALID');
                                        green();
                                }
                                else
                                {
                                        choice->cchoice = ans1;
                                        /* copy result of lookup into msg
                                        depad(color_buff.description,temp,
                                        strcpy(msg,temp);
                                        break;
                                }
                        }
                }

/*
                ans2 = 2 means the end user just wants to type
                the number in eg. mud brown and let the computer
                translate it into a color blk_number
        */ else if (ans2 == '2')
                        */
                        stou(msg);
                        pad(msg,temp,25);
                        if((nfound = btr_geteq(pos,&color_buff,
                                temp,DESCRIPT)) == NOT_FOUND)
                        {
                                clearendline();
                                whiteonred();
                                printf('RECORD NOT FOUND');
                                green();
                        }
                        else
                        {
                                choice->ichoice = color_buff.blk_num
                                choice->cchoice = ans1;
                                break;
                        }
                }
        }
        else if(ans2 = '3')
        {
                /*
                        inform the user that they need to setup
                        the barcode.
```

```
                */
                moveto(row,col);
                clearendline();
                whiteonred();
                            printf('Use barcode reader at tone');
                            green();
                            /*
                                    delay for DELAY loops
                            */
                            for(i=1;i<=DELAY;i++) ;
                            i = barcode(temp);
                            moveto(row,col);
                            clearendline();
                            if (i)
                            {
                            color_rec.blk_num = choice->ichoice = (int) atoi(temp)
                            if ((nfound = btr_geteq(pos,&color_buff,
                                        &(color_rec.blk_num),SEARCH))
                                           == NOT_FOUND)
                                {
                                        clearendline();
                                        whiteonred();
                                        printf('INVALID');
                                        green();
                                }
                                else /* if description is found */
                                {
                                        choice->cchoice = ans1;
                                        /* copy result of lookup into msg */
                                        depad(color_buff,description,temp,25);
                                        strcpy(msg,temp);
                                        break;
                                }
                            }
                            else /* if nothing comes through the barcodereader*/
                            {
                                        moveto(row,col);
                                        clearendline();
                                        whiteonred();
                                        printf('Invalid Code');
                                        green();
                            }

}

}           /* end while */
        } while (ans2 == ESC && nfound);
        btr_close(pos,&color_buff,0);
        moveto(irow,icol);
        return(1);
}
/*
 *
 *  SETUP.INC
 *
 *
 */ char menu()
{
        int ans,num;
        char itoc();

static struct setup2 selec[] = {
          'Dominant Color',1, '',
          'Subdominant Color',0,'',
          'Do Not Care',2,''
        };

num = (sizeof(selec))/(sizeof(struct setup2));

e_display(selec,num,&window);
```

```
        ans = e_select (num,0);

if (ans == -1)
                return(ESC);

return(selec[ans].s_code);
} char menu2(row,col)
int *row, *col;
{
        int ans,num;
        char itoc();

static struct setup2 sel[] = {
        { 'Type in Block Number from Color Kit',1, ''},
        { 'Type in Desired Color',2,''},
        { 'Use Barcode Reader',3,''}
        };

num = sizeof(sel)/sizeof(struct setup2);

e_display(sel, num,&window);

ans = e_select (num,0);

if (ans == -1)
                return(ESC);

*row = TOPLINE + ans;

*col = LTMARGIN + strlen(sel[ans].s_display)+ 3 + 2;

return(itoc(sel[ans].s_code));
}
/*
        itoc (integer to character) takes k and converts it from decimal
        to ascii
*/ char itoc(k)
int k;
{
        return('0'+ k);
} l = strlen(s);
        for (i=1;i<=l;i++)
                *t++ = *s++;
        for (i=1;i<= n - 1; i++)
                *t++ = ' ';
}

/*
        depad takes a padded string of length of n and copies it to t
        null terminated
*/ depad (s,t,n)
char *s,*t;
int n;
{
        char *t_head;
        int i;

t_head = t;

for(i=1;i<=n;i++)
                *t++ = *s++;
```

```
            t = t_head + n - 1;

while (*t == ' ' && t >= t_head)
                --t;

if (t == t_head && *t == ' ')
                *t = '\0';
            else
                *(t + 1) = '\0';
        return;
}
```

```
/* File          : CIN (color input)
 * Version       : 2.0
 * Release       :
 * System        : Search & Source
 * Contact       : Matthew Weinstein
 * History:
 * 6/20/84 Matthew / added color name, dominance, to color display message
 *================================================
 *
 * Purpose       : Opens the color table and fetches(depending on a menu choi
 *                 either the block number or the description
 *
 * Called
 * routines      : typ_in, btr_call, ibmcolor, critcall, getcur
 */

/*
        link with btrcall.o
*/

/*
        need to place row and column
*/ include 'stdio.h'
include 'filedesc.inc'
include 'screen.inc'
#define ESC '\033'
#define DISPLAY 0
define SEARCH 0
#define DESCRIPT 1
#define NOT_FOUND 4
#define BAUD 4800
#define WORD 8
#define PARITY 0
#define STOPBIT 1
define DELAY 100 struct setup2 {
        char    *s_display;     /* Value to be displayed        */
        int     s_code;         /* Code associated with it      */
        char    *s_fnstub;      /* File name stub               */
} ;

static struct screen_defs window = { TOPLINE, BOTLINE, LTMARGIN, 1 };

color_input(choice,msg)
char *msg;
struct {
        int ichoice;
        char cchoice;
        } *choice;
{
/*
        crec or color record is a structure containing all the information
        in order as it is found in the btreive color structure
*/
```

```
struct crec {
        int blk_num;
        char description[30];
        int cent_hue;
        int cent_val;
        int cent_chr;
        int low_hue;
        int up_hue;
        int low_val;
        int up_val;
        int low_chr;
        int up_chr;
} color_rec,color_buff;

char ans1,ans2,pos[143],temp[90];
struct file_descriptor_table t, *tbl = &t;
char menu1(), menu2();
int row, col, irow, icol, nfound, i;

nfound = 1;
getcursor(&irow,&icol);
btr_open (pos,&color_buff,'color.tab');

/*
        The following loop continues to execute until
        the enduser decides to escape from the first
        menu
*/ do{
        clrwindow(&window);
        ans1 = menu1();         /* color_input */
        if (ans1 == ESC)
        {
                btr_close(pos,&color_buff,0);
                moveto(irow,icol);
                *msg='\0';
                return(0);
        } clrwindow(&window);
        while((ans2 = menu2(&row,&col)) != ESC)
        {
        /*
                the enduser has indicated that they would like
                to type in the blk_number in the color kit.
                Look up the description of that color and prepare
                to return it
        */ if (ans2 == '1')
        {
                tbl->high_value = 9999; /* set the typin parameters
                tbl->low_value = 0;
                tbl->prompt_format = 1;
                tbl->convert_type_in=1;
                if(typ_in(tbl,row,col,choice,msg))
                {
                        color_rec.blk_num= choice->ichoice;
                        if ((nfound = btr_geteq(pos,&color_buff,
                                &(color_rec.blk_num),SEARCH))
                                == NOT_FOUND)
                        {
                                clearendline();
                                whiteonred();
                                printf('INVALID');
                        }
                        else
                        {
```

```
                                    choice->cchoice = ans1;
                                    /* copy result of lookup into msg */
                                    depad(color_buff.description,temp,25
                                    strcpy(msg,temp);
                                    break;
                    }
            }
            white();
        }
        else if(ans2 = '3')
        {
                /*
                        inform the user that they need to setup
                        the barcode.
                */
                moveto(row,col);
                clearendline();
                whiteonred();
                printf('Use barcode reader at tone');
                white();
                /*
                        delay for DELAY loops
                */
                for(i=1;i(=DELAY;i++) ;
                i = barcode(temp);
                moveto(row,col);
                clearendline();
                if (i)
                {
                    color_rec.blk_num = choice->ichoice = (int) atoi(te
                    if ((nfound = btr_gateq(pos,&color_buff,
                                    &(color_rec.blk_num),SEARCH))
                                        == NOT_FOUND)
                    {
                                    clearendline();
                                    whiteonred();
                                    printf('INVALID');
                                    white();
                    }
                    else /* if description is found */
                    {
                                    choice->cchoice = ans1;
                                    /* copy result of lookup into msg *
                                    depad(color_buff.description,temp,2
                                    strcpy(msg,temp);
                                    break;
                    }
                }
                else /* if nothing comes through the barcodereader*
                {
                                    moveto(row,col);
                                    clearendline();
                                    whiteonred();
                                    printf('Invalid Code');
                                    white();
                }
        }

}       /* end while */
} while (ans2 == ESC && nfound);
btr_close(pos,&color_buff,0);
/*
        format the display string
*/
switch (choice->cchoice)
{
```

```c
                case 0 :
                        sprintf(temp,'Block %d -- %s (Sub-dominant)',
                                choice->ichoice,msg);
                        strcpy(msg,temp);
                        break;
                case 1 :
                        sprintf(temp,'Block %d -- %s (Dominant)',
                                choice->ichoice,msg);
                        strcpy(msg,temp);
                        break;
                case 2 :
                        sprintf(temp,'Block %d -- %s ',
                                choice->ichoice,msg);
                        strcpy(msg,temp);
                        break;
        } moveto(irow,icol);
        return(1);
}
/*
 *
 *   SETUP.INC
 *
 */ char menu1()
{
        int ans,num;
        char itoc();

static struct setup2 selec[] = {
          'Dominant Color',1, '',
          'Subdominant Color',0,'',
          'Do Not Care',2,''
        };

num = (sizeof(selec))/(sizeof(struct setup2));

e_display(selec,num,&window);

ans = e_select (num,0);

if (ans == -1)
                return(ESC);

return(selec[ans].s_code);
}
char menu2(row,col)
int *row, *col;
{
        int ans,num;
        char itoc();

static struct setup2 sel[] = {
        { 'Type in Block Number from Color Kit',1, ''},
        { 'Use Barcode Reader',3,''}
        };

num = sizeof(sel)/sizeof(struct setup2);

e_display(sel, num,&window);

ans = e_select (num,0);

if (ans == -1)
                return(ESC);

*row = TOPLINE + ans;
```

```
        *col = LTMARGIN + strlen(sel[ans].s_display)+ 3 + 2;

return(itoc(sel[ans].s_code));
}
/*
        itoc (integer to character) takes k and converts it from decimal
        to ascii
*/ char itoc(k)
int k;
{
        return('0'+ k);
}
stou(k)
char *k;
{
        while(*k)
                *k++ = toupper(*k);
}

/*
        pad takes a null terminates string (s) and buffers it with
        spaces and saves it in t.
*/
pad(s,t,n)

int n;
char *s,*t;
{
        int l,i;

l = strlen(s);
        for (i=1;i<=l;i++)
                *t++ = *s++;
        for (i=1;i<= n - l; i++)
                *t++ = ' ';
}

/*
        depad takes a padded string of length of n and copies it to t
        null terminated
*/ depad (s,t,n)
char *s,*t;
int n;
{
        char *t_head;
        int i;

t_head = t;

for(i=1;i<=n;i++)
                *t++ = *s++;

t = t_head + n - 1;

while (*t == ' ' && t >= t_head)
                --t;

if (t == t_head && *t == ' ')
                *t = '\0';
        else
                *(t + 1) = '\0';

return;
}
```

```
#include 'stdio.h'
include 'btrstr.inc'
#include 'disstruc.str'
define NOTFOUND 4
#define SEARCH 0

/*
        combined choice file must be opened and closed by the calling
        program
*/ char *comfind(field,value,pos)
char field,value, *pos;
{
        int status;
        struct ccsrch temp,*ptr = &temp;
        char lookup[2];
        static char result[30];
        char keybff[64], rec[750], *ptr;
        struct file_stat infobff;

if(!(value))
        {
                result[0] = '\0';
                return(result);
        } lookup[0] = field;
        lookup[1] = value;

if ((status = btr_geteq(pos,ptr,lookup,SEARCH)) == NOTFOUND)
        {
                result[0] = '\0';
                return(result);
        } else
        {
                depad(ptr->cc_name,result,30);
                return(result);
        }
}
include 'disstruc.str'
define NOTFOUND 4
#define SEARCH 0

/*
        combined choice file must be opened and closed by the calling
        program
*/ char *comfind(field,value,pos)
unsigned char field,value, *pos;
{
        int status;
        struct ccsrch temp,*ptr = &temp;
        char lookup[2];
        static char result[30];
```

```
            if(!(value))
            {
                strcpy(result,'N/L');
                return(result);
            }
        } lt);
        }
}
/* File      :   confirm.c
 * Version   :   2.0
 * Release   :
 * System    :   Search & Source
 * Contact   :   Phil Evans
 * Date      :   4-03-84
 *================================================================
 *
 *   Purpose :   this routine prints a confirm screen at the
 *               beginning of the display program, allowing the
 *               user to begin display or forget display.
 *
 *   Called
 *   routines:   ibmcolor.c,do_color,inkey,wrcenter
 */ int confirm(database,sel_count)
int database,sel_count;
{
char work[60];
int i;

do_color(7,0);
clearhome();
do_color(7,4);
wrcenter(4,'Search and Source Display');
do_color(3,0);
moveto(8,25);
switch(database)
   {case 0 : strcpy(work,'fabric(s)'); break;

case 1 : strcpy(work,'wallcovering(s)'); break;

case 2 : strcpy(work,'upholstered furniture(s)'); break;

case 3 : strcpy(work,'non-upholstered furniture(s)'); break;

case 4 : strcpy(work,'lamp(s)'); break;

case 5 : strcpy(work,'carpet and rug(s)'); break;
   }
printf('Search found %d %s\n',sel_count,work);
moveto(9,25);
puts('with those specifications.');
moveto(12,25);
do_color(6,0);
puts('Select :');
moveto(14,30);
puts('1. Begin display.');
moveto(15,30);
puts('2. Cancel display.');
moveto(17,25);
do_color(3,0);
puts('Please enter 1 or 2 :');
moveto(17,47);
while(1)
   {while ((i = inkey()) == 0);
    switch(i)
      {case 49 : return(0);
```

```
        case 50 : return(1);
        }
    }
}
/*
*
*   CONV.C
*
*   This file contains some of the modules needed to convert the
*   database over to our own format.  These are modules for all the
*   databases.
*
*/
/*
*   TO_INT(d, l)
*
*   Date Written:       March 2, 1984
*
*   Written By:         Matt Burkhardt
*
*   Last Modified:      March 2, 1984
*
*   Passed:     A pointer to a character string
*               The length of the string
*
*   Function:   Strips out the commas and the decimal point, and
*               converts the number to integer value.
*
*   Returns:    The integer value
*
*   Notes:      This function assumes that all fixed point numbers
*               have 2 significant digits following the decimal point.
*
*/
to_int(d, l)
char *d;
int l;
{
        char s[15];

strip(d, l, s);

return((int)atoi(s));
}
/*
*   TO_LONG(d, l)
*
*
*   Date Written:       March 2, 1984
*
*   Written By:         Matt Burkhardt
*
*   Last Modified:      March 2, 1984
*
*   Passed:     A pointer to a character string
*               The length of the string
*
*   Function:   This function takes the character string, strips out
*               the commas and decimal point, then converts that number
*               to a long.
*
*   Returns:    The long value
*
*   Notes:      This function assumes that a fixed point number will hav
*               two significant digits to the right of the decimal point
*
*/
```

```
to_long(d, l)
char *d;
int l;
{
        char s[15];

strip(d, l, s);

return(atoi(s));
}
/*
 *   TO_CINT(d, l)
 *
 *   Date Written:      March 22, 1984
 *
 *   Written By:        Matt Burkhardt
 *
 *   Last Modified:     March 22, 1984
 *
 *   Passed:    A pointer to a character string
 *              The length of the string
 *
 *   Function:  Strips out the commas and the decimal point, and
 *              converts the number to integer value.  If the number
 *              is contains no digits, then the number is converted
 *              to a -1, since 0 is a valid value for hue, value and
 *              chroma.
 *
 *   Returns:   The integer value
 *
 *   Notes:     This function assumes that all fixed point numbers
 *              have 2 significant digits following the decimal point.
 *
 */
to_cint(d, l)
char *d;
int l;
{
        char s[15];

if (strip(d, l, s)) {
                return((int)atoi(s));
        }
        else {
                return(-1);
        }
}
/*
 *   TO_CLONG(d, l)
 *
 *
 *   Date Written:      March 22, 1984
 *
 *   Written By:        Matt Burkhardt
 *
 *   Last Modified:     March 22, 1984
 *
 *   Passed:    A pointer to a character string
 *              The length of the string
 *
 *   Function:  This function takes the character string, strips out
 *              the commas and decimal point, then converts that number
 *              to a long.  If there are no digits in the string, then
 *              the function returns a -1, since 0 is a valid hue, value
 *              and chroma value.
 *
```

```
 *     Returns:      The long value
 *
 *     Notes:        This function assumes that a fixed point number will ha‹
 *                   two significant digits to the right of the decimal poin:
 *
 */
to_clong(d, l)
char *d;
int l;
{ char s[15];

if(strip(d, l, s)) {
                return(atoi(s));
        }
        else {
                return((long)-1);
        }
}

/*
 *     STRIP(n, l, s)
 *
 *     Date Written:     March 2, 1984
 *
 *     Written By:       Matt Burkhardt
 *
 *     Last Modified:    March 22, 1984
 *
 *     Passed:      A pointer to the original character string
 *                  The length of the original character string
 *                  A character string to put the stripped number
 *
 *     Function:    This function strips out the commas and decimal point
 *                  from a number generated by DataEase. If there are
 *                  more than two significant digits after the decimal
 *                  point, a warning message is printed.
 *
 *     Returns:     The stripped number in s.
 *
 *     Notes:       It now returns the number of digits found in the
 *                  string to assist in converting over color values.
 *
 */
strip(d, l, s)
char *d, *s;
int l;
{ int i, p, q, n;

p = q = n = 0;

for(i = 0; i< l; i++) {
                if (d[i] != ',' && d[i] != '.') {
                    if(isdigit(d[i])) {
                        s[p] = d[i];
                        p++;
                        n++;
                    } else if(d[i] = ' ') {
                        s[p] = '0';
                        p++;
                    } else {
                        printf("Got something besides a number !%c!\n", d[i_
                    }
                }
```

```
                if (q)
                        q++;
                if (d[i] == '.')
                        q = 1;
        } if (q > 3)
                printf("More than two after decimal point\n");

s[p] = '\0';

return(n);
}

/*
 *      N_COPY(t, f, l)
 *
 *      Date Written:      March 5, 1984
 *
 *      Written By:        Matt Burkhardt
 *
 *      Last Modified:     March 5, 1984
 *
 *      Passed:     A buffer to copy the string to
 *                  A buffer to copy the string from
 *                  The number of characters to copy
 *
 *      Function:   To copy over the characters without placing a null
 *                  in the string.
 *
 *      Returns:    Nothing
 *
 *      Notes:      This function was written since all current C86 string
 *                  functions place a null character at the end of the string
 *
 */
n_copy(t, f, l)
char *t, *f;
int l;
{ int i;

for (i = 0; i < l; i++) {
                *t++ = *f++;
        } return;
}
/*
 *      YESNO_CONV(c)
 *
 *      Date Written:      March 5, 1984
 *
 *      Written By:        Matt Burkhardt
 *
 *      Last Modified:     March 5, 1984
 *
 *      Passed:     The first character of the no/yes choice field.
 *
 *      Function:   This takes the character and changes it to the correct
 *                  integer value
 *
 *      Returns:    The correct integer value
 *
 *      Notes:      An error message is printed if the field was not
 *                  anticipated.  No action is taken, however.
 *
```

```
*/
yesno_conv(c)
char c;
{
        switch(c) {
                case ' ':
                        return(0);
                case 'n':
                case 'N':
                        return(1);
                case 'y':
                case 'Y':
                        return(2);
                default:
                        printf('Unable to translate !%c! into no/yes\n', c)
                        return(0);
        }
}

/*
 *    LMH_CONV(c)
 *
 *    Date Written:      March 5, 1984.
 *
 *    Written By:        Matt Burkhardt
 *
 *    Last Modified:     March 5, 1984
 *
 *    Passed:    The first character of the low/medium/high field
 *
 *    Function:  This translates the choice field into a number.
 *
 *    Returns:   The integer value associated with the choice field.
 *
 *    Notes:     If the character passed is not anticipated, an error
 *               message is written, and it is treated as not specified.
 *
 */
lmh_conv(c)
char c;
{
        switch(c) {
                case ' ':
                        return(0);
                case 'L':
                        return(1);
                case 'M':
                        return(2);
                case 'H':
                        return(3);
                default:
                        printf('Unable to convert !%c! to low/med/high\n', c);
                        return(0);
        }
} c_conv(c)
char c;
{
        switch(c) {
                case ' ':
                        return(0);
                default:
                        return(1);
        }
}

* History:      08/10/84 - Matt / Added more to the drawscreen
*                                 and cleared up some memory problems
*               08/07/84 - Matt/ Took out pageflip and drawcat modules
*               07/06/84 - Matt / added preview to setup_db
*               07/05/84 - Matt Burkhardt changed drawscreen so
*                                 indexed files display with a *
*/
/*
```

```c
/*
 *  CRITCALL.C
 *
 *  This file contains the modules called by v2crit.c
 *
 */ include 'filedesc.inc'
include 'search.inc'
#include 'screen.inc'
#include 'keys.inc'
#include 'setup.inc'

/*
 *   DISPLAY_CATEGORIES
 *
 */
display_categories(t, e, f, c, w)
struct file_descriptor_table t[];       /* Selection criteria table    */
int e;                                  /* Number of entries in sel tbl */
int *f;                                 /* To keep track of what was first */
int *c;                                 /* Array position of selection  */
struct screen_defs *w;
{
        char    scan;           /* Scan code from getscan       */
        int     i, lines, g;

i = *c;
        lines = (w->botline - w->topline);

if (w->redraw) {
                clrwindow(w);
                draw_screen(t, e, *f, *c, w);
                w->redraw = 0;
        } while ((scan = getscan()) != SRCH && scan != RED && \
            scan != RTARROW && scan != GREEN && scan != BLUE) {
                switch (scan) {
                    case UPARROW:
                        if ( i > *f ) {
                                i--;
                        }
                        break;
                    case DNARROW:       /* Lines - 1 for more arrows */
                        if ( i < ((*f + lines) - 1) && i < (e - 1)) {
                                downline(1);
                                i++;
                        }
                        break;
                    case PGUP:
                        if ( *f > 0 ) {
                                if ( (*f = (*f - lines)) < 0 ) {
                                        *f = 0;
                                }
                                i = *f;
                                clrwindow(w);
                                draw_screen(t, e, *f, i, w);
                        }
                        break;
                    case PGDN:
                        if ( (g = (*f + lines)) < e ) {
                                *f = g;
                                i = *f;
                                clrwindow(w);
                                draw_screen(t, e, *f, i, w);
                        }
                        break;
```

```
            }       /* Close for switch    */
        }           /* Close for while     */

*c = i;

return(scan);
}

/*
 *  CLRWINDOW
 *
 */
clrwindow(w)
struct screen_defs *w;
{ int i;

i = w->topline;

moveto(w->topline, 1);
        for (i = w->topline; i < (w->botline + 1); i++) {
                clearendline();
                downline(1);
        } upline(w->botline - w->topline + 1);

return;
}

/*
 *  INPUT_METHOD
 *
 */
input_method(c, w)
char c[];               /* The array of input methods for the selection */
struct screen_defs *w;  /* Window size, etc.                            */
{ int i, n, s, q, t[6];                   /* Counters     */
        static struct setup sc[] = {    /* Choices      */
                'Type In Selection', 0, '',
                'Select from Menu', 1, '',
                'Color Selection', 2, '',
                'Size Selection', 3, '',
                'Type In Name', 4, '',
                'Reserved', 5, ''
        } ;

i = (sizeof sc) / (sizeof(struct setup));/* Number of Choices   */ for (n = 0, s = 0; n < i; n++) {        /* Step through array   */
                if (c[n] == '1') {              /* If input method flag */
                        s++;                    /* Count how many found */
                        q = n;                  /* Mark occurence       */
                }
        } if (s == 1)     /* If only one found, return that input method */
                return(q);

w->redraw = 1;
        clrwindow(w);
        moveto(w->topline, (w->ltmargin - 2));
        printf('   ');

for (n = 0, s = 0; n < i; n++) {
                if (c[n] == '1') {
```

```
                        printf("%s\n%*s", sc[n].s_display, w->ltmargin, "");
                        t[s] = sc[n].s_code;
                                s++;
                        }
                } printf("\b\b\b");
                upline(s);
                q = e_select(s, 0);

if (q == -1)
                        return(-1);
                else {
                        return(t[q]);
                }
        }
}

/*
 *      NO_OP_ENTRY
 *
 */
no_op_entry(t)
struct file_descriptor_table *t;
{ if (t->addr_srchlist == 0)              /* Nothing to delete    */
                return;

t->addr_srchlist->search_action = DUMBY;   /* Sets to always true*
        t->addr_srchlist = 0;                   /* Kill the pointer     */ white();                                /* Rewrite selection    */
        getspot();
        if (t->f_index)
                printf("   *");
        else
                printf("    ");
        printf("%.*s", DESC_LEN, t->f_display_msg);
        clearendline();

'Lamps', 4, 'lamp',                     /* Upholstered, 5
                'Unupholstered Furniture', 3, 'furn',
                'Wallcoverings', 1, 'wall',
                'Step through videodisc', -2, ''
        };

size = (sizeof s) / (sizeof(struct setup));

again:  maintop(d);                     /* Prints top of Main Selection Menu
/*************************** MLB 07/04/84 ***************************
/* This is a dog, but it's the easiest way to fix this problem
        w->topline = 10;                        /* Set top line to 10           */
        e_display(s, size, w);                           /* Display Selections  */
        w->topline = TOPLINE;                    /* Reset to define in screen.inc*/
/*************************** END OF CHANGES 07/05/84 ***************************
        legend3();                                      /* Color Legend         *,
/*************************** MLB 07/06/84 ***************************
/* Another dog of a change, but easiest way to call preview                    *
/* e_select returns the array number selected                                  *.
        if ((i = e_select(size, 0)) == 4) {
                vidmen();
                goto again;
        }
/*************************** END OF CHANGES 07/06/84 ***************************
        if (i == -1)
                return(-1);     /* Signals criteria RED was pressed     *
```

```
            db_load(s[i].s_fnstub, t, e);          /* Load filedesc table */
            *d = s[i].s_code;
            return(0);       /* Signals criteria db was selected    */
}
/*
 *    MAINTOP()
 *
 *    Maintop prints the top part of the main screen.
 *
 */
maintop(db)
int *db;          /* Data base being used */
{
        static char *s[] = {
                'Fabrics',
                'Wallcoverings',
                '', /* Carpet will be 2 */
                'Unupholstered Furniture',
                'Lamps',
                ''         /* Upholstered, 5     */
        };

clearhome();
        green();
        center('MAIN SELECTION MENU');
        if (*db > -1 && *db < 6) {
            yellow();
            printf('    %s', s[*db]);
            green();
        }
        printf('\rSearch and Source (c)1984');
        printf('\n\n     From this list, select the product you\'re ');
        printf('looking for.  Use the yellow  \n');
white();
        return;
}

/*
 *    E_DISPLAY(pointer to array of struct setup, number of elements, where
 *
 *    This function takes the array, displays the choice, and returns
 *    the cursor to the array member selected in where.  This is the EASY
 *    version (no literals, repeats, etc.)
 *
 */
e_display(out, n, p)
struct setup out[];
int n;
struct screen_defs *p;
{
        int i, s;

moveto(p->topline, (p->ltmargin - 2));
        printf('    ');

for (i = 0; i < n; i++) {
                printf('%s\n%*s', out[i].s_display, p->ltmargin, '');
        } printf('\b\b\b');
        upline(n);

return;
}

/*
 *
```

```
*  E_SELECT(number of selections, where)
*
*  This function allows the user to move the cursor up or down,
*  hit the escape key (which returns -1) or hits the return key.
*  (which returns the corresponding array number).
*
*/
e_select(n, s)
int n, s;
{
        unsigned char i;

while ((i = getscan()) != RED && i != GREEN && i != RTARROW) {
                switch(i) {
                        case UPARROW:
                                if (s > 0) {
                                        upline(1);
                                        s--;
                                }
                                break;
                        case DNARROW:
                                if (s < (n - 1)) {
                                        downline(1);
                                        s++;
                                }
                                break;
                }
        } if (i == RED)
                return(-1);
        else
                return(s);
}

/*
*   STRTMSG()
*
*/
strtmsg()
{
        int i;

clearhome();

downline(3);
        center('Welcome to');
        downline(2);
        printf('\n');
        center('S E A R C H   A N D   S O U R C E');
        printf('\n');
        downline(1);
        printf('\t\t\t\t   PATENTS PENDING\n');
        printf('\t\t\t\t (c) Copyright 1982, 1984\n');
        printf('\t\t\t\t R. E. Sherman\n');
        printf('\t\t\t\t Search & Source, Inc.\n');
        printf('\t\t\t\t Alexandria, Virginia\n');
        printf('\t\t\t\t ALL RIGHTS RESERVED\n');
        downline(3);
        center('Please press the green key to start or the red key to end.

/* Control is done in v2crit */
}
/*
*   DEFAD2
*
*/
```

```c
depad2( f, t, n)
char f[];                /* String to take from  */
char t[];                /* String to put in     */
int n;                   /* Length of string     */
{
        int i, g;

for (i = (n - 1); i )= 0 && (f[i] == ' ' || f[i] == '0'); i--);

for (g = 0; g <= i; g++)
                t[g] = f[g];

t[g] = '\0';
}

/*
 *   CUTDOWN
 *
 */
cutdown(d)
char d[];
{
        int i, l;

for (i = 1; d[i] != '\\' && d[i] != '\0'; i++);
        strcpy(d, '...');
        l = 3;   /* Has to start after periods */ for (;d[l++] = d[i++];);          /* Shift down */ if (strlen(d) ) 50) {    /* If still too long, do again */
                d[3] = ',';
                cutdown(d);
        } return;
}
/*******************************************************************
 *
 * File:    crittop.c
 *
 * Version: 2.1
 * System:  Search & Source
 * Contact: Matt Burkhardt
 *-----------------------------------------------------------------
 *
 * Purpose: This module prints the top of the criteria selection menu
 *
 * Inputs:
 *         (Parameters: ... , Files: ... , Tables: ... , etc.)
 *
 * Outputs:
 *         (Return Codes and meanings: ... Error Messages: ... ,
 *          Parameters returned: ... , Files: ... ,
 *          Data Structures filled in: ... etc.)
 *
 * Called Routines:
 *         ( names - if needed to help document this pgm include few
 *                   words of explanation of the called function.)
 *
 * Process: Brief statement explaining program logic. One sentence to
 *          2 paragraphs, or, structured English, depending on complexi
 *          of the program.
 *
 * Special Notes:
 *
```

```
*  History:
*     Date (Version)/ Who / Action
*
***********************************************************/

/*
 *   CRITTOP()
 *
 *   crittop prints the top part of the main screen.
 *
 */
crittop(db)
int *db;         /* Data base being used */
{
        static char *s[] = {
                "Fabrics",
                "Wallcoverings",
                "", /* Carpet will be 2 */
                "Unupholstered Furniture",
                "Lamps",
                ""       /* Upholstered, 5      */
        };

clearhome();
        green();
        center("SEARCH CRITERIA MENU");
        if (*db ) -1 && *db ( 6) {
           yellow();
           printf("    %s", s[*db]);
           green();
        }
        printf("\rSearch and Source (c)1984");
        printf("\n\n");
        center("Select at least one indexed field, marked by '*'");
        printf("\n\n");

white();
        return;
}
/*
        Matthew Weinstein                      6/5/84

Cut it reduces the size of outtemp so that it fits on the screen
        It returns 1 if it cleanly cut it off at a -- otherwise a zero
*/ cut_it(outtemp,col)
char *outtemp;
int col;
{
        int space;
        char temp[150];
        char *o_head,*index(),*position;

o_head = outtemp;
        space = 80 - col;
        /*
                If it fits from the start
        */
        if (strlen(outtemp) (= space)
                return(1);
        while( position = index (outtemp,'-'))
        {
                outtemp = position;     /*point at next -- */
                if(*(position+1) != '-')
                {
                        outtemp++;
                        continue;
                }
                if ((strlen(outtemp)+1) (= space) /*is there enough room now?*/
                {
```

```
                sprintf(temp,'...%s',(outtemp += 2));
                strcpy(o_head,temp);
                return(1);

}
        outtemp += 2;
}
/*
        if they have gotten to this point then the string is too
        long for the screen cut it off at the right length (lop off
        the left half
*/ sprintf(temp,'...%s',(o_head += strlen(o_head) - space));
strcpy(o_head,temp);
return(0);
} include 'stdio.h'
include 'filedesc.inc' struct stack {
        unsigned char al,ah,bl,bh,cl,ch,dl,dh;
        unsigned int si,di,ds,es;
        };

#define BELL '\007'
#define FMT (tbl->prompt_format)
#define ESC '\033'
#define MONTH 0
#define DAY 1
#define YEAR 2
#define NEW_LN '\r'
define NULL '\0' date(msg,row,col)
int row,col;
char *msg;
{
        int month;
        struct file_descriptor_table dummy, *tbl = &dummy;
        static char *prompt = 'Date (mm/dd/yy):';
        char temp1[80],m[3],d[3];
        static int monthlength[] = { 31,29,31,30,31,30,31,31,31,31,30,31};
        int i,count,lgth,error_offset,init_col;
        char *msg_hd,c,*decimal,temp[25];
        unsigned char *sc_code, k;
        char dec[3],*ptr1;
        long atoi(),tst;

/*      initial conditions      */ tbl->convert_type_in = 1;
        tbl->low_value = 1;
        tbl->prompt_format = 1;

init_col = col;
        *msg = '\0';

/*
                set up initial conditions. Note moveto has to be called
                twice once to clr eol and then in the loops so that if
                the end user is out of range the cursor will reposition
                itself
        */
        moveto(row,col);
        clearendline();
        whiteonred();
        printf('%s',prompt);
        green();
        printf(' ');
        whiteonred();
        printf('  /  /  ');

sc_code = alloc(sizeof(char));

for(i = 0; i< 3; i++)
        {
```

```
                switch(i)
                {
                        case MONTH:     lgth = 2;
                                        tbl->high_value = 12;
                                        error_offset = 8;
                                        col += strlen(prompt) + 1;
                                        break;

case DAY:       col += 3;
                                        strcpy(m,temp1);
                                        error_offset = 5;
                                        lgth = 2;
                                        tbl->high_value =
                                                monthlength[month - 1];
                                        break;

case YEAR:      col += 3;
                                        strcpy(d,temp1);
                                        tbl->high_value = 99;
                                        error_offset = 3;
                                        lgth = 2;
                                        break;
                } do {
                        moveto(row,col);
                        count = 0;
                        fill(temp1,lgth,' ');
                        while((k=getkey(sc_code)) != NEW_LN && k != ESC)
                        {
                                if(isdigit(k))
                                        rot_and_prnt(k,temp1,&count,lgth)
                                if(isdigit(k) && count == 1)
                                                unerr (col,row,error_offs }
                } while (out_of_limits(row,col,tbl,error_offset,temp1)
                                && k == NEW_LN);

if (k == ESC || count == 0)
                {
                        *msg_hd = '\0';
                        unerr(init_col,row,-1);
                        green();
                        return(0);
                }
                force(tbl,temp1,&month);
        }
        sprintf(msg,'%s%s%s',temp1,m,d);
        green();
        free(sc_code);
        return(1);
}
```

```
/* File        : delay.c
 * Version     : 2.0
 * Release     :
 * System      : Search & Source
 * Contact     : Tom Corner
 * History:
 * 04/84         Phil Evans\Created
 * 03-Jul-84    Tom Corner\Removed inkey call adjusted timing and
 *                      comments
 *===============================================================
 *
 *  Purpose   : this routine is a general delay for approximately
 *              20 milliseconds times the duration passed to it.
```

```
*
*   Called
*   routines :
*/ include 'stdio.h' int delay(duration)
int duration;

{
        long i,j;
        int k;

for (j = 0; j < duration ; j++)
        {
           for( i=0; i<450; i++);
        }
        return(0);
}
/*
*
*   DISPFAB1.C
*
*   This file contains a program to display the converted search
*   fabric file.
*
*/
include 'stdio.h'
include 'srchfab.str' main()
{
        struct srchfab s;
        FILE *fp, *fopen();
        int i;

fp = fopen('fabr1.con', 'rb');

i = sizeof(struct srchfab);

while(fread(&s, i, 1, fp)) {
                printit(&s);
        } fclose(fp);

} printit(s)
struct srchfab *s;
{
        printf('The ID is |%D|\n', s->id);
        printf('The Video Frame Number is |%D|\n', s->vid);
        printf('The disk number is |%d|\n', s->disk);
        printf('Style code 1 is |%.3s|\n', s->sty1);
        printf('Style code 2 is |%.3s|\n', s->sty2);
        printf('Preferred Material 1 is |%.3s|\n', s->pm1);
        printf('Preferred Material 2 is |%.3s|\n', s->pm2);
        printf('Fiber 1 is |%.3s|\n', s->fib1);
        printf('Fiber 2 is |%.3s|\n', s->fib2);
        printf('Fiber 3 is |%.3s|\n', s->fib3);
        printf('Fiber 4 is |%.3s|\n', s->fib4);
        printf('Reflectance is now |%d|\n', (int)s->reflect);
        printf('Text is now |%d|\n', (int)s->text);
        printf('Pattern code 1 is |%.4s|\n', s->pat1);
        printf('Pattern code 2 is |%.4s|\n', s->pat2);
        printf('Orientation 1 is now |%d|\n', (int)s->or1);
        printf('Orientation 2 is now |%d|\n', (int)s->or2);
```

```c
        printf("Scale is now !%d!\n", (int)s->scale);
        printf("Density is now !%d!\n", (int)s->dens);
        printf("Block 1 is !%d!\n", s->b11);
        printf("C1 is !%d!\n", (int)s->c1);
        printf("Block 2 is !%d!\n", s->b12);
        printf("C2 is !%d!\n", (int)s->c2);
        printf("Block 3 is !%d!\n", s->b13);
        printf("C3 is !%d!\n", (int)s->c3);
        printf("Block 4 is !%d!\n", s->b14);
        printf("C4 is !%d!\n", (int)s->c4);
        printf("Block 5 is !%d!\n", s->b15);
        printf("C5 is !%d!\n", (int)s->c5);
        printf("Block 6 is !%d!\n", s->b16);
        printf("C6 is !%d!\n", (int)s->c6);
        printf("Firerating is now !%d!\n", (int)s->fire);
        printf("Price without decimals is !%D!\n", s->price);
        printf("Supplier code is !%.5s!\n", s->supplier);
        printf("Stock is now !%d!\n", (int)s->stock);
        printf("\f");

return;
}
/*
 *   DISPFAB2.C
 *
 *   This file contains the calls necessary to display the non-search
 *   data elements for the fabrics database.
 *
 */
include 'stdio.h'
include 'nsrchfab.str' main()
{ struct nsrch s;
        FILE *fp, *fopen();
        int i;

i = sizeof(struct nsrch);

fp = fopen("a:fabr2.con", "rb");

while(fread(&s, i, 1, fp)) {
                printit2(&s);
        } fclose(fp);

} printit2(s)
struct nsrch *s;
{ printf("The ID is !%D!\n", s->n_id);
        printf("The sample is !%d!\n", (int)s->n_sample);
        printf("The page number is !%d!\n", s->n_page);
        printf("The book name is !%.40s!\n", s->n_book);
        printf("The description is !%.40s!\n", s->n_desc);
        printf("The special order field is !%d!\n", (int)s->n_special
        printf("The width is !%D!\n", s->n_width);
        printf("The vertical repeat is !%d!\n", s->n_vert);
        printf("The horizontal repeat is !%d!\n", s->n_horiz);
        printf("The usage is !%d!\n", (int)s->n_usage);
        printf("The stainproof is !%d!\n", (int)s->n_stain);
        printf("The shrinkage is !%d!\n", (int)s->n_shrink);
        printf("The quilting is !%d!\n", (int)s->n_quilt);
```

```
        printf("The sunresistant is |%d|\n", (int)s->n_sun);
        printf("The laminated is |%d|\n", (int)s->n_lamin);
        printf("The cleaning direction is |%d|\n", (int)s->n_clean);
        printf("The paperbacked is |%d|\n", (int)s->n_paper);
        printf("The dyeing process is |%d|\n", (int)s->n_dye);
        printf("The railroad is |%d|\n", (int)s->n_rail);
        printf("Fiber content 1 is |%d|\n", s->n_fibc1);
        printf("Fiber content 2 is |%d|\n", s->n_fibc2);
        printf("Fiber content 3 is |%d|\n", s->n_fibc3);
        printf("Fiber content 4 is |%d|\n", s->n_fibc4);
        printf("Coordinating bedspreads is |%d|\n", (int)s->n_cdbed);
        printf("Coordinating drapery is |%d|\n", (int)s->n_cddrape);
        printf("Coordinating other is |%d|\n", (int)s->n_cdother);
        printf("Fabric ID 1 is |%D|\n", s->n_fabid1);
        printf("Fabric ID 2 is |%D|\n", s->n_fabid2);
        printf("Fabric ID 3 is |%D|\n", s->n_fabid3);
        printf("Fabric ID 4 is |%D|\n", s->n_fabid4);
        printf("Wallpaper ID 1 is |%D|\n", s->n_wall1);
        printf("Wallpaper ID 2 is |%D|\n", s->n_wall2);
        printf("Matching bedspread is |%d|\n", (int)s->n_matchbed);
        printf("Matching drape is |%d|\n", (int)s->n_matchdrape);
        printf("Matching wallpaper is |%D|\n", s->n_matchwall);
        printf("Matching other is |%d|\n", (int)s->n_matchother);
        printf("Volume discount percentage is |%d|\n", s->n_voldiscpercen
        printf("Volume discount yardage is |%d|\n", s->n_voldiscyd);
        printf("Suitability is |%d|\n", (int)s->n_suit);
        printf("Room 1 is |%d|\n", (int)s->n_room1);
        printf("Room 2 is |%d|\n", (int)s->n_room2);
        printf("Room 3 is |%d|\n", (int)s->n_room3);
        printf("Transparency is |%d|\n", (int)s->n_trans);
        printf("Wearability is |%d|\n", (int)s->n_wear);
        printf("Applicability upholstery is |%d|\n", (int)s->n_uph);
        printf("Applicability slip is |%d|\n", (int)s->n_slip);
        printf("Case is |%d|\n", (int)s->n_case);
        printf("Window is |%d|\n", (int)s->n_window);
        printf("Linen is |%d|\n", (int)s->n_linen);
        printf("Wall is |%d|\n", (int)s->n_wallapplic);
        printf("Custom color is |%d|\n", (int)s->n_custom);
        printf("Minimum order is |%d|\n", s->n_min);
        printf("Setup charge is |%d|\n", s->n_setup);
        printf("Hue 1 is |%D|\n", s->n_hue1);
        printf("Value 1 is |%d|\n", s->n_val1);
        printf("Chroma 1 is |%d|\n", s->n_chr1);
        printf("Hue 2 is |%D|\n", s->n_hue2);
        printf("Value 2 is |%d|\n", s->n_val2);
        printf("Chroma 2 is |%d|\n", s->n_chr2);
        printf("Hue 3 is |%D|\n", s->n_hue3);
        printf("Value 3 is |%d|\n", s->n_val3);
        printf("Chroma 3 is |%d|\n", s->n_chr3);
        printf("Hue 4 is |%D|\n", s->n_hue4);
        printf("Value 4 is |%d|\n", s->n_val4);
        printf("Chroma 4 is |%d|\n", s->n_chr4);
        printf("Hue 5 is |%D|\n", s->n_hue5);
        printf("Value 5 is |%d|\n", s->n_val5);
        printf("Chroma 5 is |%d|\n", s->n_chr5);
        printf("Hue 6 is |%D|\n", s->n_hue6);
        printf("Value 6 is |%d|\n", s->n_val6);
        printf("Chroma 6 is |%d|\n", s->n_chr6);

return;
}
        /* File     : display.c
 * Version  : 2.0
 * Release  :
 * System   : Search & Source
 * Contact  : Phil Evans
 * Date     : 4-16-84
 *==================================================================
 *
```

```
*   Purpose   :  this routine is the upper level display module
*                called by the search program
*   Called
*   routines  :  confirm,dis_fabr,dis_wall,dis_nonu,dis_lamp
*/ include 'disstruc.str'
define MAXMATCH 500 int display(database)

int database;                              /*  data file                      */

{
struct selected_ids sel_table[MAXMATCH];      /*  head of selected record
int sel_count;                                /*  number of qualifying records */
int i;
long getprod();

sel_count = nfound();
for (i = 0; i < sel_count; i++)
  {sel_table[i].id = getprod(i);
   sel_table[i].saved = 0;}
switch(database)
  {case 0: dis_fabr(sel_table,sel_count);  /*  display fabrics         */
           return(0);
   case 1: dis_wall(sel_table,sel_count);  /*  display wallpapers      */
           return(0);
   case 3: dis_furn(sel_table,sel_count);  /*  display nonupholster    */
           return(0);
   case 4: dis_lamp(sel_table,sel_count);  /*  display lamps           */
           return(0);
  }
return(0);
}
/*  File      :  dis_fabr.c
 *  Version   :  2.0
 *  Release   :
 *  System    :  Search & Source
 *  Contact   :  Phil Evans
 *  Date      :  4-16-84
 *==============================================================
 *
 *  Purpose   :  this routine handles the display of the fabr
 *               screens
 *
 *  History   :  5/22/84 -- brought top_bot call to dis from show and
 *               activated the report generation option.
 *
 *
 *  Called
 *  routines  :  saveme,bump_scr,bump_rec,printme,okquit
 */ include 'posblock.inc'
include 'disstruc.str'
include 'fabrsrch.str' define REPORT 59
define UP_REC 72
#define DN_REC 80
#define UP_SCN 77
#define DN_SCN 75
#define ESC 1
#define SAVE 82
define DELETE 83 dis_fabr(sel_table,sel_count)

struct selected_ids sel_table[];
int sel_count;
```

```
        struct position_block fabr[8];
        int i,screen,find,generation,save_check,max_screen,j;
        int position,row,col,scn;
        int status,cnt,crnt;

btr_open(fabr[S],pblk,0,'fabr1.btr');
btr_open(fabr[N],pblk,0,'fabr2.btr');
btr_open(fabr[ST],pblk,0,'style.tab');
btr_open(fabr[SU],pblk,0,'sufabr.tab');
btr_open(fabr[PM],pblk,0,'pmfabr.tab');
btr_open(fabr[CC],pblk,0,'ccfabr.tab');
btr_open(fabr[PT],pblk,0,'ptfabr.tab');
btr_open(fabr[FB],pblk,0,'fbfabr.tab');

crnt = 1;
cnt = sel_count;
position = 0;
max_screen = 6;
screen = 1;
generation = 0;
save_check = FALSE;
clearhome();
top_bot('FABRIC');

break;

case DN_SCN:
                bump_scr(BACK,&screen,max_screen);
                i = showfabr(screen,sel_table,position,fabr,cnt,crnt);
                break;

case DN_REC:
                bump_rec(AHEAD,generation,&position,sel_table,sel_count);
                if (crnt == cnt)
                        crnt = 1;
                else
                        crnt++;
                screen = 1;
                i = showfabr(screen,sel_table,position,fabr,cnt,crnt);
                break;

case UP_REC:
                bump_rec(BACK,generation,&position,sel_table,sel_count);
                if (crnt == 1)
                        crnt = cnt;
                else
                        crnt--;
                screen = 1;
                i = showfabr(screen,sel_table,position,fabr,cnt,crnt);
                break;

case REPORT:
                for (scn = 1; scn <= max_screen; scn++)
                {
                        if (scn == 1)
                        {
                                clearhome();
                                top('FABRIC');
                        }
                        if (scn == max_screen)
                                bottom();

i = showfabr(scn,sel_table,position,fabr,cnt,crnt);

if (!printscrn())
                        {
                                getcursor(&row,&col);
```

```
                    moveto(1,1);
                    printf('Error printing screen');
            i = showfabr(screen,sel_table,position,fabr,cnt,crnt);
            break;

case SAVE:
            saveme(generation,position,&save_check,sel_table);
            break;

case ESC:
            if (save_check == FALSE)
            {
                i = okquit();
                if (i == 1)
                {
                    for(j = 0;j<=7;j++)
                        btr_close(fabr[j],pblk,0,
                                   sel_table[position].id);
                    clearhome();
                    return(0);
                }
            }
            else
            {
                ++generation;
                save_check = find = FALSE;
                for (i = 0; i < sel_count && find == FALSE;i++)
                    if (sel_table[i].saved == generation)
                    {
                        find = TRUE;
                        position = i;
                    }
                /*
                        count up the number of saved
                */
                for (i = 0, cnt = 0; i < sel_count; i++)
                    if(sel_table[i].saved == generation)
                        cnt++;
                crnt = 1;
                screen = 1;
                i = showfabr(screen,sel_table,position,fabr,cnt,crnt);
            }
            break;

}                               /* end switch         */
    }                                   /* end while          */
}                                       /* end routine        */

/* File       : dis_furn.c
 * Version    : 2.0
 * Release    :
 * System     : Search & Source
 * Contact    : Phil Evans
 * Date       : 4-16-84
 *==================================================================
 *
 * Purpose    : this routine handles the display of the furn
 *              screens
 *
 * History    : 5/22/84 -- brought top_bot call to dis from show and
 *              activated the report generation option.
 *
 * Called
 * routines   : saveme,bump_scr,bump_rec,printme,okquit
 */ include 'posblock.inc'
```

```c
#include 'disstruc.str'
#include 'furnsrch.str'
include 'furnnon.str' define REPORT 59
define UP_REC 72
#define DN_REC 80
#define UP_SCN 77
#define DN_SCN 75
#define ESC 1
#define SAVE 82
define DELETE 83
#undef CC
define CC 8 dis_furn(sel_table,sel_count)

struct selected_ids sel_table[];
int sel_count;

{
        struct position_block furn[9];
        int i,screen,find,generation,save_check,max_screen,j;
        int position,row,col,scn;
        int status,cnt,crnt;

btr_open(furn[S],pblk,0,'furn1.btr');
btr_open(furn[N],pblk,0,'furn2.btr');
btr_open(furn[ST],pblk,0,'style.tab');
btr_open(furn[SU],pblk,0,'sufurn.tab');
btr_open(furn[PM],pblk,0,'pmfurn.tab');
btr_open(furn[PC],pblk,0,'pcfurn.tab');
btr_open(furn[FN],pblk,0,'fnfurn.tab');
btr_open(furn[SF],pblk,0,'sffurn.tab');
btr_open(furn[CC],pblk,0,'ccfurn.tab');

crnt = 1;
cnt = sel_count;

position = 0;
max_screen = 8;
screen = 1;
generation = 0;
save_check = FALSE;
clearhome();
top_bot('FURNITURE');
i = showfurn(screen,sel_table,position,furn,cnt,crnt);

for(;;)
{
        moveto(26,1);
        i = getscan();

switch(i)
        {
        case UP_SCN:
                bump_scr(AHEAD,&screen,max_screen);
                i = showfurn(screen,sel_table,position,furn,cnt,crnt);
                break;

case DN_SCN:
                bump_scr(BACK,&screen,max_screen);
                i = showfurn(screen,sel_table,position,furn,cnt,crnt);
                break;

case DN_REC:
                bump_rec(AHEAD,generation,&position,sel_table,sel_count)
                if (crnt == cnt)
```

```
                    crnt = 1;
            else
                    crnt++;
            screen = 1;
            i = showfurn(screen,sel_table,position,furn,cnt,crnt);
            break;

case UP_REC:
            bump_rec(BACK,generation,&position,sel_table,sel_count);
            if (crnt == 1)
                    crnt = cnt;
            else
                    crnt--;
            screen = 1;
            i = showfurn(screen,sel_table,position,furn,cnt,crnt);
            break;

case REPORT:

for (scn = 1; scn <= max_screen; scn++)
            {
                    if (scn == 1)
                    {
                            clearhome();
                            top('FURNITURE');
                    }
                    if (scn == max_screen)
                            bottom();

i = showfurn(scn,sel_table,position,furn,cnt,crn if (!printscrn())
                    {
                            getcursor(&row,&col);
                            moveto(1,1);
                            printf('Error printing screen');
                            moveto (row,col);
                            break;
                    }
                    if (scn == 1)
                            clearhome();
            }
            clearhome();
            top_bot('FURNITURE');
            i = showfurn(screen,sel_table,position,furn,cnt,crnt);

break;

case SAVE:
            saveme(generation,position,&save_check,sel_table);
            break;

case ESC:
            if (save_check == FALSE)
            {
                    if(okquit() == 1)
                    {
                            for (j=0;j<=8;j++)
                                    btr_close(furn[j].pblk,0,
                                                    sel_table[position].id);
                            clearhome();
                            return(0);
                    }
            }
            else
            {
                    ++generation;
                    save_check = find = FALSE;
                    for (i = 0; i < sel_count && find == FALSE;i++)
```

```
                                if (sel_table[i].saved == generation)
                                {
                                        find = TRUE;
                                        position = i;
                                }
                /*
                                count up the number of saved
                */
                for (i = 0, cnt = 0; i < sel_count; i++)
                        if(sel_table[i].saved == generation)
                                cnt++;
                crnt = 1;
                screen = 1;
                i = showfurn(screen,sel_table,position,furn,cnt,crnt
        }
        break;

}                                              /*  end switch        */
}                                               /*  end while         */
                                                /*  end routine       */
/* File       :  dis_lamp.c
 * Version    :  2.0
 * Release    :
 * System     :  Search & Source
 * Contact    :  Phil Evans
 * Date       :  4-16-84
 *==================================================================
 *
 *   Purpose  :  this routine handles the display of the lamp
 *               screens
 *
 *   History  :  5/22/84 -- brought top_bot call to dis from show and
 *               activated the report generation option.
 *
 *   Called
 *   routines :  saveme,bump_scr,bump_rec,printme,okquit
 */ include 'posblock.inc'
include 'disstruc.str'
#include 'lampsrch.str'
include 'lampnon.str' define REPORT 59
define UP_REC 72
#define DN_REC 80
#define UP_SCN 77
#define DN_SCN 75
#define ESC 1
#define SAVE 82
define DELETE 83
#undef PT
#define PT 8
#undef CC
define CC 9 dis_lamp(sel_table,sel_count)

struct selected_ids sel_table[];
int sel_count;

{
        struct position_block lamp[10];
        int i,screen,find,generation,save_check,max_screen,j;
        int position,row,col,scn;
        int status,cnt,crnt;
```

```
btr_open(lamp[S],pblk,0,'lamp1.btr');
btr_open(lamp[N],pblk,0,'lamp2.btr');
btr_open(lamp[ST],pblk,0,'style.tab');
btr_open(lamp[SU],pblk,0,'sulamp.tab');
btr_open(lamp[PM],pblk,0,'pmlamp.tab');
btr_open(lamp[PC],pblk,0,'pclamp.tab');
btr_open(lamp[FN],pblk,0,'fnlamp.tab');
btr_open(lamp[SF],pblk,0,'sflamp.tab');
btr_open(lamp[PT],pblk,0,'ptlamp.tab');
btr_open(lamp[CC],pblk,0,'cclamp.tab');

crnt = 1;
cnt = sel_count;
position = 0;
max_screen = 7;
screen = 1;
generation = 0;
save_check = FALSE;
clearhome();
top_bot('LAMP');
i = showlamp(screen,sel_table,position,lamp,cnt,crnt);

for(;;)
{
        moveto(26,1);
        i = getscan();

switch(i)
        {
        case UP_SCN:
                bump_scr(AHEAD,&screen,max_screen);
                i = showlamp(screen,sel_table,position,lamp,cnt,crnt);
                break;

case DN_SCN:
                bump_scr(BACK,&screen,max_screen);
                i = showlamp(screen,sel_table,position,lamp,cnt,crnt);
                break;

case DN_REC:
                bump_rec(AHEAD,generation,&position,sel_table,sel_count)
                if (crnt == cnt)
                        crnt = 1;
                else
                        crnt++;
                screen = 1;
                i = showlamp(screen,sel_table,position,lamp,cnt,crnt);
                break;

case UP_REC:
                bump_rec(BACK,generation,&position,sel_table,sel_count);
                if (crnt == 1)
                        crnt = cnt;
                else
                        crnt--;
                screen = 1;
                i = showlamp(screen,sel_table,position,lamp,cnt,crnt);
                break;

case REPORT:
                for (scn = 1; scn <= max_screen; scn++)
                {
                        if (scn == 1)
                        {
                                clearhome();
                                top('LAMP');
                        }
                        if (scn == max_screen)
```

```
                                printf('Error printing screen');
                                moveto (row,col);
                                break;
                        }
                        if (scn == 1)
                                clearhome();
                }
                clearhome();
                top_bot('LAMP');
                i = showlamp(screen,sel_table,position,lamp,cnt,crnt);

break;

case SAVE:
                saveme(generation,position,&save_check,sel_table);
                break;

case ESC:
                if (save_check == FALSE)
                {
                        if(okquit() == 1)
                        {
                                for (j=0;j<=9;j++)
                                        btr_close(lamp[j],pblk,0,
                                                sel_table[position].id)
                                clearhome();
                                return(0);
                        }
                }
                else
                {

++generation;
                        save_check = find = FALSE;
                        for (i = 0; i < sel_count && find == FALSE;i++)
                                if (sel_table[i].saved == generation)
                                {
                                        find = TRUE;
                                        position = i;
                                }
                        /*
                                count up the number of saved
                        */
                        for (i = 0, cnt = 0; i < sel_count; i++)
                                if(sel_table[i].saved == generation)
                                        cnt++;
                        crnt = 1;
                        screen = 1;
                        i = showlamp(screen,sel_table,position,lamp,cnt,crnt)
                }
                break;

}                                       /*  end switch           */
}                                               /*  end while            */
}                                               /*  end routine          */
/* File      :  dis_nonu.c
* Version    :  2.0
* Release    :
* System     :  Search & Source
* Contact    :  Phil Evans
* Date       :  4-05-84
*===================================================================
*
*  Purpose   :  this routine handles the display of the
*               nonupholstered screens
*
*  Called
*  routines  :  saveme,bump_scr,bump_rec,printme,okquit
*/
```

```c
#include 'b:disstruc.str'
#include 'a:furnsrch.str'
include 'a:furnnon.str' int dis_nonu(sel_table,sel_count)
struct selected_ids sel_table[];
int sel_count;
{ struct   furnsrch   srch_rec;
struct   furnnon    nsrch_rec;
int i,screen,generation,save_check,max_screen;
long position;
char spos_blk[100],npos_blk[100];
int status;

status = btrieve(B_OPEN,spos_blk,&srch_rec,'furn1.btr',0);
if (status != 0) return(1);
status = btrieve(B_OPEN,npos_blk,&nsrch_rec,'furn2.btr',0);
if (status != 0) return(2);
position = 0;
max_screen = 7;
screen = 1;
generation = 0;
save_check = FALSE;
i = shownonu(screen,sel_table,spos_blk,npos_blk,
             &srch_rec,&nsrch_rec,position);
if (i != 0) return(5);
while(1)
   {while ((i = inkey()) == 0);
    switch(i)
      {case 333:
            bump_scr(AHEAD,&screen,max_screen);
            i = shownonu(screen,sel_table,spos_blk,npos_blk,
                     &srch_rec,&nsrch_rec,position);
            if (i != 0) return(5);
            break;

case 331:
            bump_scr(BACK,&screen,max_screen);
            i = shownonu(screen,sel_table,spos_blk,npos_blk,
                     &srch_rec,&nsrch_rec,position);
            if (i != 0) return(5);
            break;

case 328:
            bump_rec(AHEAD,generation,&position,sel_table,sel_count);
            i = shownonu(screen,sel_table,spos_blk,npos_blk,
                     &srch_rec,&nsrch_rec,position);
            if (i != 0) return(5);
            break;

case 336:
            bump_rec(BACK,generation,&position,sel_table,sel_count);
            i = shownonu(screen,sel_table,spos_blk,npos_blk,
                     &srch_rec,&nsrch_rec,position);
            if (i != 0) return(5);
            break;

case 338:
            saveme(generation,position,&save_check,sel_table);
            break;

case 27:
            if (save_check == FALSE)
              {i = okquit();
               if (i)
                  {status = btrieve(B_CLOSE,spos_blk,&srch_rec,position,0
```

```
              if (status != 0) return(3);
              status = btrieve(B_CLOSE,npos_blk,&nsrch_rec,position,
              if (status != 0) return(4);}
           else {moveto(24,25); clearendline(); break;}
           }
         else
           {++generation; save_check = FALSE;
             for (position = 0; sel_table[position].saved != generatio
                 position++);
             screen = 1;
             i = shownonu(screen,sel_table,spos_blk,npos_blk,
                 &srch_rec,&nsrch_rec,position);
             if (status != 0) return(5);}
          break;

case 315:
           printme(); break;

default: beep();

}                                        /* end switch

}                                           /* end while

}                                             /* end routine

/* File
* Version    :  2.0
* Release    :
* System     :  Search & Source
* Contact    :  Phil Evans
* Date       :  4-16-84
*================================================================
*
* Purpose    :  this routine handles the display of the wall
*               screens
*
* History    :  5/22/84 -- brought top_bot call to dis from show and
*               activated the report generation option.
*
* Called
* routines   :  saveme,bump_scr,bump_rec,printme,okquit
*/ include 'posblock.inc'
include 'disstruc.str'
include 'wallsrch.str' define REPORT 59
define UP_REC 72
#define DN_REC 80
#define UP_SCN 77
#define DN_SCN 75
#define ESC 1
#define SAVE 82
define DELETE 83 dis_wall(sel_table,sel_count)

struct selected_ids sel_table[];
int sel_count;

{
       struct position_block wall[7];
       int i,screen,find,generation,save_check,max_screen,j;
       int position,row,col,scn;
       int status,cnt,crnt;

btr_open(wall[S].pblk,0,'wall1.btr');
btr_open(wall[N].pblk,0,'wall2.btr');
btr_open(wall[ST].pblk,0,'style.tab');
btr_open(wall[SU].pblk,0,'suwall.tab');
btr_open(wall[PM].pblk,0,'pmwall.tab');
btr_open(wall[CC].pblk,0,'ccwall.tab');
btr_open(wall[PT].pblk,0,'ptwall.tab');
```

```
crnt = 1;
cnt = sel_count;
position = 0;
max_screen = 6;
screen = 1;
generation = 0;
save_check = FALSE;
clearhome();
top_bot('WALL');
i = showwall(screen,sel_table,position,wall,cnt,crnt);

for(;;)
{
        moveto(26,1);
        i = getscan();

switch(i)
        {
        case UP_SCN:
                bump_scr(AHEAD,&screen,max_screen);
                i = showwall(screen,sel_table,position,wall,cnt,crnt);
                break;

case DN_SCN:
                bump_scr(BACK,&screen,max_screen);
                i = showwall(screen,sel_table,position,wall,cnt,crnt);
                break;

case DN_REC:
                bump_rec(AHEAD,generation,&position,sel_table,sel_count
                if (crnt == cnt)
                        crnt = 1;
                else
                        crnt++;
                screen = 1;
                i = showwall(screen,sel_table,position,wall,cnt,crnt);
                break;

case UP_REC:
                bump_rec(BACK,generation,&position,sel_table,sel_count);
                if (crnt == 1)
                        crnt = cnt;
                else
                        crnt--;
                screen = 1;
                i = showwall(screen,sel_table,position,wall,cnt,crnt);
                break;

case REPORT:
                for (scn = 1; scn <= max_screen; scn++)
                {
                        if (scn == 1)
                        {
                                clearhome();
                                top('WALL');
                        }
                        if (scn == max_screen)
                                bottom();

i = showwall(scn,sel_table,position,wall,cnt,crnt)

if (!printscrn())
                        {
                                getcursor(&row,&col);
                                moveto(1,1);
                                printf('Error printing screen');
                                moveto (row,col);
                                break;
```

```
                    }
                    if (scn == 1)
                            clearhome();
            }
            clearhome();
            top_bot('WALL');

if(okquit() == 1)
                    {
                            for (j=0;j<=6;j++)
                                    btr_close(wall[j],pblk,0,
                                            sel_table[position].id);
                            clearhome();
                            return(0);
                    }
            else
            {
                    ++generation;
                    save_check = find = FALSE;
                    for (i = 0; i < sel_count && find == FALSE;i++)
                            if (sel_table[i].saved == generation)
                            {
                                    find = TRUE;
                                    position = i;
                            }
            /*
                    count up the number of saved
            */
                    for (i = 0, cnt = 0; i < sel_count; i++)
                            if(sel_table[i].saved == generation)
                                    cnt++;
            crnt = 1;
            screen = 1;

/*   end routine                           */
```

```
/*
 * File:     DMPIND.C
 * Version:  1.0
 * Release:
 * System:   Search & Source
 * Contact:  Tom Corner
 *-----------------------------------------------------------------
 * History: (reverse chronology)
 * Date (Version)    Who/Action
 *-----------------------------------------------------------------
 * 20-mar-84 ( 1.0 ) Tom Corner/ Created
 *
 * ================================================================
 *   Abstract:
 *   ---------
 *   Purpose:
 *      Dump Btrieve index files for search files.
 *   Inputs:
 *          terminal - index file description
 *          index file
 *   Outputs:
 *          listing of every record on stdout
 *   Entry Points:
 *   Called Routines:
 *   Special Notes:
 * ================================================================
 */
include 'stdio.h' main()
```

```
{
char pos[100];                          /* Btrieve position buffer */
char key[20];                           /* Btrieve key buffer */
int stat;

struct {
  long id;
  union {
    char a[20];
    char b;
    int i;
  } f0;
} r;
char c, fname[15];
int l,j;

printf('File Name:');
scanf('%14s',fname);
if(btr_open(pos,&r,fname))exit(1);      /* quit if style table wont open
printf('ASCII (a)\n');
printf('Integer (i)\n');
printf('Binary Byte (b) \n');
do {
  c = getchar();
  switch(c){
    case 'a':
      do{
        printf('Number of bytes=');
        j = scanf('%d',&l);
      }while( j!=1);
    case 'i':
    case 'b':
      j = 1;
      break;
    default:
      j = 0;
  }
}while( j==0 );
printf('Index File %s\n',fname);
stat= btr_getlw(pos,&r,key,0);
while(stat==0){
  printf('%10ld)',r.id);
  switch(c){
    case 'a':
      printf('%.*s\n',l,r.f0.a);
      break;
    case 'b':
      j = r.f0.b;
      printf('%d\n',j);
      break;
    case 'i':
      printf('%d\n',r.f0.i);
      break;
  }
  stat= btr_getnx(pos, &r, key, 0);
}
btr_close(pos,&r, key);                 /* close style table */
}

/*****************************************************************
*
* File:     dosize.c
*
* Version:  2.1
* System:   Search & Source
* Contact:  Matt Burkhardt
*---------------------------------------------------------------
*
```

```
* Purpose:  This module gets the size label information from the
*           special features table.  The record structure is hard
*           coded and SHOULD BE CHANGED!!!
*
* Inputs:
*         Parameters:
*             Special features position block, lookup string
*         Files:
*             SFFURN.TAB, SFLAMP.TAB
*
* Outputs:
*     Returns:  A pointer to a string
*     Parameters Returned:  The special features position block
*
* Called Routines:
*     btr_geteq - Gets specified key value from btrieve file
*
* Process:  Gets literal associated with Size.
*
* Special Notes:
*
* History:
*   08/10/84   Matt/ Changed size of lit in sftable.  Should be
*                    soft-coded someday SOON!!!!!
*
*******************************************************************
*/
static struct sftable {
        char    key[4];
        char    dis[4];
        char    lit[35];
} ;

char *dosize(pos, key)
char *pos, *key;
{
        struct sftable sf;
        static char work[80];

if (btr_geteq(pos, &sf, key, 1) != 0) {
                strcpy(work, 'Undefined size: ');
        } else {
                depad(sf.lit, work, sizeof(sf.lit));
                strcat(work, ': ');
        } return;
}
/*
* File:  DOSLIDE.C
*
*
* Version:  2.0a
* Release:
* System:  Search & Source
* Contact:  Matthew Weinstein
*
* History: (reverse chronology)
* Date (Version)    Who/Action
* May 10, 1984      mw/changed padding pgm and limits on loops.
* May 7, 1984       MW/changed strcmp to strncmp so doesn't need terminator
* may 26, 1984      MW changed so that a string of spaces gets replaced by \
*
* Purpose:
* Inputs:
* Outputs: pieced together string of heirarchical descriptions
* Called Routines:
* Special Notes:
*/
```

```c
#include 'stdio.h'
include 'btrstr.inc'
#define DISPLAY 0
#define SEARCH 1
#define DESCRIPT 2
define NOT_FOUND 4
#define NULL 0
define MAX_LOOK_UP 5 doslide (incode,bff,col)
char *bff, *incode;
int col;
{
        struct file_stat infobff;
        char keybff[64], rec[750], *ptr;
        int stat, s_len, d_len, s_num, i,j, offset, dc /* double count */;
        char temp[MAX_LOOK_UP][MAX_LOOK_UP], intemp[150];
        static char outtemp[150];
        char buffer[150];

stat = btr_stat(bff,&infobff,keybff);

d_len = infobff.keys[DESCRIPT].key_len;

s_len = infobff.keys[SEARCH].key_len;

#ifdef DEBUG
        {
                int r,c; getcursor(&r,&c); moveto(1,1);

for(i=1;i<=s_len;i++)
                printf('0x%x ',incode[i-1]);

getchar();
        moveto(r,c);
        }
endif ptr = incode + s_len - 1;

while ((/* *ptr == '0' || */ *ptr == ' ' || *ptr == NULL) && ptr ) incod
                ptr--;

/*
                turn the search code into a null terminated string
        */ temp[0][(ptr - incode) + 1] = NULL;

while(ptr )= incode)
        {
                temp[0][ptr - incode] = *ptr;
                ptr--;
        }
        if (*incode == ' ' || *incode == '0' || incode == NULL)
                temp[0][0] = NULL;

s_num = strlen(temp[0]);

/*
                expand the lookup codes
        */ for (i = 1; i <= s_num - 1;i++)
                for(j = 0; j<= s_num - 1 - i; j++)
                {
                        temp[i][j] = temp[0][j];
                        temp[i][j+1] = NULL;
                } temp[i][0] = NULL;
```

```
                offset = infobff.keys[DESCRIPT].key_pos - 1;

for (i = 0; temp[i][0] != NULL; i++)
                {
                        pad(temp[i],intemp,s_len);
                        strncpy(temp[i],intemp,s_len);
                } dc = buffer[0] = outtemp[0] = 0;

for (i = 0; temp[i][0] != NULL; i++)
                {
                        if(!strncmp(temp[i],temp[i+1],s_len))
                        {
                                dc++;
                                continue;
                        }
                        if (btr_geteq(bff,rec,temp[i],SEARCH) == NOT_FOUND)
                        {
#ifdef DEBUG
                                sprintf(buffer,'\\%s',outtemp);
#endif
                                strcpy(outtemp,buffer);
                        }
                        else
                        {
                                do
                                {
                                        depad(&rec[offset], intemp, d_len);
                                        sprintf(buffer,'--%s%s',intemp,outtemp);
                                        strcpy(outtemp,buffer);
                                        dc--;
                                }while(dc >= 0);
                        }
                }
                if(outtemp[0] == '-')
                {
                        strcpy(intemp,outtemp+2);
                        strcpy(outtemp,intemp);
                }
                cut_it(outtemp,col);
                return(outtemp);
}
/*
 * File:   DOSTYLE.C
 *
 *
 * Version: 2.0a
 * Release:
 * System:   Search & Source
 * Contact:  Matthew Weinstein
 *
 * History: (reverse chronology)
 * Date (Version)    Who/Action
 * May 10, 1984      mw/fixed pad and key.
 * May  7, 1984      MW/changed strcmp to strncmp so doesn't need terminate
 * June 6,   84      MW added column parameter and cut_it call
 *
 *   Purpose:
 *   Inputs:
 *   Outputs: pieced together string of heirarchical descriptions
 *   Called Routines:
 *   Special Notes:
 */ include 'stdio.h'
include 'btrstr.inc'
#define DISPLAY 0
#define SEARCH 1
```

```
#define DESCRIPT 2
define NOT_FOUND 4
#define NULL 0
define MAX_LOOK_UP 5 dostyle (incode,bff,col)
char *bff, *incode;
{
        struct file_stat infobff;
        char keybff[64], rec[750], *ptr;
        int stat, s_len, d_len, s_num, i,j, offset, dc /* double counter
        char temp[MAX_LOOK_UP][MAX_LOOK_UP], intemp[150];
        static char outtemp[150];
        char buffer[150];

stat = btr_stat(bff,&infobff,keybff);

d_len = infobff.keys[DESCRIPT].key_len;

s_len = infobff.keys[SEARCH].key_len;
#ifdef DEBUG
        {       int r,c;
                getcursor(&r,&c);
                moveto(1,1);

for(i=1;i<=s_len;i++)
                        printf("0x%x ",incode[i-1]);

getchar();
                moveto(r,c);

}
endif
        ptr = incode + s_len - 1;

while ((*ptr == '0' || *ptr == ' ' || *ptr == NULL) && ptr > incode)
                ptr--;

/*
                turn the search code into a null terminated string
        */ temp[0][(ptr - incode) + 1] = NULL;

while(ptr >= incode)
        {
                temp[0][ptr - incode] = *ptr;
                ptr--;
        } s_num = strlen(temp[0]);

/*
                expand the lookup codes
        */ for (i = 1; i <= s_num - 1;i++)
                for(j = 0; j<= s_num - 1 - i; j++)
                {
                        temp[i][j] = temp[0][j];
                        temp[i][j+1] = NULL;
                } temp[i][0] = NULL;

offset = infobff.keys[DESCRIPT].key_pos - 1;

for (i = 0; temp[i][0] != NULL; i++)
        {
                padz(temp[i],intemp,s_len);
                strncpy(temp[i],intemp,s_len);
        }
```

```
            dc = buffer[0] = outtemp[0] = 0;

for (i = 0; temp[i][0] != NULL; i++)
            {
                    if(!(strncmp(temp[i],temp[i+1],s_len)))
                    {
                            dc++;
                            continue;
                    }
                    if (btr_geteq(bff,rec,temp[i],SEARCH) == NOT_FOUND)
                    {
                            sprintf(buffer,'--%s',outtemp);
                            strcpy(outtemp,buffer);
                    }
                    else
                    {
                            do
                            {
                                    depad(&rec[offset], intemp, d_len);
                                    sprintf(buffer,'--%s %s',intemp,outtemp
                                    strcpy(outtemp,buffer);
                                    dc--;
                            } while(dc )= 0);
                    }
            }
            if(outtemp[0] == '-')
            {
                    strcpy(intemp,outtemp+2);
                    strcpy(outtemp,intemp);
            }
            cut_it(outtemp,col);
            return(outtemp);
}
/* File     :   do_color.c
 * Version  :   2.0
 * Release  :
 * System   :   Search & Source
 * Contact  :   Phil Evans
 * Date     :   4-10-84
 *================================================================
 *
 *   Purpose :   this function changes the foreground & background
 *               color of the screen using standard color numbers
 *
 *   Called
 *   routines :
 */ define  ESC  '\033' int   do_color(foreground,background)
int   foreground,background;

{
int   ibm_fore, ibm_back, blink, intensity;

printf('%c[0m',ESC);
blink = 0; intensity = 0;
if (foreground ) 15)
   {foreground -= 16;
    blink = 1;}
if (foreground ) 7)
   {foreground -= 8;
    intensity = 1;}
if (intensity) printf('%c[1m',ESC);
if (blink) printf('%c[5m',ESC);
switch (foreground)
   {case 0 : ibm_fore = 30; break;
```

```
    case 1 : ibm_fore = 34; break;

case 2 : ibm_fore = 32; break;

case 3 : ibm_fore = 36; break;

case 4 : ibm_fore = 31; break;

case 5 : ibm_fore = 35; break;

case 6 : ibm_fore = 33; break;

case 7 : ibm_fore = 37; break;}
switch (background)
    {case 0 : ibm_back = 40; break;

case 1 : ibm_back = 44; break;

case 2 : ibm_back = 42; break;

case 3 : ibm_back = 46; break;

case 4 : ibm_back = 41; break;

case 5 : ibm_back = 45; break;

case 6 : ibm_back = 43; break;

case 7 : ibm_back = 47; break;} printf('%c[%d;%dm',ESC,ibm_fore,ibm_back);
return(0);
}

/*******************************************************************
*
* File: drawcat.c
*
* Version: 2.3
* System: Search & Source
* Contact: Matt Burkhardt
*------------------------------------------------------------------
*
* Purpose:  Draws the selection criteria categories
*
* Inputs:
*          (Parameters: ... ,   Files: .... ,    Tables: ... , etc.)
*
* Outputs:
*          (Return Codes and meanings: ... Error Messages: ... ,
*           Parameters returned: ... , Files: ... ,
*           Data Structures filled in: .... etc.)
*
* Called Routines:
*          ( names - if needed to help document this pgm include few
*                    words of explanation of the called function.)
*
* Process: Brief statement explaining program logic. One sentence to
*          2 paragraphs, or, structured English, depending on complexity
*          of the program.
*
* Special Notes:
*
* History:
*    Date (Version)/ Who / Action
*
*******************************************************************/

/* History:
*     07/06/84  Matt/ Added preview to setup_db
```

```
*       07/05/84   Matt/ Changed drawscreen so
*                        indexed files display with a '*'
*       05/29/84   Matthew/ Closed file in pageflip right before both returns
*       06/08/84   Tom/ db_load btr_open call changed from 4 to 3 parameters
*/ define UPICON   24
define DNICON   25 include 'search.inc'
include 'filedesc.inc'
include 'screen.inc'

/*
*   DRAW_SCREEN
*
*/
draw_screen(t, e, f, s, w)
struct file_descriptor_table t[];     /* The table                    */
int e;                                 /* # of entries in table */
int f;                                 /* first entry at top of screen */
int s;                                 /* Selection to place cursor at */
struct screen_defs *w;                 /* Window parameters            */
{
        int i, d, q, flag;

white();                       /* Default to white on black    */
        d = f + (w->botline - w->topline);

moveto(w->topline, 2);
        printf(' ');

for ( q = 0, i = f; i < e && i < d; i++) {
                if (t[i].addr_srchlist != 0) {
                        green();
                }
/********************* MLB  07/04/84 *********************/
                if (t[i].f_index)
                        printf('*');
                else
                        printf(' ');
/************** END OF CHANGES MLB 07/04/84 **************/
                printf('%.*s', DESC_LEN, t[i].f_display_msg);
                if (t[i].addr_srchlist != 0) {
                        printf(' is %s', t[i].addr_srchlist->display_msg);
                }
                printf('\n   ');
                white();
                q++;
        } if (i < e || f > 0) {
                moveto(w->botline, 10);
                printf('More ');
        }
        if (i < e)
                printf('%c ', DNICON);
        if (f > 0)
                printf('%c', UPICON);

moveto((w->topline + s - f), 1);

return;
}
/*
*   DB_LOAD
*
*/
db_load(n, t, e)
char *n;                    /* Stub name for btrieve field descriptor file */
struct file_descriptor_table t[];   /* Table to load                       */
int *e;                     /* Number of entries in table                  */
```

```c
{
        char    name[20];       /* Final btrieve file name      */
        char    pos[115];       /* Position block for btrieve   */
        char    key;            /* Key for file (one character) */ strcpy(name, 'fd');
        strcat(name, n);
        strcat(name, '.tab');   /* End up with FDXXXX.TAB       */ if (btr_open(pos, &t[0], name)) {
                printf('Unable to open !%s! in db_load\n', name);
                return;
        } key = (char) 1;
        if (btr_getge(pos, &t[0], &key, 0)) {
                printf('Can''t read !%s! in db_load\n', name);
                return;
        } for (*e = 1; !(btr_getnx(pos, &t[*e], &key, 0)); (*e)++);

btr_close(pos, 0, 0);
        return;
}
/*
 * file: DSEARCH.C -   routines for debugging search
 */
#include 'search.inc'
dispsl(sl,s)/* display search list */
char *s;
struct search_list *sl;
{
  struct search_list *a, *o;

printf('\n\n');
  printf('------ Search List %s ------\n',s);
  for( a=sl; a!=0; a=a->and_ptr){
    printf('\n\n--- AND ---\n');
    dispsi(a);
    for( o=a->or_ptr; o!=0; o=o->or_ptr){
      printf('\n--- OR ---\n');
      dispsi(o);
      }
    }
  return;
}
dispsi(si)/* display item in search list */
struct search_list *si;
{
  printf(' btrind=%d\n',si->btrind);
  printf(' field_pos=%d\n',si->field_pos);
  printf(' compare_len=%d\n',si->compare_len);
  printf(' skip_len=%d\n',si->skip_len);
  printf(' repeat_count=%d\n',si->repeat_count);
  printf(' field_type=%d\n',si->field_type);
  printf(' search_action=%d\n',si->search_action);
  printf(' value1=');
  dispv(si->select_value1);
  printf(' value2=');
  dispv(si->select_value2);
  printf(' message=%.64s\n',si->display_msg);
}
dispv(i)
int i[4];
{
printf('%04x %04x %04x %04x\n',i[0],i[1],i[2],i[3]);
}
```

```c
/*
 *   DB_LOAD
 *
 */
db_load(n, t, e)
char *n;                        /* Stub name for btrieve field descriptor file */
struct file_descriptor_table t[];   /* Table to load                            */
int *e;                         /* Number of entries in table                   */
{
        char    name[20];       /* Final btrieve file name        */
        char    pos[115];       /* Position block for btrieve     */
        char    key;            /* Key for file (one character)   */ strcpy(name, 'fd');
        strcat(name, n);
        strcat(name, '.tab');   /* End up with FDXXXX.TAB         */ if (btr_open(pos, &t[0], name)) {
                printf('Unable to open !%s! in db_load\n', name);
                return;
        } key = (char) 1;
        if (btr_getge(pos, &t[0], &key, 0)) {
                printf('Can''t read !%s! in db_load\n', name);
                return;
        } for (*e = 1; !(btr_getnx(pos, &t[*e], &key, 0)); (*e)++);

btr_close(pos, 0, 0);
        return;
}
/*
 * file: DSEARCH.C -   routines for debugging search
 */
#include 'search.inc'
dispsl(sl,s)/* display search list */
char *s;
struct search_list *sl;
{
  struct search_list *a, *o;

printf('\n\n');
  printf('------ Search List %s ------\n',s);
  for( a=sl; a!=0; a=a->and_ptr){
    printf('\n\n--- AND ---\n');
    dispsi(a);
    for( o=a->or_ptr; o!=0; o=o->or_ptr){
      printf('\n--- OR ---\n');
      dispsi(o);
    }
  }
  return;
}
dispsi(si)/* display item in search list */
struct search_list *si;
{
  printf(' btrind=%d\n',si->btrind);
  printf(' field_pos=%d\n',si->field_pos);
  printf(' compare_len=%d\n',si->compare_len);
  printf(' skip_len=%d\n',si->skip_len);
  printf(' repeat_count=%d\n',si->repeat_count);
  printf(' field_type=%d\n',si->field_type);
  printf(' search_action=%d\n',si->search_action);
  printf(' value1=');
  dispv(si->select_value1);
```

```
         printf(' value2=');
         dispv(si->select_value2);
         printf(' message=%.64s\n',si->display_msg);
}
dispv(i)
int i[4];
{
printf('%04x %04x %04x %04x\n',i[0],i[1],i[2],i[3]);
}
```

```
/*
 *
 *   FABCONV.C
 *
 *   This file contains the modules needed to change the choice fields
 *   in the fabrics file over to the correct integer value.
 *
 */
/*
 *   TEXT_CONV(c)
 *
 *   Date Written:       March 6, 1984
 *
 *   Written By:         Matt Burkhardt
 *
 *   Last Modified:      March 6, 1984
 *
 *   Passed:     The first character of the string field to be converted
 *
 *   Function:   This module converts it to the correct integer value
 *
 *   Returns:    The integer value.
 *
 *   Notes:      This module does no checking for fields outside of
 *               the correct range.  It will print an error message,
 *               and return the value associated with not specified.
 *
 */
text_conv(c)
char c;
{
        switch(c) {
                case ' ':
                        return(0);
                case 'S':
                        return(1);
                case 'L':
                        return(2);
                case 'H':
                        return(3);
                case 'C':
                        return(4);
                default:
                        printf('Unable to convert |%c| to texture\n', c);
                        return(0);
        }
}

/*
 *   OR_CONV(c)
 *
 *   Date Written:       March 6, 1984
 *
 *   Written By:         Matt Burkhardt
 *
 *   Last Modified:      March 6, 1984
 *
 *   Passed:     The first character of the orientation choice field
 *               to be converted.
 *
```

```
*   Function:    This module converts the orientation choice field to
*               the correct integer value.
*
*   Returns:    The correct integer value.
*
*   Notes:      This module only checks to see if the character is
*               outside of the specified range, and if it is, prints
*               an error message and returns the integer value
*               associated with unspecified.
*/
or_conv(c)
char c;
{
        switch (c) {
                case ' ':
                        return(0);
                case 'A':
                        return(1);
                case 'B':
                        return(2);
                case 'C':
                        return(3);
                case 'V':
                        return(4);
                case 'H':
                        return(5);
                case 'D':
                        return(6);
```

84
```
*
*   Passed:     The first character of the small, medium, large
*               choice field.
*
*   Function:   This module converts the choice to the correct
*               integer value.
*
*   Returns:    The correct integer value.
*
*   Notes:      If the character is outside the anticipated choices,
*               the function will print an error message and return
*               the value associated with unspecified.
*/
sml_conv(c)
char c;
{
        switch(c) {
                case ' ':
                        return(0);
                case 'S':
                        return(1);
                case 'M':
                        return(2);
                case 'L':
                        return(3);
                default:
                        printf('Unable to convert {%c} to sml\n', c);
                        return(0);
        }
}
/*
*   DENS_CONV(c)
*
*   Date Written:   March 6, 1984
*
*   Written By:     Matt Burkhardt
*
```

```
*   Last Modified:    March 6, 1984
*
*   Passed:     The first character of the density field to convert.
*
*   Function:   This module changes the character to the proper
*               integer value for this choice field.
*
*   Returns:    The integer value.
*
*   Notes:      If the character is outside the anticipated choices,
*               the function will print an error message and return
*               the value associated with unspecified.
*
*/
dens_conv(c)
char c;
{
        switch (c) {
                case ' ':
                        return(0);
                case 'Q':
                        return(1);
                case 'M':
                        return(2);
                case 'B':
                        return(3);
                case 'V':
                        return(4);
                default:
                        printf('Unable to convert !%c! to density\n',c);
                        return(0);
        }
}
/****************************************************************
*                                                                *
*       The following are the conversions for the non-search     *
*       fields.                                                  *
*                                                                *
****************************************************************/
/*
*   SAMPLE_CONV(c)
*
*   Date Written:   March 6, 1984
*
*   Written By:     Matt Burkhardt
*
*   Last Modified:  March 6, 1984
*
*   Passed:     The first character of the sample field to convert.
*
*   Function:   This module changes the character to the proper
*               integer value for this choice field.
*
*   Returns:    The integer value.
*
*   Notes:      If the character is outside the anticipated choices,
*               the function will print an error message and return
*               the value associated with unspecified.
*
*/
sample_conv(c)
char c;
{
        switch(c) {
                case ' ':
                        return(0);
                case 'B':
                        return(1);
```

```
                    case 'M':
                            return(2);
                    default:
                            printf('Unable to convert !%c! to sample\n',
                            return(0);
            }
}
/*
 *      USAGE_CONV(c)
 *
 *      Date Written:       March 6, 1984
 *
 *      Written By:         Matt Burkhardt
 *
 *      Last Modified:      March 6, 1984
 *
 *      Passed:     The first character of the usage field to convert.
 *
 *      Function:   This module changes the character to the proper
 *                  integer value for this choice field.
 *
 *      Returns:    The integer value.
 *
 *      Notes:      If the character is outside the anticipated choices,
 *                  the function will print an error message and return
 *                  the value associated with unspecified.
 *
 */
usage_conv(c)
char c;
{
        switch(c) {
                case ' ':
                        return(0);
                case 'R':
                        return(1);
                case 'C':
                        return(2);
                case 'B':
                        return(3);
                default:
                        printf('Unable to convert !%c! to usage\n', c);
                        return(0);
        }
}
/*
 *      STAIN_CONV(c)
 *
 *      Date Written:       March 6, 1984
 *
 *      Written By:         Matt Burkhardt
 *
 *      Last Modified:      March 6, 1984
 *
 *      Passed:     The first character of the stain-proof field to convert.
 *
 *      Function:   This module changes the character to the proper
 *                  integer value for this choice field.
 *
 *      Returns:    The integer value.
 *
 *      Notes:      If the character is outside the anticipated choices,
 *                  the function will print an error message and return
 *                  the value associated with unspecified.
 *
 */
stain_conv(c)
char c;
{
```

```
        switch(c) {
            case ' ':
                return(0);
            case 'S':
                return(1);
            case 'Z':
                return(2);
            case 'P':
                return(3);
            case 'O':
                return(4);
            default:
                printf('Unable to convert !%c! to stainproof\n', c)
                return(0);
        }
}

/*
 *  SHRINK_CONV(c)
 *
 *  Date Written:    March 6, 1984
 *
 *  Written By:      Matt Burkhardt
 *
 *  Last Modified:   March 6, 1984
 *
 *  Passed:    The first character of the shrinkage field to convert.
 *
 *  Function:  This module changes the character to the proper
 *             integer value for this choice field.
 *
 *  Returns:   The integer value.
 *
 *  Notes:     If the character is outside the anticipated choices,
 *             the function will print an error message and return
 *             the value associated with unspecified.
 *
 */
shrink_conv(c)
char c;
{
        switch (c) {
            case ' ':
                return(0);
            case 'S':
                return(1);
            case 'P':
                return(2);
            case 'B':
                return(3);
            default:
                printf('Unable to convert !%c! to shrinkage\n', c)
                return(0);
        }
}

/*
 *  QUILT_CONV(c)
 *
 *  Date Written:    March 6, 1984
 *
 *  Written By:      Matt Burkhardt
 *
 *  Last Modified:   March 6, 1984
 *
 *  Passed:    The first character of the quilted field to convert.
 *
 *  Function:  This module changes the character to the proper
 *             integer value for this choice field.
 *
 *  Returns:   The integer value.
```

```
*
*   Notes:          If the character is outside the anticipated choices,
*                   the function will print an error message and return
*                   the value associated with unspecified.
*
*/
quilt_conv(c)
char c;
{
        switch (c) {
                case ' ':
                        return(0);
                case 'M':
                        return(1);
                case 'O':
                        return(2);
                case 'B':
                        return(3);
                default:
                        printf('Unable to convert !%c! to quilted\n', c
                        return(0);
        }
}

/*
*   CLEAN_CONV(c)
*
*   Date Written:    March 6, 1984
*
*   Written By:      Matt Burkhardt
*
*   Last Modified:   March 6, 1984
*
*   Passed:          The first character of the cleaning field to convert.
*
*   Function:        This module changes the character to the proper
*                    integer value for this choice field.
*
*   Returns:         The integer value.
*
*   Notes:           If the character is outside the anticipated choices,
*                    the function will print an error message and return
*                    the value associated with unspecified.
*
*/
clean_conv(c)
char c;
{
        switch (c) {
                case ' ':
                        return(0);
                case 'D':
                        return(1);
                case 'W':
                        return(2);
                default:
                        printf('Unable to convert !%c! to cleaning\n',
                        return(0);
        }
}

/*
*   DYE_CONV(c)
*
*   Date Written:    March 6, 1984
*
*   Written By:      Matt Burkhardt
*
*   Last Modified:   March 6, 1984
```

```
*
*   Passed:     The first character of the dye process field to convert.
*
*   Function:   This module changes the character to the proper
*               integer value for this choice field.
*
*   Returns:    The integer value.
*
*   Notes:      If the character is outside the anticipated choices,
*               the function will print an error message and return
*               the value associated with unspecified.
*
*/
dye_conv(c)
char c;
{
        switch(c) {
                case ' ':
                        return(0);
                case 'Y':
                        return(1);
                case 'O':
                        return(2);
                default:
                        printf('Unable to convert |%c| to dye\n', c);
                        return(0);
        }
}

/*
*   SUIT_CONV(c)
*
*   Date Written:    March 6, 1984
*
*   Written By:      Matt Burkhardt
*
*   Last Modified:   March 6, 1984
*
*   Passed:     The first character of the suitability field to convert.
*
*   Function:   This module changes the character to the proper
*               integer value for this choice field.
*
*   Returns:    The integer value.
*
*   Notes:      If the character is outside the anticipated choices,
*               the function will print an error message and return
*               the value associated with unspecified.
*
*/
suit_conv(c)
char c;
{
        switch(c) {
                case ' ':
                        return(0);
                case 'A':
                        return(1);
                case 'O':
                        return(2);
                default:
                        printf('Unable to convert |%c| to suitability\n';
                        return(0);
        }
}

/*
*   ROOM_CONV(c)
*
*   Date Written:    March 6, 1984
```

```
*
*       Written By:         Matt Burkhardt
*
*       Last Modified:      March 6, 1984
*
*       Passed:     The characters of the room field to convert.
*
*       Function:   This module changes the character to the proper
*                   integer value for this choice field.
*
*       Returns:    The integer value.
*
*       Notes:      If the character is outside the anticipated choices,
*                   the function will print an error message and return
*                   the value associated with unspecified.
*
*/
room_conv(c)
char c[];
{
        switch (c[0]) {
                case ' ':
                        return(0);
                case 'L':
                        return(1);

case 'D':
                        switch (c[1]) {
                                case 'R':
                                        return(2);
                                case 'E':
                                        return(4);
                                default:
                                        printf('Bad D code in room\n');
                                        return(0);
                        }
                case 'R':
                        return(3);
                case 'K':
                        return(5);
                case 'P':
                        return(6);
                case 'M':
                        switch (c[1]) {
                                case 'B':
                                        return(7);
                                case 'S':
                                        return(13);
                                default:
                                        printf('Bad M code in room\n');
                                        return(0);
                        }
                case 'B':
                        switch (c[1]) {
                                case 'O':
                                        return(8);
                                case 'A':
                                        return(10);
                                case 'T':
                                        return(11);
                                default:
                                        printf('Bad B code in room\n');
                                        return(0);
                        }
                case 'G':
                        return(9);
                case 'O':
                        return(12);
                default:
                        printf('Unable to convert !%3s! to room\n', c);
                        return(0);
```

```
                }
        }
/*
 *     TRANS_CONV(c)
 *
 *     Date Written:        March 6, 1984
 *
 *     Written By:          Matt Burkhardt
 *
 *     Last Modified:       March 6, 1984
 *
 *     Passed:      The characters of the transparency field to convert.
 *
 *     Function:    This module changes the character to the proper
 *                  integer value for this choice field.
 *
 *     Returns:     The integer value.
 *
 *     Notes:       If the character is outside the anticipated choices,
 *                  the function will print an error message and return
 *                  the value associated with unspecified.
 *
 */
trans_conv(c)
char c[];
{
        switch (c[0]) {
                case ' ':
                        return(0);
                case 'O':
                        switch (c[2]) {
                                case 'A':
                                        return(1);
                                case 'E':
                                        return(4);
                                default:
                                        printf('Bad O code in trans\n');
                                        return(0);
                        }
                case 'S':
                        switch (c[1]) {
                                case 'E':
                                        return(2);
                                case 'H':
                                        return(3);
                                default:
                                        printf('Bad S code in trans\n');
                                        return(0);
                        }
        }
}
/*
 * File:    FABRIND.C
 * Version: 1.0
 * Release:
 * System:
 * Contact  Tom Corner
 *----------------------------------------------------------------
 * History: (reverse chronology)
 * Date (Version)   Who/Action
 *----------------------------------------------------------------
 * 21-mar-84 ( 1.0 ) Created
 *
 * ==============================================================
 *  Abstract:
 *  ---------
 *  Purpose:
 *          Build index files for fabric search file.
```

```
*   Inputs:
*           search file: FABR1.BTR
*   Outputs:
*           stdout: operational log
*           index files:
*                       FABRSTY.IND - styles
*                       FABRPAT.IND - patterns
*                       FABRPM.IND  - preferred materials
*                       FABRSCO.IND - subdominant colors
*                       FABRDCO.IND - dominant colors
*                       FABRFIB.IND - fibers
*   Entry Points:
*   Called Routines:
*                       bld_ind in sslib. This calls other routines in sslib and
*                       btrcall.
*   Special Notes:
*   ================================================================
*/
include 'bldind.inc' main()

{
static struct index defind[MAXIND] ={
  {
    {'fabrsty.ind'},        /* file name */
    0,                      /* pointer to Btrieve position Block */
    IDLEN+3,                /*   record length */
    1,                      /*   number of keys */
    {3},                    /*     key length */
    {DUP},                  /*     key flag */
    {                       /* definition of field in search record */
      2,                    /*   number of field repeats */
      10,                   /*   index of 1st char 1st field */
      3                     /*   length of each field */
    },
    &string
  },
  {
    {'fabrpm.ind'},         /* file name */
    0,                      /* pointer to Btrieve position Block */
    IDLEN+3,                /*   record length */
    1,                      /*   number of keys */
    {3},                    /*     key length */
    {DUP},                  /*     key flag */
    {                       /* definition of field in search record */
      2,                    /*   number of field repeats */
      16,                   /*   index of 1st char 1st field */
      3                     /*   length of each field */
    },
    &string
  },
  {
    {'fabrfib.ind'},        /* file name */
    0,                      /* pointer to Btrieve position Block */
    IDLEN+3,                /*   record length */
    1,                      /*   number of keys */
    {3},                    /*     key length */
    {DUP},                  /*     key flag */
    {                       /* definition of field in search record */
      4,                    /*   number of field repeats */
      22,                   /*   index of 1st char 1st field */
      3                     /*   length of each field */
    },
    &string
  },
  {
    {'fabrpat.ind'},        /* file name */
    0,                      /* pointer to Btrieve position Block */
    IDLEN+4,                /*   record length */
    1,                      /*   number of keys */
```

```
            {4},                    /*      key length */
            {DUP},                  /*      key flag */
            {
                                    /* definition of field in search record */
                2,                  /*    number of field repeats */
                36,                 /*    index of 1st char 1st field */
                4                   /*    length of each field */
            },
            &strins
        },
        {
            {'fabrdco.ind'},        /* file name */
            0,                      /* pointer to Btrieve position block */
            IDLEN+2,                /*    record length */
            1,                      /*    number of keys */
            {2},                    /*      key length */
            {DUP+BIN},              /*      key flag */
            {
                                    /* definition of field in search record */
                6,                  /*    number of field repeats */
                48,                 /*    index of 1st char 1st field */
                3                   /*    length of each field */
            },
            &dcolins
        },
        {
            {'fabrsco.ind'},        /* file name */
            0,                      /* pointer to Btrieve position block */
            IDLEN+2,                /*    record length */
            1,                      /*    number of keys */
            {2},                    /*      key length */
            {DUP+BIN},              /*      key flag */
            {
                                    /* definition of field in search record */
                6,                  /*    number of field repeats */
                48,                 /*    index of 1st char 1st field */
                3                   /*    length of each field */
            },
            &scolins
        }
    };
    /*
     * build indexes for fabric search file
     *    from FABR1.BTR
     *    6 indexes defined in defind
     */
    bld_ind('fabr1.btr',defind,6);
} include 'disstruc.str'
define NOTFOUND 4
#define SEARCH 0
#define DISPLAY 1

/*
        combined choice file must be opened and closed by the calling
        program
*/ char *fibfind(field,pos)
char *field, *pos;
{
        int status;
        struct fbfabr temp,*ptr = &temp;
        static char result[30];

if ((status = btr_geteq(pos,ptr,field,DISPLAY)) == NOTFOUND)
        {
                result[0] = '\0';
```

```
                    return(result);
        } else
        {
                depad(ptr->fb_name,result,30);
                return(result);
        }
}
/*
 * File:    FURNIND.C
 * Version: 1.0
 * Release:
 * System:
 * Contact  Tom Corner
 *----------------------------------------------------------------
 * History: (reverse chronology)
 * Date (Version)    Who/Action
 * ---------------------------------------------------------------
 * 22-mar-84 ( 1.0 ) Created
 *
 * ===============================================================
 * Abstract:
 * ---------
 * Purpose:
 *          Build index files for non-upholstered furniture search file.
 * Inputs:
 *          search file: FURN1.BTR
 * Outputs:
 *          stdout: operational log
 *          index files:
 *                  furnsty.ind  - styles.
 *                  furnpm.ind   - preferred materials
 *                  furnfin.ind  - finishes
 *                  furnpce.ind  - piece types
 *                  furnsf.ind   - special features
 *                  furnsco.ind  - subdominant colors
 *                  furndco.ind  - dominant colors
 * Entry Points:
 * Called Routines:
 *                  bld_ind in sslib. This calls other routines in sslib and
 *                  btrcall.
 * Special Notes:
 * ===============================================================
 */ include 'bldind.inc' main()

{
static struct index defind[MAXIND] ={
{
   {'furnsty.ind'},          /* file name */
   0,                        /* pointer to Btrieve position Block */
   IDLEN+3,                  /*   record length */
   1,                        /*   number of keys */
   {3},                      /*     key lengths */
   {DUP},                    /*     key flags */
   {                         /* definition of field in search record */
       3,                    /*   number of field repeats */
       10,                   /*   index of 1st char 1st field */
       3                     /*   length of each field */
   },
   &strins                   /* function to insert record */
},
{
   {'furnpm.ind'},           /* file name */
   0,                        /* pointer to Btrieve position Block */
   IDLEN+4,                  /*   record length */
   1,                        /*   number of keys */
   {4},                      /*     key lengths */
   {DUP},                    /*     key flags */
```

```
        {
            4,                      /* definition of field in search record */
            19,                     /*   number of field repeats */
            4                       /*   index of 1st char 1st field */
        },                          /*   length of each field */
        &strins                     /* function to insert record */
    },
    {
        {'furnfin.ind'},            /* file name */
        0,                          /* pointer to Btrieve position Block */
        IDLEN+3,                    /*   record length */
        1,                          /*   number of keys */
        {3},                        /*     key lengths */
        {DUP},                      /*     key flags */
        {                           /* definition of field in search record */
            4,                      /*   number of field repeats */
            35,                     /*   index of 1st char 1st field */
            4                       /*   length of each field */
        },
        &strins                     /* function to insert record */
    },
    {
        {'furnpce.ind'},            /* file name */
        0,                          /* pointer to Btrieve position Block */
        IDLEN+5,                    /*   record length */
        1,                          /*   number of keys */
        {5},                        /*     key lengths */
        {DUP},                      /*     key flags */
        {                           /* definition of field in search record */
            3,                      /*   number of field repeats */
            48,                     /*   index of 1st char 1st field */
            5                       /*   length of each field */
        },
        &strins                     /* function to insert record */
    },
    {
        {'furndco.ind'},            /* file name */
        0,                          /* pointer to Btrieve position Block */
        IDLEN+2,                    /*   record length */
        1,                          /*   number of keys */
        {2},                        /*     key lengths */
        {DUP+BIN},                  /*     key flags */
        {                           /* definition of field in search record */
            6,                      /*   number of field repeats */
            177,                    /*   index of 1st char 1st field */
            3                       /*   length of each field */
        },
        &dcolins                    /* function to insert record */
    },
    {
        {'furnsco.ind'},            /* file name */
        0,                          /* pointer to Btrieve position Block */
        IDLEN+2,                    /*   record length */
        1,                          /*   number of keys */
        {2},                        /*     key lengths */
        {DUP+BIN},                  /*     key flags */
        {                           /* definition of field in search record */
            6,                      /*   number of field repeats */
            177,                    /*   index of 1st char 1st field */
            3                       /*   length of each field */
        },
        &scolins                    /* function to insert record */
    },
    {
        {'furnsf.ind'},             /* file name */
        0,                          /* pointer to Btrieve position Block */
        IDLEN+4,                    /*   record length */
        1,                          /*   number of keys */
        {4},                        /*     key lengths */
        {DUP},                      /*     key flags */
        {                           /* definition of field in search record */
```

```
            12,                     /*  number of field repeats */
            129,                        /*   index of 1st char 1st field */
            4                       /*  length of each field */
        },
        &strins                     /* function to insert record */
    }
};
/*

*===================================================
*
* Purpose       : returns the current cursor position in two integers
*                 position 1,1 is the upper left corner.
*
* Called
* routines      :
*/

/*
            this function will return the position of the cursor in row and
*/
struct regval { int ax,bx,cx,dx,si,di,ds,es;};
getcursor(row,col)
int *row, *col;
{
        struct regval initval, finalval;

initval.ax = 0x0300;

initval.bx = 0;

sysint(0x10,&initval,&finalval);

*col = (finalval.dx & 0x00ff) + 1;

*row = (finalval.dx >> 8) + 1;

}
/****************************************************************/
/*
* File:    GO.C
* Release:
* System:  Search & Source
* Contact: Sylvia Lasky, Matt Burkhardt
*---------------------------------------------------------------
* History: (reverse chronology)
* Date (Version)   Who/Action
*       August 10, 1984 - Sylvia/ changed version number to 2.4
*       July 6, 1984 - Sylvia/ changed version number to 2.3
*       July 5, 1984 - Tom / added 7 second delay and beep to error message
*                      when querylog not found.
*       June 14, 1984 - Sylvia / changed version to 2.2
*       June 12, 1984 - Sylvia / changed exitmsg screen and renamed
*                      program GO.C instead of V2MAIN.C
*       June 8, 1984 - Tom / added query logging
*       June 8, 1984 - Sylvia/ updated version to 2.1B
*                      and Tom /declare criteria and sldel as pointers
*                      to a search list.
*       May 31, 1984 - Sylvia/ updated version to 2.1A
*       May 17, 1984 - Sylvia/ updated version to 2.1
*       May 7, 1984 - Sylvia/ added version function call
*       April 24, 1984 - Matt - Added RED for exitmsg and scan
*       July 5,1984 - Tom - added delay and beep if querylog file not found
* ==================================================================
* Abstract:
* -----------
* Purpose: Runs the Search & Source user interface programs
* Inputs:
* Outputs:
* Entry Points:
```

```
*   Called Routines:  Criteria, Search, Display
*   Special Notes:
*   ================================================================
*/ include 'stdio.h'
include 'search.inc'          /* search vector struct definition */
#include 'screen.inc'          /* screen defines and structure */
#include 'filedesc.inc'        /* File descriptor table structure */
#include 'keys.inc'            /* Key definitions */
extern struct search_list *criteria(),*sldel();

int debug;
main()
{ unsigned char status;          /* status of search: 0=incomplete 1=complete */
int db;                        /* data base chosen */
int selected;                  /* number of entries selected by search */
int e;                         /* Number of entries in file desc table */
char c;
int logcnt;                    /* # of records in querylog file */
FILE *log,*fopen();

struct file_descriptor_table t[MAX_CRIT];   /* Criteria list              */
struct search_list *v;         /* pointer to 1st search vector entry */
struct search_list *l;         /* pointer to last search vector entry */
struct screen_defs window;

/**********************************************************************/ window.topline = TOPLINE;
window.botline = BOTLINE;
window.ltmargin = LTMARGIN;
db = -1;
selected = 0;

white();                       /* set writing to white on black */ strtmsg();                     /* Intro to Search and Source         */ if(!(log = fopen('querylog','rwb'))){
   beep();
   whiteonred();
   moveto(20,25);
   printf('no QUERYLOG file, type: loginit');
   delay(350);
   white();
   exitmsg();
   return;
   }
fread(&logcnt,2,1,log);        /* get querylog record count */ while ((c=getscan()) != GREEN && c != RED) {
   debug= c=='\007';/* Enter or GREEN to start*/
   if (c =='\007') version(20,1);          /* display version numbers*/
   } if (c == RED) {
        fclose( log );
        exitmsg();             /* Out if they hit escape         */
        return;
}
v = 0;
while ((v=criteria(t, &e, &db, &window,v )) != -1) /*get search criteria*/
{                                                  /*returns 0 if RED pressed*/
        v = sldel( v );                            /* delete DUMBY entries from
                                                      search list */
        logcnt = querylog( db, v, logcnt, log );   /* log query */
        if( search(v, db) ){                       /*search for products*/
           display( db );      /*show selected products*/
           }
        }
}
```

```
 fclose( log );
 exitmsg();                          /* tells how to restart program */
 return;

}
exitmsg()
{
 clearhome();
 printf('\n\n\n\n\n\n\n');
 whiteongreen();
 printf('
 whiteonred();
 printf('
 printf('          To start the Search & Source program, type 'go'...
 printf('
 printf('
 printf('              (C)Copyright 1984, Search & Source, Inc.
 printf('                     All Rights Reserved
 printf('
 whiteongreen();
 printf('
 white();
}

/*
 * Function:  VERSION.C
 *
 *               CORDATUM, INC.
 *               Suite 1100
 *               4720 Montgomery Lane
 *               Bethesda Maryland 20783 8015
 *               301-652-5424
 *
 *               (C) Copyright 1984  Cordatum, Inc.
 *                     All Rights Reserved
 *
 * Version:
 * Release:
 * System:  Search & Source
 * Contact: Sylvia Lasky
 *
 * History: (reverse chronology)
 * Date (Version)   Who/Action
 * May 7, 1984    Sylvia/ Created.
 *
 *   Purpose:
 *     This function prints the version number of the software on the screen.
 *     It calls version functions for software components as well.  The version
 *     numbers themselves are assigned by the librarian when updating program
 *     libraries or programs.
 *   Inputs:  row and column where msgs should appear
 *   Outputs: message on screen
 *   Called Routines: vercrit - version number of criteria (CRIT.LIB)
 *                    versrch - version number of search (SEARCH.LIB)
 *                    verdisp - version number of display (DISPLAY.LIB)
 *                    vermisc - version number of MISC.LIB
 *                    moveto - position the cursor
 *   Special Notes: The actual version numbers must be updated by the
 *                  librarian for these functions to be meaningful.
 */
version(row, col)

int row, col;                        /*where to print msgs*/
{
moveto (row,col);
puts ('Version No.: 2.4   (August 10, 1984)');
vercrit ((row+1), col);
versrch ((row+2), col);
verdisp ((row+3), col);
vermisc ((row+4), col);
return;
}
main(){
printf('hello\n');
}
/*
* indsrch - Function to search search file for one node in index list that
*           uses an index file.
```

```
*/
main()
{
   char key[500];
   long *kb,kbr;
   int stat, n;
   char sb[500], pos[200], ip[500], ib[500], ik[500];
   char indname[15];

/* movmem( ib, kb, sizeof(long) );
      printf("|%ld|", *kb);
      if( btr_geteq( pos, sb, kb, 0 ))abort("Bad geteq");/* get prod from search fil
         printf("%4d\015",n++);
      stat = btr_getnx( ip, ib, key, 0 ); /* get next index record */
   } /* end while in range */
   printf("before close\n");
   if( btr_close( ip, ib, key) );
   printf("before stat check\n");
   if( stat != 0 && stat != 4 && stat != 9 );
   printf("before final return\n");
   return(0);
}

/* File     : IBMCOLOR.C
 * Version  : 2.0
 * Release  :
 * System   : Search & Source
 *
 *   The following modules control the IBM color monitor.
 * HISTORY
 *   08/10/84 - Matt/ Changed some of the codes in the three legends
 *                    to correspond with Search and Sources key color's.
 *
 *   June 12, 1984 Sylvia/ created new legend3 for select-db screen
 *
 *
 *********************************************************************/
#define UP_ARROW         0x48
#define DOWN_ARROW       0x50
#define DEL              0x53
#define BELL             '\007'
#define ESC              '\033'
define BLOCK            '\333' struct stack {
        unsigned char    al, ah;
        unsigned char    bl, bh;
        unsigned char    cl, ch;
        unsigned char    dl, dh;
        unsigned int     si, di, ds, es;
} ;

/*
 *   CLEARHOME()
 *
 *   Clearhome clears the screen and homes the cursor.
 *
 */
clearhome()
{ printf("%c[2J", ESC);

return;
}
/*
 * CLEARENDLINE()
 *
 * This function clears from the cursor position to the end of line.
 *
 */
clearendline()
{
```

```c
        printf("%c[K", ESC);

return;
}

/*
 *   UPLINE(number of lines)
 *
 *   This function moves the cursor up so many lines.
 *
 */
upline(n)
int n;
{
        printf("%c[%dA", ESC, n);

return;
}
/*
 *   DOWNLINE(number of lines)
 *
 *   This function moves the cursor down so many lines.
 *
 */
downline(n)
int n;
{
        printf("%c[%dB",ESC, n);

return;
}

/*
 *   MOVETO(row number, column number)
 *
 *   This function simply moves the cursor to the row and column number
 *
 */
moveto(r, c)
int r, c;
{
        printf("%c[%d;%dH", ESC, r, c);

return;
}

/*
 *   CENTER(string)
 *
 *   Center places the string in the middle of the screen.
 *
 */
center(s)
char *s;
{
        printf("%*s%s",((80 - strlen(s))/ 2), "", s);

return;
}

/*
 *   GETKEY()
 *
 *   This function does a system interrupt to get the key pressed,
 *   and returns the character.
 *
 */
getkey(s)
unsigned char *s;
{
        struct stack a, b;

a.ah = 0x00;
        sysint(0x16, &a, &b);
```

```
        *s = b.ah;

return(b.al);
}

/*
 *   GETSCAN()
 *
 *   This function does a system interrupt and returns the scan code.
 *
 */
getscan()
{
        struct stack a, b;

a.ah = 0x00;
        sysint(0x16, &a, &b);

return(b.ah);
}

/*
 *   GETSPOT()
 *
 *   This function gets where the cursor is.
 *
 */
getspot()
{
        printf('%c[s', ESC);

return;
}

/*
 *   RESTORE()
 *
 *   This function puts the cursor back since last call to getspot()
 *
 */
restore()
{
        printf('%c[u', ESC);

return;
}

/*
 *   RED()
 *
 *   This function changes the attribute to red on black.
 *
 */
red()
{
        printf('%c[31;40m', ESC);

return;
}

/*
 *   WHITE()
 *
 *   This function changes the attribute to white on black.
 *
 */
white()
{
        printf('%c[37;40m', ESC);
```

```
        return;
}

/*
*   GREEN()
*
*   This function changes the attribute to green on black.
*
*/
green()
{
        printf('%c[1;32;40m', ESC);

return;
}

/*
*   YELLOW()
*
*   This function changes the attribute to yellow letters on black background
*
*/
yellow()
{
        printf('%c[1;33;40m', ESC);

return;
}

/*
*   WHITEONRED()
*
*   This function changes the attribute to white letters on red background
*
*/
whiteonred()
{
        printf('%c[37;41m', ESC);

return;
}

/*
*   WHITEONGREEN()
*
*   This function changes the attribute to white letters on green background
*
*/
whiteongreen()
{
        printf('%c[37;42m', ESC);

return;
}

/*
*   LEGEND1()
*
*   This function adds the legend for criteria to the bottom of the screen.
*   yellow, cyan(lt. blue), orange, dk. blue, green
*   magenta, white, white-on-black, red, white-on-black
*/ legend1()
{
  getspot();

moveto(24,1);
  printf('   %c[1m%c[33;40m%c%c%c[32;40m move up; ', ESC,ESC,BLOCK,BLOCK,ESC);
  printf('%c[36;40m%c%c%c[32;40m move down; ', ESC, BLOCK, BLOCK, ESC);
  printf('%c[1m%c[31;40m%c%c%c[1;32;40m page up; ', ESC,ESC,BLOCK,BLOCK,ESC);
  printf('%c[0;34;40m%c%c%c[1;32;40m page down; ', ESC, BLOCK, BLOCK, ESC);
```

```
    printf("%c[32;40m%c%c%c[32;40m enter choice", ESC, BLOCK, BLOCK, ESC);

moveto(25,1);
    printf("%c[35;40m%c%c%c[1;32;40m more detail; ", ESC, BLOCK, BLOCK, ESC);
    printf("%c[1;37;40m%c%c%c[1;32;40m less detail; ", ESC, BLOCK, BLOCK, ESC);
    printf("%c[1;40m%c%c%c[1;32;40m cancel search; ", ESC, BLOCK, BLOCK, ESC);
    printf("%c[0;30;43mD%c[1;32;40m erase choice; ", ESC, ESC);
    printf("%c[0;30;43mS%c[1;32;40m SEARCH ", ESC, ESC);

white();
    restore();
    return;
}

/*
 *    LEGEND2()
 *
 *   This function adds the legend for display to the bottom of the screen.
 *   yellow, cyan(lt. blue), red
 *   magenta, white, white-on-black, white-on-black
 */ legend2()
{
    getspot();

moveto(24,1);
    printf("       ");            /* seven spaces */
    printf("%c[1m%c[33;40m%c%c%c[32;40m prev product; ",ESC,ESC,BLOCK,BLOCK,ESC);
    printf("%c[36;40m%c%c%c[32;40m next product; ", ESC, BLOCK, BLOCK, ESC);
    printf("%c[0;31;40m%c%c%c[1;32;40m stop/ switch to saved products",ESC,BLOCK,BLOCK,ESC 'm ESC, BLOCK, BLOCK, ESC);
    printf("%c[37;40m%c%c%c[32;40m prev screen", ESC, BLOCK, BLOCK, ESC);

white();
    restore();
    return;
}

/*
 *   LEGEND3()
 *
 *   This function adds the legend for select database to the screen.
 */ legend3()
{
    getspot();

moveto(25,1);
    printf("   %c[1m%c[33;40m%c%c%c[32;40m move up; ", ESC,ESC,BLOCK,BLOCK,ESC);
    printf("%c[36;40m%c%c%c[32;40m move down; ", ESC, BLOCK, BLOCK, ESC);
    printf("%c[32;40m%c%c%c[32;40m enter your choice; ", ESC, BLOCK, BLOCK, ESC);
    printf("%c[0;31;40m%c%c%c[1;32;40m stop program ", ESC, BLOCK, BLOCK, ESC);

white();
    restore();
    return;
}
/* File       : inkey.c
 * Version    : 2.0
 * Release    :
 * System     : Search & Source
 * Contact    : Phil Evans
 * Date       : 3-31-84
 *=================================================================
 *
 * Purpose    : this function reads the keyboard & returns the
 *              ASCII or extended value of a keystroke
 *              (scan code + 256)
 *
```

```
*   Called
*   routines :
*/ int inkey()
{
extern int sysint();
struct reg_in {int ax,bx,cx,dx,si,di,ds,es;} cregs;
struct reg_out {char al,ah;
                int bx1,cx1,dx1,si1,di1,ds1,es1;}rregs;
int status,hold;

cregs.ax = 0x0100;                          /* read  keyboard
status = sysint(0x16,&cregs,&rregs);        /* interrupt 16
if (status & 0x40) return(0);               /* zero flag set return 0
cregs.ax = 0x0000;                          /* read & advance buffer
status = sysint(0x16,&cregs,&rregs);        /* interrupt 16
hold = (int)rregs.al;
if (hold != 0) return(hold);                /* if ascii code return it
hold = (int)rregs.ah;
hold += 256;                                /* add 256
return(hold);                               /* return extended value
}
/*
*
*   LAMP1.C
*
*   This file contains the programs for the lamp search
*   file conversion.
*
*/
include 'stdio.h'
#include 'lampin.str'
include 'lampsrch.str' define CR      0x0D
define LF      0x0A

/*
*   CONV_LSRCH(d, fp)
*
*   Date Written:       March 22, 1984
*
*   Written By:         Matt Burkhardt
*
*   Last Modified:      June 11, 1984 - Now works with DataEase files
*                       March 22, 1984
*
*   Passed:     A pointer to the input structure
*               A pointer to the output structure
*
*   Function:   This function sets all the members of the search
*               structure to the appropriate values.
*
*   Returns:    Nothing.
*
*   Notes:      Really should make it so it dumps out the records that
*               don't meet some validity edits, but that's for later.
*
*/
conv_lsrch(in, srch)

} else
                srch->l_vid = in->li_vid;

srch->l_disc = in->li_disc;

stylec(srch->l_style1, in->li_dummy6, in->li_style1, \
                sizeof(srch->l_style1));
        stylec(srch->l_style2, in->li_dummy7, in->li_style2, \
                sizeof(srch->l_style2));

strncpy(srch->l_pm1, in->li_pm1, sizeof(srch->l_pm1));
```

```c
        strncpy(srch->l_pm2, in->li_pm2, sizeof(srch->l_pm2));
        strncpy(srch->l_pm3, in->li_pm3, sizeof(srch->l_pm3));

strncpy(srch->l_finish, in->li_finish, sizeof(srch->l_finish));

srch->l_reflect = in->li_reflect;

strncpy(srch->l_piece1, in->li_piece1, sizeof(srch->l_piece1));
        strncpy(srch->l_piece2, in->li_piece2, sizeof(srch->l_piece2));
        strncpy(srch->l_piece3, in->li_piece3, sizeof(srch->l_piece3));

strncpy(srch->l_sfb1, in->li_sfb1, sizeof(srch->l_sfb1));
        strncpy(srch->l_sfb2, in->li_sfb2, sizeof(srch->l_sfb2));
        strncpy(srch->l_sfb3, in->li_sfb3, sizeof(srch->l_sfb3));

strncpy(srch->l_sfs1, in->li_sfs1, sizeof(srch->l_sfs1));
        strncpy(srch->l_sfs2, in->li_sfs2, sizeof(srch->l_sfs2));

strncpy(srch->l_sfm1, in->li_sfm1, sizeof(srch->l_sfm1));

srch->l_size = (int) ftol(in->li_size);
        srch->l_depth = (int) ftol(in->li_depth);
        srch->l_width = (int) ftol(in->li_width);
        srch->l_extend = ftol(in->li_extend);
        srch->l_const = in->li_const;

strncpy(srch->l_pat1, in->li_pat1, sizeof(srch->l_pat1));
        strncpy(srch->l_pat2, in->li_pat2, sizeof(srch->l_pat2));

srch->l_or1 = in->li_or1;
        srch->l_or2 = in->li_or2;
        srch->l_text = in->li_text;

if (in->li_b11 < 0) {
                printf('\nID |%ld| contains block 1 value of ', in->li_id);
                printf('|%ld|.  Stored as 0\n', in->li_b11);
        } srch->l_b11 = itoi(in->li_b11);
        srch->l_b12 = itoi(in->li_b12);
        srch->l_b13 = itoi(in->li_b13);
        srch->l_b14 = itoi(in->li_b14);
        srch->l_b15 = itoi(in->li_b15);
        srch->l_b16 = itoi(in->li_b16);

srch->l_c1 = (char) 1;
        srch->l_c2 = (char) 0;
        srch->l_c3 = (char) 0;
        srch->l_c4 = (char) 0;
        srch->l_c5 = (char) 0;
        srch->l_c6 = (char) 0;

strncpy(srch->l_supplier, in->li_supplier, sizeof(srch->l_supplier))

srch->l_price = ftol(in->li_price);
        srch->l_baseprice = ftol(in->li_baseprice);
        srch->l_shadeprice = ftol(in->li_shadeprice);

srch->l_delivery = itoi(in->li_delivery);

srch->l_stocked = in->li_stocked;

srch->l_cr = CR;
        srch->l_lf = LF;

return;
} stylec(o, g, i, l)
char *o, g;
int  i, l;
{ if (i <= 0) {
```

```
            if (g )  (char) 0 && g ( (char) 5) {
                i = (int) g * 100;
                itoc(o, i, 1);
                return;
            }
        } else {
            itoc(o, i, 1);
            return;
        }
    }
}
/*
 *
 *   LAMP2.C
 *
 *   This file contains the programs for the lamp associated text
 *   file conversion.
 *
 */
include 'stdio.h'
#include 'lampin.str'
include 'lampnon.str' define CR      0x0D
define LF      0x0A

/*
 *   CONV_LNON(in, non)
 *
 *   Date Written:      March 24, 1984
 *
 *   Written By:        Matt Burkhardt
 *
 *   Last Modified:     June 11, 1984 - Works directly from DataEase now.
 *                      March 24, 1984
 *
 *   Passed:     A pointer to the input structure
 *               A pointer to the output structure
 *
 *   Function:   This function sets all the members of the associated text
 *               structure to the appropriate values.
 *
 *   Returns:    Nothing.
 *
 *   Notes:      Really should make it so it dumps out the records that
 *               don't meet some validity edits, but that's for later.
 *
 */
conv_lnon(in, non)
struct lampin *in;
struct lampnon *non;
{ long    ftol();

non->ln_id = in->li_id;

non->ln_page1 = itoi(in->li_page1);
        non->ln_page2 = itoi(in->li_page2);
        non->ln_page3 = itoi(in->li_page3);
        non->ln_sample = in->li_sample;

strncpy(non->ln_collection, in->li_collection, \
                sizeof(non->ln_collection));

strncpy(non->ln_descb, in->li_descb, sizeof(non->ln_descb));
        strncpy(non->ln_descs, in->li_descs, sizeof(non->ln_descs));

non->ln_widthst = (int) ftol(in->li_widthst);
        non->ln_depthst = (int) ftol(in->li_depthst);
        non->ln_widthsb = (int) ftol(in->li_widthsb);
        non->ln_depthsb = (int) ftol(in->li_depthsb);
        non->ln_heights = (int) ftol(in->li_heights);

non->ln_extendf = ftol(in->li_extendf);
```

```
        non->ln_standardfinish = ctoi(in->li_standardfinish);
        non->ln_customfinish = ctoi(in->li_customfinish);

non->ln_voldisc = in->li_voldisc;
        non->ln_customcolor = in->li_customcolor;
        non->ln_customshade = in->li_customshade;
        non->ln_baseswitch = in->li_baseswitch;
        non->ln_lineswitch = in->li_lineswitch;
        non->ln_boltdown = in->li_boltdown;
        non->ln_ground = in->li_ground;
        non->ln_special = in->li_special;
        non->ln_usage = in->li_usage;

strncpy(non->ln_smallcharge, in->li_smallcharge, \
                sizeof(non->ln_smallcharge));
        strncpy(non->ln_minorder, in->li_minorder, sizeof(non->ln_minorder));

non->ln_cdtable = in->li_cdtable;
        non->ln_cdfloor = in->li_cdfloor;
        non->ln_cdcont = in->li_cdcont;

non->ln_wall1 = ltol(in->li_wall1);
        non->ln_wall2 = ltol(in->li_wall2);
        non->ln_wall3 = ltol(in->li_wall3);
        non->ln_fab1 = ltol(in->li_fab1);
        non->ln_fab2 = ltol(in->li_fab2);
        non->ln_fab3 = ltol(in->li_fab3);

strncpy(non->ln_shape1, in->li_shape1, sizeof(non->ln_shape1));
        strncpy(non->ln_shape2, in->li_shape2, sizeof(non->ln_shape2));

non->ln_hue1 = ftol(in->li_hue1);
        non->ln_val1 = (int) ftol(in->li_val1);
        non->ln_chr1 = (int) ftol(in->li_chr1);
        non->ln_hue2 = ftol(in->li_hue2);
        non->ln_val2 = (int) ftol(in->li_val2);
        non->ln_chr2 = (int) ftol(in->li_chr2);

non->ln_hue3 = ftol(in->li_hue3);
        non->ln_val3 = (int) ftol(in->li_val3);
        non->ln_chr3 = (int) ftol(in->li_chr3);

non->ln_hue4 = ftol(in->li_hue4);
        non->ln_val4 = (int) ftol(in->li_val4);
        non->ln_chr4 = (int) ftol(in->li_chr4);

non->ln_hue5 = ftol(in->li_hue5);
        non->ln_val5 = (int) ftol(in->li_val5);
        non->ln_chr5 = (int) ftol(in->li_chr5);

non->ln_hue6 = ftol(in->li_hue6);
        non->ln_val6 = (int) ftol(in->li_val6);
        non->ln_chr6 = (int) ftol(in->li_chr6);

non->ln_cr = CR;
        non->ln_lf = LF;

return;
}
/*
* File:    LAMPIND.C
* Version: 1.0
* Release:
* System:
* Contact  Tom Corner
*------------------------------------------------------------------
* History: (reverse chronology)
* Date (Version)   Who/Action
* ------------------------------------------------------------------
* 21-mar-84 ( 1.0 ) Created
*
* ==================================================================
* Abstract:
* ---------
```

```
*  Purpose:
*          Build index files for lamp search file.
*  Inputs:
*          search file: LAMP1.BTR
*  Outputs:
*          stdout: operational log
*          index files:
*                      LAMPSTY.IND  - styles
*                      LAMPPM.IND   - preferred materials
*                      LAMPPCE.IND  - piece
*                      LAMPSF.IND   - special features
*                      LAMPPAT.IND  - patterns
*                      LAMPSCO.IND  - subdominant colors
*                      LAMPDCO.IND  - dominant colors
*  Entry Points:
*  Called Routines:
*                      bld_ind in sslib. This calls other routines in sslib and
*                      btrcall.
*  Special Notes:
*  ================================================================
*/ include 'bldind.inc' main()

{
static struct index defind[] ={
{
   {'lampsty.ind'},        /* file name */
   0,                      /* pointer to Btrieve position Block */
   IDLEN+3,                /*   record length */
   1,                      /*   number of keys */
   {3},                    /*     key lengths */
   {DUP},                  /*     key flags */
   {                       /* definition of field in search record */
     2,                    /*   number of field repeats */
     10,                   /*   index of 1st char 1st field */
     3                     /*   length of each field */
   },
   &strins                 /* function to insert record */
},
{
   {'lamppm.ind'},         /* file name */
   0,                      /* pointer to Btrieve position Block */
   IDLEN+4,                /*   record length */
   1,                      /*   number of keys */
   {4},                    /*     key lengths */
   {DUP},                  /*     key flags */
   {                       /* definition of field in search record */
     3,                    /*   number of field repeats */
     16,                   /*   index of 1st char 1st field */
     4                     /*   length of each field */
   },
   &strins                 /* function to insert record */

{                       /* definition of field in search record */
     3,                    /*   number of field repeats */
     33,                   /*   index of 1st char 1st field */
     4                     /*   length of each field */
   },
   &strins                 /* function to insert record */
},
{
   {'lampsf.ind'},         /* file name */
   0,                      /* pointer to Btrieve position Block */
   IDLEN+4,                /*   record length */
   1,                      /*   number of keys */
   {4},                    /*     key lengths */
   {DUP},                  /*     key flags */
   {                       /* definition of field in search record */
     6,                    /*   number of field repeats */
     45,                   /*   index of 1st char 1st field */
     4                     /*   length of each field */
   },
   &strins                 /* function to insert record */
```

```
},
{
    {'lamppat.ind'},        /* file name */
    0,                      /* pointer to Btrieve position Block */
    IDLEN+4,                /*   record length */
    1,                      /*   number of keys */
    {4},                    /*     key lengths */
    {DUP},                  /*     key flags */
    {                       /* definition of field in search record */
        2,                  /*   number of field repeats */
        80,                 /*   index of 1st char 1st field */
        4                   /*   length of each field */
    },
    &strins                 /* function to insert record */
},
{
    {'lampsco.ind'},        /* file name */
    0,                      /* pointer to Btrieve position Block */
    IDLEN+2,                /*   record length */
    1,                      /*   number of keys */
    {2},                    /*     key lengths */
    {DUP+BIN},              /*     key flags */
    {                       /* definition of field in search record */
        6
    0,                      /* pointer to Btrieve position Block */
    IDLEN+2,                /*   record length */
    1,                      /*   number of keys */
    {2},                    /*     key lengths */
    {DUP+BIN},              /*     key flags */
    {                       /* definition of field in search record */
        6,                  /*   number of field repeats */
        91,                 /*   index of 1st char 1st field */
        3                   /*   length of each field */
    },
    &dcolins                /* function to insert record */
}
};
/*
 * build indexes for lamp search file
 *    from
 *    7_indexes defined in defind
 */
bld_ind('lamp1.btr',defind,7);
}
/* File      :  lampword.c
 * Version   :  2.0
 * Release   :
 * System    :  Search & Source
 * Contact   :  Phil Evans
 * Date      :  4-20-84
 *==========================================================
 *
 * Purpose   :  these routine return lamp words for use on
 *              display screens
 *
 * Called
 * routines  :
 */ char *yesno(kind)
char kind;

{ switch(kind)
  {case '1': return(words(42));
   case '2': return(words(78));
   default : return(words(44));} switch(kind)
  {case '1': return(words(36));
```

```c
          case '2': return(words(48));
          case '3': return(words(30));
          default : return(words(44));}
    } char   *textopt(kind)
char    kind;

{
char   *words();

switch(kind)
   {case '1': return(words(72));
    case '2': return(words(36));
    case '3': return(words(30));
    case '4': return(words(6));
    default : return(words(44));}
} char   *patopt(kind)
char    kind;

{
char   *words();

switch(kind)
   {case '1': return(words(18));
    case '2': return(words(24));
    case '3': return(words(54));
    case '4': return(words(45));
    default : return(words(44));}
} char   *ptoropt(kind)
char    kind;

{
char   *words();

switch(kind)
   {case '1': return(words(1));
    case '2': return(words(5));
    case '3': return(words(17));
    case '4': return(words(79));
    case '5': return(words(26));
    case '6': return(words(21));
    default : return(words(44));}
} char   *mostsub(kind)
char    kind;

{
 char  *words();
 switch(kind)
  {case '1': return(words(41));
   default : return(words(73));}
} char   *when(kind)
char    kind;

{
 char *words();
 switch(kind)
 {case '0': return(words(85));
   case '1': return(words(86));
   default : return(words(44));}
}
/*
* File:    LOADTAB.C
* Version: 1.0
* Release:
* System:  Search & Source
* Contact: Tom Corner
```

```
/*-------------------------------------------------------------
 * History: (reverse chronology)
 * Date (Version)   Who/Action
 * -------------------------------------------------------------
 * 13-jun-84 ( 2.0b) TC/ upped pattern description and color description by 5
 *                       characters. Changed file descriptor and file names
 *                       for separate pattern tables for each data base.
 * 09-may-84 ( 2.0a) Tom Corner / Changed to pick up correct supplier offsets
 * 27-mar-84 ( 1.0 ) Tom Corner / Created to load style table only
 * 06-apr-84 ( 1.1 ) TC/ add file descriptor table
 * ==============================================================
 * Abstract:
 * ----------
 * Purpose: Read ASCII tables as received from Search & Source and
 *          convert to Btrieve files. The tables define values of
 *          fields in the product description files.
 * Inputs:
 * Outputs:
 * Entry Points:
 * Called Routines:
 * Special Notes: Link requires BTRCALL and SSLIB and C86XFACE object
 *                modules
 * ==============================================================
 */ include 'stdio.h'
include 'btrstr.inc'
#define PAGSIZ 512
#define MAXINRECLEN 256
#define MAXOUTRECLEN 256
#define MAXKEYLEN 25
#define ENDDEF -2                   /* end of field definitions for a table */
#define NOTKEY -1                   /* flag for field not used as Btrieve key */
#define BIN 4                       /* binary key flag */
#define DUP 1                       /* duplicates allowed key flag */
/*
 * definition of codes used to define key types
 */
#define DISCOD 0      /* Display Code */
#define STRING 1      /* ASCII character string */
#define INT 2         /* Integer */
#define LJBF 3        /* Left justify and blank fill ASCII field */
#define YNB 4         /* Y, N or blank; convert to 2,1 or 0 */
#define DECIMAL 5     /* Number with decimal point convert to integer */
#define LONG 6
define NULSTR 7      /* string to have a null terminator */ struct field {         /* field definition structure */
  int flag;            /* Btrieve key flag */
  int srcind;          /* index to first character in input record */
  int srclen;          /* length in input record */
  int desind;          /* index to 1st character in output record */
  int deslen;          /* length in output record */
  int type;            /* type code as defined above */
  char *desc;          /* pointer to string describing field */
};

struct fildef {        /* definition of input and output files */
ofcarguments on command line */
char *argv[];    /* pointers to argument strings */

{ static struct field style[] = {
/*
key       source    source    dest.     dest.     field
flag      index     length    index     length    type */
 {DUP,     0,        8,        0,        3,        DISCOD, 'Display Code'},
 {0,      12,        3,        3,        3,        STRING, 'Search Code'},
 {DUP,    15,       25,        6,       25,        STRING, 'Description'},
 {NOTKEY,40,        1,       31,        1,        YNB,    'Informal Flag'},
 {NOTKEY,41,        1,       32,        1,        YNB,    'Semi-Formal Flag'},
 {NOTKEY,42,        1,       33,        1,        YNB,    'Formal Flag'},
 {ENDDEF}
    };
```

```
    static struct field finish[] = {
/*
key      source   source   dest,    dest,    field
flag     index    length   index    length   type */
{DUP,    28,      8,       0,       3,       DISCOD, 'Display Code'},
{0,      0,       3,       3,       3,       STRING, 'Search Code'},
{DUP,    3,       25,      6,       25,      STRING, 'Description'},
{ENDDEF}
         };

static struct field combchce[] = {/* combined choice */
/*
key      source   source   dest,    dest,    field
flag     index    length   index    length   type */
{DUP,    0,       5,       0,       2,       DISCOD, 'Display Code'},
{DUP,    6,       2,       2,       1,       DISCOD, 'Search Code'},
{DUP,    9,       30,      3,       30,      STRING, 'Description'},
{ENDDEF} key      source   source   dest,    dest,    field
flag     index    length   index    length   type */
{DUP,    34,      8,       0,       3,       DISCOD, 'Display Code'},
{0,      0,       4,       3,       4,       STRING, 'Search Code'},
{DUP,    4,       30,      7,       30,      STRING, 'Description'},
{ENDDEF}
         };

static struct field sf4[] = {/* special features 4 level display code */
/*
key      source   source   dest,    dest,    field
flag     index    length   index    length   type */
{DUP,    39,      11,      0,       4,       DISCOD, 'Display Code'},
{0,      0,       4,       4,       4,       STRING, 'Search Code'},
{DUP,    4,       35,      8,       35,      STRING, 'Description'},
{ENDDEF}
         };

static struct field pmfurn[] = {/* preferred materials for non-up. furn. */
/*
key      source   source   dest,    dest,    field
flag     index    length   index    length   type */
{DUP,    34,      11,      0,       4,       DISCOD, 'Display Code'},
{0,      0,       4,       4,       4,       STRING, 'Search Code'},
{DUP,    4,       30,      8,       30,      STRING, 'Description'},
{ENDDEF}
         };

static struct field pmlamp[] = {/* preferred materials for lamps */
/*
key      source   source   dest,    dest,    field
flag     index    length   index    length   type */
{DUP,    34,      8,       0,       3,       DISCOD, 'Display Code'},
{0,      0,       4,       3,       4,       STRING, 'Search Code'},
{DUP,    4,       30,      7,       30,      STRING, 'Description'},
{ENDDEF}
         };

static struct field pmfw[] = {/* preferred materials for fabrics & wall co.*
/*
key      source   source   dest,    dest,    field
flag     index    length   index    length   type */
{DUP,    33,      5,       0,       2,       DISCOD, 'Display Code'},
{0,      0,       3,       2,       3,       STRING, 'Search Code'},
{DUP,    3,       30,      5,       30,      STRING, 'Description'},
{ENDDEF}
         };

static struct field fiber[] = {/* fiber contents */
/*
};

static struct field pattern[] = {
/*
key      source   source   dest,    dest,    field
flag     index    length   index    length   type */
```

```
    {DUP,    39,     11,     0,      4,      DISCOD, 'Display Code'},
    {0,      0,      4,      4,      4,      STRING, 'Search Code'},
    {DUP,    4,      35,     8,      35,     STRING, 'Description'},
    {ENDDEF}
         };

static struct field color[] = {         /* color block limits */
/*
key     source  source  dest.   dest.   field
flag    index   length  index   length  type */
    {DUP,    0,      4,      0,      2,      INT,    'Block Number'},
    {DUP,    21,     30,     2,      30,     STRING, 'Description'},
    {NOTKEY, 5,      6,      27,     2,      DECIMAL,'Centroid Hue'},
    {NOTKEY, 11,     5,      29,     2,      DECIMAL,'Centroid Value'},
    {NOTKEY, 16,     5,      31,     2,      DECIMAL,'Centroid Chroma'},
    {DUP,    46,     6,      33,     2,      DECIMAL,'Lower Hue'},
    {NOTKEY, 52,     6,      35,     2,      DECIMAL,'Upper Hue'},
    {NOTKEY, 58,     5,      37,     2,      DECIMAL,'Lower Value'},
    {NOTKEY, 63,     5,      39,     2,      DECIMAL,'Upper Value'},
    {NOTKEY, 68,     5,      41,     2,      DECIMAL,'Lower Chroma'},
    {NOTKEY, 73,     5,      43,     2,      DECIMAL,'Upper Chroma'},
    {ENDDEF}
         };

static struct field supplier[] = {
/*
key     source  source  dest.   dest.   field
flag    index   length  index   length  type */
    {DUP,    35,     2,      0,      1,      DISCOD, 'Display Code'},
    {0,      0,      5,      1,      5,      STRING, 'Code'},
    {0,      5,      30,     6,      30,     STRING, 'Name'},
    {NOTKEY, 37,     25,     36,     25,     STRING, 'Address'},
    {NOTKEY, 62,     20,     61,     20,     STRING, 'City'},
    {NOTKEY, 82,     2,      81,     2,      STRING, 'State'},
    {NOTKEY, 84,     5,      83,     5,      STRING, 'Zipcode'},
    {NOTKEY, 89,     1,      88,     1,      STRING, 'Type code'},
    {NOTKEY, 90,     3,      89,     3,      STRING, '?'},
    {NOTKEY, 93,     22,     92,     22,     STRING, 'Representative'},
    {NOTKEY, 115,    14,     114,    14,     STRING, 'Phone Number'},
    {ENDDEF}
         };

static struct field sf3[] = {/* special features 3 level display code */
/*
key     source  source  dest.   dest.   field
flag    index   length  index   length  type */
    {DUP,    33,     5,      0,      2,      DISCOD, 'Display Code'},
    {0,      0,      3,      2,      3,      STRING, 'Search Code'},
    {DUP,    3,      30,     5,      30,     STRING, 'Description'},
    {ENDDEF}
         };

static struct field temp[] = {
/*
key     source  source  dest.   dest.   field
flag    index   length  index   length  type */
    {ENDDEF}
         };

static struct field pclamp[] = {
/*
key     source  source  dest.   dest.   field
flag    index   length  index   length  type */
    {DUP,    34,     11,     0,      4,      DISCOD, 'Display Code'},
    {0,      0,      4,      4,      4,      STRING, 'Search Code'},
    {DUP,    4,      30,     8,      30,     STRING, 'Description'},
    {ENDDEF}
         };

static struct field pcfurn[] = {
/*
key     source  source  dest.   dest.   field
flag    index   length  index   length  type */
    {DUP,    36,     11,     0,      4,      DISCOD, 'Display Code'},
```

```
 {0,       0,       5,       4,       5,       STRING, 'Search Code'},
 {DUP,     5,       30,      9,       30,      STRING, 'Description'},
 {DUP,     35,      1,       39,      1,       STRING, 'Special Feature Code'},
 {ENDDEF}
        };

static struct field filedes[] = {/* file descriptor tables */
/*
 key      source   source   dest.    dest.    field
 flag     index    length   index    length   type */
 {DUP,    0,       2,       0,       1,       DISCOD, 'Display Code'},
 {BIN+DUP,3,       2,       1,       2,       INT,    'Field Number'},
 {NOTKEY,6,        3,       3,       2,       INT,    'Field Position'},
 {NOTKEY,10,       2,       5,       2,       INT,    'Compare Length'},
 {NOTKEY,13,       2,       7,       2,       INT,    'Skip Length'},
 {NOTKEY,16,       6,       9,       6,       STRING, 'Input Methods'},
 {NOTKEY,23,       1,       15,      2,       INT,    'Prompt Format'},
 {NOTKEY,25,       1,       17,      2,       INT,    'Convert Type In'},
 {NOTKEY,27,       8,       19,      4,       LONG,   'Low Value'},
 {NOTKEY,36,       8,       23,      4,       LONG,   'High Value'},
 {NOTKEY,45,       18,      27,      18,      STRING, 'Display Message'},
 {NOTKEY,64,       1,       45,      2,       INT,    'Search Action'},
 {NOTKEY,66,       1,       47,      2,       INT,    'Field Type'},
 {NOTKEY,68,       2,       49,      2,       INT,    'Repeat Count'},
 {NOTKEY,71,       12,      51,      13,      NULSTR, 'Btrieve Choice File'},
 {NOTKEY,84,       3,       64,      2,       INT,    'Index File'},
 {NOTKEY,88,       1,       66,      2,       INT,    'Address of Search List'},
 {ENDDEF}
        };

static struct fildef tables[] = {        /* table definitions */
    { 'style', style },
    { 'fbfabr',fiber },             /* fiber contents for fabrics */
    { 'pattern',pattern },
    { 'ptlamp',pattern },           /* patterns for lamps */
    { 'ptwall',pattern },           /* patterns for wall coverings */
    { 'ptfabr',pattern },           /* patterns for fabrics */
    { 'color',color },              /* color block limits */
    { 'fdfurn', filedes },          /* file descriptor for non-uphol. furniture */
    { 'fdupho', filedes },          /* file descriptor for uphol. furniture */
    { 'fdwall', filedes },          /* file descriptor for wall covering */
    { 'fdlamp', filedes },          /* file descriptor for lamps */
    { 'fdfabr', filedes },          /* file descriptor for fabrics */
    { 'fdrug', filedes },           /* file descriptor for carpets & rugs */
    { 'ccwall',combchce },          /* combined choice for wall coverings */
    { 'ccfabr', combchce },         /* combined choice for fabrics */
    { 'ccfurn', combchce },         /* combined choice for non-up. furniture */
    { 'ccupho', combchce },         /* combined choice for uphol. furniture */
    { 'cclamp', combchce },         /* combined choice for lamps */
    { 'ccrug', combchce },          /* combined choice for carpets & rugs */
    { 'sffurn',sf4 },               /* special features non-uphol. furniture */
    { 'sflamp',sf3 },               /* special features lamps */
    { 'pclamp', pclamp },           /* piece types for lamps */
    { 'pcfurn', pcfurn },           /* piece types for non-upholstered furniture*/
    { 'sufurn', supplier },         /* suppliers for non-uphol. furniture */
    { 'sulamp', supplier },         /* suppliers for lamps */
    { 'suwall', supplier },         /* suppliers for wall coverings */
    { 'sufabr', supplier },         /* suppliers for fabrics */
    { 'fnfurn', finish },           /* finishes for non-upholstered furniture */
    { 'fnlamp', finish },           /* finishes for lamps */
    { 'pmfurn', pmfurn },           /* pref. mat. for non-uphol. furniture */
    { 'pmlamp', pmlamp },           /* preferred materials for lamps */
    { 'pmfabr', pmfw },             /* preferred materials for fabrics */
    { 'pmwall', pmfw },             /* pref. mat. for wall coverings */
    { 0, 0 }                        /* end of table defs */
    };

char pos[115];                      /* Btrieve position buffer */
int stat,i,j,l;

FILE *fopen(),*inf;
char ascname[13],tabname[13],ts[12],*s,*d;
struct fildef *t;
```

```
    char ib[MAXINRECLEN];           /* input line buffer */
    char ob[MAXOUTRECLEN];          /* output Btrieve buffer */
    struct field *fs, *f;
    struct file_stat spec;          /* file specification for Btrieve create */
    char key[MAXKEYLEN];            /* key buffer for Btrieve calls */
    char c;

/*
 * search for file name on command line in tables
 */
for(t = tables;
    t->root != 0
    && strcmp(argv[1], t->root);
    t++);
if( t->root == 0 ){
    printf('Invalid Table Name: %s\n', argv[1]);
    exit(1);
    }       /* end if invalid table name */
fs = t->fields;                 /* point to field descriptions */
/*
 * Build File Names
 */
strcpy(tabname, argv[1]);
strcat(tabname,'.tab');
strcpy(ascname, argv[1]);
strcat(ascname, '.asc');

if( argc < 3 ){                 /* if table build */
                                /* anything following table name indicates display */
/*
 * Build Btrieve file specification for output file
 */
    for( f=fs, j=0, l=0; f->flag != ENDDEF; f++){ /* for each field defined */
        l += f->deslen;              /* calculate record length */
        if( f->flag != NOTKEY){      /* if this field is to be Btrieve key */
            spec.keys[j].key_pos = f->desind + 1;
            spec.keys[j].key_len = f->deslen;
            spec.keys[j++].key_flag = f->flag;
            }       /* end if key */
        }           /* end for each field */
    spec.rec_len = l;
    spec.page_size = PAGSIZ;
    spec.index_count = j;

printf('Building Table %s from %s\n',tabname,ascname);
    if((inf=fopen(ascname,'r'))==NULL){
        printf('Input file %s won't open\n',ascname);
        exit(1);    /* quit if input wont open */
        }           /* end if input file won't open */
    if(btr_creat(pos,&spec,tabname))exit(2);/* quit if can't create output file */
    if(btr_open(pos,ob,tabname))exit(3);    /* quit if output wont open */
/*
 * Data Ease output files have 4 garbage characters at the beginning
 * If the first character is a control character, skip 4 characters
 */
    if( (c=fgetc(inf)) < ' ')for(j=0;j++<3;fgetc(inf));
    else ungetc( c, inf );
/*
 * Load Btrieve Table from ASCII Table
 */
    for(i=1; 0 != fgets(ib,MAXINRECLEN,inf); i++){/* for each input line */
        pad(ib,MAXINRECLEN);            /* pad end of line with blanks */
        printf('%8d\015',i);            /* print line number CR no LF */
        if(convert(fs, ib, ob))         /* convert to Btrieve format */
            printf('conversion error line %d \n %s \n',i,ib);
        else{
            stat= btr_inser(pos,ob,key,0);  /* add record to output */
            if( stat != 0)
                printf('line %d \n %s \n',i,ib);/* insert error, print line */
            }       /* end else convert successful */
        }           /* end for each input line */
    fclose(inf);                        /* close input */
    btr_close(pos,ob,key);              /* close output */
    }           /* end if build table */
```

```
/*
 * Display Btrieve Table
 */
else {                 /* else display table */
  if(btr_open(pos,ob,tabname))exit(3);     /* quit if table wont open */
  printf(" Table %s\n",tabname);
  stat= btr_getlw(pos,ob,key,0);/* get lowest record */
  while(stat==0){
    disrec( fs, ob );               /* display one record */
    stat= btr_getnx(pos, ob, key, 0);/* get next record */
    }             /* end while records */
  btr_close(pos,ob , key);                  /* close table */
  }             /* end else display */
}             /* end main */

/*
 * convert input record to output record format
 */
convert(f,ib,ob)
struct field *f;       /* field descriptors */
char *ib,*ob;          /* input & output buffers */
{
char *s,*d,ts[12],*t;
int i,j,l,r;

for( r=0; f->flag != ENDDEF; f++){     /* for each field */
  s = &ib[f->srcind];           /* address of field source */
  d = &ob[f->desind];           /* address of field destination */
  l = f->deslen;                /* length of field destination */
  switch(f->type){
    case DISCOD:        /* display code */
      r += condc(s, d, l);
      break;
    case STRING:        /* ASCII string */
      movmem(s, d, l);
      break;

r += conlng( d, s, f->srclen );
      break;
    case LJBF:          /* Left Justify Blank Fill */
      for( i=f->srclen; *s==' ' && i>0; s++,i--);/* skip leading blanks */
      if( i>0 )movmem( s, d, i)l ? l : i );       /* move rest of field */
      for( l=l-i; (l--)>0; )ob[i++]=' ';          /* blank fill */
      break;
    case YNB:
      *d = ynbconv(*s);
      if( *d<0 ) r++;
      break;
    }
  }
  return(r);
}

/*
 * convert ASCII string to integer checking for errors
 */
conint(i,s,l)
int *i;
char *s;
int l;
{
  int sign;
  char *ts;
  int t;

t=l;
  ts=s;
  *i=0;
  for(; l>0 && *s==' '; l--, s++ );       /* skip leading blanks */
  if( l==0 )return(0);
  if( *s=='-' ){ s++; sign = -1; l--; }
  else{ sign = 1; if( *s=='+'){s++;l--;}}
  for(; l>0; s++,l-- ){
```

```
         if( isdigit(*s) ) *i = *i * 10 + *s - '0';
         else if( *s !=',' )break;
         }
      *i = *i * sign;
      for(; l>0 && *s==' '; s++,l-- );      /* skip trailing blanks */
      if( l != 0 ){
         printf("Error, expecting integer got:%.*s\n",t,ts);
         return(1);
         }
      return(0);
      }
conlng(i,s,l)
long *i;
char *s;
int l;
{
   int sign;
   char *ts;
   int t;

t=l;
   ts=s;
   *i=0;
=' '; s++,l-- );      /* skip trailing blanks */
   if( l != 0 ){
      printf("Error, expecting integer got:%.*s\n",t,ts);
      return(1);
      }
   return(0);
}
/*
* condc - convert ASCII display code to binary.
* The ASCII display codes is in the form of pairs of hexadecimal ASCII digits
* Between pairs is a period. Each pair converts to a single byte.
* e.g. .1F.56 converts to 0x1F56
*/
condc( s, d, l )
char *s, *d;
int l;
{
   int tl,i;
   char *ts;

tl=l;
   ts=s;
   for(; l>0; s+=3,l--,d++ ){
      if( *s == ' ' && *(s+1) == ' ')*d=0;
      else {
         if( 1 != sscanf(s,"%2x",&i) ){
            printf("Error converting display code:%.*s\n",tl,ts);
            return(1);
            }
         *d = i;
         }
      }
   return(0);
}
/*
* disrec - display one record from Btrieve Table
*/
disrec(f,ob)
struct field *f;
char *ob;
{
   int i;
   unsigned char *d;
   static char ynb[]=" NY";

printf("\n");
, (int)(*d));
         break;
      case STRING:
      case LJBF:
```

```
          printf("%.*s", f->deslen, d);
          break;
        case YNB:
          printf("%c",ynb[*d]);
          break;
        case INT:
          printf("%d",*(int *)d );
          break;
        case LONG:
          printf("%ld",*(long *)d );
          break;
      }
      printf("\n");
    }
  return;
}
/*
* File:     LOGINIT.C
* Version:  1.0
* Release:
* System:
* Contact: Tom Corner
*-------------------------------------------------------------
* History: (reverse chronology)
* Date (Version)   Who/Action
* -------------------------------------------------------------
* 25-may-84 ( 1.0 ) Tom Corner/created
*
* =============================================================
*   Abstract:
*   ---------
*   Purpose: Create QUERYLOG file and initialize field count to 0.
*   Inputs:  none
*   Outputs: Initialized QUERYLOG file.
*   Entry Points:
*   Called Routines:
*   Special Notes:
* =============================================================
*/ include 'stdio.h'
main()
{
static int logcnt=0;
FILE *fopen(), *log;

log = fopen('querylog','wb');
fseek(log, 0L, 0);
fwrite(&logcnt,2,1,log);
  displays a message at the desired
*               row,column,foreground, and background colors
*               with delay time & clearing options
*
*   Called
*   routines :
*/ include  'a:stdio.h' int   message(row,column,foreground,background,time,clear,string)
int   row,column,foreground,background,time,clear;
char  *string;

{
char work[81];
int  slength,i;
moveto(row,column);
do_color(foreground,background);
puts(string);
if (time) delay(time);
if (clear)
   {moveto(row,column);
    for (i = 0; i < strlen(string); i++) work[i] = ' ';
```

```
    work[i] = '\0';
    puts(work);}
do_color(2,0);
return(0);
} include <stdio.h>
include <mc.h> main()

for(;;){ pcvscp(2,4);

printf("ENTER A FOR ALL LINES / S FOR SINGLE LINE ");

whiteonred();

printf("  ");

key(answer,4,46,'A','a','S','s');

white();

if(toupper(anser[0])=='S')

getjline();

if(toupper(answer[0])=='A')

getj();

}

}
/*
 *
 *
 */
screen(type)
     int type;

{ cls(0,0,23,79,screen);

pcvscp(6,4);

printf("ENTER PO NUMBER ");

whiteonred();

printf("     \n\n");

white();

printf("     ENTER DATE ");

whiteonred();

printf("       \n\n");

white();

printf("     ENTER JOB NUMBER ");

whiteonred();
```

```
            printf('   \n\n');

white();

if(type=='2'){ printf('    ENTER LINE NUMBER ');

printf('   \n\n');

}
/*
*
*
*/ break;

case 2 :

sc=nlcursor(date,8,15,6,'n');
            break;

case 3 :

sc=wrap(job,10,21,4,'i');
            break;

case 4 :

sc=wrap(line,12,22,4,'i');
            break;

} line=linecur(sc,line,type,4);

}
/* File: NOVIDEO.C
*
* Version:
* Release:
* Contact:
*
* History: (reverse chronology)
* Date (Version)   Who/Action
* 26-APR-84  Sylvia Lasky/Created.
*
*  Purpose:   This is a dummy videodisc display routine for
*             testing videodisc using programs when a player is not
*             available.
*  Inputs:    2 long integers
*  Outputs:   a message at row 23, col.1
*  Entry Points:  video
*  Called Routines: getcursor, moveto
*  Special Notes:
*
*/ include 'stdio.h' video(a,b)

long a,b;

{ int row, col;
```

```
getcursor(&row, &col    );            /*save current cursor position*/
moveto(23,1);
printf('dummy video call, frame %ld',a);   /*display frame #*/
moveto(row, col);             /* restore old cursor position*/
```

```
/* File       : okquit.c
 * Version    : 2.0
 * Release    :
 * System     : Search & Source
 * Contact    : Phil Evans
 * Date       : 4-19-84
 *================================================================
 *
 * Purpose   : this routine verifies that the user wants to
 *             leave the display & abandon save list
 *
 * Called
 * routines  : ibmcolor
 */ int okquit()
{
        unsigned char c;
        char i, getkey(), *msg1 ='Leave display?', *msg2 = '     (y/n)';

beep();
        moveto(1,1);
        red();
        puts(msg1);
        printf('%s',msg2);
        for(;;)
        {
                i = getkey(&c);
                switch(i)
                {
                        case 'Y' :

case 'y'  : return(1);

case 'N' :

case 'n'  :
                                                atsay(1,1,'                    ');
                                                atsay(2,1,'                    ');
                                                moveto(22,1);
                                                return(0);

default  : beep();
                }
        }
}
/*
 *
 *   FABRIC1.C
 *
 *  This file contains the programs for the fabric conversion.
 *
 */
include 'stdio.h'
#include 'insrch.def'
include 'srchfab.str' define CR      0x0D
define LF      0x0A
#define EOFMARK 0x1A
main()
{
        char *d;
        FILE *fp, *out, *fopen();

fp = fopen('fabr1.asc','rb');
        out = fopen('fabr1.con', 'wb');

d = alloc(200);
```

```
          while(fgets(d, 200, fp)) {
                  conv_srch(d, out);
                  free(d);
                  d = alloc(200);
          } free(d);

fputc(EOFMARK, out);

fclose(fp);
          fclose(out);

printf('Inside main\n');
}
/*
 *    CONV_SRCH(d, fp)
 *
 *    Date Written:      March 7, 1984
 *
 *    Written By:        Matt Burkhardt
 *
 *    Last Modified:     March 7, 1984
 *
 *    Passed:     A pointer to the input data stream
 *                A file pointer to the output search file
 *
 *    Function:   This function sets all the members of the search
 *                structure to the appropriate values.
 *
 *    Returns:    Nothing.
 *
 *    Notes:      Really should make it so it dumps out the records that
 *                don't meet some validity edits, but that's for later.
 *
 */
conv_srch(d, fp)
char *d;
FILE *fp;
{ struct srchfab s;
          long to_long();

s.id = to_long(&d[ID_START], ID_LENGTH);
          s.vid = to_long(&d[VID_START], VID_LENGTH);
          s.disk = 1;                                   /* Default value for now */
          n_copy(s.sty1, &d[STY1_START], STY_LENGTH);
          n_copy(s.sty2, &d[STY2_START], STY_LENGTH);
          n_copy(s.pm1, &d[PM1_START], PM_LENGTH);
          n_copy(s.pm2, &d[PM2_START], PM_LENGTH);
          n_copy(s.fib1, &d[FIB1_START], FIB_LENGTH);
          n_copy(s.fib2, &d[FIB2_START], FIB_LENGTH);
          n_copy(s.fib3, &d[FIB3_START], FIB_LENGTH);
          n_copy(s.fib4, &d[FIB4_START], FIB_LENGTH);
          s.reflect = (char)lmh_conv(d[REFLECT_START]);
          s.text = (char)text_conv(d[TEXT_START]);
          n_copy(s.pat1, &d[PAT1_START], PAT_LENGTH);
          n_copy(s.pat2, &d[PAT2_START], PAT_LENGTH);
          s.or1 = (char)or_conv(d[OR1_START]);
          s.or2 = (char)or_conv(d[OR2_START]);
          s.scale = (char)sml_conv(d[SCALE_START]);
          s.dens = (char)dens_conv(d[DENS_START]);
          s.bl1 = to_int(&d[BL1_START], BL_LENGTH);
          s.bl2 = to_int(&d[BL2_START], BL_LENGTH);
          s.bl3 = to_int(&d[BL3_START], BL_LENGTH);
          s.bl4 = to_int(&d[BL4_START], BL_LENGTH);
          s.bl5 = to_int(&d[BL5_START], BL_LENGTH);
          s.bl6 = to_int(&d[BL6_START], BL_LENGTH);
          s.c1 = (char)c_conv(d[C1_START]);
          s.c2 = (char)c_conv(d[C2_START]);
          s.c3 = (char)c_conv(d[C3_START]);
          s.c4 = (char)c_conv(d[C4_START]);
```

```
            s.c5 = (char)0;
            s.c6 = (char)0;

s.fire = (char)yesno_conv(d[FIRE_START]);
            s.price = to_long(&d[PRICE_START], PRICE_LENGTH);
            n_copy(s.supplier, &d[SUPPLIER_START], SUPPLIER_LENGTH);
            s.stock = (char)0;
            s.cr = CR;
            s.lf = LF;

fwrite(&s, sizeof(struct srchfab), 1, fp);

return;
    }
    /*
    *
    *   FABRIC2.C
    *
    *   This file contains the calls necessary to convert over the
    *   non-search data elements for the fabric database.
    *
    */
    #include 'stdio.h'
    #include 'innosrch.def'
    #include 'nsrchfab.str' define CR      0x0D
    #define LF      0x0A
    #define EOFMARK 0x1A main()
    { char *d;
            FILE *fp, *out, *fopen();

fp = fopen('fabr2.asc', 'r');
            out = fopen('fabr2.con', 'wb');
            d = alloc(500);

while (fgets(d, 500, fp)) {
                    conv_nonsrch(d, out);
                    free(d);
                    d = alloc(500);
            } free(d);

fputc(EOFMARK, out);

fclose(fp);
            fclose(out);

printf('Finished\n');
    }

/*
    *   CONV_NONSRCH(d, fp)
    *
    *   Date Written:       March 7, 1984
    *
    *   Written By:         Matt Burkhardt
    *
    *   Last Modified:      March 7, 1984
    *
    *   Passed:     A pointer to the non-search input data
    *               A file pointer for the output non-search file
    *
    *   Function:   This function converts the data over to Cordatum format
    *
    *   Returns:    Nothing
    *
    *   Notes:      This module really should kick out records that do
    *               not pass some sort of validity checks, but that is
    *               for later.
```

```c
*
*/
conv_nonsrch(d, fp)
char *d;
FILE *fp;
{
        struct nsrch s;
        long to_long(), to_clong();

s.n_id = to_long(&d[ID_START], ID_LENGTH);
        s.n_sample = (char)sample_conv(d[SAMPLE_START]);
        s.n_page = to_int(&d[PAGE_START], PAGE_LENGTH);
        n_copy(s.n_book, &d[BOOK_START], BOOK_LENGTH);
        n_copy(s.n_desc, &d[DESC_START], DESC_LENGTH);
        s.n_special = (char)yesno_conv(d[SPECIAL_START]);
        s.n_width = to_long(&d[WIDTH_START], WIDTH_LENGTH);
        s.n_vert = to_int(&d[VERT_START], VERT_LENGTH);
        s.n_horiz = to_int(&d[HORIZ_START], HORIZ_LENGTH);
        s.n_usage = (char)usage_conv(d[USAGE_START]);
        s.n_stain = (char)stain_conv(d[STAIN_START]);
        s.n_shrink = (char)shrink_conv(d[SHRINK_START]);
        s.n_quilt = (char)quilt_conv(d[QUILT_START]);
        s.n_sun = (char)yesno_conv(d[SUN_START]);
        s.n_lamin = (char)yesno_conv(d[LAMIN_START]);
        s.n_clean = (char)clean_conv(d[CLEAN_START]);
        s.n_paper = (char)yesno_conv(d[PAPER_START]);
        s.n_dye = (char)dye_conv(d[DYE_START]);
        s.n_rail = (char)yesno_conv(d[RAIL_START]);
        s.n_fibc1 = to_int(&d[FIBC1_START], FIBC_LENGTH);
        s.n_fibc2 = to_int(&d[FIBC2_START], FIBC_LENGTH);
        s.n_fibc3 = to_int(&d[FIBC3_START], FIBC_LENGTH);
        s.n_fibc4 = to_int(&d[FIBC4_START], FIBC_LENGTH);
        s.n_cdbed = (char)yesno_conv(d[CDBED_START]);
        s.n_cddrape = (char)yesno_conv(d[CDDRAPE_START]);
        s.n_cdother = (char)yesno_conv(d[CDOTHER_START]);
        s.n_fabid1 = to_long(&d[FABID1_START], ID_LENGTH);
        s.n_fabid2 = to_long(&d[FABID2_START], ID_LENGTH);
        s.n_fabid3 = to_long(&d[FABID3_START], ID_LENGTH);
        s.n_fabid4 = to_long(&d[FABID4_START], ID_LENGTH);
        s.n_wall1 = to_long(&d[WALL1_START], ID_LENGTH);
        s.n_wall2 = to_long(&d[WALL2_START], ID_LENGTH);
        s.n_matchbed = (char)yesno_conv(d[MATCHBED_START]);
        s.n_matchdrape = (char)yesno_conv(d[MATCHDRAPE_START]);
        s.n_matchwall = to_long(&d[MATCHWALL_START], ID_LENGTH);
        s.n_matchother = (char)yesno_conv(d[MATCHOTHER_START]);
        s.n_voldiscpercent = to_int(&d[VOLDISCPERCENT_START], \
                VOLDISCPERCENT_LENGTH);
        s.n_voldiscyd = to_int(&d[VOLDISCYD_START], VOLDISCYD_LENGTH);
        s.n_suit = (char)suit_conv(d[SUIT_START]);
        s.n_room1 = (char)room_conv(&d[ROOM1_START]);
        s.n_room2 = (char)room_conv(&d[ROOM2_START]);
        s.n_room3 = (char)room_conv(&d[ROOM3_START]);
        s.n_trans = (char)trans_conv(&d[TRANS_START]);
        s.n_wear = (char)yesno_conv(d[WEAR_START]);
        s.n_uph = (char)yesno_conv(d[UPH_START]);
        s.n_slip = (char)yesno_conv(d[SLIP_START]);
        s.n_case = (char)yesno_conv(d[CASE_START]);
        s.n_window = (char)yesno_conv(d[WINDOW_START]);
        s.n_linen = (char)yesno_conv(d[LINEN_START]);
        s.n_wallapplic = (char)yesno_conv(d[WALLAPPLIC_START]);
        s.n_custom = (char)yesno_conv(d[CUSTOM_START]);
        s.n_min = to_int(&d[MIN_START], MIN_LENGTH);
        s.n_setup = to_int(&d[SETUP_START], SETUP_LENGTH);
        s.n_hue1 = to_clong(&d[HUE1_START], HUE_LENGTH);
        s.n_hue2 = to_clong(&d[HUE2_START], HUE_LENGTH);
        s.n_hue3 = to_clong(&d[HUE3_START], HUE_LENGTH);
        s.n_hue4 = to_clong(&d[HUE4_START], HUE_LENGTH);
        s.n_hue5 = to_clong(&d[HUE5_START], HUE_LENGTH);
        s.n_hue6 = to_clong(&d[HUE6_START], HUE_LENGTH);
        s.n_val1 = to_cint(&d[VAL1_START], VAL_LENGTH);
        s.n_val2 = to_cint(&d[VAL2_START], VAL_LENGTH);
```

```c
        s.n_val3 = to_cint(&d[VAL3_START], VAL_LENGTH);
        s.n_val4 = to_cint(&d[VAL4_START], VAL_LENGTH);
        s.n_val5 = to_cint(&d[VAL5_START], VAL_LENGTH);
        s.n_val6 = to_cint(&d[VAL6_START], VAL_LENGTH);
        s.n_chr1 = to_cint(&d[CHR1_START], CHR_LENGTH);
        s.n_chr2 = to_cint(&d[CHR2_START], CHR_LENGTH);
        s.n_chr3 = to_cint(&d[CHR3_START], CHR_LENGTH);
        s.n_chr4 = to_cint(&d[CHR4_START], CHR_LENGTH);
        s.n_chr5 = to_cint(&d[CHR5_START], CHR_LENGTH);
        s.n_chr6 = to_cint(&d[CHR6_START], CHR_LENGTH);

s.n_cr = CR;
        s.n_lf = LF;

fwrite(&s, sizeof(struct nsrch), 1, fp);

return;
}
/*
 *
 *  FURN1DIS.C
 *
 *  This file contains the programs for the furniture search
 *  file dump.
 *
 */
include 'stdio.h'
include 'furnsrch.str' main()
{ struct furnsrch d;
        int i;
        FILE *fp, *fopen();

i = sizeof(struct furnsrch);
        fp = fopen('furn1.con', 'rb');

while(fread(&d, i, 1, fp)) {
                print_it(&d);
        } fclose(fp);

printf('Finished\n');

}
/*
 *  print_it(s)
 *
 *  Date Written:     March 26, 1984
 *
 *  Written By:       Matt Burkhardt
 *
 *  Last Modified:    March 26, 1984
 *
 *  Passed:    A pointer to the input structure
 *
 *  Function:  This function prints all the members of the search
 *             structure.
 *
 *  Returns:   Nothing.
 *
 *  Notes:
 *
 */
print_it(s)
struct furnsrch *s;
{ printf('The ID is !%D!\n', s->n_id);
        printf('The video frame is !%D!\n', s->n_vid);
```

```c
        printf("The disc is |%d|\n", s->n_disc);
        printf("Style 1 is |%.3s|\n", s->n_style1);
        printf("Style 2 is |%.3s|\n", s->n_style2);
        printf("Style 3 is |%.3s|\n", s->n_style3);
        printf("Preferred Material 1 is |%.4s|\n", s->n_pm1);
        printf("Preferred Material 2 is |%.4s|\n", s->n_pm2);
        printf("Preferred Material 3 is |%.4s|\n", s->n_pm3);
        printf("Preferred Material 4 is |%.4s|\n", s->n_pm4);
        printf("Finish 1 is |%.3s|\n", s->n_fin1);
        printf("Finish 2 is |%.3s|\n", s->n_fin2);
        printf("Finish 3 is |%.3s|\n", s->n_fin3);
        printf("Finish 4 is |%.3s|\n", s->n_fin4);
        printf("Reflect is |%d|\n", (int)s->n_reflect);
        printf("Piece 1 is |%.5s|\n", s->n_piece1);
        printf("Piece 2 is |%.5s|\n", s->n_piece2);
        printf("Piece 3 is |%.5s|\n", s->n_piece3);
        printf("Size 1 is |%.6s|\n", s->n_size1);
        printf("Inch 1 is |%D|\n", s->n_inch1);
        printf("Size 2 is |%.6s|\n", s->n_size2);
        printf("Inch 2 is |%D|\n", s->n_inch2);
        printf("Size 3 is |%.6s|\n", s->n_size3);
        printf("Inch 3 is |%D|\n", s->n_inch3);
        printf("Size 4 is |%.6s|\n", s->n_size4);
        printf("Inch 4 is |%D|\n", s->n_inch4);
        printf("Size 5 is |%.6s|\n", s->n_size5);
        printf("Inch 5 is |%D|\n", s->n_inch5);
        printf("Shape 1 is |%.4s|\n", s->n_shape1);
        printf("Shape 2 is |%.4s|\n", s->n_shape2);
        printf("Shape 3 is |%.4s|\n", s->n_shape3);
        printf("Shape 4 is |%.4s|\n", s->n_shape4);
        printf("Specialfeature 1 is |%.4s|\n", s->n_sf1);
        printf("Specialfeature 2 is |%.4s|\n", s->n_sf2);
        printf("Specialfeature 3 is |%.4s|\n", s->n_sf3);
        printf("Specialfeature 4 is |%.4s|\n", s->n_sf4);
        printf("Specialfeature 5 is |%.4s|\n", s->n_sf5);
        printf("Specialfeature 6 is |%.4s|\n", s->n_sf6);
        printf("Specialfeature 7 is |%.4s|\n", s->n_sf7);
        printf("Specialfeature 8 is |%.4s|\n", s->n_sf8);
        printf("Specialfeature 9 is |%.4s|\n", s->n_sf9);
        printf("Specialfeature 10 is |%.4s|\n", s->n_sf10);
        printf("Specialfeature 11 is |%.4s|\n", s->n_sf11);
        printf("Specialfeature 12 is |%.4s|\n", s->n_sf12);
        printf("Block 1 is |%d|\n", s->n_bl1);
        printf("C 1 is |%d|\n", (int)s->n_c1);
        printf("Block 2 is |%d|\n", s->n_bl2);
        printf("C 2 is |%d|\n", (int)s->n_c2);
        printf("Block 3 is |%d|\n", s->n_bl3);
        printf("C 3 is |%d|\n", (int)s->n_c3);
        printf("Block 4 is |%d|\n", s->n_bl4);
        printf("C 4 is |%d|\n", (int)s->n_c4);
        printf("Block 5 is |%d|\n", s->n_bl5);
        printf("C 5 is |%d|\n", (int)s->n_c5);
        printf("Block 6 is |%d|\n", s->n_bl6);
        printf("C 6 is |%d|\n", (int)s->n_c6);
        printf("Maximum price is |%D|\n", s->n_maxprice);
        printf("Minimum price is |%D|\n", s->n_minprice);
        printf("Supplier code is |%.5s|\n", s->n_supplier);
        printf("Cut 1 is |%.8s|\n", s->n_cut1);
        printf("Cut 2 is |%.8s|\n", s->n_cut2);
        printf("Cut 3 is |%.8s|\n", s->n_cut3);
        printf("Month 1 is |%d|\n", s->n_month1);
        printf("Month 2 is |%d|\n", s->n_month2);
        printf("Month 3 is |%d|\n", s->n_month3);
        printf("Stocked is |%d|\n", (int)s->n_stocked);

return;
}
/*
 *
 *   FURN2DIS.C
 *
 *   This file contains the programs for the furniture search
 *   file print.
```

```c
*
*/
include 'stdio.h'
include 'furnnon.str' main()
{
        struct furnnon d;
        FILE *fp, *fopen();
        int i;

i = sizeof(struct furnnon);
        fp = fopen('furn2.con','rb');

while(fread(&d, i, 1, fp)) {
                print_it(&d);
        } fclose(fp);

printf('Finished\n');

}
/*
*   PRINT_IT(s)
*
*   Date Written:       March 26, 1984
*
*   Written By:         Matt Burkhardt
*
*   Last Modified:      March 26, 1984
*
*   Passed:    A pointer to the input data stream
*
*   Function:  This function prints all the members of the search
*              structure.
*
*   Returns:   Nothing.
*
*   Notes:
*
*/
print_it(s)

struct furnnon *s;
{ printf('The ID is !%D!\n', s->nn_id);
        printf('Sample is !%d!\n', (int)s->nn_sample);
        printf('Description is !%.40s!\n', s->nn_desc);
        printf('Book name is !%.40s!\n', s->nn_book);
        printf('Page 1 is !%d!\n', s->nn_page1);
        printf('Page 2 is !%d!\n', s->nn_page2);
        printf('Page 3 is !%d!\n', s->nn_page3);
        printf('C.O.M. Price is !%D!\n', s->nn_comprice);
        printf('Special order is !%d!\n', (int)s->nn_special);
        printf('Volume discount is !%d!\n', s->nn_voldisc);
        printf('And/or is !%D!\n', s->nn_andor);
        printf('Minimum order is !%d!\n', s->nn_minorder);
        printf('Weight in pounds is !%D!\n', s->nn_wtlbs);
        printf('Weight in ounces is !%d!\n', s->nn_wtozs);
        printf('Mid 1 is !%d!\n', (int)s->nn_mid1);
        printf('Mid 2 is !%d!\n', (int)s->nn_mid2);
        printf('Mid 3 is !%d!\n', (int)s->nn_mid3);
        printf('Stock 1 is !%d!\n', s->nn_stock1);
        printf('Stock 2 is !%d!\n', s->nn_stock2);
        printf('Stock 3 is !%d!\n', s->nn_stock3);
        printf('Date is !%.8s!\n', s->nn_date);
        printf('Cut time is !%d!\n', (int)s->nn_cuttime);
        printf('Cut month is !%d!\n', s->nn_cutmonth);
        printf('Ship month is !%d!\n', s->nn_shipmonth);
        printf('Ship year is !%d!\n', s->nn_shipyear);
```

```
        printf("Pack is |%d|\n", s->nn_pack);
        printf("Percarton is |%D|\n", s->nn_percarton);
        printf("C.O.M yardage is |%d|\n", s->nn_comyds);
        printf("COM 4 is |%d|\n", s->nn_com4);
        printf("COM 6 is |%d|\n", s->nn_com6);
        printf("Based on 54 is |%d|\n", (int)s->nn_base54);
        printf("Pagef is |%d|\n", s->nn_pagef);
        printf("Descf is |%.35s|\n", s->nn_descf);
        printf("Fabric ID is |%D|\n", s->nn_fabid);
        printf("Greade is |%.4s|\n", s->nn_grade);
        printf("Retail per yard is |%d|\n", s->nn_retailperyd);
        printf("Access is |%d|\n", (int)s->nn_access);
        printf("Access ID is |%D|\n", s->nn_accessid);
        printf("Desca is |%.20s|\n", s->nn_desca);
        printf("First ID is |%D|\n", s->nn_firstid1);
        printf("Last ID is |%D|\n", s->nn_lastid1);
        printf("Type 1 is |%d|\n", (int)s->nn_type1);
        printf("Except ID 1 is |%D|\n", s->nn_except1id1);
        printf("Except ID 2 is |%D|\n", s->nn_except1id2);
        printf("Except ID 3 is |%D|\n", s->nn_except1id3);
        printf("Plus ID 1 is |%D|\n", s->nn_plus1id1);
        printf("Plus ID 2 is |%D|\n", s->nn_plus1id2);
        printf("Plus ID 3 is |%D|\n", s->nn_plus1id3);
        printf("First ID is |%D|\n", s->nn_firstid2);
        printf("Last ID is |%D|\n", s->nn_lastid2);
        printf("Type 2 is |%d|\n", (int)s->nn_type2);
        printf("Except ID 1 is |%D|\n", s->nn_except2id1);
        printf("Except ID 2 is |%D|\n", s->nn_except2id2);
        printf("Except ID 3 is |%D|\n", s->nn_except2id3);
        printf("Plus ID 1 is |%D|\n", s->nn_plus2id1);
        printf("Plus ID 2 is |%D|\n", s->nn_plus2id2);
        printf("Plus ID 3 is |%D|\n", s->nn_plus2id3);
        printf("Option is |%d|\n", s->nn_option);
        printf("Option Price is |%d|\n", s->nn_optionprice);
        printf("Custom is |%d|\n", (int)s->nn_custom);
        printf("Hue 1 is |%D|\n", s->nn_hue1);
        printf("Value 1 is |%d|\n", s->nn_val1);
        printf("Chroma 1 is |%d|\n", s->nn_chr1);
        printf("Hue 2 is |%D|\n", s->nn_hue2);
        printf("Value 2 is |%d|\n", s->nn_val2);
        printf("Chroma 2 is |%d|\n", s->nn_chr2);
        printf("Hue 3 is |%D|\n", s->nn_hue3);
        printf("Value 3 is |%d|\n", s->nn_val3);
        printf("Chroma 3 is |%d|\n", s->nn_chr3);
        printf("Hue 4 is |%D|\n", s->nn_hue4);
        printf("Value 4 is |%d|\n", s->nn_val4);
        printf("Chroma 4 is |%d|\n", s->nn_chr4);
        printf("Hue 5 is |%D|\n", s->nn_hue5);
        printf("Value 5 is |%d|\n", s->nn_val5);
        printf("Chroma 5 is |%d|\n", s->nn_chr5);
        printf("Hue 6 is |%D|\n", s->nn_hue6);
        printf("Value 6 is |%d|\n", s->nn_val6);
        printf("Chroma 6 is |%d|\n", s->nn_chr6);

return;
}
/*
 *
 *   FURN1.C
 *
 *   This file contains the programs for the furniture search
 *   file conversion.
 *
 */
#include "stdio.h"
#include "furnsrch.def"
#include "furnsrch.str"

#define CR       0x0D
define LF       0x0A
define EOFMARK  0x1A main()
{
```

```
        char *d;
        FILE *fp, *out, *fopen();

fp = fopen('furn1.asc','rb');
        out = fopen('furn1.con', 'wb');

d = alloc(300);

while(fgets(d, 300, fp)) {
                conv_srch(d, out);
                free(d);
                d = alloc(300);
        } free(d);

fputc(EOFMARK, out);

fclose(fp);
        fclose(out);

printf('Finished\n');

}
/*
*       CONV_SRCH(d, fp)
*
*       Date Written:       March 26, 1984
*
*       Written By:         Matt Burkhardt
*
*       Last Modified:      March 26, 1984
*
*       Passed:     A pointer to the input data stream
*                   A file pointer to the output search file
*
*       Function:   This function sets all the members of the search
*                   structure to the appropriate values.
*
*       Returns:    Nothing.
*
*       Notes:      Really should make it so it dumps out the records that
*                   don't meet some validity edits, but that's for later.
*
*/
conv_srch(d, fp)
char *d;
FILE *fp;
{
        struct furnsrch s;
        long to_long(), to_clong();

s.n_id = to_long(&d[ID_START], ID_LENGTH);
        s.n_vid = to_long(&d[VID_START], VID_LENGTH);
        s.n_disc = to_int(&d[DISC_START], DISC_LENGTH);
        n_copy(s.n_style1, &d[STYLE1_START], STYLE_LENGTH);
        n_copy(s.n_style2, &d[STYLE2_START], STYLE_LENGTH);
        n_copy(s.n_style3, &d[STYLE3_START], STYLE_LENGTH);
        n_copy(s.n_pm1, &d[PM1_START], PM_LENGTH);
        n_copy(s.n_pm2, &d[PM2_START], PM_LENGTH);
        n_copy(s.n_pm3, &d[PM3_START], PM_LENGTH);
        n_copy(s.n_pm4, &d[PM4_START], PM_LENGTH);
        n_copy(s.n_fin1, &d[FIN1_START], FIN_LENGTH);
        n_copy(s.n_fin2, &d[FIN2_START], FIN_LENGTH);
        n_copy(s.n_fin3, &d[FIN3_START], FIN_LENGTH);
        n_copy(s.n_fin4, &d[FIN4_START], FIN_LENGTH);
        s.n_reflect = (char)lmh_conv(d[REFLECT_START]);
        n_copy(s.n_piece1, &d[PIECE1_START], PIECE_LENGTH);
        n_copy(s.n_piece2, &d[PIECE2_START], PIECE_LENGTH);
        n_copy(s.n_piece3, &d[PIECE3_START], PIECE_LENGTH);
        n_copy(s.n_size1, &d[SIZE1_START], SIZE_LENGTH);
        s.n_inch1 = to_long(&d[INCH1_START], INCH_LENGTH);
        n_copy(s.n_size2, &d[SIZE2_START], SIZE_LENGTH);
```

```
        s.n_inch2 = to_long(&d[INCH2_START], INCH_LENGTH);
        n_copy(s.n_size3, &d[SIZE3_START], SIZE_LENGTH);
        s.n_inch3 = to_long(&d[INCH3_START], INCH_LENGTH);
        n_copy(s.n_size4, &d[SIZE4_START], SIZE_LENGTH);
        s.n_inch4 = to_long(&d[INCH4_START], INCH_LENGTH);
        n_copy(s.n_size5, &d[SIZE5_START], SIZE_LENGTH);
        s.n_inch5 = to_long(&d[INCH5_START], INCH_LENGTH);
        n_copy(s.n_shape1, &d[SHAPE1_START], SHAPE_LENGTH);
        n_copy(s.n_shape2, &d[SHAPE2_START], SHAPE_LENGTH);
        n_copy(s.n_shape3, &d[SHAPE3_START], SHAPE_LENGTH);
        n_copy(s.n_shape4, &d[SHAPE4_START], SHAPE_LENGTH);
        n_copy(s.n_sf1, &d[SF1_START], SF_LENGTH);
        n_copy(s.n_sf2, &d[SF2_START], SF_LENGTH);
LENGTH);
        n_copy(s.n_sf9, &d[SF9_START], SF_LENGTH);
        n_copy(s.n_sf10, &d[SF10_START], SF_LENGTH);
        n_copy(s.n_sf11, &d[SF11_START], SF_LENGTH);
        n_copy(s.n_sf12, &d[SF12_START], SF_LENGTH);
        s.n_bl1 = to_long(&d[BL1_START], BL_LENGTH);
        s.n_c1 = (char)c_conv(d[C1_START]);
        s.n_bl2 = to_long(&d[BL2_START], BL_LENGTH);
        s.n_c2 = (char)c_conv(d[C2_START]);
        s.n_bl3 = to_long(&d[BL3_START], BL_LENGTH);
        s.n_c3 = (char)c_conv(d[C3_START]);
        s.n_bl4 = to_long(&d[BL4_START], BL_LENGTH);
        s.n_c4 = (char)c_conv(d[C4_START]);
        s.n_bl5 = to_long(&d[BL5_START], BL_LENGTH);
        s.n_c5 = (char)0;
        s.n_bl6 = to_long(&d[BL6_START], BL_LENGTH);
        s.n_c6 = (char)0;
        s.n_maxprice = to_long(&d[MAXPRICE_START], PRICE_LENGTH);
        s.n_minprice = to_long(&d[MINPRICE_START], PRICE_LENGTH);
        n_copy(s.n_supplier, &d[SUPPLIER_START], SUPPLIER_LENGTH);
        n_copy(s.n_cut1, &d[CUT1_START], CUT_LENGTH);
        n_copy(s.n_cut2, &d[CUT2_START], CUT_LENGTH);
        n_copy(s.n_cut3, &d[CUT3_START], CUT_LENGTH);
        s.n_month1 = to_int(&d[MONTH1_START], MONTH_LENGTH);
        s.n_month2 = to_int(&d[MONTH2_START], MONTH_LENGTH);
        s.n_month3 = to_int(&d[MONTH3_START], MONTH_LENGTH);
        s.n_stocked = (char)yesno_conv(d[STOCKED_START]);

s.n_cr = CR;
        s.n_lf = LF;

fwrite(&s, sizeof(struct furnsrch), 1, fp);

return;
}
/*
 *
 *    FURN2.C
 *
 *    This file contains the programs for the furniture search
 *    file conversion.
 *
 */
include 'stdio.h'
#include 'furnnon.def'
include 'furnnon.str' define CR       0x0D
define LF       0x0A
define EOFMARK  0x1A main()
{
```

```
        char *d;
        FILE *fp, *out, *fopen();

fp = fopen('furn2.asc','rb');
        out = fopen('furn2.con', 'wb');

d = alloc(500);

while(fgets(d, 500, fp)) {
                conv_nonsrch(d, out);
                free(d);
                d = alloc(500);
        } free(d);

fputc(EOFMARK, out);

fclose(fp);
        fclose(out);

printf('Finished\n');

}
/*
 *   CONV_NONSRCH(d, fp)
 *
 *   Date Written:      March 26, 1984
 *
 *   Written By:        Matt Burkhardt
 *
 *   Last Modified:     March 26, 1984
 *
 *   Passed:    A pointer to the input data stream
 *              A file pointer to the output search file
 *
 *   Function:  This function sets all the members of the search
 *              structure to the appropriate values.
 *
 *   Returns:   Nothing.
 *
 *   Notes:     Really should make it so it dumps out the records that
 *              don't meet some validity edits, but that's for later.
 *
 */
conv_nonsrch(d, fp)
char *d;
FILE *fp;
{ struct furnnon s;
        long to_long(), to_clong();

s.nn_id = to_long(&d[ID_START], ID_LENGTH);
        s.nn_sample = (char)bf_conv(&d[SAMPLE_START]);
        n_copy(s.nn_desc, &d[DESC_START], DESC_LENGTH);
        n_copy(s.nn_book, &d[BOOK_START], BOOK_LENGTH);
        s.nn_page1 = to_int(&d[PAGE1_START], PAGE_LENGTH);
        s.nn_page2 = to_int(&d[PAGE2_START], PAGE_LENGTH);
        s.nn_page3 = to_int(&d[PAGE3_START], PAGE_LENGTH);
        s.nn_comprice = to_long(&d[COMPRICE_START], PRICE_LENGTH);
        s.nn_special = (char)yesno_conv(d[SPECIAL_START]);
        s.nn_voldisc = to_int(&d[VOLDISC_START], VOLDISC_LENGTH);
        s.nn_andor = to_long(&d[ANDOR_START], ANDOR_LENGTH);
        s.nn_minorder = to_int(&d[MINORDER_START], MINORDER_LENGTH);
        s.nn_wtlbs = to_long(&d[WTLBS_START], WTLBS_LENGTH);
        s.nn_wtozs = to_int(&d[WTOZS_START], WTOZS_LENGTH);
        s.nn_mid1 = (char)eml_conv(d[MID1_START]);
        s.nn_mid2 = (char)eml_conv(d[MID2_START]);
```

```
    s.nn_mid3 = (char)eml_conv(d[MID3_START]);
    s.nn_stock1 = to_int(&d[STOCK1_START], STOCK_LENGTH);
    s.nn_stock2 = to_int(&d[STOCK2_START], STOCK_LENGTH);
    s.nn_stock3 = to_int(&d[STOCK3_START], STOCK_LENGTH);
    n_copy(s.nn_date, &d[DATE_START], DATE_LENGTH);
    s.nn_cuttime = (char)eml_conv(d[CUTTIME_START]);
    s.nn_cutmonth = to_int(&d[CUTMONTH_START], CUTMONTH_LENGTH);
    s.nn_shipmonth = to_int(&d[SHIPMONTH_START], SHIPMONTH_LENGTH);
    s.nn_shipyear = to_int(&d[SHIPYEAR_START], SHIPYEAR_LENGTH);
    s.nn_pack = to_int(&d[PACK_START], PACK_LENGTH);
    s.nn_percarton = to_long(&d[PERCARTON_START], PERCARTON_LENGTH);
    s.nn_comyds = to_int(&d[COMYDS_START], COMYDS_LENGTH - 1);
    s.nn_com4 = to_int(&d[COM4_START], COM_LENGTH);
    s.nn_com6 = to_int(&d[COM6_START], COM_LENGTH);
    s.nn_base54 = (char)yesno_conv(d[BASE54_START]);
    s.nn_pagef = to_int(&d[PAGEF_START], PAGE_LENGTH);
    n_copy(s.nn_descf, &d[DESCF_START], DESCF_LENGTH);
    s.nn_fabid = to_long(&d[FABID_START], ID_LENGTH);
    n_copy(s.nn_grade, &d[GRADE_START], GRADE_LENGTH);
    s.nn_retailperyd = to_int(&d[RETAILPERYD_START], RETAILPERYD_LENGTH);
    s.nn_access = (char)yesno_conv(d[ACCESS_START]);
    s.nn_accessid = to_long(&d[ACCESSID_START], ID_LENGTH);
    n_copy(s.nn_desca, &d[DESCA_START], DESCA_LENGTH);
    s.nn_firstid1 = to_long(&d[FIRSTID1_START], ID_LENGTH);
    s.nn_lastid1 = to_long(&d[LASTID1_START], ID_LENGTH);
    s.nn_type1 = (char)ftype_conv(&d[TYPE1_START]);
    s.nn_except1id1 = to_long(&d[EXCEPT1ID1_START], ID_LENGTH);
    s.nn_except1id2 = to_long(&d[EXCEPT1ID2_START], ID_LENGTH);
    s.nn_except1id3 = to_long(&d[EXCEPT1ID3_START], ID_LENGTH);
    s.nn_plus1id1 = to_long(&d[PLUS1ID1_START], ID_LENGTH);
    s.nn_plus1id2 = to_long(&d[PLUS1ID2_START], ID_LENGTH);
    s.nn_plus1id3 = to_long(&d[PLUS1ID3_START], ID_LENGTH);
    s.nn_firstid2 = to_long(&d[FIRSTID2_START], ID_LENGTH);
    s.nn_lastid2 = to_long(&d[LASTID2_START], ID_LENGTH);
    s.nn_type2 = (char)ftype_conv(&d[TYPE2_START]);
    s.nn_except2id1 = to_long(&d[EXCEPT2ID1_START], ID_LENGTH);
    s.nn_except2id2 = to_long(&d[EXCEPT2ID2_START], ID_LENGTH);
    s.nn_except2id3 = to_long(&d[EXCEPT2ID3_START], ID_LENGTH);
    s.nn_plus2id1 = to_long(&d[PLUS2ID1_START], ID_LENGTH);
    s.nn_plus2id2 = to_long(&d[PLUS2ID2_START], ID_LENGTH);
    s.nn_plus2id3 = to_long(&d[PLUS2ID3_START], ID_LENGTH);
    s.nn_option = to_int(&d[OPTION_START], OPTION_LENGTH);
    s.nn_optionprice = to_int(&d[OPTIONPRICE_START], OPTIONPRICE_LENGTH);
    s.nn_custom = (char)yesno_conv(d[CUSTOM_START]);
    s.nn_hue1 = to_clong(&d[HUE1_START], HUE_LENGTH);
    s.nn_val1 = to_cint(&d[VAL1_START], VAL_LENGTH);
    s.nn_chr1 = to_cint(&d[CHR1_START], CHR_LENGTH);
    s.nn_hue2 = to_clong(&d[HUE2_START], HUE_LENGTH);
    s.nn_val2 = to_cint(&d[VAL2_START], VAL_LENGTH);
    s.nn_chr2 = to_cint(&d[CHR2_START], CHR_LENGTH);
    s.nn_hue3 = to_clong(&d[HUE3_START], HUE_LENGTH);
    s.nn_val3 = to_cint(&d[VAL3_START], VAL_LENGTH);
    s.nn_chr3 = to_cint(&d[CHR3_START], CHR_LENGTH);
    s.nn_hue4 = to_clong(&d[HUE4_START], HUE_LENGTH);
    s.nn_val4 = to_cint(&d[VAL4_START], VAL_LENGTH);
    s.nn_chr4 = to_cint(&d[CHR4_START], CHR_LENGTH);
    s.nn_hue5 = to_clong(&d[HUE5_START], HUE_LENGTH);
    s.nn_val5 = to_cint(&d[VAL5_START], VAL_LENGTH);
    s.nn_chr5 = to_cint(&d[CHR5_START], CHR_LENGTH);
    s.nn_hue6 = to_clong(&d[HUE6_START], HUE_LENGTH);
    s.nn_val6 = to_cint(&d[VAL6_START], VAL_LENGTH);
    s.nn_chr6 = to_cint(&d[CHR6_START], CHR_LENGTH);
    s.nn_cr = CR;
    s.nn_lf = LF;

fwrite(&s, sizeof(struct furnnon), 1, fp);

return;
} eml_conv(d)
```

```
char d;
{
        switch(d) {
                case ' ':
                        return(0);
                case 'E':
                        return(1);
                case 'M':
                        return(2);
                case 'L':
                        return(3);
                default:
                        printf('Unable to convert |%c| to eml\n', d);
                        return(0);
        }
} ftype_conv(d)
char *d;
{
        switch(d[0]) {
                case ' ':
                        return(0);
                case 'B':
                        return(1);
                case 'D':
                        switch(d[1]) {
                                case '/':
                                        return(2);
                                case 'E':
                                        return(4);
                                default:
                                        printf('|D%c| wrong in type\n', d[1]);
                                        return(0);
                        }
                case 'T':
                        return(3);
                default:
                        printf('Unable to convert |%.4s| to type\n', d);
                        return(0);
        }
} bf_conv(d)
char d;
{
        switch(d) {
                case ' ':
                        return(0);
                case 'B':
                        return(1);
                case 'F':
                        return(2);
                default:
                        printf('Unable to convert |%c| to bookfile\n', d);
                        return(0);
        }
}
/*
*
*   LAMP1.C
*
*   This file contains the programs for the lamp search
*   file conversion.
*
*/
include 'stdio.h'
#include 'lampsrch.def'
include 'lampsrch.str' define CR      0x0D
define LF      0x0A
#define EOFMARK 0x1A
```

```
main()
{ char *d;
        FILE *fp, *out, *fopen();

fp = fopen('lamp1.asc','rb');
        out = fopen('lamp1.con', 'wb');

d = alloc(200);

while(fgets(d, 200, fp)) {
                conv_srch(d, out);
                free(d);
                d = alloc(200);
        } free(d);

fputc(EOFMARK, out);

fclose(fp);
        fclose(out);

printf('Inside main\n');
}
/*
 *   CONV_SRCH(d, fp)
 *
 *   Date Written:      March 22, 1984
 *
 *   Written By:        Matt Burkhardt
 *
 *   Last Modified:     March 22, 1984
 *
 *   Passed:    A pointer to the input data stream
 *              A file pointer to the output search file
 *
 *   Function:  This function sets all the members of the search
 *              structure to the appropriate values.
 *
 *   Returns:   Nothing.
 *
 *   Notes:     Really should make it so it dumps out the records that
 *              don't meet some validity edits, but that's for later.
 *
 */
conv_srch(d, fp)
char *d;
FILE *fp;
{ struct lampsrch s;
        long to_long();

s.l_id = to_long(&d[ID_START], ID_LENGTH);
        s.l_vid = to_long(&d[VID_START], VID_LENGTH);
        s.l_disc = 1;                                   /* Default value for now */
        n_copy(s.l_style1, &d[STYLE1_START], STYLE_LENGTH);
        n_copy(s.l_style2, &d[STYLE2_START], STYLE_LENGTH);
        n_copy(s.l_pm1, &d[PM1_START], PM_LENGTH);
        n_copy(s.l_pm2, &d[PM2_START], PM_LENGTH);
        n_copy(s.l_pm3, &d[PM3_START], PM_LENGTH);
        n_copy(s.l_finish, &d[FINISH_START], FINISH_LENGTH);
        s.l_reflect = (char)lmh_conv(d[REFLECT_START]);
        n_copy(s.l_piece1, &d[PIECE1_START], PIECE_LENGTH);
        n_copy(s.l_piece2, &d[PIECE2_START], PIECE_LENGTH);
        n_copy(s.l_piece3, &d[PIECE3_START], PIECE_LENGTH);
        n_copy(s.l_sfb1, &d[SFB1_START], SF_LENGTH);
        n_copy(s.l_sfb2, &d[SFB2_START], SF_LENGTH);
        n_copy(s.l_sfb3, &d[SFB3_START], SF_LENGTH);
        n_copy(s.l_sfs1, &d[SFS1_START], SF_LENGTH);
        n_copy(s.l_sfs2, &d[SFS2_START], SF_LENGTH);
```

```c
        s.l_size = to_int(&d[SIZE_START], SIZE_LENGTH);
        s.l_depth = to_int(&d[DEPTH_START], DEPTH_LENGTH);
        s.l_width = to_int(&d[WIDTH_START], WIDTH_LENGTH);
        s.l_extend = to_long(&d[EXTEND_START], EXTEND_LENGTH);
        s.l_const = (char)const_conv(&d[CONST_START]);
        n_copy(s.l_pat1, &d[PAT1_START], PAT_LENGTH);
        n_copy(s.l_pat2, &d[PAT2_START], PAT_LENGTH);
        s.l_or1 = (char)or_conv(d[OR1_START]);
        s.l_or2 = (char)or_conv(d[OR2_START]);
        s.l_text = (char)text_conv(d[TEXT_START]);
        s.l_bl1 = to_int(&d[BL1_START], BL_LENGTH);
        s.l_c1 = (char)c_conv(d[C1_START]);
        s.l_bl2 = to_int(&d[BL2_START], BL_LENGTH);
        s.l_c2 = (char)c_conv(d[C2_START]);
        s.l_bl3 = to_int(&d[BL3_START], BL_LENGTH);
        s.l_c3 = (char)c_conv(d[C3_START]);
        s.l_bl4 = to_int(&d[BL4_START], BL_LENGTH);
        s.l_c4 = (char)c_conv(d[C4_START]);
        s.l_bl5 = to_int(&d[BL5_START], BL_LENGTH);
        s.l_c5 = (char)0;
        s.l_bl6 = to_int(&d[BL6_START], BL_LENGTH);
        s.l_c6 = (char)0;
        n_copy(s.l_supplier, &d[SUPPLIER_START], SUPPLIER_LENGTH);
        s.l_price = to_long(&d[PRICE_START], PRICE_LENGTH);
        s.l_baseprice = to_long(&d[BASEPRICE_START], PRICE_LENGTH);
        s.l_shadeprice = to_long(&d[SHADEPRICE_START], PRICE_LENGTH);
        s.l_delivery = to_int(&d[DELIVERY_START], DELIVERY_LENGTH);
        s.l_stocked = (char)0;
        s.l_cr = CR;
        s.l_lf = LF;

fwrite(&s, sizeof(struct lampsrch), 1, fp);

return;
} const_conv(d)
char *d;
{
        switch(d[0]) {
                case ' ':
                        return(0);
                case 'C':
                        switch(d[2]) {
                                case 'S':
                                        return(1);
                                case 'R':
                                        return(2);
                                default:
                                        printf("Bad Const !%.4s!\n", d);
                                        return(0);
                        }
                case 'P':
                        return(3);
                case 'O':
                        return(4);
                default:
                        printf("Unable to convert !%.s! construct\n", d);
                        return(0);
        }
}
/*
 *
 *   LAMP2.C
 *
 *   This file contains the programs for the lamp associated text
 *   file conversion.
 *
 */
include 'stdio.h'
#include 'lampnon.def'
#include 'lampnon.str'
```

```
#define CR       0x0D
define LF       0x0A
define EOFMARK  0x1A main()
{
        char *d;
        FILE *fp, *out, *fopen();

fp = fopen('lamp2.asc','rb');
        out = fopen('lamp2.con', 'wb');

d = alloc(400);

while(fgets(d, 400, fp)) {
                conv_nonsrch(d, out);
                free(d);
                d = alloc(400);
        } free(d);

fputc(EOFMARK, out);

fclose(fp);
        fclose(out);

printf('Finished\n');
}
/*
*       CONV_NONSRCH(d, fp)
*
*       Date Written:    March 24, 1984
*
*       Written By:      Matt Burkhardt
*
*       Last Modified:   March 24, 1984
*
*       Passed:    A pointer to the input data stream
*                  A file pointer to the output search file
*
*       Function:  This function sets all the members of the associated text
*                  structure to the appropriate values.
*
*       Returns:   Nothing.
*
*       Notes:     Really should make it so it dumps out the records that
*                  don't meet some validity edits, but that's for later.
*
*/
conv_nonsrch(d, fp)
char *d;
FILE *fp;
{
        struct lampnon s;
        long to_long(), to_clong();

s.ln_id = to_long(&d[ID_START], ID_LENGTH);

s.ln_page1 = to_int(&d[PAGE1_START], PAGE_LENGTH);
        s.ln_page2 = to_int(&d[PAGE2_START], PAGE_LENGTH);
        s.ln_page3 = to_int(&d[PAGE3_START], PAGE_LENGTH);
        s.ln_sample = (char)bf_conv(d[SAMPLE_START]);
        n_copy(s.ln_collection, &d[COLLECT_START], COLLECT_LENGTH);
        n_copy(s.ln_descb, &d[DESCB_START], DESC_LENGTH);
        n_copy(s.ln_descs, &d[DESCS_START], DESC_LENGTH);
        s.ln_widthst = to_int(&d[WIDTHST_START], DIMEN_LENGTH);
        s.ln_depthst = to_int(&d[DEPTHST_START], DIMEN_LENGTH);
        s.ln_widthsb = to_int(&d[WIDTHSB_START], DIMEN_LENGTH);
        s.ln_depthsb = to_int(&d[DEPTHSB_START], DIMEN_LENGTH);
        s.ln_heights = to_int(&d[HEIGHTS_START], DIMEN_LENGTH);
```

```
                s.ln_extendf = to_long(&d[EXTENDF_START], EXTENDF_LENGTH);
                s.ln_standardfinish = to_int(&d[STANFIN_START], FINISH_LENGTH);
                s.ln_customfinish = to_int(&d[CUSTFIN_START], FINISH_LENGTH);
                s.ln_voldisc = (char)yesno_conv(d[VOLDISC_START]);
                s.ln_customcolor = (char)yesno_conv(d[CUSTCOL_START]);
                s.ln_customshade = (char)yesno_conv(d[CUSTSHADE_START]);
                s.ln_baseswitch = (char)yesno_conv(d[BASE_START]);
                s.ln_lineswitch = (char)yesno_conv(d[LINE_START]);
                s.ln_boltdown = (char)yesno_conv(d[BOLTDOWN_START]);
                s.ln_ground = (char)yesno_conv(d[GROUND_START]);
                s.ln_special = (char)yesno_conv(d[SPECIAL_START]);
                s.ln_usage = (char)usage_conv(d[USAGE_START]);
                n_copy(s.ln_smallcharge, &d[SMALL_START], SMALL_LENGTH);
                n_copy(s.ln_minorder, &d[MINORDER_START], MINORDER_LENGTH);
                s.ln_cdtable = (char)yesno_conv(d[CDTABLE_START]);
                s.ln_cdfloor = (char)yesno_conv(d[CDFLOOR_START]);
                s.ln_cdcont = (char)yesno_conv(d[CDCONT_START]);
                s.ln_wall1 = to_long(&d[WALL1_START], ID_LENGTH);
                s.ln_wall2 = to_long(&d[WALL2_START], ID_LENGTH);
                s.ln_wall3 = to_long(&d[WALL3_START], ID_LENGTH);
                s.ln_fab1 = to_long(&d[FAB1_START], ID_LENGTH);
                s.ln_fab2 = to_long(&d[FAB2_START], ID_LENGTH);
                s.ln_fab3 = to_long(&d[FAB3_START], ID_LENGTH);
                n_copy(s.ln_shape1, &d[SHAPE1_START], SHAPE_LENGTH);
                n_copy(s.ln_shape2, &d[SHAPE2_START], SHAPE_LENGTH);
                s.ln_hue1 = to_clong(&d[HUE1_START], HUE_LENGTH);
                s.ln_val1 = to_cint(&d[VAL1_START], VAL_LENGTH);
                s.ln_chr1 = to_cint(&d[CHR1_START], CHR_LENGTH);
                s.ln_hue2 = to_clong(&d[HUE2_START], HUE_LENGTH);
                s.ln_val2 = to_cint(&d[VAL2_START], VAL_LENGTH);
                s.ln_chr2 = to_cint(&d[CHR2_START], CHR_LENGTH);
                s.ln_hue3 = to_clong(&d[HUE3_START], HUE_LENGTH);
                s.ln_val3 = to_cint(&d[VAL3_START], VAL_LENGTH);
                s.ln_chr3 = to_cint(&d[CHR3_START], CHR_LENGTH);
                s.ln_hue4 = to_clong(&d[HUE4_START], HUE_LENGTH);
                s.ln_val4 = to_cint(&d[VAL4_START], VAL_LENGTH);
                s.ln_chr4 = to_cint(&d[CHR4_START], CHR_LENGTH);
                s.ln_hue5 = to_clong(&d[HUE5_START], HUE_LENGTH);
                s.ln_val5 = to_cint(&d[VAL5_START], VAL_LENGTH);
                s.ln_chr5 = to_cint(&d[CHR5_START], CHR_LENGTH);
                s.ln_hue6 = to_clong(&d[HUE6_START], HUE_LENGTH);
                s.ln_val6 = to_cint(&d[VAL6_START], VAL_LENGTH);
                s.ln_chr6 = to_cint(&d[CHR6_START], CHR_LENGTH);

s.ln_cr = CR;
                s.ln_lf = LF;

fwrite(&s, sizeof(struct lampnon), 1, fp);

return;
        } bf_conv(d)
char d;
{
        switch(d) {
                case ' ':
                        return(0);
                case 'B':
                        return(1);
                case 'F':
                        return(2);
                default:
                        printf("Unable to convert {%c} to book,file\n", d)
                        return(0);
        }
}
/*
 *
 *   LAMP1DIS.C
 *
 *   This file contains the programs for the lamp search
 *   file display.
```

```c
*
*/
include 'stdio.h'
include 'lampsrch.str' main()
{
        struct lampsrch d;
        FILE *fp, *fopen();
        int i;

i = sizeof(struct lampsrch);
        fp = fopen('lamp1.con','rb');

while(fread(&d, i, 1, fp)) {
                print_it(&d);
        } fclose(fp);
}
/*
*   PRINT_IT(d)
*
*   Date Written:       March 22, 1984
*
*   Written By:         Matt Burkhardt
*
*   Last Modified:      March 22, 1984
*
*   Passed:     A pointer to the input data stream
*
*   Function:   This function prints all the members of the search
*               structure.
*
*   Returns:    Nothing.
*
*   Notes:
*
*/
print_it(s)
struct lampsrch *s;
{
        printf('The ID is |%D|\n', s->l_id);
        printf('The frame is |%D|\n', s->l_vid);
        printf('The volume is |%d|\n', s->l_disc);
        printf('Style 1 is |%.3s|\n', s->l_style1);
        printf('Style 2 is |%.3s|\n', s->l_style2);
        printf('Preferred 1 is |%.4s|\n', s->l_pm1);
        printf('Preferred 2 is |%.4s|\n', s->l_pm2);
        printf('Preferred 3 is |%.4s|\n', s->l_pm3);
        printf('Finish is |%.4s|\n', s->l_finish);
        printf('Reflectance is |%d|\n', (int)s->l_reflect);
        printf('Piece 1 is |%.4s|\n', s->l_piece1);
        printf('Piece 2 is |%.4s|\n', s->l_piece2);
        printf('Piece 3 is |%.4s|\n', s->l_piece3);
        printf('Specialbase 1 is |%.4s|\n', s->l_sfb1);
        printf('Specialbase 2 is |%.4s|\n', s->l_sfb2);
        printf('Specialbase 3 is |%.4s|\n', s->l_sfb3);
        printf('Specialshade 1 is |%.4s|\n', s->l_sfs1);
        printf('Specialshade 2 is |%.4s|\n', s->l_sfs2);
        printf('Size is |%d|\n', s->l_size);
        printf('Depth is |%d|\n', s->l_depth);
        printf('Width is |%d|\n', s->l_width);
        printf('Extension is |%D|\n', s->l_extend);
        printf('Pattern 1 is |%.4s|\n', s->l_pat1);
        printf('Pattern 2 is |%.4s|\n', s->l_pat2);
        printf('Orientation 1 is |%d|\n', (int)s->l_or1);
        printf('Orientation 2 is |%d|\n', (int)s->l_or2);
        printf('Texture is |%d|\n', (int)s->l_text);
        printf('Block 1 is |%d|\n', s->l_bl1);
        printf('C 1 is |%d|\n', (int)s->l_c1);
        printf('Block 2 is |%d|\n', s->l_bl2);
```

```c
        printf("C 2 is |%d|\n", (int)s->l_c2);
        printf("Block 3 is |%d|\n", s->l_bl3);
        printf("C 3 is |%d|\n", (int)s->l_c3);

printf("Block 5 is |%d|\n", s->l_bl5);
        printf("C 5 is |%d|\n", (int)s->l_c5);
        printf("Block 6 is |%d|\n", s->l_bl6);
        printf("C 6 is |%d|\n", (int)s->l_c6);
        printf("Supplier is |%.5s|\n", s->l_supplier);
        printf("Price is |%D|\n", s->l_price);
        printf("Baseprice is |%D|\n", s->l_baseprice);
        printf("Shadeprice is |%D|\n", s->l_shadeprice);
        printf("Delivery is |%d|\n", s->l_delivery);
        printf("Stocked is |%d|\n", (int)s->l_stocked);

return;
}
/*
 *
 *   LAMP2DIS.C
 *
 *   This file contains the programs for the lamp associated text
 *   file display.
 *
 */
include 'stdio.h'
include 'lampnon.str' main()
{ struct lampnon d;
        FILE *fp, *fopen();
        int i;

i = sizeof(struct lampnon);
        fp = fopen('lamp2.con','rb');

while(fread(&d, i, 1, fp)) {
                print_it(&d);
        } fclose(fp);

}
/*
 *   PRINT_IT(s)
 *
 *   Date Written:     March 24, 1984
 *
 *   Written By:       Matt Burkhardt
 *
 *   Last Modified:    March 24, 1984
 *
 *   Passed:    A pointer to the input data stream
 *
 *   Function:  This function prints all the members of the associated text
 *              structure.
 *
 *   Returns:   Nothing.
 *
 *   Notes:
 *
 */
print_it(s)
struct lampnon *s;
{
        printf("The ID is |%D|\n", s->ln_id);

printf("Page 1 is |%d|\n", s->ln_page1);
        printf("Page 2 is |%d|\n", s->ln_page2);
        printf("Page 3 is |%d|\n", s->ln_page3);
        printf("Sample is |%d|\n", (int)s->ln_sample);
```

```
        printf("Collection is !%.35s!\n", s->ln_collection);
        printf("Description of base is !%.40s!\n", s->ln_descb);
        printf("Description of shade is !%.40s!\n", s->ln_descs);
        printf("Width shade top is !%d!\n", s->ln_widthst);
        printf("Depth shade top is !%d!\n", s->ln_depthst);
        printf("Width shade bottom is !%d!\n", s->ln_widthsb);
        printf("Depth shade bottom is !%d!\n", s->ln_depthsb);
        printf("Height of shade is !%d!\n", s->ln_heights);
        printf("Extension from floor is !%D!\n", s->ln_extendf);
        printf("Standard finish is !%d!\n", s->ln_standardfinish);
        printf("Custom finish is !%d!\n", s->ln_customfinish);
        printf("Volume discount is !%d!\n", (int)s->ln_voldisc);
        printf("Custom color is !%d!\n", (int)s->ln_customcolor);
        printf("Custom shade is !%d!\n", (int)s->ln_customshade);
        printf("Base switch is !%d!\n", (int)s->ln_baseswitch);
        printf("Line switch is !%d!\n", (int)s->ln_lineswitch);
        printf("Bolt down is !%d!\n", (int)s->ln_boltdown);
        printf("Grounding plug is !%d!\n", (int)s->ln_ground);
        printf("Special order is !%d!\n", (int)s->ln_special);
        printf("Usage is !%d!\n", (int)s->ln_usage);
        printf("Small order charge is !%.7s!\n", s->ln_smallcharge);
        printf("Minimum order is !%.8s!\n", s->ln_minorder);
        printf("Coordinating table lamp is !%d!\n", (int)s->ln_cdtable);
        printf("Coordinating floor is !%d!\n", (int)s->ln_cdfloor);
        printf("Coordinating container is !%d!\n", (int)s->ln_cdcont);
        printf("Wall 1 is !%D!\n", s->ln_wall1);
        printf("Wall 2 is !%D!\n", s->ln_wall2);
        printf("Wall 3 is !%D!\n", s->ln_wall3);
        printf("Fabric 1 is !%D!\n", s->ln_fab1);
        printf("Fabric 2 is !%D!\n", s->ln_fab2);
        printf("Fabric 3 is !%D!\n", s->ln_fab3);
        printf("Shape 1 is !%.4s!\n", s->ln_shape1);
        printf("Shape 2 is !%.4s!\n", s->ln_shape2);
        printf("Hue 1 is !%D!\n", s->ln_hue1);
        printf("Value 1 is !%d!\n", s->ln_val1);
        printf("Chroma 1 is !%d!\n", s->ln_chr1);
        printf("Hue 2 is !%D!\n", s->ln_hue2);
        printf("Value 2 is !%d!\n", s->ln_val2);
        printf("Chroma 2 is !%d!\n", s->ln_chr2);
        printf("Hue 3 is !%D!\n", s->ln_hue3);
        printf("Value 3 is !%d!\n", s->ln_val3);
        printf("Chroma 3 is !%d!\n", s->ln_chr3);
        printf("Hue 4 is !%D!\n", s->ln_hue4);
        printf("Value 4 is !%d!\n", s->ln_val4);
        printf("Chroma 4 is !%d!\n", s->ln_chr4);
        printf("Hue 5 is !%D!\n", s->ln_hue5);
        printf("Value 5 is !%d!\n", s->ln_val5);
        printf("Chroma 5 is !%d!\n", s->ln_chr5);
        printf("Hue 6 is !%D!\n", s->ln_hue6);
        printf("Value 6 is !%d!\n", s->ln_val6);
        printf("Chroma 6 is !%d!\n", s->ln_chr6);

return;
}

/*
 *
 *   WALL1.C
 *
 *   This file contains the programs for the wallcovering search
 *   file conversion.
 *
 */
include 'stdio.h'
#include 'wallsrch.def'
include 'wallsrch.str' define CR       0x0D
define LF       0x0A
define EOFMARK  0x1A main()
{
        char *d;
```

```
        FILE *fp, *out, *fopen();

fp = fopen('wall1a.asc','rb');
        out = fopen('wall1.con', 'wb');

d = alloc(200);

while(fgets(d, 200, fp)) {
                conv_srch(d, out);
                free(d);
                d = alloc(200);
        } free(d);

fputc(EOFMARK, out);

fclose(fp);
        fclose(out);

printf('Inside main\n');

}
/*
 *    CONV_SRCH(d, fp)
 *
 *    Date Written:      March 16, 1984
 *
 *    Written By:        Matt Burkhardt
 *
 *    Last Modified:     March 16, 1984
 *
 *    Passed:    A pointer to the input data stream
 *               A file pointer to the output search file
 *
 *    Function:  This function sets all the members of the search
 *               structure to the appropriate values.
 *
 *    Returns:   Nothing.
 *
 *    Notes:     Really should make it so it dumps out the records that
 *               don't meet some validity edits, but that's for later.
 *
 */
conv_srch(d, fp)
char *d;
FILE *fp;
{ struct wallsrch s;
        long to_long();

s.w_id = to_long(&d[ID_START], ID_LENGTH);
        s.w_vid = to_long(&d[VID_START], VID_LENGTH);
        s.w_disk = 1;                          /* Default value for now */
        n_copy(s.w_style1, &d[STY1_START], STY_LENGTH);
        n_copy(s.w_style2, &d[STY2_START], STY_LENGTH);
        n_copy(s.w_pm1, &d[PM1_START], PM_LENGTH);
        n_copy(s.w_pm2, &d[PM2_START], PM_LENGTH);
        n_copy(s.w_pm3, &d[PM3_START], PM_LENGTH);
        s.w_reflect = (char)lmh_conv(d[REFLECT_START]);
        s.w_woven = (char)woven_conv(d[WOVEN_START]);
        n_copy(s.w_pat1, &d[PAT1_START], PAT_LENGTH);
        n_copy(s.w_pat2, &d[PAT2_START], PAT_LENGTH);
        n_copy(s.w_pat3, &d[PAT3_START], PAT_LENGTH);
        s.w_or1 = (char)or_conv(d[OR1_START]);
        s.w_or2 = (char)or_conv(d[OR2_START]);
        s.w_scale = (char)sml_conv(d[SCALE_START]);
        s.w_dens = (char)dens_conv(d[DENS_START]);
        s.w_text = (char)text_conv(d[TEXT_START]);
        s.w_fire = (char)fire_conv(&d[FIRE_START], FIRE_LENGTH);
        s.w_bl1 = to_int(&d[BL1_START], BL_LENGTH);
        s.w_bl2 = to_int(&d[BL2_START], BL_LENGTH);
        s.w_bl3 = to_int(&d[BL3_START], BL_LENGTH);
```

```
        s.w_b14 = to_int(&d[BL4_START], BL_LENGTH);
        s.w_b15 = to_int(&d[BL5_START], BL_LENGTH);
        s.w_b16 = to_int(&d[BL6_START], BL_LENGTH);
        s.w_c1 = (char)c_conv(d[C1_START]);
        s.w_c2 = (char)c_conv(d[C2_START]);
        s.w_c3 = (char)c_conv(d[C3_START]);
        s.w_c4 = (char)c_conv(d[C4_START]);

s.w_c5 = (char)0;
        s.w_c6 = (char)0;

s.w_price = to_long(&d[PRICE_START], PRICE_LENGTH);
        n_copy(s.w_supplier, &d[SUPPLIER_START], SUPPLIER_LENGTH);
        s.w_stocked = (char)0;

s.w_cr = CR;
        s.w_lf = LF;

fwrite(&s, sizeof(struct wallsrch), 1, fp);

return;
}
/*
 *   FIRE_CONV(d, l)
 *
 *   Date Written:      March 16, 1984
 *
 *   Written By:        Matt Burkhardt
 *
 *   Last Modified:     March 16, 1984
 *
 *   Passed:    A pointer to the data string
 *              The length of the data string
 *
 *   Function:  This function checks the ASTM field, the smoke density
 *              field, the fuel contribution field and if any of these
 *              are filled in, it returns a 2 for yes, otherwise it
 *              returns a 1 for no.
 *
 */
fire_conv(d, l)
char *d;
int l;
{
        int i;

for (i = 0; i < l; i++) {
                if(isdigit(d[i])) {
                        return(2);
                }
        } return(1);
}
/*
 *   WOVEN_CONV(d)
 *
 *   Date Written:      March 16, 1984
 *
 *   Written By:        Matt Burkhardt
 *
 *   Last Modified:     March 16, 1984
 *
 *   Passed:    The character to be converted.
 *
 *   Function:  This function changes a no entry to a 0, a P to 1,
 *              W to 2 and B to 3.
 *
 *   Returns:   The correct value.
 *
 */
```

```c
woven_conv(d)
char d;
{
        switch(d) {
                case ' ':
                        return(0);
                case 'P':
                        return(1);
                case 'T':
                        return(2);
                case 'B':
                        return(3);
                default:
                        printf('Unable to convert !%c! to woven\n', d);
                        return(0);
        }

}
/*
 *
 *      WALL2.C
 *
 *      This file contains the calls necessary to convert over the
 *      non-search data elements for the wallcoverings database.
 *
 */
include 'stdio.h'
#include 'wallnon.def'
include 'wallnon.str' define CR        0x0D
define LF        0x0A
define EOFMARK   0x1A main()
{ char *d1, *d2;
        FILE *fp1, *fp2, *out, *fopen();

fp1 = fopen('wall2.asc', 'r');
        fp2 = fopen('wall3.asc', 'r');
        out = fopen('wall2.con', 'wb');
        d1 = alloc(500);
        d2 = alloc(200);

while (fgets(d1, 500, fp1) && fgets(d2, 200, fp2)) {
                if (strncmp(d1, d2, 7)) {
                        printf('ID numbers don't match !%.7s! !%.7s!\n', \
                                d1, d2);
                } else {
                        conv_nonsrch(d1, d2, out);
                        free(d1);
                        free(d2);
                        d1 = alloc(500);
                        d2 = alloc(200);
                }
        } free(d1);
        free(d2);

fputc(EOFMARK, out);

fclose(fp1);
        fclose(fp2);
        fclose(out);
        printf('Finished\n');

}

/*
```

```
* CONV_NONSRCH(d, fp)
*
* Date Written:      March 16, 1984
*
* Written By:        Matt Burkhardt
*
* Last Modified:     March 22, 1984
*
* Passed:     A pointer to the first non-search input data
*             A pointer to the second non-search input data
*             A file pointer for the output non-search file
*
* Function:   This function converts the data over to Cordatum format
*
* Returns:    Nothing
*
* Notes:      This module really should kick out records that do
*             not pass some sort of validity checks, but that is
*             for later.
*
*/
conv_nonsrch(d, d2, fp)
char *d, *d2;
FILE *fp;
{
        struct wallnon s;
        long to_long(), to_clong();

s.wn_id = to_long(&d[ID_START], ID_LENGTH);
        s.wn_sample = (char)sample_conv(d[SAMPLE_START]);
        s.wn_page = to_int(&d[PAGE_START], PAGE_LENGTH);
        n_copy(s.wn_book, &d[BOOK_START], BOOK_LENGTH);
        n_copy(s.wn_desc, &d[DESC_START], DESC_LENGTH);
        s.wn_priceper = (char)priceper_conv(d[PRICEPER_START]);
        s.wn_special = (char)yesno_conv(d[SPECIAL_START]);
        s.wn_width1 = to_long(&d[WIDTH1_START], WIDTH_LENGTH);
        s.wn_width2 = to_long(&d[WIDTH2_START], WIDTH_LENGTH);
        s.wn_roll = to_long(&d[ROLL_START], ROLL_LENGTH);
        s.wn_ftyd = (char)ftyd_conv(d[FTYD_START]);
        s.wn_vert = to_int(&d[VERT_START], VERT_LENGTH);
        s.wn_pack = (char)pack_conv(&d[PACK_START]);
        s.wn_bolt1 = to_int(&d[BOLT1_START], BOLT_LENGTH);
        s.wn_bolt2 = to_int(&d[BOLT2_START], BOLT_LENGTH);
        s.wn_horiz = to_int(&d[HORIZ_START], HORIZ_LENGTH);
        s.wn_withrolls = to_long(&d[WITHROLLS_START], WITHROLLS_LENGTH);
        s.wn_andor = to_long(&d[ANDOR_START], ANDOR_LENGTH);
        s.wn_usage = (char)usage_conv(d[USAGE_START]);
        s.wn_stain = (char)stain_conv(d[STAIN_START]);
        s.wn_trim = (char)yesno_conv(d[TRIM_START]);
        s.wn_paste = (char)yesno_conv(d[PASTE_START]);
        s.wn_strip = (char)yesno_conv(d[STRIP_START]);
        s.wn_peel = (char)yesno_conv(d[PEEL_START]);
        s.wn_wash = (char)yesno_conv(d[WASH_START]);
        s.wn_scrub = (char)yesno_conv(d[SCRUB_START]);
        s.wn_print = (char)print_conv(d[PRINT_START]);
        n_copy(s.wn_astm, &d[ASTM_START], ASTM_LENGTH);
        s.wn_fuel = to_int(&d[FUEL_START], FUEL_LENGTH);
        s.wn_smoke = to_int(&d[SMOKE_START], SMOKE_LENGTH);
        s.wn_flame = to_int(&d[FLAME_START], FLAME_LENGTH);
        s.wn_match = (char)match_conv(d[MATCH_START]);
        s.wn_back = (char)back_conv(d[BACK_START]);
        s.wn_weight = to_int(&d[WEIGHT_START], WEIGHT_LENGTH);
        s.wn_pastetype = (char)pastetype_conv(d[PASTETYPE_START]);
        s.wn_cdbed = (char)yesno_conv(d[CDBED_START]);
        s.wn_cddrape = (char)yesno_conv(d[CDDRAPE_START]);
        s.wn_cdother = (char)yesno_conv(d[CDOTHER_START]);
        s.wn_fab1 = to_long(&d[FABID1_START], ID_LENGTH);
        s.wn_fab2 = to_long(&d[FABID2_START], ID_LENGTH);
        s.wn_fab3 = to_long(&d[FABID3_START], ID_LENGTH);
        s.wn_fab4 = to_long(&d[FABID4_START], ID_LENGTH);
        s.wn_fab5 = to_long(&d[FABID5_START], ID_LENGTH);
        s.wn_wall1 = to_long(&d[WALL1_START], ID_LENGTH);
        s.wn_wall2 = to_long(&d[WALL2_START], ID_LENGTH);
```

```c
        s.wn_wall3 = to_long(&d[WALL3_START], ID_LENGTH);
        s.wn_wall4 = to_long(&d[WALL4_START], ID_LENGTH);
        s.wn_wall5 = to_long(&d[WALL5_START], ID_LENGTH);
        s.wn_border1 = to_long(&d[BORDER1_START], ID_LENGTH);
        s.wn_border2 = to_long(&d[BORDER2_START], ID_LENGTH);
        s.wn_border3 = to_long(&d[BORDER3_START], ID_LENGTH);
        s.wn_matchbed = (char)yesno_conv(d[MATCHBED_START]);
        s.wn_matchdrape = (char)yesno_conv(d[MATCHDRAPE_START]);
        s.wn_matchfabric = to_long(&d[MATCHFABR_START], ID_LENGTH);
        s.wn_matchother = (char)yesno_conv(d[MATCHOTHER_START]);
        s.wn_voldiscpercent = to_int(&d[VOLDISCPERCENT_START], \
                VOLDISCPERCENT_LENGTH);
        s.wn_voldiscdollar = to_long(&d[VOLDISCDOLLAR_START], \
                VOLDISCDOLLAR_LENGTH);
        s.wn_voldiscyds = to_int(&d[VOLDISCYD_START], VOLDISCYD_LENGTH);

/**************************************************************
*                                                              *
*              Start of second file conversion                 *
*                                                              *
**************************************************************/
        s.wn_rollsperyd = (char)priceper_conv(d2[ROLLSYD_START]);
        s.wn_suit = (char)suit_conv(d2[SUIT_START]);
        s.wn_room1 = (char)room_conv(&d2[ROOM1_START]);
        s.wn_room2 = (char)room_conv(&d2[ROOM2_START]);
        s.wn_room3 = (char)room_conv(&d2[ROOM3_START]);
        s.wn_trans = (char)yesno_conv(d2[TRANS_START]);
        s.wn_wear = (char)lmh_conv(d2[WEAR_START]);
        s.wn_uph = (char)yesno_conv(d2[UPH_START]);
        s.wn_custom = (char)yesno_conv(d2[CUSTOM_START]);
        s.wn_minorder = to_int(&d2[MIN_START], MIN_LENGTH);
        s.wn_customrolls = (char)customrolls_conv(d2[CUSTOMROLLS_START]);
        s.wn_setup = to_int(&d2[SETUP_START], SETUP_LENGTH);
        s.wn_hue1 = to_clong(&d2[HUE1_START], HUE_LENGTH);
        s.wn_hue2 = to_clong(&d2[HUE2_START], HUE_LENGTH);
        s.wn_hue3 = to_clong(&d2[HUE3_START], HUE_LENGTH);
        s.wn_hue4 = to_clong(&d2[HUE4_START], HUE_LENGTH);
        s.wn_hue5 = to_clong(&d2[HUE5_START], HUE_LENGTH);
        s.wn_hue6 = to_clong(&d2[HUE6_START], HUE_LENGTH);
        s.wn_val1 = to_cint(&d2[VAL1_START], VAL_LENGTH);
        s.wn_val2 = to_cint(&d2[VAL2_START], VAL_LENGTH);
        s.wn_val3 = to_cint(&d2[VAL3_START], VAL_LENGTH);
        s.wn_val4 = to_cint(&d2[VAL4_START], VAL_LENGTH);
        s.wn_val5 = to_cint(&d2[VAL5_START], VAL_LENGTH);
        s.wn_val6 = to_cint(&d2[VAL6_START], VAL_LENGTH);
        s.wn_chr1 = to_cint(&d2[CHR1_START], CHR_LENGTH);
        s.wn_chr2 = to_cint(&d2[CHR2_START], CHR_LENGTH);
        s.wn_chr3 = to_cint(&d2[CHR3_START], CHR_LENGTH);
        s.wn_chr4 = to_cint(&d2[CHR4_START], CHR_LENGTH);
        s.wn_chr5 = to_cint(&d2[CHR5_START], CHR_LENGTH);
        s.wn_chr6 = to_cint(&d2[CHR6_START], CHR_LENGTH);

s.wn_cr = CR;
        s.wn_lf = LF;

fwrite(&s, sizeof(struct wallnon), 1, fp);

return;
}

/*
*   BACK_CONV(d)
*
*   Date Written:       March 21, 1984
*
*   Written By:         Matt Burkhardt
*
*   Last Modified:      March 21, 1984
*
*   Passed:     A character
*
*   Function:   Translates backing to a number
*
*   Returns:    The appropriate number
*
```

```
*   Notes:
*
*/
back_conv(d)
char d;
{
        switch(d) {
                case ' ':
                        return(0);
                case 'P':
                        return(1);
                case 'V':
                        return(2);
                case 'A':
                        return(3);
                case 'F':
                        return(4);
                case 'O':
                        return(5);
                default:
                        printf("Unable to convert !%c! to backing\n", d);
                        return(0);
        }
} ftyd_conv(d)
char d;
{
        switch(d) {
                case ' ':
                        return(0);
                case 'F':
                        return(1);
                case 'Y':
                        return(2);
                default:
                        printf("Unable to convert !%c! to feet or yards\n", d
                        return(0);
        }
} match_conv(d)
char d;
{
        switch(d) {
                case ' ':
                        return(0);
                case 'H':
                        return(1);
                case 'D':
                        return(2);
                case 'S':
                        return(3);
                case 'R':
                        return(4);
                default:
                        printf("Unable to convert !%c! match\n", d);
                        return(0);
        }
} pack_conv(d)
char *d;
{
        switch(d[0]) {
                case ' ':
                        return(0);
                case 'S':
                        switch(d[1]) {
                                case ' ':
                                        return(1);
                                case 'D':
```

```
                                        return(4);
                            case 'T':
                                    return(5);
                            default:
                                    printf("Bad roll !%.2s!\n", d);
                                    return(0);
                        }
                case 'D':
                        switch(d[1]) {
                            case ' ':
                                    return(2);
                            case 'T':
                                    return(6);
                            default:
                                    printf("Bad roll !%.2s!\n", d);
                                    return(0);
                        }
                case 'T':
                        return(3);
                case 'A':
                        return(7);
                default:
                        printf("Unable to convert !%.2s! rolls\n", d);
                        return(0);
        }
} pastetype_conv(d)
char d;
{
        switch(d) {
                case ' ':
                        return(0);
                case 'P':
                        return(1);
                case 'W':
                        return(2);
                case 'V':
                        return(3);
                case 'O':
                        return(4);
                default:
                        printf("Unable to convert !%c! paste type\n", d);
                        return(0);
        }
} priceper_conv(d)
char d;
{
        switch(d) {
                case ' ':
                        return(0);
                case 'R':
                        return(1);
                case 'Y':
                        return(2);
                case 'B':
                        return(3);
                case 'O':
                        return(4);
                default:
                        printf("Unable to convert !%c! price per\n", d);
                        return(0);
        }
} print_conv(d)
char d;
{
        switch(d) {
                case ' ':
                        return(0);
```

```
                case 'H':
                        return(1);
                case 'M':
                        return(2);
                case 'R':
                        return(3);
                default:
                        printf('Unable to convert |%c| to print\n', d);
                        return(0);
        }
} customrolls_conv(d)
char d;
{
        switch(d) {
                case ' ':
                        return(0);
                case 'R':
                        return(1);
                case 'Y':
                        return(2);
                default:
                        printf('Unable to convert |%c| custom rolls\n', d)
                        return(0);
        }
}
/*
        pad takes a null terminates string (s) and buffers it with
        spaces and saves it in t.
*/
padz(s,t,n)
int n;
char *s,*t;
{
        int l,i;

l = strlen(s);
        for (i=1;i<=l;i++)
                *t++ = *s++;
        for (i=1;i<= n - l; i++)
                *t++ = '0';
}
/*
        depad takes a padded string of length of n and copies it to t
        null terminated
*/
depadz(s,t,n)
char *s,*t;
int n;
{
        char *t_head;
        int i;

t_head = t;

for(i=1;i<=n;i++)
                *t++ = *s++;

t = t_head + n - 1;

while (*t == '0' && t >= t_head)
                --t;
        if (t == t_head && *t == '0')
                *t = '\0';
        else
                *(t + 1) = '\0';
}
```

```
/************************************************************************
 *
 * File: pageflip.c
 *
 * Version: 2.3
 * System:  Search & Source
 * Contact: Matt Burkhardt
 *------------------------------------------------------------------------
 *
 * Purpose:  This set of modules displays the hierarchical tables
 *
 * Inputs:   The btrieve file to use
 *           Starting key to use
 *           The search code to return back
 *           The display literal associated
 *           Window size definition
 *
 *                search.inc   - Search include file
 *                filedesc.inc - File descriptor table include file
 *                screen.inc   - Screen definitions include file
 *                keys.inc     - Key definition include file
 *                setup.inc    - Setup for the pageflip modules
 *                length.inc   - For lengths of pageflip record
 *                pageflip.inc - Pageflip information include file
 *                btrstr.inc   - Btrieve stat structure include file
 *
 * Outputs:
 *           The search code to return back
 *           The display literal associated
 *
 *           Returns -1 on error condition
 *           Returns  0 if no choice made
 *           Returns  1 on normal exit
 *
 * Called Routines:
 *           getspot   - Save cursor position
 *           restore   - Restore cursor to last getspot
 *           cutdown   - Take out higher hierarchical levels
 *           depad2    - Take out trailing spaces
 *           clrwindow - Clear the window
 *           p_outdesc -
 *           p_freemem - Free memory used up by page_go
 *           moveto    - Move to a row, column on the screen
 *           p_display - Display the hierarchichal table
 *           p_upload  - Load the previous table at the same level
 *           p_load    - Load the next table at the same level
 *           page_go   - Controls the entire hierarchical display
 *           page_flip - Start the entire hierarchical display
 *
 * Process:  This set of modules allow the user to place the name
 *           of the file to use in the file descriptor table, and
 *           these modules will display the hierarchical table.
 *
 * Special Notes:
 *
 * History:
 *     08/10/84 - Matt - Changed the header information
 *     08/10/84 - Matt - Freed up memory after alloc's
 *     08/10/84 - Matt - Seperated out from critcall.c
 *
 ************************************************************************/ define UPICON   24
define DNICON   25 include 'search.inc'
include 'filedesc.inc'
include 'screen.inc'
#include 'keys.inc'
#include 'setup.inc'
#include 'length.inc'
#include 'pageflip.inc'
#include 'btrstr.inc'
```

```
/*
 *  PAGE_FLIP
 *
 */
page_flip(name, prefix, c, d, w)
char *name;             /* The btrieve file to use              */
int prefix;             /* Starting key to use                  */
char *c;                /* The search code to return back       */
char *d;                /* The display literal associated       */
struct screen_defs *w;  /* Window size definition               */
{
        char data[500];         /* Just for initial call        */
        char pos[115];          /* Btrieve position block       */
        char startkey[20];      /* For initial positioning      */
        struct file_stat fs;    /* Get stats from Btrieve       */
        struct lengths lens;    /* Data element lengths         */
        int stat;               /* Return code from page_go     */
        int count;              /* A dummy count value          */ if (btr_open(pos, data, name)) {
                printf('Tried to open !%s! in page_flip\n', name);
                return(-1);
        }
        if (btr_stat(pos, &fs, startkey)) {
                printf('Error on stat call in page_flip\n');
                btr_close(pos,0,0);
                return(-1);
        } lens.l_rl = fs.rec_len;
        lens.l_dcl = fs.keys[DISCODE_INDEX].key_len;
        lens.l_cl = fs.keys[CODE_INDEX].key_len;
        lens.l_dl = fs.keys[DESC_INDEX].key_len;
        lens.l_dclstart = fs.keys[DISCODE_INDEX].key_pos - 1;
        lens.l_clstart = fs.keys[CODE_INDEX].key_pos - 1;
        lens.l_dlstart = fs.keys[DESC_INDEX].key_pos - 1;

btr_getlw(pos, data, startkey, DISCODE_INDEX);
        lens.l_lev = 0;
        strcpy(d, '');

if (prefix) {                           /* Set starting key     */
                startkey[0] = (char)prefix;
                lens.l_lev++;                   /* Increment level      */
        } stat = page_go(&lens, startkey, c, d, pos, w);
        btr_close(pos,0,0);
        return(stat);
}

/*
 *  PAGE_GO
 *
 */
page_go(s, key, c, d, pos, w)
struct lengths *s;      /* Lengths of data elements             */
char key[];             /* Starting key                         */
char *c;                /* Return the search code               */
char *d;                /* Return the display                   */
char pos[];             /* Position block for btrieve           */
struct screen_defs *w;  /* Window size, etc.                    */
{
        char scan;              /* Scan code from getscan               */
        int nc;                 /* To fool around with key              */
        char *tempkey;          /* Temp key for use in this mod         */
        char *sendkey;          /* Key to send to other page_go         */
        char dp_str[64];        /* Depad result put here                */
        struct page *t[24];     /* Table for entries                    */
        int e;                  /* # of entries in table                */
        struct page *n[24];     /* New table for entries (for pgup dn)  */
        int ne;                 /* New number of entries                */
```

```
            int i;                      /* # of entries wanted          */
            int ln;                     /* Current line that it is on   */
            int redraw;                 /* Redraw flag 1 = yes, 0 = no  */
            int stat;                   /* More detail flag             */
            int count;                  /* A dummy count */
            unsigned char more[2];      /* More flags [0] Down [1] Up   */
/*********************************************************************/
    more[0] = more[1] = (char)0;
    tempkey = alloc(20);
    movmem( key, tempkey, s->l_lev + 1);

i = (w->botline - w->topline) - 2;      /* Room for top and bottom info */
    if ((e = p_load( tempkey, s, i, t, pos, more)) == 0) {  /* No more detail*/
            free(tempkey);
            return(-1);
    }
    ln = redraw = 0;
    clrwindow(w);
    p_display( t, e, d, w, ln, more);

while ((scan = getscan()) != GREEN && scan != RED) {
            switch (scan) {
                case UPARROW:
                    if ( ln > 0) {
                            upline(1);
                            ln--;
                    }
                    break;
                case DNARROW:
                    if ( ln < (e - 1)) {
                            downline(1);
                            ln++;
                    }
                    break;
                case RTARROW:
                    if (s->l_lev < (s->l_dcl - 1)) {
                            s->l_lev++;
                            sendkey = alloc(20);
                            movmem(t[ln]->p_discode, sendkey, s->l_lev);
                            depad(t[ln]->p_desc, dp_str, s->l_dl);
                            sprintf(d, '%s\\%s', d, dp_str);
                            if ((stat = page_go(s, sendkey, c, d, pos, w)) == 1) {
                                    free(sendkey);
                                    free(tempkey);
                                    p_freemem(t, e);
                                    return(1);
                            }
                            free(sendkey);
                            redraw = 1;
                            if (stat == -1) {               /* No more detail           */
                                    p_outdesc(d);           /* Take out level put in    */
                                    redraw = 0;             /* No detail, don't redraw  */
                                    s->l_lev--;             /* Reset level to original  */
                            }
                    }
                    if (s->l_lev >= (s->l_dcl - 1) || stat == -1) {
                            getspot();
                            printf('    %s   No more detail', t[ln]->p_desc);
                            restore();
                    }
                    break;
                case LFARROW:
                    p_outdesc(d);
                    s->l_lev--;
                    free(tempkey);
                    p_freemem(t, e);
                    return(0);
                case PGUP:
                    if (more[1]) {                  /* More up flag set     */
                        movmem(t[0]->p_discode, tempkey, s->l_lev + 1);
                        p_freemem(t, e);  /* Have to free up previous table here */
                        e = p_upload(tempkey, s, i, t, pos, more);
                        redraw = 1;
```

```
                        }
                        break;
                case PGDN:
                        if (more[0]) {              /* More down flag set    */
                                sendkey = alloc(20);
                                movmem(t[e - 1]->p_discode, sendkey, s->l_lev + 1); /* Get start
                                    key */
                                if ((ne = p_load(sendkey, s, i, n, pos, more)) != 0) {
                                        ln = 0;
                                        p_freemem(t, e);
                                        for (e = 0; e < ne; e++) {  /* Pass pointers      */
                                            t[e] = n[e];             /* and e is reset to ne */
                                        }
                                        movmem(sendkey, tempkey, s->l_lev + 1);
                                        free(sendkey);
                                        redraw = 1;           /* Redraw only if new set of tables*/
                                } /* Close for if ((nc */
                        } /* Close for if more[0] */
                        break;

} /* Close bracket for switch */
                if (redraw) {
                        clrwindow(w);
                        p_display(t, e, d, w, ln, more);
                        redraw = 0;
                }
        } /* Close bracket for while     */
                if (scan == GREEN) {
                        depad(t[ln]->p_desc, dp_str, s->l_dl);
                        sprintf(d, '%s\\%s', d, dp_str);
                        if (strlen(d) > 50)
                                cutdown(d);        /* Take out higher levels */
                        depad2(t[ln]->p_code, c, s->l_cl);
                } if (scan == RED) {
                        strcpy(d, '');
                } free(tempkey);
                p_freemem(t, e);
                return(1);
}

/*
 *  P_LOAD
 *
 */
p_load(k, s, i, t, pos, more)
char *k;                        /* Pointer to starting key value      */
struct lengths *s;              /* Lengths of data elements           */
int i;                          /* Number of records desired          */
struct page *t[];               /* Where to put the data              */
char *pos;                      /* Position block for btrieve         */
unsigned char more[];           /* More flags [0] = DN, [1] = UP      */
{
        int n;                          /* Number of records retrieved  */
        int stat;                       /* Stat return from btrieve     */
        char *tempkey;                  /* Temporary key value          */
        char *data;                     /* Temp place for the data      */
        int count;                      /* A dummy */
/*****************************************************************/ tempkey = alloc(20);
        movmem( k, tempkey, s->l_lev + 1);

data = alloc(s->l_rl);
        n = 0;

while ((stat = btr_getge(pos, data, tempkey, DISCODE_INDEX)) == 0 \
            && n < i) {
                if (s->l_lev) {
```

```
                if (tempkey[(s-)l_lev - 1)] != k[(s-)l_lev - 1)]) {
                        if (more[0]) /* If already set, more up */
                                more[1] = (char)1;
                        more[0] = (char)0;
                        free(data);
                        free(tempkey);
                        return(n);
                }
            }
            if (tempkey[(s-)l_lev] != '\0') {
                if ((s-)l_lev == (s-)l_dcl - 1) || \
                    tempkey[(s-)l_lev + 1)] == '\0') {
                        t[n] = (struct page *) alloc(sizeof(struct page));
                        t[n]->p_discode = alloc((s-)l_dcl + 1);
                        t[n]->p_code = alloc((s-)l_cl + 1);
                        t[n]->p_desc = alloc((s-)l_dl + 1);
                        movmem( &data[(s-)l_dclstart], t[n]->p_discode, s-)l_dcl);
                        movmem( &data[(s-)l_clstart], t[n]->p_code, s-)l_cl);
                        movmem( &data[(s-)l_dlstart], t[n]->p_desc, s-)l_dl);
                        n++;
                }
            }
            tempkey[(s-)l_lev]++;       /* Increment the key    */
        } if (n == i && stat == 0) {      /* Filled up, take last and show*/
                if (more[0])    /* If flag already set, mean more up    */
                        more[1] = (char)1;
                more[0] = (char)1;
        } else          /* Not filled up, so no more down       */
                more[0] = (char)0;

free(data);
        free(tempkey);
        return(n);
}
/*
 *      P_UPLOAD
 *
 */
p_upload(k, s, i, t, pos, more)
char *k;                        /* Pointer to starting key value        */
struct lengths *s;              /* Lengths of data elements             */
int i;                          /* Number of records desired            */
struct page *t[];               /* Where to put the data                */
char *pos;                      /* Position block for btrieve           */
unsigned char more[];           /* More flags [0] = DN, [1] = UP        */
{
        int n;                  /* Number of records retrieved  */
        int stat;               /* Stat return from btrieve     */
        char *tempkey;          /* Temporary key value          */
        char *data;             /* Temp place for the data      */
        int count;              /* A dummy */
/****************************************************************/ tempkey = alloc(20);
        movmem( k, tempkey, s-)l_lev + 1);
        data = alloc(s-)l_rl);
        n = (i - 1);

while ((stat = btr_getle(pos, data, tempkey, DISCODE_INDEX)) == 0 \
                && n )= 0) {
                if (s-)l_lev) {
                    if (tempkey[(s-)l_lev - 1)] != k[(s-)l_lev - 1)]) {
                        more[0] = (char)1;
                        more[1] = (char)0;
                        free(data);
                        free(tempkey);
                        return(n);
                    }
                }
```

```c
                 if (tempkey[s->l_lev] != '\0') {
                    if (s->l_lev == (s->l_dcl - 1) || \
                       tempkey[(s->l_lev + 1)] == '\0') {
                          t[n] = (struct page *) alloc(sizeof(struct page));
                          t[n]->p_discode = alloc(s->l_dcl + 1);
                          t[n]->p_code = alloc(s->l_cl + 1);
                          t[n]->p_desc = alloc(s->l_dl + 1);
                          movmem( &data[s->l_dclstart], t[n]->p_discode, s->l_dcl);
                          movmem( &data[s->l_clstart], t[n]->p_code, s->l_cl);
                          movmem( &data[s->l_dlstart], t[n]->p_desc, s->l_dl);
                          n--;
                    }
                 }
                 tempkey[s->l_lev]--;    /* Decrement the key      */
           } if (n == -1 && stat == 0 && tempkey[s->l_lev] != '\0'
              && (s->l_lev == (s->l_dcl - 1) || tempkey[(s->l_lev + 1)] == '\0')) {
                    if (more[1])    /* If flag already set, mean more down  */
                       more[0] = 1;
                    more[1] = 1;
           } else {                         /* no more up                */
                    more[0] = (char)1;
                    more[1] = (char)0;
           } free(data);
           free(tempkey);
           return(i);
}

/*
 *   P_DISPLAY
 *
 */
p_display( t, e, d, w, ln, more)
struct page *t[];        /* Entries for display  */
int e;                   /* Number of entries in page table     */
char *d;                 /* Description of current selection    */
struct screen_defs *w;   /* Window information                  */
int ln;                  /* Line number to put cursor           */
unsigned char more[];    /* More flags [0] = DN, [1] = UP       */
{
        int i;

moveto(w->topline, 1);
        if (strlen(d))
              printf(" %s...\n\n", d);

printf("More ");
              if (more[0])
                    printf("%c ", DNICON);
              if (more[1])
                    printf("%c", UPICON);
        } moveto((w->topline + ln + 2), (w->ltmargin - 2));

return;
}

/*
 *   P_FREEMEM
 *
 */
p_freemem( t, e)
struct page *t[];                /* Table of pointers to free    */
int e;                           /* Number of entries to free    */
{
        int i;
```

```c
        for (i = 0; i < e; i++) {
            free(t[i]->p_desc);
            free(t[i]->p_code);
            free(t[i]->p_discode);
            free(t[i]);
        } return;
}

/*
 *   P_OUTDESC
 *
 */
p_outdesc(d)
char d[];       /* Pointer to description, have to take out last /cccc */
{ int i, s;

i = strlen(d);

for ( s = (i - 1); s >= 0; s--)
            if ( d[s] == '\\' ) {
                    d[s] = '\0';
                    break;
            } return;
}
/* File: play.c         (issue play command to ld-v1000 )
 *
 *
 * Version: 1.0
 * Release:
 * System:
 * Contact: Carlyle Reeder
 *-----------------------------------------------------------------
 * History: (reverse chronology)
 * Date (Version)    Who/Action
 *
 * 16-Apr-84          cr     Created.
 *
 * =================================================================
 *   Abstract:
 *   ---------
 *   Purpose:   Issue a ld-v1000 commands to the port.
 *   Inputs:
 *   Outputs:
 *   Entry Points:
 *   Called Routines:
 *   Special Notes:
 * =================================================================
 */ include <stdio.h> main(argc,argv)
int argc;
char *argv[];
{
    int k, buf_pt;
    long int delval;                    /* output delay value */
    static int bytes[40];

sscanf(argv[1],"%ld",&delval);      /* get delay value */
    video( (long)-1, delval);           /* and set it */
    printf( " %ld ",delval);            /* and show it */ b
    }
    puts("\n");
```

```
        bytes[argc] = 0;                          /* mark end of command stream */
        vcmio(bytes);                             /* and send it */
        exit(0);
}
/* File: PREVIEW.C
** Version: 1.0
** Release:
** System:   Laser Video Disc Player Interface
** Contact:  Alan M. Friedman
**-----------------------------------------------------------------
** History: (reverse chronology)
** Date (Version)   Who/Action
** -----------------------------------------------------------------
** 06-12-84         Modified to stand alone for Search & Source project
**                          usage; i.e., all externs declared herein
** 05-22-84         Modified to use assembly function getstat() in gs.asm
**                          to get status from LDV and wait for certain
**                          status bytes to indicate end of autostop
**                          and search before continuing with course.
** 05-07-84         Modified to utilize an LD-V1000 Video Disc Player
** 03-17-84.        Modified to reflect version control standards
** 01-22-84         AMF - Ported from Cromemco System from version
**                          under developement 10/83 through 1/84
** 12-22-83         Initial version interfacing a Pioneer 7820-3
** ================================================================
**   Abstract:
**   ---------
**   Purpose: To provide laser video disc preview capability and
**                    interface during course development and execution
**
**   Inputs:
**        Preview Mode     -    Keyboard input to menu via get_akey()
**                                  (ascii code) and get_skey() (scan code)
**                                  for selection of video player commands
**        Student Mode     -    Char array containing string of video
**                                  commands
**
**   Outputs:               Bytes to the player, separated by hex FF.
**
**   Entry Points: vidmen()    -    for preview mode
**                 video_cmds() -   for student mode
**
**   Called Routines:
**   Special Notes:  Linked to Student.c in front and gs.asm in back
**
*/

FILE *ftiv;

char    cmdbuf[80];
struct  regs {
        unsigned char   al, ah;
        unsigned char   bl, bh;
        unsigned char   cl, ch;
        unsigned char   dl, dh;
        unsigned int    si, di, ds, es; };
struct  regs brv, arv;

struct  cmdhex  {
        char    *cmd;
        int     hex;
} cmds[] = {
        '0',                    0x3f,
        '1',                    0x0f,
        '2',                    0x8f,
        '3',                    0x4f,
        '4',                    0x2f,
        '5',                    0xaf,
        '6',                    0x6f,
        '7',                    0x1f,
        '8',                    0x9f,
        '9',                    0x5f,
```

```
            'AUDIO1',       0XF4,
            'AUDIO2',       0XFC,
            'AUTOSTOP',     0XF3,
            'DISPLAY',      0XF1,
            'CLEAR',        0XBF,

'STEPFWD',      0XF6,
            'STEPREV',      0XFE,
            'STOP',         0XFB,
            'STORE',        0XF5,
            'TOFF',         0XFF,
tr;

/*************************************************************/
/****************    menu  structure definitions    *******/
/*************************************************************/

/*     set up defines for proper    */
#define F1      0x3b          /*               scan codes         */
#define F2      0x3c
#define F3      0x3d
#define F4      0x3e
#define F5      0x3f
#define F6      0x40
#define F7      0x41
#define F8      0x42
#define F9      0x43
#define F10     0x44
#define BRK     0x46
#define ESC     27
struct keyval {
        char   *numbs;
} keys[] = {
                'F1 ',           'F2 ',
                'F3 ',           'F4 ',
                'F5 ',           'F6 ',
                'F7 ',           'F8 ',
                'F9 ',           'F10 ',
                '<---',          'Fwd' };
struct list {
        char  *entrys;
} menu[] = {
        ' Play',                         ' Stop',
        ' Display',                      ' Slow',
        ' Audio1',                       ' Step',
        ' Audio2',                       ' Scan',
        ' Autostop',                     'Search',
        'Rev',                           '---)'
};

struct  rwcl {
        int  *rows;
        int  *cols;
} cursrs[] = {
7,10,  7,40,  9,10,  9,40,  11,10,  11,40,  13,10,  13,40,  15,10,  15,40
};
        unsigned char aa;

int     tog, key, audisp[4], which, slast = 3;
        int     soff, scncod, scncmd, savfr, sselct = 3;
        int     row, column;
        int     last;    /*    extern   */

/*
**
**      vidmen() builds the video preview menu and then goes
**          into an infinite loop interpreting command
**          keys until two (ESC)s in a row are pressed
**          at which point it returns to the calling
**          function.
**      No arguments or returned values.
*/
```

```
vidmen()
{
        last = 1;

clear();
        row = 1;
        column  = 29;
        movec();
        yellow();
        printf('VIDEODISK PREVIEW MENU');
                                        /* clear screen and print initial menu */
        for (i=0; i<=9; i += 2) {
                row    = cursrs[i].rows;
                column = cursrs[i].cols;
                movec();
                yellow();
                printf ('%s %s',keys[i].numbs, menu[i].entrys);

row    = cursrs[i+1].rows;
                column = cursrs[i+1].cols;
                movec();
                printf ('%s %s',keys[i+1].numbs, menu[i+1].entrys);
        }
        row    = cursrs[2].rows;
        column = cursrs[2].cols;
        movec();
                printf ('%s %s  ON ',keys[2].numbs, menu[2].entrys);
        row    = cursrs[4].rows;
        column = cursrs[4].cols;
        movec();
                printf ('%s %s  OFF',keys[4].numbs, menu[4].entrys);
        row    = cursrs[6].rows;
        column = cursrs[6].cols;
        movec();
                printf ('%s %s  OFF',keys[6].numbs, menu[6].entrys);

row = 22;
        column = 28;
        movec();
        printf('(PRESS ESC TWICE TO EXIT)');

for (;;) {
                clearpromptline();     /* clear prompt line */ key = get_sckey();

switch (key) { case 1:
        if ((key = get_sckey()) == 1) {
                        ftiv = fopen('active','w');
                        fprintf(ftiv,'%s %s %s',userid,stat2,c_code);        fclose(ftiv);
                /*      no_ret();      */
                        return;
        }
        break;
                                        /* return if ESC is pressed twice */
case F3:
case F5:
case F7:
        switch (key) { case F3:                /* frame display */
                        tog = 1;
                        which = 2;
                        break;
                case F5:                /* audio 1 */
                        tog = 2;
                        which = 4;
                        break;
                case F7:                /* audio 2 */
                        tog = 3;
                        which = 6;
                        break;
        }
        row    = cursrs[which].rows;
        column = cursrs[which].cols;
        movec();
        audisp[tog] ^=   01;
```

```
                if (audisp[tog]) {
                        yellow();
                        hi_int();
                        printf ('%s %s  ON ',keys[which].numbs, menu[which].entrys);
                        lo_int();
                }
                else {
                        lo_int();
                        yellow();
                        printf ('%s %s  OFF',keys[which].numbs, menu[which].entrys);
                        lo_int();
                }
                                                /* flag for slow fwd/rev display */
                soff = 0;
                break;
        case F2:
                switch (key) {          /*   which for display sselct for code */
                        case F2:                /*      stop selected    */
                                which = 1;
                                break;
                }
                lo_int();
                yellow();
                row    = cursrs[last].rows;
                column = cursrs[last].cols;
                movec();
                printf ('%s %s',keys[last].numbs, menu[last].entrys);
                last = which;
                hi_int();
                yellow();
                row    = cursrs[which].rows;
                column = cursrs[which].cols;
                movec();
                printf ('%s %s',keys[which].numbs, menu[which].entrys);
                lo_int();
                soff = 1;
                break;
        case F4:
        case F6:
        case F8:
                lo_int();
                yellow();
                row    = cursrs[sselct].rows;
                column = cursrs[sselct].cols;
                movec();
                printf ('%s %s',keys[sselct].numbs, menu[sselct].entrys);
                printf ('                 ');

switch (key) {
                        case F4:                /*      slow selected    */
                                soff = 0;
                                sselct = 3;
                                which = 3;
                                break;
                        case F6:                /*      step selected    */
                                soff = 1;
                                sselct = 5;
                                which = 5;
                                break;
                        case F8:                /*      scan selected    */
                                soff = 1;
                                sselct = 7;
                                which = 7;
                                break;
                }
                lo_int();
                yellow();
                row    = cursrs[last].rows;
                column = cursrs[last].cols;
                movec();
                printf ('%s %s',keys[last].numbs, menu[last].entrys);
```

```
                            last = which;
                            hi_int();
                            yellow();
                            row    = cursrs[which].rows;
                            column = cursrs[which].cols;
                            movec();
                            printf ('%s %s',keys[which].numbs, menu[which].entrys);
                            lo_int();
                            yellow();
                            printf ('   <--- Rev    Fwd ---> ');
                            lo_int();
                    break;

case 75:
            case 77:
                    switch (key) { case  75:                   /*      reverse selected         */
                                    which = 10;
                                    break;
                            case  77:                   /*      forward selected         */
                                    which = 11;
                                    break;
                    } if (savfr != which) soff = 1;
                                            else soff = 0;

strcat (cmdbuf,menu[sselct].entrys);
                            frpos();
                            hi_int();
                            yellow();
                            printf ('%s %s',keys[which].numbs, menu[which].entrys);

if ((sselct == 7) || (sselct == 3))
                                    break;   /* dont turn hi-int off
                                                    if slow or scanning   */
                            frpos();
                            lo_int();
                            yellow();
                            printf ('%s %s',keys[which].numbs, menu[which].entrys);
                            lo_int();
                    break;
            case F1:
            case F9:
            case F10:
                    switch (key) {
                            case F1:                    /*      play selected    */
                                    which = 0;
                                    break;
                            case F9:                    /*      autostop selected        */
                                    which = 8;
                                    break;
                            case F10:                   /*      search selected */
                                    which = 9;
                    break;
                            soff = 1;
                            lo_int();
                            yellow();
                            row    = cursrs[last].rows;
                            column = cursrs[last].cols;
                            movec();
                            printf ('%s %s',keys[last].numbs, menu[last].entrys);
                            last = which;
                            hi_int();
                            yellow();
                            row    = cursrs[which].rows;
                            column = cursrs[which].cols;
                            movec();
                            printf ('%s %s',keys[which].numbs, menu[which].entrys);
                            lo_int();
```

```
                do {
                        clearpromptline();
                                        /* clear line in case of backspace */
                        row    = 17;
                        column = 25;
                        movec();
                        printf ('Frame Number ? ');

i=0;

if (c == 8)   break;
                                if (c == 13)  break;
                                if (c == 10)  break;
                        } while (c != '\n');
                } while (c == 8);        /* re-get frame number if backspace */
                cmdbuf[i] = '\0';

if (cmdbuf[0] != '\0') { /* if frame number & play selected */
                        if (which == 0)         /* add search to cmdbuf */
                                strcat (cmdbuf,menu[9].entrys);
                }
                else
                        which = 0;      /* play only if nul frm nmbr  */
        break;
default:
        continue;
        }           /* closes first switch */ if (which == 11)
                        strcat (cmdbuf,keys[which].numbs);
                else
                        strcat (cmdbuf,menu[which].entrys);
        if ((savfr != 0) & (sselct == 3) & (soff != 0)) { frpos();
                if (which == 11)
                                movb12();
                if ((savfr == 11) & (which != 11))
                                movf12();
                lo_int();
                yellow();
                printf ('%s %s',keys[savfr].numbs, menu[savfr].entrys);
                lo_int();
                soff  = 0;

}
        if ((sselct == 3) && ((which == 10) || (which == 11)))
                        savfr = which;

if ((sselct == 7) && ((which == 10) || (which == 11)))
                        doascan();

if (!(ldskon))
                video_cmd();

cmdbuf[0] = '\0';
/*      poscurs(); */
        }           /* closes 'for (;;)' */
}
poscurs()
{
                        row    = 17;
                        column = 40;
                        movec();
}
frpos()
{
                switch (sselct) {
                case 3:
                        row = 9;
                        break;
```

```
                        case 5:
                                row = 11;
                                break;
                        case 7:
                                row = 13;
                                break;
                }
                column = 52;
                movec();
                if (which == 11)
                        movf12();

/****************************************************************/
/***************    end of menu functions    ********************/
/****************************************************************/

/****************************************************************/
/***************    begin video cmd functions   *****************/
/****************************************************************/ video_cmd()
{
        int i, j;
        int   hexbuf[80];
                i = 0;                          /* upify cmdbuf */
                while (cmdbuf[i] != '\0') {
                        cmdbuf[i] = toupper(cmdbuf[i]);
                        i ++;
                }
/****************************************************************/ i = 0;
        j = 0;
        while(cmdbuf[i] != '\0') {
                if(cmdbuf[i] == ' ') i++;
                hexbuf[j] = preview(&cmdbuf[i]);
                if(hexbuf[j] != 0) {
                        j ++;
                        i += strlen(stptr->cmd);
                }
                if (hexbuf[0] == 0) break;
        }
        hexbuf[j] = 00;
        i = 0;

if (videbug) {
        printf('cmdbuf has %s \n',cmdbuf);
        printf('hexbuf[0] has %d \n',hexbuf[0]);
}
        vcmio(hexbuf);

}               /*      closes video_cmd function      */ preview(cmdbuf)
char   cmdbuf[80];
{
        for(stptr = cmds; stptr->cmd ; stptr++) {
                if (!(strncmp(cmdbuf,stptr->cmd,strlen(stptr->cmd))))
                        return(stptr->hex);

return(0);
} clearpromptline()
{                                       /* clear prompt line */
        row    = 17;
        column = 25;
        movec();
        printf ('                                        ');
```

```
}
/*****************************************************************/
/*****************************************************************/
/********      environment dependent functions      *********/
/********      for video disk command menu          *********/
/*****************************************************************/ doascan()                    /*   if command is scan fwd or rev, keep  */
                             /*   checking key and keep scanning       */
{
int scanbuf[3];
            switch (which) {
                    case 10:
                            scncmd = 248;
                            scncod = 75;      /* scncod = 8;  */
                            break;
                    case 11:
                            scncmd = 240;
                            scncod = 77;      /* scncod = 12; */
                            break;
            }
            scanbuf[0] = scncmd;
            scanbuf[1] = 0;
            for (i=1; i<=7; i++)
                    if (!(ldskon))
                            vcmio(scanbuf);

/******* need to check status and if scan is still pressed, keep sending
                          scan cmd to provide smooth scan  ******** brv.ah = 0x01;
            while (!(sysint (0x16, &brv, &arv) & 0x0040)) {
                                        /*  if((arv.ah!=08)&(arv.ah!=12)) */
                    if ((arv.ah != 75) & (arv.ah != 77))
                                        break;
                    brv.ah = 0x00;
                    sysint (0x16, &brv, &arv);

brv.ah = 0x01;
                    vcmio(scanbuf);
                    for (i=0;i<=1900;i++); /* delay until next key scan *
            } frpos();
            lo_int();
            yellow();
            printf ('%s %s',keys[which].numbs, menu[which].entrys);
            lo_int();
}
waitstop()
{
        unsigned char bytin;

if (videbug)
                printf('Result bytes are:');

do {                            /* await status */
                for (i=0; i<=3000; i++);        /* delay (don't ask me why) * bytin = getstat(VCM_IN);
                if (videbug)
                        printf(' %x ',bytin);
                if (key_stat() == 27) {
                        get_akey();
                        return;
                }
        } while (!(bytin & 0x80) || ((videbug == 77) && (savbo == 243)));
}
yellow()
{
        printf ('%c[33;40m',ESC);
}
hi_int()
```

```
{
        printf ('%c[1;1m',ESC);
}
lo_int()
{
        printf ('%c[0;0m',ESC);
} movec()
{
        brv.bh=0x00;
        brv.ah = 0x02;
        brv.dh = row;
        brv.dl = column;
        sysint(0x10,&brv,&arv);
}
get_sckey()
{
                brv.ah = 0x00;
                sysint (0x16, &brv, &arv);
                return (arv.ah);
}
get_akey()
{
                brv.ah = 0x00;
                sysint (0x16, &brv, &arv);
                return (arv.al);
}
key_stat()
{
                brv.ah = 0x01;
                if (sysint (0x16, &brv, &arv) & 0x0040)
                                return (0);
                return (arv.al);
}
clear()
{
                printf ('%c[2J',ESC);
}
movb12()
{                                       /*      move cursor back 12     */
                printf ('%c[12D',ESC);
}
movf12()
{                                       /*      move cursor forward 12  */
                printf ('%c[12C',ESC);
}
/**********      added to eliminate need for ibmpc.env   *********/
save()
{
                brv.bh = 0x00;
                brv.ah = 0x03;
                sysint (0x10,&brv,&arv);
                row = arv.dh;
                column = arv.dl;
}
restore()
{
                brv.ah = 0x02;
                brv.bh = 0x00;
                brv.dl = column;
                brv.dh = row;
                sysint (0x10,&brv,&arv);
}
/*****************************************************************
* int vcmio(bytes)
*     int bytes[]
*
*    where bytes is an array of bytes to be sent to player, with a 0 value use
*    to terminate the list of bytes.
*    function returns status byte from player.
*    call with an array with single value of 0 to get status.
*/
```

```
vcmio(bytes)
int bytes[];
{
    long int kk;
    int k, fill;

long    delay = 500;

if (videbug)
                printf('bytes being sent are:');
        for ( k=0; bytes[k]; ++k ) {                    /* loop thru bytes */ outportb( VCM_OUT, 0xff );      /* filler */
                for ( kk=0; kk < delay; kk++);  /* wait long enuf for strobe */
                if (videbug)
                        printf(' %x ',bytes[k]);
                outportb( VCM_OUT, bytes[k] );  /* output the byte */
                for ( kk=0; kk < delay; kk++);  /* wait long enuf for strobe */ outportb( VCM_OUT, 0xff );  /* clear bus for proper status */
                if ((savbo = bytes[k]) == 247)
                        waitstop();
                if ((savbo == 253) && (init == 0))
                        waitstop();             /* wait for player to start */
                if (videbug)
                        printf(' %x ',bytes[k]);
        }
}
/* File       : printme.c
 * Version    : 2.0
 * Release    :
 * System     : Search & Source
 * Contact    : Phil Evans
 * Date       : 4-03-84
 *==================================================================
 *
 *  Purpose   : this routine prints a display screen invoked
 *              by F10 during display
 *
 *  Called
 *  routines  :
 */ int  printme()
{
beep();
return(0);
}
include 'stdio.h' struct regval { int ax,bx,cx,dx,si,di,ds,es;};

printscrn()
{
        struct regval i,f;
        int status;

/*
                execute interupt 0x05 (print screen)
        */ sysint(0x05,&i,&f);
        while((status = peek(0x00,0x50)) == 1)
                ;
        /*
                status uses negative logic (a 1 means unsuccessfull operation
                or print screen in progress while a 0 means that the operatio
                is successful. We return a 1 if completed and a 0 if not
        */ return(!status);
```

```
/*
 * File:     PSEARCH.C
 * Version:  1.0
 * Release:
 * System:   Search & Source
 * Contact:  Tom Corner
 *-----------------------------------------------------------------
 * History: (reverse chronology)
 * Date (Version)    Who/Action
 * -----------------------------------------------------------------
 * 03-apr-84 ( 1.0 ) Tom Corner / created
 * ================================================================
 *  Abstract:
 *  ---------
 *  Purpose:
 *          psearch (product search) searches a product file and saves
 *          selected product id's in a table. This routine is called by
 *          'search'.
 *  Inputs:
 *          index list - This defines how the data is to be indexed in the
 *                       search.
 *          compare list - This contains the criteria used in selecting
 *                         products.
 *          product type - This is a code which tells which product file to
 *                         search.
 *  Outputs:
 *          product found list is accessed with routines defined below.
 *          return code:
 *          -1 Btrieve error
 *           0 Search completed successfully
 *           1 Search terminated by red key
 *           2 Search terminated when maximum products found
 *           4 Search terminated by green key
 *  Entry Points:
 *          psearch
 *          long getprod(i) - returns the i'th product in product found table
 *                            The first product is 0.
 *          nfound() - returns the number of products found by psearch.
 *          pdisp() - display product found table.
 *  Called Routines:
 *  -       Btrieve interface routines in file BTRCALL.C
 *          In this file:
 *            indsrch - search using a separate index file
 *            keysrch - search using a key in the product file
 *            pollkbd - poll keyboard for an escape character
 *            pmatch  - product match compares a product to the criteria in
 *                      the compare list
 *            inrange - checks Btrieve key to see if it is in range specified
 *                      by index list item.
 *            binge   - compare of binary values for greater or equal
 *            binle   - compare of binary values for less or equal
 *            strge   - compare of string values for greater or equal
 *            strle   - compare of string values for less or equal
 *            imatch  - item match compares one item in the compare list to
 *                      one product
 *            clrprod - clears the product table
 *            chkprod - checks whether a product is in the table
 *            addprod - adds a product to the table
 *            getprod - gets a product id from the table
 *            nfound  - returns the number of products in the table
 *  Special Notes:
 * ================================================================
 */
#include 'keys.inc'
#include 'search.inc'
#define MAXSRECLEN 256    /* maximum search record length */
#define POSSIZE 115       /* length of Btrieve position buffer */
#define MAXIRECLEN 15     /* maximum index record length */
extern int debug;
/*
 * psearch - Function for searching product search file using selected inde
 */
```

```
psearch( ilist, clist, prodtype )
struct search_list
   *ilist,          /* index list */
   *clist;          /* compare list */
int prodtype;
{
   char pos[POSSIZE], sb[MAXSRECLEN], kb[MAXFLDLEN];
   static char *sfname[] = {
      'fabri.btr',
      'wall1.btr',
      'uphol.btr',
      'furn1.btr',
      'lamp1.btr',
      'rug1.btr'
      };
   struct search_list *il;
   int keynum, ret, ns;

ns = 0;
   clrprod();              /* clear found product table */
   if( btr_open(pos, sb, sfname[prodtype] ))return(-1);/* open search file */
   for( il=ilist; il!=0; il=il->or_ptr ){/* for every node in index list */
      if( il->search_action == EQUAL ){/* convert equal compares to ranges */
         movmem( il->select_value1, il->select_value2, il->compare_len );
         il->search_action = RANGE;
         }
      if( il->btrind > 0 ){/* if an index file is to be used */
         ret = indsrch( ns, il, clist, prodtype, pos, sb, kb );
         }
      else {               /* else a search file key is to be used */
         keynum = 1 - il->btrind;
         ret = keysrch( ns, il, clist, keynum, pos, sb, kb );
         }
      if(ret)break;
      }
   shown( nfound() );
   if( btr_close( pos, sb, kb ))return(-1);
   return(ret);
}

/*
 * indsrch - Function to search search file for one node in index list that
 *           uses an index file.
 */
indsrch( ns, il, cl, prodtype, pos, sb, kb )
char *pos, *sb, *kb;
int prodtype, ns;
struct search_list *il, /* node in index list */
                   *cl; /* compare list */
{
   char key[MAXFLDLEN];
   int stat, n, i, ret;
   char ip[POSSIZE], ib[MAXIRECLEN], ik[MAXFLDLEN];
   char indname[15];
   static *fsuffix[]={ 'sco','dco','sty','pce','pm','fib','sf','fin','pat'};
   static *fprefix[]={ 'fabr','wall','upho','furn','lamp','rug' };

/*
 * build index file name
 */
   strcpy( indname, fprefix[prodtype] );
   strcat( indname, fsuffix[il->btrind-1] );
   strcat( indname, '.ind' );

/*
 * perform search
 */
   if( btr_open( ip, ib, indname ))return(-1);
   ret=0;
   movmem( il->select_value1, key, sizeof(il->select_value1));
   stat = btr_getge( ip, ib, key, 0 );
```

```
    while( stat == 0 && inrange( key, il ) ){/* while in range */
       if( !chkprod( ib )){         /* if product id not already in found list
          movmem( ib, kb, sizeof(long) );
          if( btr_geteq( pos, sb, kb, 0 )){ /* get prod from search file*/
             ret=-1;
             break;
             }
          showsrch(++ns);
          if( pmatch( cl, sb )){/* if product matches criteria in compare list */
             if( !addprod(kb) ){      /* add to found list */
                ret=2;
                break;
                }
             n = nfound();
             if( n % 5 == 1 )shown(n);
             }
          } /* end if not in found list */
       if( i = pollkbd() ){
          ret=i;
          break;
          }
       stat = btr_getnx( ip, ib, key, 0 ); /* get next index record */
       } /* end while in range */
    if( btr_close( ip, ib, key) )ret=-1;
    if( stat != 0 && stat != 4 && stat != 9 )ret=-1;
b,rkb ),
char *pos, *sb, *kb;
int prodtype, ns;
struct search_list *il; /* node in index list */
               *cl; /* compare list */
{
   char key[MAXFLDLEN];
   int stat, n, i;
   int keynum;

keynum = -1-il->btrind;       /* key number in search file */
   movmem( il->select_value1, key, sizeof(il->select_value1));
   stat = btr_getge( pos, sb, key, keynum );
   while( stat == 0 && inrange( key, il ) ){/* while in range */
      showsrch(++ns);
      if( !chkprod( sb )){        /* if product id not already in found list *
         if( pmatch( cl, sb )){/* if product matches criteria in compare list *
            if( !addprod(sb) )return(2);     /* add to found list */
            n = nfound();
            if( n % 5 == 1 )shown(n);
            }
         } /* end if not in found list */
      if( i = pollkbd() )return(i);
      stat = btr_getnx( pos, sb, key, keynum );    /* get next index record */
      } /* end while in range */
   if( stat != 0 && stat != 4 && stat != 9 )return(-1);
   return(0);
}
showsrch(ns)
int ns;
{
   if( ns % 6 == 1 ){
      moveto(20,38);
      printf('\001');
      moveto(21,1);
      }
   else if( ns % 6 == 4 ){
      moveto(20,38);
      printf('\002');
      moveto(21,1);
      }
   return;
}
/*
* inrange - check Btrieve key to see if its in range specified by item in
* compare list,
*/
```

```
inrange(key, item)
char *key;
struct search_list *item;
{
   int l;

l = item->skip_len;
   switch( item->field_type ){
      case COLOR:
      case BINARY:
         l = l/2;
         if( binge( key, item->select_value1, l )
            && binle( key, item->select_value2, l ) )return(1); /* in range */
         else return(0);   /* out of range */
      case STRING:
         if( strge( key, item->select_value1, l )
            && strle( key, item->select_value2, l ))return(1); /* in range */
         else return(0);   /* out of range */
      }
} binge( i1, i2, n)
int *i1, *i2, n;
{
   int i;
   if( n == 1){
      if( *i1 < *i2 ) return(0);   /* less than */
      if( *i1 > *i2 ) return(2);/* greater than */
      return(1);   /* equal */
      }
   else{/* long */
      if( *(long *)i1 < *(long *)i2 ) return(0);   /* less than */
      if( *(long *)i1 > *(long *)i2 ) return(2);/* greater than */
      return(1);   /* equal */
      }
} binle( i1, i2, n)
int *i1, *i2, n;
{
   return( 2-binge( i1, i2, n ) );
} strge( s1, s2, n )
unsigned char *s1, *s2;
int n;
{
   int i;

for( i=0; i++<n;){
      if( *s1 < *s2 ) return(0);
      if( *s1++ > *s2++ ) return(2);
      }
   return(1);
} strle( s1, s2, n )
unsigned char *s1, *s2;
int n;
{
   return( 2 - strge( s1, s2, n ) );
}

/*
 * pmatch - compare a product to criteria in compare list.
 */
pmatch( cl, sb )
struct search_list *cl;
char *sb;
{
   while( cl != 0 ){
      if( imatch( cl, sb ) )cl=cl->and_ptr;
      else {
```

```
        cl = cl->or_ptr;
        if( cl== 0 )return( 0 );
     }
  }
  return( 1 ); /* product satisfies criteria */
}

/*
 * imatch - compare a product to one item in compare list
 */
imatch( cl, sb )
struct search_list *cl;
char *sb;
{
  char *f, *s, *v[2];
  int i, c[2], k, n, l;

l = cl->compare_len;
  f = &sb[cl->field_pos-1];      /* pointer to field of interest in data */
  for( i=0; i<cl->repeat_count; f += cl->skip_len, i++ ){
                                 /* for each repeated field */
    v[0] = cl->select_value1;    /* pointer to compare value */
    v[1] = cl->select_value2;    /* pointer to range upper limit */
/*
 *   preprocess special field types
 */
    switch( cl->field_type){
      case BINARY:
      case STRING:
        s=f;
        break;
      case COLOR:
        s = (f[2] == v[0][2]) ? f : 0;/* dominance flag must match */
        break;
      case SIZE:
        l = 4;                   /* length of long integer to be compared */
        s = ( strge( f, v[0], 4 ) == 1 ) ? &f[6] : 0;/* descriptor must match */
        v[0] = &v[0][4];         /* point to measurement */
        v[1] = &v[1][4];
        if(s!=0)
          break;
    }
/*
 *   if match in preprocessing, perform compare
 */
    if( s != 0 ){ c[k] = strge(s, v[k], l );
        break;
      }
    }
/*
 * evaluate compare results
 */
    switch( cl->search_action){
      case LESSOREQUAL:
        if( c[0] != 2 ) return(1);
        break;
      case EQUAL:
        if( c[0] == 1 ) return(1);
        break;
      case MOREOREQUAL:
        if( c[0] != 0 ) return(1);
        break;
      case RANGE:
        if( c[0] != 0 && c[1] != 2 ) return(1);
        break;
    }
  }
  return(0);           /* no match */
}
```

```
/*
 * clrprod - clear product table
 * chkprod - check to see if product in table
 * addprod - add product to table
 * getprod - get product from table
 * nfound  - return number of products in the table
 */
long found[MAXMATCH];
int nmatch;
long getprod(i)int i;{return(found[i]);}
clrprod(){ nmatch=0; return; }
chkprod(prodid)
long *prodid;
{
   int i;
   for( i=0; i<nmatch;)
      if( *prodid == getprod(i++) )return(1);
   return( 0 );
}
addprod(prodid)
long *prodid;
{
   if( nmatch == MAXMATCH )return(0);
   found[nmatch++] = *prodid;
   return(1);
}
nfound(){ return(nmatch);}
pdisp() /* display product table */
{
   int i, j, n;

for( i=0, n=nfound(); i<n;i+=9){
      for(j=i; j<i+9 && j<n; )
         printf(' %7D',getprod(j++));
      printf('\n');
      }
   return;
}
/*
 *   pollkbd()
 *
 *   This function does a system interrupt to get the key pressed,
 *   and returns true if an escape character was pressed other keys
 *   or no key struck causes false to be returned.
 *
 */
struct stack {
        unsigned char    al, ah;
        unsigned char    bl, bh;
        unsigned char    cl, ch;
        unsigned char    dl, dh;
        unsigned int     si, di, ds, es;
};
pollkbd()
{
        int i;
        char c;
        struct stack a, b;
        do{
           a.ah = 0x01;
           i = 0x0040 & sysint(0x16, &a, &b);
           if(! i){
              c = getscan();
              if( c == RED )return(1);
              if( c == GREEN )return(4);
              }
           }while( ! i );
           return(0);
}
```

```
/*
 * File:     QDUMP.C
 * Version:  1.0
 * Release:
 * System:   Search & Source
 * Contact:  Tom Corner
 *-----------------------------------------------------------------
 * History: (reverse chronology)
 * Date (Version)   Who/Action
 * -----------------------------------------------------------------
 * 26-jun-84  ( 1.0 )  Tom Corner/created
 *
 * ================================================================
 *   Abstract:
 *   ----------
 *   Purpose:
 *       Dump queries
 *   Inputs: QUERYLOG
 *   Outputs:
 *   Entry Points:
 *   Called Routines:
 *   Special Notes:
 * ================================================================
 */
include 'stdio.h'
#include 'search.inc'
#include 'query.inc'
#define NFABR 17
#define NLAMP 28
#define NFURN 17
#define NWALL 17
struct field {
   int pos;
   char *desc;
   int type;
   };
#define B 0   /* binary */
#define A 1   /* ASCII */
#define C 2   /* color */
#define S 3   /* size */
main()
{
/* field descriptor tables that describe the fields in the databases
   search records */
static struct field walltab[]={
 1,'Record ID',B,
 5,'Videodisc Frame',B,
 9,'Videodisc Volume',B,
 11,'Style',A,
 17,'Preferred Material',A,
 26,'Reflectance',B,
 27,'Pattern Construction',B,
 28,'Pattern',A,
 40,'Pattern Orientation',B,
 42,'Pattern Scale',B,
 43,'Pattern Density',B,
 44,'Texture',B,
 45,'Fire Rating',B,
 46,'Color',C,
 64,'Vendor',A,
 69,'Price',B,
 73,'Stocked Item',B
};
static struct field furntab[]={
 1,'Record ID',B,
 5,'Videodisc Frame',B,
 9,'Videodisc Volume',B,
 11,'Style',A,
 20,'Preferred Material',A,
 34,'Finish',A,
 48,'Reflectance',B,
 49,'Piece Type',A,
 64,'Size',S,
```

```
  114,'Shape',A, /* in special features table */
  130,'Special Feature',A,
  178,'Color',C,
  196,'Maximum Retail Price',B,
  200,'Minimum Retail Price',B,
  204,'Supplier',A,
  209,'Cutting Date',A,
  239,'Stocked Item',B
};
static struct field lamptab[]={
  1,'Record ID',B,
  5,'Videodisc Frame',B,
  9,'Videodisc Volume',B,
  11,'Style',A,
  17,'Preferred Material, Body',A,
  21,'Preferred Material, Shade',A,
  25,'Preferred Material, Trim',A,
  29,'Finish',A,
  33,'Reflectance',B,
  34,'Piece Type',A,
  46,'Special Feature, Body',A,
  58,'Special Feature, Shade',A,
  66,'Special Feature, Trim',A,
  70,'Height, Overall',B,
  72,'Depth, Overall',B,
  74,'Length, Overall',B,
  76,'Maximum Extension From Wall',B,
  80,'Pattern Construction',B,
  81,'Pattern',A,
  89,'Pattern Orientation',B,
  91,'Texture',B,
  92,'Color',C,
  110,'Supplier',A,
  115,'Total Price',B,
  119,'Body Price',B,
  123,'Shade Price',B,
  125,'Days to Delivery',B,
  127,'Stocked Item',B
};
static struct field fabrtab[]={
  1,'Record ID',B,
  5,'Videodisc Frame',B,
  9,'Videodisc Volume',B,
  11,'Style',A,
  17,'Preferred Material',A,
  23,'Fiber Content',A,
  35,'Reflectance',B,
  36,'Texture',B,
  37,'Pattern',A,
  45,'Pattern Orientation',B,
  47,'Pattern Scale',B,
  48,'Pattern Density',B,
  49,'Color',C,
  67,'Fire Rating',B,
  68,'Price',B,
  72,'Vendor',A,
  77,'Stocked Item',B
};
static int nf[]={/* number of fields in the search record for each database*/
NFABR,
NWALL,
0,
NFURN,
NLAMP
};
static struct field *t[]={/* table of field descriptor tables for each database */
fabrtab,
walltab,
0,
furntab,
lamptab
};
```

```c
static char *dbn[]={
'fabrics',
'wall coverings',
0,
'non-upholstered furniture',
'lamps'
};

FILE *log,*fopen(),*l;
struct qlog q;
int db;
int i, j;
int logcnt;

if(!(log=fopen('querylog','rb'))){
      printf('querylog file not found\n');
      exit(1);
      } fread( &logcnt, 2, 1, log );   /* get number of records in file */ l = fopen('PRN:','w');
   j = 0;
   db = -1;
   while( logcnt>0 ){
      if( db<0 ){           /* get database number */
         fread( &db, 2, 1, log );
         j++;
         logcnt--;
         fseek( log, (long)(LOGSIZE-2), 1 );
         fprintf(l,'\n%d Query on %s database\n',j,dbn[db]);
         } fread(&q, LOGSIZE, 1, log );         /* read query log for 1 field */
      logcnt--;
      for( i=0;
           i<nf[db] && t[db][i].pos != q.posit;
           i++ );
      if( i == nf[db] )
         fprintf(l,'Invalid field position (%d) in database %d\n',q.posit,db);
      else { /* valid field */
         fprintf(l,'   %s is ',t[db][i].desc);
         vprint( q.v1, q.length, t[db][i].type, l );
         if( q.action == RANGE ){
            fprintf(l,' to ' );
            vprint( q.v2, q.length, t[db][i].type, l );
            }
         fprintf(l,'\n');
         }
      if( q.term==0 ){    /* if last field in query */
         db = -1;
         }
      } /* end while */
   fclose(log);
}
vprint( v, l, type, f ) /* print value */
union {
   int i;
   char c[8];
   struct { int block; char flag; } color;
   struct { char d[4]; long s; } size;
   long li;
   } *v;
int l;
int type;
FILE *f;
{
int j;

switch(type){
case A:
   fprintf(f, '%.*s',l,v->c);
   break;
```

```
    case 8:
      switch( l ){
      case 1:
        j = v->c[0];
        fprintf(f, '%d', j );
        break;
      case 2:
        fprintf(f, '%d', v->i );
        break;
      case 4:
        fprintf(f, '%ld', v->li );
        break;
      default:
        fprintf(f,' Invalid binary field length\n');
ze,s );
      break;
    }
    return;
}
/*
* File:    QSTAT.C
* Version: 1.0
* Release:
* System:  Search & Source
* Contact: Tom Corner
*-------------------------------------------------------------
* History: (reverse chronology)
* Date (Version)   Who/Action
* -------------------------------------------------------------
* 04-jun-84 ( 1.0 ) Tom Corner/created
*
* ==========================================================
*   Abstract:
*   ----------
*   Purpose:
*           Report statistics queries.
*   Inputs: QUERYLOG
*   Outputs:
*   Entry Points:
*   Called Routines:
*   Special Notes:
* ==========================================================
*/
include 'stdio.h'
#include 'search.inc'
#include 'query.inc'
struct stat {
  struct field *ftab;   /* pointer to field description table */
  int cquery;           /* count of queries for this data base */
  int *cfld;            /* pointer to array of counters of occurances
                           of each field */
  int (*clev)[MAXFLDLEN];/* pointer to array of counters of occurences of each
                    1
};

main()
{
static struct field walltab[]={
  1,'Record ID',
  5,'Videodisc Frame',
  9,'Videodisc Volume',
  11,'Style',
  17,'Preferred Material',
  26,'Reflectance',
  27,'Pattern Construction',
  28,'Pattern',
  40,'Pattern Orientation',
  42,'Pattern Scale',
  43,'Pattern Density',
  44,'Texture',
  45,'Fire Rating',
  46,'Color',
  64,'Vendor',
```

```c
69,'Price',
73,'Stocked Item'
};
static struct field furntab[]={
  1,'Record ID',
  5,'Videodisc Frame',
  9,'Videodisc Volume',
 11,'Style',
 20,'Preferred Material',
 36,'Finish',
 48,'Reflectance',
 49,'Piece Type',
 64,'Size',
114,'Shape',
130,'Special Feature',
178,'Color',
196,'Maximum Retail Price',
200,'Minimum Retail Price',
204,'Supplier',
209,'Cutting Date',
239,'Stocked Item'
};
static struct field lamptab[]={
  1,'Record ID',
  5,'Videodisc Frame',
  9,'Videodisc Volume',
 11,'Style',
 17,'Preferred Material, Body',
 21,'Preferred Material, Shade',
 25,'Preferred Material, Trim',
 29,'Finish',
 33,'Reflectance',
 34,'Piece Type',
 46,'Special Feature, Body',
 58,'Special Feature, Shade',
 66,'Special Feature, Trim',
 70,'Height, Overall',
 72,'Depth, Overall',
 74,'Length, Overall',
 76,'Maximum Extension From Wall',
 80,'Pattern Construction',
 81,'Pattern',
 89,'Pattern Orientation',
 91,'Texture',
 92,'Color',
110,'Supplier',
115,'Total Price',
119,'Body Price',
123,'Shade Price', 47,'Pattern Scale',
 48,'Pattern Density',
 49,'Color',
 67,'Fire Rating',
 68,'Price',
 72,'Vendor',
 77,'Stocked Item'
};
static int cffabr[NFABR],cflamp[NLAMP],cffurn[NFURN],cfwall[NWALL];
static int clfabr[NFABR][MAXFLDLEN], cllamp[NLAMP][MAXFLDLEN];
static int clfurn[NFURN][MAXFLDLEN], clwall[NWALL][MAXFLDLEN];

static struct stat s[6]={
{ fabrtab,0,cffabr,clfabr,NFABR },
{ walltab,0,cfwall,clwall,NWALL },
{ 0,0,0,0,0 },
{ furntab,0,cffurn,clfurn,NFURN },
{ lamptab,0,cflamp,cllamp,NLAMP },
{ 0,0,0,0,0 }
};
FILE *log,*fopen(),*l;
struct qlog q;
int db;
```

```c
  int i, j;
  int n;
  int fchist[12];
  int logcnt;
  double t,p;

/*
 * zero counters
 */
  for( db=0; db<6; db++ ){
    s[db].cquery = 0;
    for( i=0; i<s[db].nfields; i++ ){
      s[db].cfld[i] = 0;
      for( j=0; j<MAXFLDLEN; j++)
        s[db].clev[i][j] = 0;
    }
  }
  for( i=0; i<12; i++ )fchist[i] = 0;

if(!(log=fopen('querylog','rb'))){
    printf('querylog file not found\n');
    exit(1);
  }
  fread( &logcnt, 2, 1, log );   /* get number of records in file */

/*
 * calculate statistics
 */
  db = -1;
  while( logcnt>0 ){
    if( db<0 ){              /* get database number */
      fread( &db, 2, 1, log );
      s[db].cquery++;
      logcnt--;
      n = 0;
      fseek( log, (long)(LOGSIZE-2), 1 );
    } fread(&q, LOGSIZE, 1, log );         /* read query log for 1 field */
    n++;
    logcnt--;
    for( i=0;
         i<s[db].nfields && s[db].ftab[i].pos != q.posit;
         i++ );
    if( i == s[db].nfields )
      printf('Invalid field position (%d) in database %d\n',q.posit,db);
    else{
      s[db].cfld[i]++;
      s[db].clev[i][q.length-1]++;
    }
    if( q.term==0 ){    /* if last field in query */
      n = n>12 ? 11 : --n;/* update field count histogram */
      fchist[n]++;
      db = -1;
    }
  } /* end while */
  fclose(log);
/*
 * print selection statistics
 */
  l = fopen('PRN:','w');
  report( l, 'fabrics', &s[0] );
  report( l, 'wall coverings', &s[1] );
  report( l, 'furniture', &s[3] );
  report( l, 'lamps', &s[4] );
/*
 * print selection count histogram
 */
  fprintf(l,'\014 Selection Count Histogram\n');
  for( i=0, t=0.; i<12; i++) t += fchist[i];
  fprintf(l,'%.0f total queries\n',t );
  fprintf(l,'Number of    Number of    Percent\n');
```

```
    fprintf(l,'Selections    Queries\n');
    for( i=0; i<12; i++ ){
      p=(fchist[i]/t)*100.;
      j=i+1;
      fprintf(l,'%5d%14d%12.1f\n',j,fchist[i],p);
      }
}

/*
 * print selection counts for one data base
 */
report( l, title, s )
char *title;
FILE *l;
struct stat *s;
{
  double t,p;
  int i,n,j,m;

fprintf(l,'\014 Selection Counts for Queries on %s Database\n',title );
  t = s->cquery;
  fprintf(l,'%.0f total queries\n',t);
  for( i=0; i<s->nfields; i++){
    fprintf(l,'%30s',s->ftab[i].desc);
    n = s->cfld[i];
    p = (n/t)*100.;
    fprintf(l,' %5d %4.1f%%',n,p);
    for( j=0; j<MAXFLDLEN; j++ ){
      m = s->clev[i][j];
      if( m>0 ){
        p = ( (double)m/n ) * 100.;
        fprintf(l,' %d/%4.1f%%',j+1,p);
        }
      }
    fprintf(l,'\n');
    }
  return;
}
* 25-may-84 ( 1.0 ) Tom Corner/created
* q5-jul-84 ( 1.1 ) Tom/stop logging when logcnt exceeds 11000
*
* ================================================================
*  Abstract:
*  ---------
*  Purpose: Add current query to QUERYLOG file.
*     Queries are not logged after logcnt (number of records in querylog file)
*     excedes 11000. This prevents querylog file from exceding 300k bytes and
*     insures it will fit on a floppy disk.
*  Inputs:  sl - search list defining query
*           logcnt - number of fields in file
*           log - stream pointer
*  Outputs: series of fields in QUERYLOG file
*  Entry Points:
*  Called Routines:

int logcnt;
FILE *log;
{
  int dba[(LOGSIZE+1)/2];
  struct search_list *a;
  struct qlog q;

if( logcnt>11000 ) return( logcnt );
  if( sl!=0 ){
    fseek(log,(long)(2L+(long)logcnt*LOGSIZE), 0 );
    dba[0] = db;

movmem(a->select_value2,q.v2,MAXFLDLEN);
    q.ftype = a->field_type;
    q.action = a->search_action;
    fwrite(&q,LOGSIZE,1,log);
    logcnt++;
    }
```

```
    fseek(log,0L,0);
    fwrite(&logent,2,1,log);
    fflush(log);
} /* end if sl != 0 */
================================
*
*   Purpose  :  this routine saves the current record to the
*                existing generation +1
*
*   Called
*   routines :  message
*/ include 'disstruc.str'
define WAIT 100 int saveme(generation,position,save_check,sel_table)

int position;
int generation,*save_check;
struct selected_ids sel_table[];
{
        int i;

yellow();
        beep();
        moveto(1,1);
        if (sel_table[position].saved == generation+1)
        {
                puts('Already saved');
                cleanup();
                return(0);
        }
        sel_table[position].saved = generation+1;
        *save_check = TRUE;
        puts('Adding to save');
        puts('      list');
        cleanup();
        return(0);
}
cleanup()
{
        delay(WAIT);
        moveto(1,1);
        puts('              ');
        puts('              ');
}

/*
*  File:    SEARCH.C
*  Version: 1.0
*  Release:
*  System:  Search & Source
*  Contact: Tom Corner
*------------------------------------------------------------
*  History: (reverse chronology)
*  Date (Version)   Who/Action
*  ----------------------------------------------------------
*  14-jun-84 ( 1.1 ) TC/ fixed bug that caused abort when slist=0
*  03-apr-84 ( 1.0 ) Tom Corner / created
*  ==========================================================
*  Abstract:
*  ----------
*  Purpose:
*  search - A function to search the database for products matching the
*           criteria specified in the search list.
*  Inputs:
*           search list
*           product type - This is a code which tells which product file to
*                          search.
```

```
*   Outputs:
*           product found list is accessed with routines defined below.
*           return code:
*              0  reselection of criteria requested
*              1  display of products requested
*   Entry Points:
*           psearch
*           long getprod(i) - returns the i'th product in product found table.
*                            The first product is 0.
*           nfound() - returns the number of products found by psearch.
*   Called Routines:
flags
*               select_index - selects the index to use
*   Special Notes:
* =================================================================
*/
extern int debug;

#include 'keys.inc'
#include 'search.inc'
struct selret { /* structure of select_index's returned data */
    struct search_list *index_list, *comp_list;
    };
extern struct selret *select_index();
extern struct search_list *copy_list();

search( slist, prodtype )
struct search_list *slist;
int prodtype;
{
  int ret,r,c;

srchscr( slist );
  ret = asearch( slist, prodtype );
  printf('\007');
  white();
  switch( ret ){
    case -3:
      center('ERROR- unable to allocate memory\n');
      break;
    case -2:
      center('ERROR- no index specified\n');
      break;
    case 0:
      center('search completed successfully');
      break;
    case 1:
      center('search terminated by red key');
      delay( 100 );
      return( 0 );         /* on red key, go to criteria */
      break;
    case 2:
      center('Search Interrupted: A maximum of 500 products\n');
      center('may be retrieved by one search.\n');
      break;
    case 3:
      nomatch();
      break;
    case 4:
      center('search terminated by green key\n');
      if( nfound() != 0 ){
        center('display in a moment');
        return( 1 );   /* on green key go to display */
        }
      break;
    }
  while( 0==0 ){
    c = getscan();
    if( c == RED )return( 0 );
    if( c == GREEN && nfound() != 0 )return( 1 );
    }
```

```
}
/*
 *   NOMATCH()
 *
 *   This is an informative screen to let the user know that his
 *   selection criteria was too restrictive and no matches were found.
 *
 */
nomatch()
{
        int i;

center("NO PRODUCTS FOUND");
        printf("\nEither change or delete some of the criteria ");
        printf("to allow for a larger number\nof products ");
        printf("to fit your needs");

return;
}
struct search_list *sldel(sl) /* delete DUMBY entries from search list */
struct search_list *sl;
{
   struct search_list *la,*lo,*na,*no,*a,*o,*t,*ret,*to;

/*
 * If STYLE selection is deleted also delete or All Styles
 */
   for(a=sl; a!=0; a=a->and_ptr){
     for(o=a; o!=0; o=o->or_ptr){
        if( o->btrind==STYLES && o->search_action==DUMBY && o->or_ptr!=0){
          o = o->or_ptr;
          if( o->btrind==STYLES )o->search_action = DUMBY;
        }
     }
   }
/*
 * Delete DUMBY entries from search list
 */
  ret=sl;
  la=0;                         /* previous and node null */
  for( a=sl; a!=0; la=a, a=na){ /* for each and node */
    na = a->and_ptr;
    for( lo=0, o=a; o!=0; lo=o, o=no ){ /* for each or node */
      no=o->or_ptr;
      if( o->search_action == DUMBY ){
        if( lo==0){
          if(no==0){
            t=na;
            a=la;
          }
          else {
            t=no;
            a=t;
          }
          if(la==0)ret=t;
          else for(to=la; to!=0; to=to->or_ptr)to->and_ptr=t;
        } /* end if lo==0 */
        else lo->or_ptr=no;
        free(o);
        o=lo;
      }/* end if DUMBY */
    } /* end for or's */
  } /* end for and's */
  return(ret);
}
asearch( slist, prodtype )
struct search_list *slist;
int prodtype;
{
  struct selret *sr;
  int ret;
  struct search_list *copy;
```

```
      if(debug)dispsl(slist,'Original');
      copy = copy_list( slist );              /* copy search list */
      if( copy == 0 && slist != 0 )return(-3);
/*    translate entries for color fields with a don't care dominance field
      if( adjust_color( copy ) )return( -3 );
      if(debug)dispsl( copy, 'Color Adjusted' );
      sr = select_index( copy, prodtype );
      if(debug)dispsl( sr->index_list, 'Index' );
      if(debug)dispsl( sr->comp_list, 'Compare' );
      if( sr == 0 )return( -2 );
      ret = psearch( sr->index_list, sr->comp_list, prodtype );
      deal_list( sr->index_list );  /* deallocate memory */
      deal_list( sr->comp_list );

{
   struct search_list *ret, *a, *b, **pa, *po, *o, *t;

ret = 0;
   for( pa = &ret, a = slist;       /* for each and entry in list */
        a != 0; a = a->and_ptr ){
      t = malloc( SLSIZE );         /* allocate memory for new item */
      if( t == 0 ){
         deal_list( ret );
         return( 0 );
      }
      pa = &t->and_ptr;             /* save address of this item's and ptr */
   } for( a = slist, b = ret;         /* for each and entry in list */
        a != 0; a = a->and_ptr, b = b->and_ptr ){
      po = b;
      for( o = a->or_ptr;           /* for each or item in and item */
           o != 0; o = o->or_ptr ){
         t = malloc( SLSIZE );      /* allocate memory for copy */
         if( t == 0 ){
            deal_list( ret );
            return( 0 );
         }
         movmem( o, t, SLSIZE );    /* copy data */
         t->or_ptr = 0;             /* next or item not allocated yet */
         t->and_ptr = b->and_ptr;   /* set and pointer */
         po->or_ptr = t;            /* point last item to this one */
         po = t;                    /* save pointer to this item */
      }
   }
   return( ret );
}
/*
 * deal_list - A function to deallocate the memory in a copied search list.
 */
deal_list( sl )
struct search_list *sl;
{
   struct search_list *a, *o, *t;

for( a = sl; a != 0; ){          /* for each and item */
      o = a;
      a = a->and_ptr;
      while( o != 0 ){              /* for each or item */
         t = o;
         o = o->or_ptr;
         free( t );
      }
   }
   return;
}
/*
 * adjust_color - A function to convert each color entry in the search list
 * that has a don't care dominance flag into a dominant and a subdominant
 * entry.
 */
adjust_color( clist )
struct search_list *clist;
```

```
{
  struct search_list *c, *d, *t;

for( c = clist; c !=0; c = c->and_ptr){      /* for each and item */
    for( d = c; d != 0; d = d->or_ptr ){      /* for each or item */
      if( d->field_type == COLOR ){
        switch( d->select_value1[2] ){
          case SUBDOMINANT:
            break;
          case DOMINANT:
            d->btrind = COLORS+1;
            break;
          case DONTCARE:
            t = malloc( SLSIZE );          /* allocate memory for new item */
            if( t == 0 )return(1);
            movmem( d, t, SLSIZE );        /* duplicate old item */
            t->btrind = COLORS+1;
            t->or_ptr = d->or_ptr;         /* put new item in or list */
            d->btrind = COLORS;            /* subdominant index number */
            d->or_ptr = t;
            d->select_value1[2] = SUBDOMINANT;
            t->select_value1[2] = DOMINANT;
        }/* end switch */
      } /* end if color */
    }   /* end for or nodes */
  }     /* end for and nodes */
  return(0);
}

/*
 * select_index - Function to select an index file to use in search
 */
extern long sublng();
struct selret *select_index( sl, prodtype )
struct search_list *sl;
int prodtype;
{
  struct search_list *a, *o, *b, *wa, *wb;
  static struct selret r;
  int i, w, t;
  long l;
#include 'weights.inc'/* include weights table */

/*
 * select index list
 */
  wa = wb = b = 0;
  w = 0x7fff;              /* weight = max value */
  for( a=sl; a!=0; a=a->and_ptr){
    t = 0;                 /* weight for this or list */
    for( o=s; o!=0; o=o->or_ptr ){
      if( o->btrind == NOTIND ){/*if comparison can't be indexed */
        t = 0x7fff;
        break;
      }
      else if( o->btrind < 0 ){ /* if this comp. indexed by search file key */
        l = sublng( o->select_value2, o->select_value1 )/10;
        l = ( l == 0 ) ? 1 : l;
        l = ( l > 500 ) ? 500 : l;
        t += l;
      }
      else /* this comparison is indexed by an index file; use weight table */
        t += weights[prodtype][o->btrind-1][o->compare_len-1];
    }
    if( t < w ){/* if the weight of this or list is less than the weight */
      wa = a;   /* of the saved one, replace saved list with this one */
      wb = b;
      w = t;
    }
    b = a;
  }
  if( wa==0 )return(0); /* no index found */
/*
 * divide search list into index list and compare list
 */
  r.index_list = wa;
  if( wb==0 ){
    r.comp_list = wa->and_ptr;
  }
```

```
* skip length.
* These are partial key selections that are to match all products that have
* the first part of the key equal.
* Convert these to ranges.
*/
  for( o=wa; o!=0; o=o->or_ptr){
    if( o->field_type == STRING && o->compare_len != o->skip_len){
      for( i=o->compare_len; i<o->skip_len;){
        o->select_value2[i]='\377';
        o->select_value1[i++]=0;
        }
      o->search_action = RANGE;
      movmem(o->select_value1, o->select_value2, o->compare_len);
      }
    }
  return(&r);
}
/*
* sublng - subtract two long integers
*/
long sublng( l1, l2 )
long *l1, *l2;
{
  return( *l1 - *l2 );
}

/* File       : showfabr
 * Version    : 2.0
 * Release    :
 * System     : Search & Source
 * Contact    : Matthew Weinstein
 * Date       : 4-16-84
 *================================================================
 *
 *  Purpose  : this routine prints a fabric display screen
 *
 *  History  : 5/22/84 Matthew changed page 1 so that page and i.d. #
 *             were consistent with the other pages AND then brought that
 *             out of the case statement
 *
 *
 *  Called
 *  routines :
 */ include 'screen.inc'
include 'posblock.inc'
include 'disstruc.str'
include 'fabrsrch.str'
#include 'fabrnon.str'
#define btrieve BTRIEVE
#define ESC '\033'
#define NOT_FOUND 4
#define GREEN   do_color(2,0)

showfabr(screen,sel_table,position,fabr,cnt,crnt)

int   screen,cnt,crnt;
struct selected_ids  sel_table[];
int   position;
struct position_block fabr[];

{
int i,status;
char *yesno(),*useopt(),*textopt(),*reflopt(),*doslide();
char *patopt(),*ptoropt(), work[80],temp[10],*dostyle();
static struct screen_defs window = {4,20, LTMARGIN, 1};
struct srchfab srch;
struct nsrchfab nsrch;
struct supsrch sup;
char *comfind(),*fibfind();
long current;

/*
        combined choice file
*/
```

```c
/*
                position the search and nonsearch records for the current
                product
*/
current = sel_table[position].id;

if ( btr_geteq(fabr[S],pblk,&srch,&current,0) == NOT_FOUND)
{
        moveto(1,1);
        printf('Search not found');
}
if ( btr_geteq(fabr[N],pblk,&nsrch,&current,0) == NOT_FOUND)
{
        moveto(1,1);
        printf('Non-search not found');
}
clrwindow(&window);
do_color(3,0);
atsay(2,65,'Page');
clearendline();
printf(' %d',screen);
atsay(3,65,'I.D.:'); clearendline();
printf(' %ld',srch.id);
red();
atsay(1,1,'                    ');
atsay(1,1,'Item');
printf(' %d of %d',crnt ,cnt );
GREEN;
/*
                each case represents one screen
*/
switch (screen)
        {
         case(1) :
                if (btr_geteq(fabr[SU],pblk,&sup,srch.supplier,1) == NOT_FOUND)
                {
                        moveto(1,1);
                        printf('Supplier not found');
                }
                video((long)srch.vid,(long) 300);
                atsay(4,65,'P.O.: ');
                moveto(5,1); printf('Phone: %.14s',sup.su_phone);
                moveto(5,58); printf('Video frame: %ld',srch.vid);
                moveto(7,1); printf('Vendor name: %.25s',sup.su_name);
                moveto(7,44); printf('Rep. name:');
                moveto(9,1); printf('Address: %.25s %.20s %.2s %.5s',
                                sup.su_addr,sup.su_city,
                                sup.su_state,sup.su_zip);
                moveto(12,1);
                printf('Collection name: %.40s',nsrch.n_book);
                moveto(12,65); printf('Page: %d',nsrch.n_page);
                moveto(14,1); printf('Description: %.40s',nsrch.n_desc);
                atsay(14,65,'Quantity: ');
                moveto(17,1);

printf('Retail price per single yard: $%.2ld',
                        srch.price);
                atsay(17,48,'Vertical repeat:');
                printf(' %.2d inches',nsrch.n_vert);

atsay(19,1,'Width of fabric is');
                printf(' %.2ld inches',nsrch.n_width);

atsay(19,48,'Horizontal repeat:');
                printf(' %.2d inches',nsrch.n_horiz);
                break;

case(2) :

atsay(6,1,'Most dominant color is block #:');
                printf(' %d',srch.bl1);
                atsay(6,42,'Sub-dominant color 2 is block #:');
```

```
                printf(' %d',srch.b12);
                atsay( 9,1,'Sub-dominant color 3 is block #:');
                printf(' %d',srch.b13);
                atsay( 9,42,'Sub-dominant color 4 is block #:');
                printf(' %d',srch.b14);
                atsay(12,1,'Sub-dominant color 5 is block #:');
                printf(' %d',srch.b15);
                atsay(12,42,'Sub-dominant color 6 is block #:');
                printf(' %d',srch.b16);

atsay(15,1,'Stainproofing used was:');
                printf(' %s',comfind(0x6e,nsrch.n_stain,fabr[CC].pblk));

atsay(15,56,'Shrinkage:');
                printf(' %s',comfind(0x6f,nsrch.n_shrink,fabr[CC].pblk));

atsay(18,1,'Recommended for');
                printf(' %s usage',comfind(0x6d,nsrch.n_usage,fabr[CC].pblk atsay(18,56,'Firerated:');
                printf(' %s',yesno(srch.fire));

break;
    case(3) :

atsay(5,1,'Available options: Paperbacking:');
                printf(' %s',yesno(nsrch.n_paper));
                atsay(5,56,'Sun resistant:');
                printf(' %s',yesno(nsrch.n_sun));
                atsay(6,20, 'Laminating:');
                printf(' %s',yesno(nsrch.n_lamin));
                atsay(8,1,'Cleaning directions:');
                printf(' %s',comfind(0x73,nsrch.n_clean,fabr[CC].pblk));
                atsay(8,56,'Can be railroaded:');
                printf(' %s',yesno(nsrch.n_rail));
                atsay(10,1,'Fiber content:');
                moveto(11,5);
                printf('%d\%%: %s',nsrch.n_fibc1,
                        fibfind(srch.fib1,fabr[FB].pblk));
                moveto(11,45);
                printf('%d\%%: %s',nsrch.n_fibc2,
                        fibfind(srch.fib2,fabr[FB].pblk));
                moveto(13,5);
                printf('%d\%%: %s',nsrch.n_fibc3,
                        fibfind(srch.fib3,fabr[FB].pblk));
                moveto(13,45);
                printf('%d\%%: %s',nsrch.n_fibc3,
                        fibfind(srch.fib4,fabr[FB].pblk));
                atsay(16,1,'Quilting available at an additional charge:');
                printf(' %s',comfind(0x70,nsrch.n_quilt,fabr[CC].pblk));
                atsay(18,1,'Custom colors available with a minimum order of');
                printf(' %d yards',nsrch.n_min);
                break;

case(4) :

atsay(5,1,'Set-up charge for custom printing is');
                printf(' $%.2d',nsrch.n_setup);

atsay(8,1,'A volume discount of');
                printf(' %2d\%% is available on orders of %d or more',
                        nsrch.n_voldiscpercent, nsrch.n_voldiscyd);

atsay(11,1,'The I.D. numbers below are products that coord');
                printf('inate with this fabric');
                atsay(13,1,'Wallpapers:');
                moveto(13,19);
                printf('1\) %ld    2\) %ld',nsrch.n_wall1, nsrch.n_wall2);
                atsay(15,1,'Other fabrics:');
                moveto(15,19);
                printf('1\) %ld    2\) %ld    3\) %ld    4\) %ld',
                        nsrch.n_fabid1, nsrch.n_fabid2,
                        nsrch.n_fabid3, nsrch.n_fabid4);

atsay(17,1,'Matching products available:');
                        atsay(18,5,'Bedspreads:');
                        printf(' %s',yesno(nsrch.n_matchbed));
```

```
f(' %s',yesno(nsrch.n_matchother));
                    break;

case(5) :

atsay(5,1,'Coordinating products!');
                    atsay(5,45,'Bedspreads:');
                    printf(' %s',yesno(nsrch.n_cdbed));
                    atsay (6,5,'Drapery:');
                    printf(' %s',yesno(nsrch.n_cddrape));
                    atsay(6,45,'Other:');
                    printf(' %s',yesno(nsrch.n_cdother));

atsay(8,1,'Texture:');
                    printf(' %s',comfind(0x0c,srch.text,fabr[CC],pblk));
                    atsay(8,23,'Reflectance:');
                    printf(' %s',comfind(0x06,srch.reflect,fabr[CC],pblk));
                    atsay(8,51,'Transparency:');
                    printf(' %s',comfind(0x85,nsrch.n_trans,fabr[CC],pblk));

atsay(11,1,'Pattern 1\)');
                    printf(' %.65s',doslide(srch.pat1,fabr[PT],pblk,15));
                    atsay(14,1,'Pattern 2\)');
                    printf(' %.65s',doslide(srch.pat2,fabr[PT],pblk,15));

atsay(17,1, 'Pattern orientation: 1\)');
                    printf(' %s',comfind(0x09,srch.or1,fabr[CC],pblk));
                    atsay(17,48, 'Pattern density:');
                    printf(' %s',comfind(0x0b,srch.dens,fabr[CC],pblk));
                    atsay(19,1, 'Pattern orientation: 2\)');
                    printf(' %s',comfind(0x09,srch.or2,fabr[CC],pblk));
                    atsay(19,48, 'Pattern scale:');
                    printf(' %s',comfind(0x0a,srch.scale,fabr[CC],pblk));
                    break;

case(6) :

atsay(5,1,'Preferred material:');
                    atsay(6,7,'1\)');
                    printf(' %.65s',doslide(srch.pm1,fabr[PM],pblk,10));
                    atsay(8,7,'2\)');
                    printf(' %.65s',doslide(srch.pm2,fabr[PM],pblk,10));

atsay(12,1,'Style 1\)');
                    printf(' %.65s',dostyle(srch.sty1,fabr[ST],pblk,10));
                    atsay(14,1,'Style 2\)');
                    printf(' %.65s',dostyle(srch.sty2,fabr[ST],pblk,10));
                    atsay(17,26,'THIS ITEM IS USUALLY STOCKED');

break;

}
return(0);
}
/* File       :  showfurn.c
 * Version    :  2.0
 * Release    :
 * System     :  Search & Source
 * Contact    :  Sylvia Lasky
 *
 * 8/10/84 Matt    / Pulled out a stray return
 * 7/03/84 Matt    / use dosize to lookup the size code
 * 6/20/84 Matthew/ cleaned up pg 5 display appearance by dropping data
 *                  element CUTTIME - TEMPORARY FIX - need to design what
 *                  will look ok whether or not cuttime was present.
 * 5/29/84 Sylvia / use comfind to lookup reflectance instead of
 *                  nonexistant reflopt function.  Delete
 *                  references to other nonexistant functions.
 *                  Also, get rid of field overrides to print 0's instead
 *                  of bad numbers since memory bug is not there anymore.
 * 5/11 84 Sylvia / pass addr of a long holding current ID to Btrieve instea
 *          of &(sel_table[position].id) as in new showwall
 *   April 23, 1984 Matt/Correct some typo's
 *===========================================================
 *
 * Purpose :   this routine prints a furn display screen
 *
```

```
*   History    :  5/22/84 Matthew changed page 1 so that page and i.d.  *
*                        were consistent with the other pages AND then brought that
*                        out of the case statement
*
*
*   Called
*   routines :
*/ include  'screen.inc'
include  'posblock.inc'
#include  'disstruc.str'
#include  'furnsrch.str'
#include  'furnnon.str'
#define ESC '\033'
#define GREEN do_color(2,0)
#undef CC
define CC 8 showfurn(screen,sel_table,position,furn,cnt,crnt)

int   screen,crnt,cnt;
struct position_block furn[];
struct selected_ids  sel_table[];
int   position;
{
long current;
int i,status;
/************** MLB 7/03/84 ADD DOSIZE ***************/
char *yesno(),*doslide(), *dostyle(), *dosize();
char *when(), work[80];
static struct screen_defs window = {4,20, LTMARGIN, 1};
struct furnsrch srch;
struct furnnon nsrch;
struct  supsrch sup;
current = sel_table[position].id;
btr_geteq(furn[S],pblk,&srch,&current,0);
btr_geteq(furn[N],pblk,&nsrch,&current,0);

clrwindow(&window);
do_color(3,0);
atsay(2,65,'Page');
clearendline();
printf(' %d',screen);
atsay(3,65,'I.D.:'); clearendline();
printf(' %ld',srch.n_id);
red();
atsay(1,1,'                    ');
atsay(1,1,'Item');
printf(' %d of %d',crnt ,cnt );
GREEN;

switch (screen) {
   case(1):
        status = btr_geteq(furn[SU],pblk,&sup,srch.n_supplier,1);
        video((long)srch.n_vid,(long) 300);

moveto(4,65); puts('P.O.: ');
        moveto(5,1); printf('Phone: %.14s\n', sup.su_phone);
        moveto(5,58); printf('Video frame: %ld\n',srch.n_vid);
        moveto(7,1); printf('Vendor name: %.30s\n',sup.su_name);
        moveto(7,44); printf('Rep. name:\n');
        moveto(9,1);
        printf('Address: %.25s %.20s %.2s %.5s\n',
                 sup.su_addr,sup.su_city,sup.su_state,sup.su_zip);
        moveto(11,1); printf('Collection name: %.35s\n',nsrch.nn_book);
        moveto(11,65); printf('Page: %d\n',nsrch.nn_page1);
        moveto(13,1); printf('Description: %.40s\n',nsrch.nn_desc);
        moveto(13,65); puts('Quantity: ');
        moveto(15,1);
        printf('Max retail: $%.2ld       ', srch.n_maxprice);
        printf('Min. retail: $%.2ld      ', srch.n_minprice);
```

```
            printf('C.O.H. retail: $%.2ld\n', nsrch.nn_comprice);
            moveto(17,1);
/********************* MLB   07/03/84 *********************/
            if (srch.n_inch2) {
                printf('%s %.2d Inches     ', dosize(furn[SF].pblk,
                    srch.n_size2), srch.n_inch2);
                moveto(17, 41);
            }
            if (srch.n_inch3) {
                printf('%s %.2d Inches', dosize(furn[SF].pblk, srch.n_size3),
                    srch.n_inch3);
                moveto(19,1);
            }
            if (srch.n_inch1) {
                printf('%s %.2ld Inches', dosize(furn[SF].pblk, srch.n_size1),
                    srch.n_inch1);
                moveto(19, 41);
            }
            if (srch.n_inch4) {
                printf('%s %.2ld Inches    ',
                    dosize(furn[SF].pblk, srch.n_size4),srch.n_inch4);
                moveto(20, 1);
            }
            if (srch.n_inch5) {
                printf('%s %.2ld Inches', dosize(furn[SF].pblk, srch.n_size5),
                    srch.n_inch5);
            }
/******************** END OF CHANGES *********************/
            break;
        case(2):
            moveto(5,1);
            printf('Total of %d additional standard finishes ', nsrch.nn_option);
            printf('available at same cost\n');
            moveto(7,1);
            printf('Total of %d additional finishes ',nsrch.nn_optionprice);
            printf('available at additional cost\n');
            moveto(9,1);
            printf('Custom finishes available:   %s         ',
                yesno(nsrch.nn_custom));
            printf('Reflectance of dominant finish:   %s\n',
                comfind(0x06,srch.n_reflect,furn[CC].pblk));
            moveto(11,1);
            printf('Most dominant color is block: %d    ', srch.n_b11);
            printf('%s dominant color #2 is block: %d\n',
                mostsub(srch.n_c2),srch.n_b12);
            moveto(13,1);
            printf('%s dominant color #3 is block: %d    ',
                mostsub(srch.n_c3),srch.n_b13);
            printf('%s dominant color #4 is block: %d\n',
                mostsub(srch.n_c4),srch.n_b14);
            moveto(15,1);
            printf('%s dominant color #5 is block: %d    ',
                mostsub(srch.n_c5),srch.n_b15);
            printf('%s dominant color #6 is block: %d\n',
                mostsub(srch.n_c6),srch.n_b16);
            break;

case(3):
            moveto(5,1);
            printf('Volume discount %d%% and/or $%.2ld ',
                nsrch.nn_voldisc,nsrch.nn_andor);
            printf('for quanities of %d or more\n', nsrch.nn_minorder);
            moveto(7,1);
            printf('Coordinated %s:  I.D. %ld   ',comfind(0x87,
                nsrch.nn_type1,furn[CC].pblk),nsrch.nn_firstid1);
            printf('through    I.D. %ld\n',nsrch.nn_lastid1);
            moveto(9,10);
            printf('Except:   I.D. %ld\n',nsrch.nn_exceptid1);
            moveto(9,40); printf('I.D. %ld\n',nsrch.nn_exceptid2);
            moveto(9,60); printf('I.D. %ld\n',nsrch.nn_exceptid3);
            moveto(11,10);
            printf('Plus:   I.D. %ld\n',nsrch.nn_plus1id1);
            moveto(11,40); printf('I.D. %ld\n',nsrch.nn_plus1id2);
            moveto(11,60); printf('I.D. %ld\n',nsrch.nn_plus1id3);
            moveto(13,1);
            printf('Coordinated %s:  I.D. %ld   ', comfind(0x87,
                nsrch.nn_type2,furn[CC].pblk),nsrch.nn_firstid2);
            printf('through    I.D. %ld\n',nsrch.nn_lastid2);
            moveto(15,10);
```

```
         printf('Except:   I.D. %ld\n',nsrch.nn_except2id1);
         moveto(15,40); printf('I.D. %ld\n',nsrch.nn_except2id2);
         moveto(15,60); printf('I.D. %ld\n',nsrch.nn_except2id3);
         moveto(17,10);
         printf('Plus:   I.D. %ld\n',nsrch.nn_plus2id1);
         moveto(17,40); printf('I.D. %ld\n',nsrch.nn_plus2id2);
         moveto(17,60); printf('I.D. %ld\n',nsrch.nn_plus2id3);
         break;

case(4):
         moveto(5,1); printf('Piece type:\n');
         moveto(5,14);
         printf('1) %.60s\n',doslide(srch.n_piece1,furn[PC].pblk,20));
         moveto(7,14);
         printf('2) %.60s\n',doslide(srch.n_piece2,furn[PC].pblk,20));
         moveto(9,14);
         printf('3) %.60s\n',doslide(srch.n_piece3,furn[PC].pblk,20));
         moveto(11,1); printf('Shape:\n');
         moveto(11,14);
         printf('1) %.60s\n',doslide(srch.n_shape1,furn[SF].pblk,20));
         moveto(13,14);
         printf('2) %.60s\n',doslide(srch.n_shape2,furn[SF].pblk,20));
         moveto(15,14);
         printf('3) %.60s\n',doslide(srch.n_shape3,furn[SF].pblk,20));
         moveto(17,14);
         printf('4) %.60s\n',doslide(srch.n_shape4,furn[SF].pblk,20));
         break;

case(5):
         moveto(5,1); printf('Style:');
         moveto(5,10);
         printf('1)  %.60s',dostyle(srch.n_style1,furn[ST].pblk,15));
         moveto(7,10);
         printf('2)  %.60s',dostyle(srch.n_style2,furn[ST].pblk,15));
         moveto(9,10);
         printf('3)  %.60s',dostyle(srch.n_style3,furn[ST].pblk,15));
         moveto(11,1);
         printf('Other accessories required:  %s       ',yesno(nsrch.nn_access));
         printf('Accessory I.D.: %ld\n',nsrch.nn_accessid);
         moveto(13,1);
         printf('Description:\n');
         moveto(15,1);
         printf('Specified cutting dates:    1) %.8s     ', srch.n_cut1);
         printf('2)%.8s    3) %.8s\n',srch.n_cut2,srch.n_cut3);
         moveto(17,1);
         printf('Quantity in stock was %d as of ', nsrch.nn_stock1);
         printf('%.8s          Shipping weight: %.2ld lbs\n',
                nsrch.nn_date,nsrch.nn_wtlbs);
         moveto(19,1);
         printf('Projected cutting date: %s',
                when(nsrch.nn_cuttime));        /*DROPPED CUTMONTH-NOT EVALUATED
         printf('          Anticipated shipping: %d/%d\n',
                nsrch.nn_shipmonth,nsrch.nn_shipyear);
         break;

case(6):
         moveto(5,1); printf('Preferred material:\n');
         moveto(5,23);
         printf('1) %.50s',doslide(srch.n_pm1,furn[PM].pblk,30));
         moveto(7,23);
         printf('2) %.50s',doslide(srch.n_pm2,furn[PM].pblk,30));
         moveto(9,23);
         printf('3) %.50s',doslide(srch.n_pm3,furn[PM].pblk,30));
         moveto(11,23);
         printf('4) %.50s',doslide(srch.n_pm4,furn[PM].pblk,30));
         moveto(13,1);
         printf('Finish:');
         moveto(13,23);
         printf('1) %.50s',doslide(srch.n_fin1,furn[FN].pblk,30));
         moveto(15,23);
         printf('2) %.50s',doslide(srch.n_fin2,furn[FN].pblk,30));
         moveto(17,23);
```

```c
            printf('3) %.50s',doslide(srch.n_fin3,furn[FN].pblk,30));
            moveto(19,23);
            printf('4) %.50s',doslide(srch.n_fin4,furn[FN].pblk,30));
            break;

case(7):
            moveto(5,1);
            printf('Special features:\n');
            moveto(7,10);
            printf('1) %.65s\n',doslide(srch.n_sf1,furn[SF].pblk,15));
            moveto(8,10);
            printf('2) %.65s\n',doslide(srch.n_sf2,furn[SF].pblk,15));
            moveto(9,10);
            printf('3) %.65s\n',doslide(srch.n_sf3,furn[SF].pblk,15));
            moveto(10,10);
            printf('4) %.65s\n',doslide(srch.n_sf4,furn[SF].pblk,15));
            moveto(11,10);
            printf('5) %.65s\n',doslide(srch.n_sf5,furn[SF].pblk,15));
            moveto(12,10);
            printf('6) %.65s\n',doslide(srch.n_sf6,furn[SF].pblk,15));
            moveto(13,10);
            printf('7) %.65s\n',doslide(srch.n_sf7,furn[SF].pblk,15));
            moveto(14,10);
            printf('8) %.65s\n',doslide(srch.n_sf8,furn[SF].pblk,15));
            moveto(15,10);
            printf('9) %.65s\n',doslide(srch.n_sf9,furn[SF].pblk,15));
            moveto(16,10);
            printf('10) %.65s\n',doslide(srch.n_sf10,furn[SF].pblk,16));
            moveto(17,10);
            printf('11) %.65s\n',doslide(srch.n_sf11,furn[SF].pblk,16));
            moveto(18,10);
            printf('12) %.65s\n',doslide(srch.n_sf12,furn[SF].pblk,16));
            break;

case 8:
            moveto(5,1);
            printf('Packing information: .%1d. per carton', nsrch.nn_percarton);
            printf('       $%.2d  for splitting carton\n', nsrch.nn_pack);
            moveto(7,1);
            printf('C.O.M. information:  %.2d  yds. ', nsrch.nn_comyds);
            printf('- single sheet    %.2d  yds. - set of four\n', nsrch.nn_com4);      /*nn_com4*/
            moveto(9,22); printf('%.2d  yds. for set of six\n',nsrch.nn_com6);
            moveto(11,1);
            printf('Based on 54 inch plain material:  %s\n',
                    yesno(nsrch.nn_base54));
            moveto(13,1);
            printf('Pictured fabric:  %.40s\n',nsrch.nn_descf);
        -   moveto(15,10);
            printf('I.D.:  %1d      Grade:  %.4s', nsrch.nn_fabid, nsrch.nn_grad
            printf('     Retail price:  $%.2d  yd.\n', nsrch.nn_retailperyd);
            moveto(17,1);
            center('THIS ITEM IS USUALLY STOCKED  ');
            break;
    }
return(0);
}
/* File     :  showlamp.c
 * Version  :  2.1
 * Release  :
 * System   :  Search & Source
 * Contact  :  Sylvia Lasky

*==============================================================
*
*   Purpose :  this routine prints a lamp display screen
*
*   History !
*     Date    Who /  What Changed
*
* 5/29/84 Sylvia/ use comfind instead of nonexistant combined choice lookup
*                 functions to fix bug 23 - no data displaying for some fld
*                 Remove references to the old nonextant function names.
*                 Also, add colons after stubs for some screen 3 fields.
*
* 5/11/84 Sylvia/ pass &current ,which holds current ID, to BTR instead
*                 of &(sel_table[position].id) as in new showwall.
*
* 5/22/84 Matthew changed page 1 so that page and i.d. #
*                 were consistent with the other pages AND then brought that
*                 out of the case statement
```

```c
/*
 * Called
 * routines *
 */ include  'screen.inc'
include  'posblock.inc'
#include  'disstruc.str'
#include  'lampsrch.str'
#include  'lampnon.str'
#define ESC '\033'
#define GREEN do_color(2,0)
#undef PT
#define PT 8
#undef CC
define CC 9 int  showlamp(screen,sel_table,position,lamp,cnt,crnt)

int  screen,cnt,crnt;
struct position_block lamp[];
struct selected_ids  sel_table[];
int  position;

{
long current;
int i,status;
char *yesno(),*comfind(),*doslide();
char work[80],*dostyle();
static struct screen_defs window = {4,20, LTMARGIN, 1};
struct lampsrch srch;
struct lampnon nsrch;
struct supsrch sup;
current = sel_table[position].id;     /*current ID*/
btr_geteq(lamp[S].pblk,&srch,&current,0);
btr_geteq(lamp[N].pblk,&nsrch,&current,0);

clrwindow(&window);
do_color(3,0);
atsay(2,65,'Page');
clearendline();
printf(' %d',screen);
atsay(3,65,'I.D.:'); clearendline();
printf(' %ld',srch.l_id);
red();
atsay(1,1,'                   ');
atsay(1,1,'Item');
printf(' %d of %d',crnt ,cnt );
GREEN;

switch(screen){
  case(1) : status = btr_geteq(lamp[SU].pblk,&sup,srch.l_supplier,1);
            moveto(4,65); puts('P.O.: ');
            video(srch.l_vid,(long)300);
            moveto(5,1); printf('Phone: %.14s\n',sup.su_phone);
            moveto(5,58); printf('Video frame: %ld\n',srch.l_vid);
            moveto(7,1); printf('Vendor name: %.30s\n',sup.su_name);
            moveto(7,44); printf('Rep. name:\n');
            moveto(9,1); printf('Address: %.25s %.20s %.2s %.5s\n',
                        sup.su_addr,sup.su_city,
                        sup.su_state,sup.su_zip);
            moveto(11,1);
            printf('Collection name: %.35s\n',nsrch.ln_collection);
            moveto(11,65);
            printf('Page: %d\n',nsrch.ln_page1);
            moveto(13,1); printf('Shade description: %.40s\n',nsrch.ln_descs);
            moveto(13,65); puts('Quantity: ');
            moveto(15,1);
            printf('Lamp or body description: %.40s\n',nsrch.ln_descb);
            moveto(17,1);
            printf('Retail price   Shade only: ');
            printf('$%.21d Body only: $%.21d Entire lamp: $%.21d\n',
```

```
                    srch.l_shadeprice,srch.l_baseprice,srch.l_price);
            moveto(19,1);
            printf("Size    Overall ht. of entire lamp:");
            printf(" %.2d Inches   Ht. of shade: %.2d Inches",
                    srch.l_size,nsrch.ln_heights);
            break;

case(2) :
            moveto(5,1); puts("Size of lamp body only:");
            moveto(5,30); printf("Width %.2d Inches\n",srch.l_width);
            moveto(5,60); printf("Depth %.2d Inches\n",srch.l_depth);
            moveto(7,1); puts("Size of shade top:");
            moveto(7,30);printf("Width %.2d Inches\n",nsrch.ln_widthst)
            moveto(7,60);printf("Depth %.2d Inches\n",nsrch.ln_depthst)
            moveto(9,1); puts("Size of shade bottom:");
            moveto(9,30);printf("Width %.2d Inches\n",nsrch.ln_widthsb)
            moveto(9,60);printf("Depth %.2d Inches\n",nsrch.ln_depthsb)
            moveto(11,1); puts("Maximum exten. of lamp: ");
            moveto(11,30);
            printf("From wall: %.2d Inches\n",srch.l_extend);
            moveto(11,56);
            printf("From floor: %.2d Inches\n",nsrch.ln_extendf);
            moveto(13,1);
            printf("%d Additional standard finishes/colors",
                    nsrch.ln_standardfinish);
            printf(" available for this lamp\n");
            moveto(15,1);
            printf("%d Additional custom finishes/colors",
                    nsrch.ln_customfinish);
            printf(" available for this lamp\n");
            moveto(17,1);
            printf("Estimated delivery: %.2d days from date of order\n
                    nsrch.l_delivery);
            moveto(19,1);
            printf("There is a small order charge");
            printf(" of %.7s for orders under %.8s\n",
                    nsrch.ln_smallcharge,nsrch.ln_minorder);
            break;

case(3) :
    moveto(5,1);
    printf("Volume discount available: %s \n",
    yesno(nsrch.ln_voldisc));
    moveto(5,35); printf("Usage: %s \n",
            comfind(0x79,nsrch.ln_usage,lamp[CC].pblk));
    moveto(7,1);
    printf("Available options: Other mountings:");
    printf(" %s   Other shades: %s   Switch in line: %s \n",
            yesno(nsrch.ln_customcolor),
            yesno(nsrch.ln_customshade),
            yesno(nsrch.ln_lineswitch));
    moveto(9,20);
    printf("Switch in the base: %s Bolt down: %s Grounding plug: %s\n",
            yesno(nsrch.ln_baseswitch),
            yesno(nsrch.ln_boltdown),yesno(nsrch.ln_ground));
    moveto(11,1);
    printf("Coordinated products available: Table accessories:");
    printf(" %s Floor accessories %s \n",
            yesno(nsrch.ln_cdtable),yesno(nsrch.ln_cdfloor));
    moveto(13,1);
    printf("Coordinated wallpapers: %ld    %ld    %ld\n",
            nsrch.ln_wall1,nsrch.ln_wall2,nsrch.ln_wall3);
    moveto(15,1);
    printf("Coordinated fabrics:    %ld    %ld    %ld\n",
    nsrch.ln_fab1,nsrch.ln_fab2,nsrch.ln_fab3);
            moveto(17,1); printf("Texture of lamp body: %s\n",
                    comfind(0x20,srch.l_text,lamp[CC].pblk));
    moveto(17,40); printf("Reflectance of lamp body: %s\n",
            comfind(0x08,srch.l_reflect,lamp[CC].pblk));
            break;
```

```
case(4) :
            moveto(5,1); printf('Most dominant color is block: %d',
                    srch.l_bl1);
            moveto(5,40); printf('%s dominant color 2 is block: %d',
                    mostsub(srch.l_c2),srch.l_bl2);
            moveto(7,1); printf('%s dominant color 3 is block: %d',
                    mostsub(srch.l_c3),srch.l_bl3);
            moveto(7,40); printf('%s dominant color 4 is block: %d',
                    mostsub(srch.l_c4),srch.l_bl4);
            moveto(9,1); printf('%s dominant color 5 is block: %d',
                    mostsub(srch.l_c5),srch.l_bl5);
            moveto(9,40); printf('%s dominant color 6 is block: %d',
                    mostsub(srch.l_c6),srch.l_bl6);
            moveto(11,1);
            printf('Piece type of lamp:  1) %.55s\n',
            doslide(srch.l_piece1,lamp[PC],pblk,30));
            moveto(13,22);
            printf('2) %.55s\n',doslide(srch.l_piece2,lamp[PC],pblk,30
            moveto(15,1);
            printf('Piece type of shade: 3) %.50s\n',
            doslide(srch.l_piece3,lamp[PC],pblk,25));
            moveto(17,1);
            printf('Pattern construction: %.55s \n',
              comfind(0x11,srch.l_const,lamp[CC],pblk));
            break;

case(5) :
            moveto(5,1);
            printf('Pattern  1) %.65s\n',
                    doslide(srch.l_pat1,lamp[PT],pblk,15));
            moveto(7,10);
            printf('2) %.65s\n',doslide(srch.l_pat2,lamp[PT],pblk,15));
            moveto(9,1);
            printf('Pattern orientation: 1) %s    2)  %s\n',
                    comfind(0x19,srch.l_or1,lamp[CC],pblk),
                    comfind(0x19,srch.l_or2,lamp[CC],pblk));
            moveto(11,1);
            printf('Style: 1) %.65s\n',
                    dostyle(srch.l_style1,lamp[ST],pblk,15));
            moveto(13,8);
            printf('2) %.65s\n',dostyle(srch.l_style2,lamp[ST],pblk,15))
            moveto(15,1);
            printf('Shape of lamp body: %.60s\n',
                    doslide(nsrch.ln_shape1,lamp[SF],pblk,20));
            moveto(17,1);
            printf('Shape of lampshade: %.60s\n',
                    doslide(nsrch.ln_shape2,lamp[SF],pblk,25));
            break;

case(6) :
            moveto(5,1);
            printf('Preferred material of lamp body: %.45s\n',
                    doslide(srch.l_pm1,lamp[PM],pblk,35));
            moveto(7,1);
            printf('Preferred material of lampshade: %.45s\n',
                    doslide(srch.l_pm2,lamp[PM],pblk,35));
            moveto(9,1);
            printf('Preferred material of trim: %.50s\n',
                    doslide(srch.l_pm3,lamp[PM],pblk,30));
            moveto(11,1);
            printf('Finish of lamp body: %.55s\n',
                    doslide(srch.l_finish,lamp[FN],pblk,25));
            moveto(13,1);
            printf('Special features lamp body: %.50s\n',
            doslide(srch.l_sfb1,lamp[SF],pblk,25));
            moveto(15,27);
            printf('%.50s\n',doslide(srch.l_sfb2,lamp[SF],pblk,30));
            moveto(17,27);
            printf('%.50s\n',doslide(srch.l_sfb3,lamp[SF],pblk,30));
            break;
```

```
        case(7) :
                        moveto(5,1);
                        printf('Special features to lampshade: %.45s\n',
                                doslide(srch.l_sfs1,lamp[SF],pblk,35));
                        moveto(7,32);
                        printf('%.45s\n',doslide(srch.l_sfs2,lamp[SF],pblk,35));
                        moveto(9,1);
                        printf('Miscellaneous special features: %.45s\n',
                                doslide(srch.l_sfm1,lamp[SF],pblk,35));
                        moveto(11,1);
                        printf('This item can also be seen on pages %d and %d ',
                        nsrch.ln_page2,nsrch.ln_page3);
                        moveto(13,25);
                        printf('This item is usually stocked\n');
                        break;

}
return(0);
}
/* File      : showwall.c
 * Version   : 2.0
 * Release   :
 * System    : Search & Source
 * Contact   : Phil Evans
 * Date      : 4-16-84
 *================================================================
 *
 * History   : 8/10/84 MB pulled out a stray return (in screen 1)
 *
 *             5/22/84 Matthew changed page 1 so that page and i.d. #
 *             were consistent with the other pages AND then brought that
 *             out of the case statement
 *
 *             5/23/84 MW took out excess %ld's from one of the printf state-
 *             ments and recompiled with new structure.
 *
 *
 * Purpose   : this routine prints a wall display screen
 *
 * Called
 * routines  :
 */ include         'disstruc.str'
include         'posblock.inc'
#include         'wallsrch.str'
#include         'screen.inc'
#define GREEN    do_color(2,0)

showwall(screen,sel_table,position,wll,cnt,crnt)

int  screen,cnt,crnt;
struct selected_ids  sel_table[];
int  position;
struct position_block wll[];

{
int i,status;
char *yesno(),*useopt(),*textopt(),*reflopt(),*doslide(),*dostyle();
char *patopt(),*ptoropt(),temp[10];
static struct screen_defs window = {4,20, LTMARGIN, 1};
struct wallsrch srch;
struct wallnon nsrch;
struct supsrch sup;
char *comfind();
long current;

/*
        combined choice file
*/

/*
                position the search and nonsearch records for the current
                product
*/
current = sel_table[position].id;
btr_geteq(wll[S],pblk,&srch,&current,0);
```

```
btr_geteq(wll[N],pblk,&nsrch,&current,0);
clrwindow(&window);
do_color(3,0);
atsay(2,65,'Page');
clearendline();
printf(' %d',screen);
atsay(3,65,'I.D.:'); clearendline();
printf(' %ld',srch.w_id);
red();
atsay(1,1,'                        ');
atsay(1,1,'Item');
printf(' %d of %d',crnt ,cnt );
GREEN;

/*
                  each case represents one screen
*/
switch (screen)
        {
        case(1) :
                btr_geteq(wll[SU],pblk,&sup,srch.w_supplier,1);
                video((long)srch.w_vid,(long) 300);
                atsay(4,65,'P.O.: ');

moveto(5,1); printf('Phone: %.14s',sup.su_phone);
                moveto(5,58); printf('Video frame: %ld',srch.w_vid);
                moveto(7,1); printf('Vendor name: %.25s',sup.su_name);
                moveto(7,44); printf('Rep. name:');
                moveto(9,1); printf('Address: %.25s %.20s %.2s %.5s',
                           sup.su_addr,sup.su_city,
                           sup.su_state,sup.su_zip);
                moveto(11,1);
                printf('Collection name: %.40s',nsrch.wn_book);
                moveto(11,65); printf('Page: %d',nsrch.wn_page);
                moveto(13,1); printf('Description: %.40s',nsrch.wn_desc);
                atsay(13,65,'Quantity: ');
                moveto(15,1);

printf('Retail price per single roll: $%.2ld',
                        srch.w_price);
                atsay(15,48,'Vertical repeat:');
                moveto(15,67);
                printf('%.2d inches',nsrch.wn_vert);

atsay(17,1,'Packaged in');
                printf(' %s',comfind(0x6f,nsrch.wn_pack,wll[CC],pblk));
                atsay(17,48,'Horizontal repeat:');
                printf(' %.2d inches',nsrch.wn_horiz);
                atsay(19,1,'Each single roll has approx.');
                printf(' %.2ld',nsrch.wn_withrolls);
                atsay(19,36,'sq. ft.');
                atsay(19,49,'Pattern match:');
                printf(' %s\n',comfind(0x82,nsrch.wn_match,wll[CC],pblk));

break;

case(2) :

atsay(6,1,'Most dominant color is block #:');
                printf(' %d',srch.w_bl1);
                atsay(6,42,'Sub-dominant color 2 is block #:');
                printf(' %d',srch.w_bl2);
                atsay( 9,1,'Sub-dominant color 3 is block #:');
                printf(' %d',srch.w_bl3);
                atsay( 9,42,'Sub-dominant color 4 is block #:');
                printf(' %d',srch.w_bl4);
                atsay(12,1,'Sub-dominant color 5 is block #:');
                printf(' %d',srch.w_bl5);
                atsay(12,42,'Sub-dominant color 6 is block #:');
                printf(' %d',srch.w_bl6);

atsay(15,1,'Fuel contributed: ');
                printf(' %.2d',nsrch.wn_fuel);
```

```
                    atsay(15,30,'Smoke density:');
                    printf(' %.2d',nsrch.wn_smoke);
                    atsay(15,61,'Flamespread:');
                    printf(' %.2d',nsrch.wn_flame);

atsay(18,1,'ASTM rating:');
                    depad(nsrch.wn_astm,temp,5);
                    printf(' %s',temp);
                    atsay(18,26,'Width of paper:');
                    printf(' %.21d inches and %.21d inches',nsrch.wn_width1,
                            nsrch.wn_width2);

break;

case(3) :

atsay(5,1,'Single roll length:');
                    printf(' %.21d',nsrch.wn_roll);
                    printf(' %s with %d single rolls to the bolt.',comfind(0x6d,
                            nsrch.wn_ftyd,wll[CC].pblk),nsrch.wn_bolt1);

atsay(7,1,'Weight of paper is');
                    printf(' %d ozs.', nsrch.wn_weight);
                    atsay(7,40,'Printing method used:');
                    printf(' %s',comfind(0x7d,nsrch.wn_print,wll[CC].pblk));

atsay(9,1,'Characteristics:');
                    atsay(10,5,'Pretrimmed:');
                    printf(' %s',yesno(nsrch.wn_trim));
                    atsay(10,40,'Scrubbable:');
                    printf(' %s',yesno(nsrch.wn_scrub));
                    atsay(11,5,'Prepasted:');
                    printf(' %s',yesno(nsrch.wn_paste));
                    atsay(11,40,'Washable:');
                    printf(' %s',yesno(nsrch.wn_wash));
                    atsay(12,5,'Peelable:');
                    printf(' %s',yesno(nsrch.wn_peel));

_custom,wll[CC].pblk));

printf('available with am minimum order of %d rolls',
                            nsrch.wn_minorder);
                    atsay(18,1,'There is a set-up charge of:');
                    printf(' $%.2d for all custom printing', nsrch.wn_setup);

break;

case(4) :

atsay(5,1,'This wallpaper has');
                    printf(' %s backing',comfind(0x83,nsrch.wn_back,
                            wll[CC].pblk));

atsay(8,1,'The I.D. numbers below are products that');
                    printf(' coordinate with this wallpaper:');
                    atsay(10,1,'Fabrics:');
                    moveto(10,21);
                    printf('1) %ld    2) %ld    3) %ld    4) %ld    5) %ld',
                            nsrch.wn_fab1, nsrch.wn_fab2, nsrch.wn_fab3,
                            nsrch.wn_fab4, nsrch.wn_fab5);

atsay(12,1,'Other wall papers:');
                    moveto(12,21);
                    printf('1) %ld    2) %ld    3) %ld    4) %ld    5) %ld',
                            nsrch.wn_wall1, nsrch.wn_wall2, nsrch.wn_wall3,
                            nsrch.wn_wall4, nsrch.wn_wall5);
                    atsay(14,1,'Wall paper borders:');
                    moveto(14,21);
                    printf('1) %ld    2) %ld    3) %ld',nsrch.wn_border1,
                            nsrch.wn_border2, nsrch.wn_border3);
```

```
                atsay(16,1,'Coordinated bedspreads available:');
                printf(' %s',yesno(nsrch.wn_matchbed));

atsay(16,39,'Coordinated drapery available:');

atsay(20,1,'A volume discount of');
                printf(' %d\% or $%.21d is available on orders of %d %s',
                        nsrch.wn_voldiscpercent, nsrch.wn_voldiscdollar,
                        nsrch.wn_voldiscyds,comfind(0x94,nsrch.wn_rollsperyd,
                        wll[CC],pblk));

printf('or more.');
                break;

case(5) :
                atsay(5,1,'Texture:');
                printf(' %s',comfind(0x0b,srch.w_text,wll[CC],pblk));
                atsay(5,41,'Reflectance:');
                printf(' %s',comfind(0x05,srch.w_reflect,wll[CC],pblk));

atsay(7,1,'Pattern 1\)');
                printf(' %.75s',doslide(srch.w_pat1,wll[PT],pblk,12));
                atsay(9,1,'Pattern 2\)');
                printf(' %.75s',doslide(srch.w_pat2,wll[PT],pblk,12));
                atsay(11,1,'Pattern 3\)');
                printf(' %.75s',doslide(srch.w_pat3,wll[PT],pblk,12));
                atsay(14,1, 'Pattern construction:');
                printf(' %s',comfind(0x06,srch.w_woven,wll[CC],pblk));
                atsay(14,48, 'Pattern scale:');
                printf(' %s',comfind(0x09,srch.w_scale,wll[CC],pblk));
                atsay(16,1, 'Pattern orientation: 1\)');
                printf(' %s',comfind(0x08,srch.w_or1,wll[CC],pblk));
                atsay(16,48, 'Pattern density:');
                printf(' %s',comfind(0x0a,srch.w_dens,wll[CC],pblk));
                atsay(18,1, 'Pattern orientation: 2\)');
                printf(' %s',comfind(0x08,srch.w_or2,wll[CC],pblk));
                break;

case(6) :

atsay(5,1,'Style 1\)');
                printf(' %.65s',dostyle(srch.w_style1,wll[ST],pblk,10));
                atsay(8,1,'Style 2\)');
                printf(' %.65s',dostyle(srch.w_style2,wll[ST],pblk,10));
                atsay(11,1,'Preferred material:');
                atsay(12,7,'1\)');
                printf(' %.65s',doslide(srch.w_pm1,wll[PM],pblk,10));
                atsay(13,7,'2\)');
                printf(' %.65s',doslide(srch.w_pm2,wll[PM],pblk,10));
                atsay(14,7,'3\)');
                printf(' %.65s',doslide(srch.w_pm3,wll[PM],pblk,10));
                atsay(17,26,'THIS ITEM IS USUALLY STOCKED');
                break;

} return(0);
}
/* File          : sizein (size_in)
 * Version       : 2.0
 * Release       :
 * System        : Search & Source
 * Contact       : Matthew Weinstein
 *==========================================
 *
 * Purpose       : asks the user for a string and then an int
 *
 *
 * Called
 * routines      : typin, ibmcolor
 */
```

```
#include 'stdio.h'
include 'filedesc.inc'
include 'screen.inc' size_in(tbl,row,col,choice,msg,chosen)
int row,col,chosen;
struct file_descriptor_table *tbl;
char *msg;
struct { char array[6]; long lchoice;} *choice;
{
        struct file_descriptor_table x, *tbl2 = &x;
        char temp1[50], temp2[50];
        static struct screen_defs w = {TOPLINE, BOTLINE, LTMARGIN, 1};

printf(' is ');
        if(typ_in(tbl,row,col+=4,&(choice-)lchoice),temp1))
        {
                strcat(msg,' is ');
                strcat(msg,temp1);
                strcat(msg,'\'');
        }
        else
        {
                choice-)array[0] = *msg = '\0';
                return(0);
        }
        return(1);
}
/* File           : sizein (size_in)
 * Version        : 2.0
 * Release        :
 * System         : Search & Source
 * Contact        : Matthew Weinstein
 *================================================
 *
 * Purpose        : asks the user for a string and then an int
 *
 *
 * Called
 * routines       : typin, ibmcolor
 */ include 'stdio.h'
include 'filedesc.inc'
define pswap(x,y)      {char *temp; temp = x; x = y; y = temp;} size_in(tbl,row,col,choice,choice2,msg)
int row,col;
struct file_descriptor_table *tbl;
char *msg;
long *choice,*choice2;
{
        struct file_descriptor_table x, *tbl2 = &x;
        char temp1[50], temp2[50], temp3[50];
        long tlong;

if(typ_in(tbl,row,col+=4,choice,temp1))
        {
                strcat(temp1,'\'');
        }
        else
        {
                *msg = '\0';
                return(0);
        }
        if(tbl-)f_search_action == 3)
        {
                moveto(row,col+=8);
                printf(' to ');
                getcursor(&row,&col);
                if(!typ_in(tbl,row,col,choice2,temp2))
                {
```

```
                    *choice2 = *choice;
                    strcpy(temp2,temp1);
                    clearendline();
                    whiteonred();
                    printf('%s',temp1);
                    green();
                }
                else
                {
                    strcat(temp2,'\'');
                }
                if(*choice2 < *choice)
                {
                    tlong = *choice;
                    *choice = *choice2;
                    *choice2 = tlong;
                    strcpy(temp3,temp1);
                    strcpy(temp1,temp2);
                    strcpy(temp2,temp3);
                }
                strcpy(msg,temp1);
                strcat(msg,' to ');
                strcat(msg,temp2);
            }
            else
                strcpy(msg,temp1);
        return(1);
}
/*
* File:    SSEARCH.C
* Version: 1.1
* Release:
* System:  Search & Source
* Contact: Tom Corner
*---------------------------------------------------------------
* History: (reverse chronology)
* Date (Version)    Who/Action
* ---------------------------------------------------------------
*
* 10-aug-84 ( 2.? ) MB/ Changed color on reselect choice
* 14-may-84 ( 1.0 ) Created/Tom Corner
* 13-jun-84 ( 1.1 ) TC/ added category name to search list display.
*
* ==============================================================
*  Abstract:
*  ---------
*  Purpose:
*         Paint display screen at beginning of search.
*  Inputs:
*  Outputs:
*  Entry Points:
*         srchscr - paint display screen
*         dispcrit - display search criteria
*  Called Routines:
*         routines in IBMCOLOR.C for cursor movement and display colors
*  Special Notes:
* ==============================================================
*/
#include 'search.inc'
include 'filedesc.inc'
srchscr( sl )   /* paint display screen for search */
struct search_list *sl;
{
    clearhome();
    center('SEARCHING');
    moveto( 3, 1 );
    dispcrit( sl );
    whiteonred();
    moveto( 19, 33 );
    printf('Products Found');
    moveto( 25, 15 );
    printf('\033[0;31;40m');
    printf('\333\333');
    printf('\033[1m');
```

```
    white();
    printf(' Reselect');
    moveto( 25, 55 );
    green();
    printf('\333\333');
    white();
    printf(' Display');
    moveto( 21, 1 );
    whiteonred();
    return;
}
dispcrit( sl )   /* display search criteria */
struct search_list *sl;
{
    struct search_list *a, *o;
    int n;

white();
    printf('         Selection Criteria\n');
    n = 0;
    for( a=sl; a!=0; a=a->and_ptr){
      yellow();
      if( a==sl )printf('    ');
      else       printf('AND ');
      green();
      if( ++n>14 )break;
      printf('%-18.18s',a->sl_fd->f_display_msg);
      printf(' is ');
      printf('%.64s\n',a->display_msg);
      for( o=a->or_ptr; o!=0; o=o->or_ptr){
        yellow();
        printf(' OR ');
        green();
        if( ++n>14 )break;
        printf('%-18.18s',o->sl_fd->f_display_msg);
        printf(' is ');
        printf('%.64s\n',o->display_msg);
      }
      if(n>14)break;
    }
    white();
    if( n>14 )printf('Not enough space to display all search criteria\n');
    return;
}
/*
* File:    SSLIB.C
* Version:1.0
* Release:
* System: Search & Source
* Contact:Tom Corner
*---------------------------------------------------------------
* History: (reverse chronology)
* Date (Version)    Who/Action
*  ----------------------------------------------------------
* 21-mar-84 ( 1.0 ) Created
*
* ================================================================
* Abstract:
*  ----------
* Purpose:
*          functions used by Search and Source programs that
*          build tables and indexes.
* Inputs:
* Outputs:
* Entry Points:
*         ynbconv  - convert Y, N or blank field to binary 2, 1 or 0
*         pad      - pad out line to fixed length with blanks
*         bld_ind  - build index files for a search file
*         strins   - insert string field record in index file
*         scolins  - insert subdominant color field record in index
*         dcolins  - insert dominant color field record in index
*         colins   - insert color field record in index
*         binins   - insert binary character field record in index
```

```
*  Called Routines:
*                  functions in BTRCALL
*  Special Notes:
* ================================================================
*/

/*
function to convert flag(Y,N,or blank) fields
*/
ynbconv(c)
char c;
{
switch(c){
 case 'Y':return(2);
 case 'N':return(1);
 case ' ':return(0);
 default:printf("error: got x%02x '%c' when expecting Y, N or blank\n",
    (int)c,c);
    return(-1);
 }
}
pad(s,n)        /* pad string to end with blanks */
char *s;
int n;
{
int i,j;

for(i=0; i<n-1 && *s!='\0' && *s!=10; i++,s++);
for(;i<n-1; i++)*s++=' ';
*s='\0';
}

/************************************************************************
 *
 * functions used by build index programs
 *
 ************************************************************************/ include 'bldind.inc'

/*
 * bld_index - function to build all indexes for a given search file.
 */
bld_ind(srch, id, nid)
#define I id[i]
char *srch;
int nid;
struct index id[];
{
   static struct file_stat spec={/* file specification for Btrieve create */
      0,                /* record length */
      512,              /* page length */
      0,                /* number of keys */
      {0},{0},          /* not used & reserved */
      {                 /* key definitions */
        {               /*   key 0 */
           0,           /*     key position */
           0,           /*     key length   */
           DUP,         /*     key flag: duplicates allowed */
           {0},{0}      /*     not used & reserved */
        }
      }
   };
   int i,j,k,stat;
   char ib[MAXIRECLEN];  /* data buffer for index record */
   char sk[IDLEN];       /* buffer for index key */
   char sp[115];         /* Btrieve position block for search file */
   char sb[MAXSRECLEN];  /* data buffer for search file */
   char *s;
   long pid;
   printf("Indexing search file %s\n", srch);
   if( btr_open(sp, sb, srch) )return(3);
   printf("Creating index files:\n");
```

```
       for(i=0; i<nid; i++){ /* for each index file */
          printf("    %s\n",I.name);
    /* fill out file specification for Btrieve create */
          k = IDLEN+1;        /* position of key 0 */
          spec.rec_len = I.reclen;    /* record length */
          spec.index_count = I.nkeys; /* number of keys */
          for( j=0; j<spec.index_count; j++){/* for each key */
             spec.keys[j].key_pos = k; /* key position */
             spec.keys[j].key_len = I.keylen[j];/* key length */
             spec.keys[j].key_flag = I.keyflg[j];/* key flag */
             k += I.keylen[j];
             }
          I.pos = alloc(115);                       /* allocate position block */
          if( btr_creat(I.pos, &spec, I.name))return(1);    /* create file */
          if( btr_open(I.pos, ib, I.name))return(2);        /* open file */
          }
       if( stat= btr_getlw(sp, sb, sk, IDNUM) )return(4);
       while( stat==0 ){              /* do until end of file */
          movmem(&sb[IDIND], ib, IDLEN); /* put product id in index record buffer */
          movmem(ib, &pid, 4);
          printf("%10ld\015",pid);      /* print product id */
          for(i=0; i<nid; i++){         /* for each index file */
             s = &sb[I.f.p];            /*   address of first field */
             for( j=0; j<I.f.n; j++ ){  /*   for each field repeat */
                                       /*    -insert in index if entered */
                if( (*I.insert)( s, I.f.l, ib, I.pos))return(5);
                s += I.f.l;             /* point to next field */
                }
             }
          stat= btr_getnx(sp, sb, sk, IDNUM);/* get next search record */
          }
       for( i=0; i<nid; i++)    /* for each index file */
          btr_close(I.pos, sb, 0);     /* close file */ char *sf;       /* pointer to first field */
    int lf;         /* length of each field */
    char *ib;       /* pointer to buffer for index record */
    char *pb;       /* pointer to Btrieve position block for index file */

{ char kb[MAXIKEYLEN], /* key buffer for Btrieve call */
       *s;
    int i,j;

s=sf;
       for( j=0; j<lf && *s++==' '; j++);/* field all blank ? */
       if( j<lf ){                     /* if field not blank */
          movmem( sf, &ib[IDLEN], lf );/* move to index record */
          btr_inser( pb, ib, kb, 0 );  /* & insert record in index file */
          }

*/
dcolins( sf, lf, ib, pb )
char *sf, *ib, *pb;
int lf;
{
   return(
      colins( DOM, sf, lf, ib, pb )
      );
}
/*
 * colins - function to insert colors in index file
 */
colins( code, sf, lf, ib, pb )

int code;              /* code: 0, subdominant; 1, dominant */
    struct {               /* search record color structure */
       int block;          /*    color block number */
       c
       } *ib;
    char *pb;              /* Btrieve position block */
```

```
{
  int i;
  char kb[MAXIKEYLEN];

if( sf->block != 0 && sf->flag == code ){
      ib->col = sf->block;      /*   move block number */
      btr_inser( pb, ib, kb, 0 );/*  insert in index file */
      }
  return(0);
}
/*
 * binins - function to insert records in index file. The records are
 * derived from fields in a search record which consist of repeated fields
 * that are a single binary byte.
 */
binins( sf, lf, ib, pb )

char *sf;      /* pointer to first field */
  int lf;        /* length of each field */
  char *ib;      /* pointer to buffer for index record */
  char *pb;      /* pointer to Btrieve position block for index file */

{ char kb[MAXIKEYLEN];   /* key buffer for Btrieve call */ if( *sf != 0 ){          /* if field was entered */
     ib[IDLEN] = *sf;      /*   move to index record */
     btr_inser( pb, ib, kb, 0 ); /* insert in index file */
     }
  return(0);
}
/* typin is a multifunction input program that allows information
          to be entered in the following ways: any character string, any
          integer, any number with two decimal places and any number with
          two decimal places and a dollar sign.

typin returns  the input as a string in msg and as either a string
          long or int in choice. Furthermore limits on the allowed value
          can be imposed. All of this information can be handled through
          tbl (a pointer to file_descriptor_etc.)

the following functions must be linked with this program:

cls(), green(), whiteonred(), getkey(k), restore(),
          getspot() and moveto(r,c);
*/
/*
 * History
 *     08/10/84 - MB: Changed some copy routines to copy to places
 *                    in memory instead of altering memory locations
 *                    Done so memory could be freed in v2crit.
 *     08/10/84 - MB: removed extra return before break that returned
 *                    without no return code
 *     06/04/84 - MW: added print test for characters in FMT == 0
 *     06/01/84 - MW: changed how decimal numbers are typed in.
 */ include 'stdio.h'
include 'filedesc.inc' struct stack {
        unsigned char al,ah,bl,bh,cl,ch,dl,dh;
        unsigned int si,di,ds,es;
        } ;

#define BELL '\007'
#define FMT (tbl->prompt_format)
#define ESC '\033'
#define dcml_plcs 2
#define WITH_DOLLAR 3              /* prompt_format = 3 */
```

```
#define DCML_WO_DOLLAR 2          /* prompt_format = 2 */
#define NO_DEC 1                  /* prompt_format = 1 */
#define NO_NOTHING 0              /* prompt_format = 0 */
#define NEW_LN '\r'
define NULL '\0' typ_in(tbl,row,col,choice,msg)
struct file_descriptor_table *tbl;
int row,col;
char *msg;
char *choice;
{
        int i,count,lgth;
        char *msg_hd,c,*decimal,temp[25],*choice_hd;
        unsigned char *sc_code, k;
        char dec[3],*ptr1;
        long atoi(),tst;

msg_hd = msg;
        *msg = '\0';

/*
                set up initial conditions. Note moveto has to be called
                twice once to clr eol and then in the loops so that if
                the end user is out of range the cursor will reposition
                itself
        */ moveto(row,col);
        clearendline();
        whiteonred();

/*
                FMT == 0 is used if the proverbial end user indicates
                that he/she wishes to enter a text string of compare_length
                N.B. No other editing needs be done
        */
        if (FMT == NO_NOTHING)
        {
                moveto(row,col);

sc_code = alloc(sizeof(char));
                fill(msg_hd,tbl->compare_length,' ');
                printx(msg_hd);
                for(i=0,msg = msg_hd;i<=tbl->compare_length -1;i++)
                        /*
                                return to the user if esc is hit or
                                the return-key is hit and there are
                                no other characters hit so far
                        */
                        if((c=getkey(sc_code)) == ESC !! c == NEW_LN && i==0
                        {
                                *choice = *msg_hd = '\0';
                                unerr(row,col,-1);
                                green();
                                return(0);
                        }
                        else if (c == NEW_LN)
                                break;
                        else if (isprint(c))
                        {
                                *msg++ = c;
                                *msg = '\0';
                                printx(msg_hd);
                        }
                *msg = '\0';
                strcpy(choice,msg_hd);
                green();
                return(1);
        }
if (FMT == NO_DEC)
{
```

```
          sc_code = alloc(sizeof(char));
          lgth = place(tbl->high_value);
          do {
                  moveto(row,col);
                  count = 0;
                  fill(msg_hd,lgth,' ');
                  printx(msg_hd);
                  while((k=getkey(sc_code)) != NEW_LN && k != ESC)
                  {
                          if(isdigit(k))
                                  rot_and_prnt(k,msg_hd,&count,lgth)
                          if(isdigit(k) && count == 1)
                                          unerr (col,row,lgth);

}
          } while (out_of_limits(row,col,tbl,lgth,msg_hd)
                          && k == NEW_LN);
          free(sc_code);
          if (k == ESC || count == 0)
          {
                  strcpy(choice, '');
                  strcpy(msg_hd, '');
                  unerr(col,row,-1);
                  green();
                  return(0);
          }
          force(tbl,msg_hd,choice);
          green();
          return(1);
}
if (FMT == DCML_WO_DOLLAR || FMT == WITH_DOLLAR)
{
          sc_code = alloc(sizeof(char));
          do {
                  moveto(row,col);

lgth = place((tbl->high_value)/100);

count = 0;
                          if (FMT == WITH_DOLLAR)
                                  lgth++;
                          fill(msg_hd,lgth,' ');
                          if (FMT == WITH_DOLLAR)
                          {
                                  *msg_hd = '$';
                          } getspot();
                          printf('%s.%s',msg_hd,'00');
                          restore();

while((k=getkey(sc_code)) != NEW_LN
                                          && k != ESC && k != '.')
                          {
                                  if(isdigit(k))
                                          if(FMT == DCML_WO_DOLLAR)
                                                  rot_and_prnt(k,
                                                          msg_hd,&count,lgth)

else
                                          {
                                                  *msg_hd = ' ';
                                                  *(msg_hd + 1) = '$';
                                                  rot_and_prnt(k,msg_hd,&coun
                                                          lgth);
                                          }
                                          /*
                                                  erase the error message
                                          */ if(isdigit(k) && count == 1)
                                          unerr(col,row,(FMT == WITH_DOLLAR)?
                                                  place(tbl->high_value)+ 2;
                                                  place(tbl->high_value) + 1)
```

```
                }
        /*
                        do the following routine if a period has
                        been typed in.

this reads the two decimal places
        */
        if (k == '.')
        {
                /*
                        unerase error message if a decimal
                        is the first character typed
                */
                if (count == 0)
                        unerr(col,row,(FMT == WITH_DOLLAR)?
                                place(tbl->high_value)+ 2:
                                place(tbl->high_value) + 1);

decimal = msg = msg_hd + lgth;
                *decimal = '.';
                *(decimal + 1) = '\0';
                printf("%s",msg_hd);
                lgth =dcml_plcs;

fill(dec,dcml_plcs,'0');
                *(dec + dcml_plcs ) = '\0';
                for(i=1; i <= 2 &&((k=getkey(sc_code)) !=
                        NEW_LN && k != ESC); i++)
                {
                        if(isdigit(k))
                        {
                                dec[i-1] = k;
                                printx(dec);
                                count++;
                        }
                } if (k != NEW_LN && k != ESC)
                        while((k=getkey(sc_code)) != NEW_LN
                                && k != ESC)
                                if(isdigit(k))
                                        rot_and_prnt(k,dec,
                                                &count,lgth /*
                        make two copies of msg_hd.
                        One includes the $ and decimal
                        the other (temp) does not.
                */
                strcpy(temp,msg_hd);
                if ((ptr1 = index(temp,'$')))
                        *ptr1 = ' ';
                strcpy((temp + (decimal - msg_hd)),dec);
                strcpy(decimal+1,dec);
        } else if(k == NEW_LN)
        {
                decimal = msg = msg_hd + lgth;
                *decimal = '.';
                *(decimal + 1) = '\0';
                strcpy(temp,msg_hd);
                if ((ptr1 = index(temp,'$')))
                        *ptr1 = ' ';
                strcpy((temp + (decimal - msg_hd)),'00');
                strcpy(decimal+1,'00');

}
} while (out_of_limits(row,col,tbl,
```

```
                        ((FMT == WITH_DOLLAR)? place(tbl->high_value) + 2:
                        place(tbl->high_value) + 1),temp)
                        && k ==NEW_LN);

free(sc_code);
                if (k == ESC || count == 0)
                {
                        *choice=*msg_hd = '\0';
                        unerr(col,row,-1);
                        green();
                        return(0);
                }
                force(tbl,temp,choice);
                green();
                return(1);
        }

}
/***********************************/ struct {
        char *msg;
        } error[] ={
        'VALUE TOO SMALL',
        'VALUE TOO LARGE' };

out_of_limits(row,col,tbl,lgth,str)

int row, col, lgth;
struct file_descriptor_table *tbl;
char *str;
{
        long k;
        long atoi();

if((k = atoi(str)) < tbl->low_value)
        {
                moveto(row,col + lgth + 1);
                printf('%s',error[0].msg);
                return(1);
        }
        else if (k > tbl->high_value)
        {
                moveto(row,col + lgth + 1);
                printf('%s',error[1].msg);
                return(1);
        }
        else
                return(0);
}
/*
                unerase takes the errormessage left by outofrange and
                writes over it in black, it does this at the first
                digit typed
*/
unerr(col,row,lgth)
int col,row,lgth;
{
        char erse[80];

moveto(row,col + lgth + 1);
        green();
        clearendline();
        whiteonred();
        moveto(row,col);
}

/*
                returns the number of places in long n eg. place(30) = 2
                place(5500) = 4 and place(9) = 1
```

```
*/
place(t)
long t;
{
        long n;
        int i;

n = t;
        if (n==0) return(1);
        for(i=0;n != 0;i++,n /= 10)
                ;
        return(i);
}
/*******************************/
/*
        fill fills a string of length n with a given value
*/
fill(s,n,c)
char c,*s;
int n;
{
        while(n--)
                *s++ = c;
        *s = '\0';
}
/* rot_and_prnt (rotate and print) takes a vector (msg_hdr)
        of length lgth for which count characters have been read in
        and rotates it to the left (disposing
        o
                /*
                        set msg back to start
                */
                msg = msg_hdr;
                /*
                        rotate the msg
                        array 1 to the left
                */
                for(j=1;j<=lgth-1;j++)
                {
                        *msg = *(msg + 1);
                        msg++;
                }
                *msg++ = k;
                *msg = '\0';
                printx(msg_hdr);
        }
}
printx(s)
char *s;
{
        getspot();
                printf('%s',s);
        restore();
}

/*
        force squeezes the value held in msg into choice according to
        tbl->convert_type_in
*/ define result (tbl->convert_type_in)

union multival {
        int ichoice;
        long lchoice;
        char *cchoice;
        };
force(tbl,msg,choice)
struct file_descriptor_table *tbl;
char *msg;
union multival *choice;
```

```
        long atoi();

if (result == 0)
                strcpy(choice->cchoice,msg);

else if (result == 1)
        {
                choice->ichoice = (int) atoi(msg);
        }
        else if (result == 2)
        {
                choice->lchoice = (long) atoi(msg);
        }
}
/* File           : tin (typ_in_name)
 * Version        : 2.0
 * Release        :
 * System         : Search & Source
 * Contact        : Matthew Weinstein
 *=========================================
 *
 * Purpose        : using typ_in , it fetches a description from the user
 *                  and looks it up in the table given to it by the file desc
 *                  table
 * Called
 * routines       : typ_in, btr_call, cin, ibmcolor
 */
include 'stdio.h'
include 'btrstr.inc'
#include 'filedesc.inc'
#define DISPLAY 0
#define SEARCH 1
#define DESCRIPT 2
define NOT_FOUND 4 typ_in_name(tbl,row,col,choice,msg)
int row,col;
struct file_descriptor_table *tbl;
char *choice, *msg;
{
        int stat, field_lgth,crow,ccol,offset;
        char bff[143],keybff[64];
        char rec[750];
        struct file_stat infobff;
        struct file_descriptor_table dummy;

btr_open(bff,rec,tbl->btr_file);
        stat = btr_stat(bff,&infobff,keybff);
        /*
                find the length of the key we're going to read in
        */
        field_lgth = dummy.compare_length = infobff.keys[DESCRIPT].key_len;
        /*
                set parameters for input
        */
        dummy.prompt_format = 0;
        typ_in(&dummy,row,col,choice,msg);
        /*
                convert the input so that it is padded
                and can be compared
        */
        stou(msg);
        pad(msg,keybff,field_lgth);
        if(btr_geteq(bff,rec,keybff,DESCRIPT) == NOT_FOUND)
        {
                moveto(row,col + field_lgth + 1);
                clearendline();
                whiteonred();
                printf('NOT DEFINED, TRY AGAIN');
```

```
                green();
                btr_close(bff,rec,keybff);
                *msg = 0;
                return(0);
        } offset = infobff.keys[SEARCH].key_pos - 1;
        depad(rec+offset,choice,infobff.keys[SEARCH].key_len);
        btr_close(bff,rec,keybff);
        return(1);
}
/* File     :  top_bot.c
 * Version  :  2.0
 * Release  :
 * System   :  Search & Source
 * Contact  :  Phil Evans
 * Date     :  4-19-84
 *=================================================================
 *
 *  Purpose :  this routine prints the top & bottom information
 *             on all screens of the display program
 *
 *  Called
 *  routines :  none
 */ top_bot(kind)
char *kind;
{
        top(kind);
        bottom();
} int top(kind)
char *kind;
{
        int i;
        char work[80];
        static char *astrc = '*******************************************';

do_color(1,0);
        wrcenter(1,astrc);
        wrcenter(3,astrc);
        do_color(14,0);
        strcpy(work,kind);
        strcat(work,' SPECIFICATIONS AND INFORMATION');
        wrcenter(2,work);
} bottom()
{
        int i;
        static char *bline =
        '(C)COPYRIGHT 1984--PATENTS PENDING--SEARCH AND SOURCE, INC.--ALL RIGHTS RESERVED';

do_color(1,0);
        for (i = 21; i <= 23; i += 2)
        wrcenter(i,'----------------------------------------------------------
        do_color(14,0);
        wrcenter(22,bline);
        legend2();
}
/*
 * File:     UPHOIND.C
 * Version:  1.0
 * Release:
 * System:
 * Contact   Tom Corner
 *---------------------------------------------------------------
 * History: (reverse chronology)
 * Date (Version)    Who/Action
 * ---------------------------------------------------------------
 * 22-mar-84 ( 1.0 ) Created
```

```
/* ================================================================
*  Abstract:
*  ---------
*  Purpose:
*          Build index files for upholstered furniture search file.
*  Inputs:
*          search file: UPH01.BTR
*  Outputs:
*          stdout: operational log
*          index files:
*                  uphosty.ind - styles
*                  uphopm.ind  - preferred materials
*                  uphofin.ind - finishes
*                  uphopce.ind - piece types
*                  uphosf.ind  - special features
*                  uphodco.ind - dominant colors
*                  uphosco.ind - subdominant colors
*  Entry Points:
*  Called Routines:
*                  bld_ind in sslib. This calls other routines in sslib and
*                  btrcall.
*  Special Notes:
* ================================================================
*/ include 'bldind.inc' main()

{
static struct index defind[MAXIND] ={
{
    {'uphosty.ind'},       /* file name */
    0,                     /* pointer to Btrieve position Block */
    IDLEN+3,               /*   record length */
    1,                     /*   number of keys */
    {3},                   /*     key lengths */
    {DUP},                 /*     key flags */
    {                      /* definition of field in search record */
        3,                 /*   number of field repeats */
        10,                /*   index of 1st char 1st field */
        3                  /*   length of each field */
    },
    &strins                /* function to insert record */
},
{
    {'uphopm.ind'},        /* file name */
    0,                     /* pointer to Btrieve position Block */
    IDLEN+4,               /*   record length */
    1,                     /*   number of keys */
    {4},                   /*     key lengths */
    {DUP},                 /*     key flags */
    {                      /* definition of field in search record */
        4,                 /*   number of field repeats */
        19,                /*   index of 1st char 1st field */
        4                  /*   length of each field */
    },
    &strins                /* function to insert record */
},
{
    {'uphofin.ind'},       /* file name */
    0,                     /* pointer to Btrieve position Block */
    IDLEN+3,               /*   record length */
    1,                     /*   number of keys */
    {3},                   /*     key lengths */
    {DUP},                 /*     key flags */
    {                      /* definition of field in search record */
        3,                 /*   number of field repeats */
        35,                /*   index of 1st char 1st field */
        3                  /*   length of each field */
    },
    &strins                /* function to insert record */
},
```

```
{
    {'uphopce.ind'},                /* file name */
    0,                              /* pointer to Btrieve position Block */
    IDLEN+5,                        /*   record length */
    1,                              /*   number of keys */
    {5},                            /*     key lengths */
    {DUP},                          /*     key flags */
    {                               /* definition of field in search record */
        3,                          /*   number of field repeats */
        44,                         /*   index of 1st char 1st field */
        5                           /*   length of each field */
    },
    &strins                         /* function to insert record */
},
{
    {'uphosf.ind'},                 /* file name */
    0,                              /* pointer to Btrieve position Block */
    IDLEN+4,                        /*   record length */
    1,                              /*   number of keys */
    {4},                            /*     key lengths */
    {DUP},                          /*     key flags */
    {                               /* definition of field in search record */
        12,                         /*   number of field repeats */
        115,                        /*      index of 1st char 1st field */
        4                           /*   length of each field */
    },
    &strins                         /* function to insert record */
},
{
    {'uphodco.ind'},                /* file name */
    0,                              /* pointer to Btrieve position Block */
    IDLEN+2,                        /*   record length */
    1,                              /*   number of keys */
    {2},                            /*     key lengths */
    {DUP+BIN},                      /*     key flags */
    {                               /* definition of field in search record */
        6,                          /*   number of field repeats */
        163,                        /*   index of 1st char 1st field */
        3                           /*   length of each field */
    },
    &dcoins                         /* function to insert record */
},
{
    {'uphosco.ind'},                /* file name */
    0,                              /* pointer to Btrieve position Block */
    IDLEN+2,                        /*   record length */
    1,                              /*   number of keys */
    {2},                            /*     key lengths */
    {DUP+BIN},                      /*     key flags */
    {                               /* definition of field in search record */
        6,                          /*   number of field repeats */
        163,                        /*   index of 1st char 1st field */
        3                           /*   length of each field */
    },
    &scoins                         /* function to insert record */
}
};
/*
* build indexes for search file
*   from
*   7 indexes defined in defind
*/
bld_ind('uphol.btr',defind,7);
}
g allocated
*       07/05/84   Matt/ Changed call maintop to call crittop; added crittop
*                         and recompiled with new screen.inc changing window size.
*       06/20/84   Matthew/ Added redraw flag in case (typ_in).
*       06/08/84   Matthew/ Fixed typin calls
*       06/08/84   Tom/ Declare criteria as pointer to a search list.
*       04/19/84
*
* ================================================================
```

```
*   Abstract:
*   --------
*   Purpose: Interacts with user to define the search selection criteria.
*            Creates the search list to convey search requirements to the
*            search program.
*            Returns a -1 to request exiting the S&S program, else
*            0 to search using the current criteria.
*   Inputs:
*   Outputs:
*   Entry Points:
*   Called Routines:
*   Special Notes:
*   ================================================================
*/ include 'search.inc'          /* Search vector struct definition     */
include 'filedesc.inc'        /* Criteria menu structure             */
#include 'screen.inc'          /* Screen defines and structure        */
include 'keys.inc'            /* Key definitions                     */ define pswap(x,y)      {char *temp; temp = x; x = y; y = temp;} struct search_list *criteria( t, e, db, s, sl)

struct file_descriptor_table t[];

int *e;                        /* Number of entries in table t        */
int *db;                       /* Database to use                     */
struct screen_defs *s;         /* Screen definitions (Window used)    */
struct search_list *sl;

{ char *choice2;  /* a string containing second (high) value to look for */
char *display;  /* Display value returned from user input modules      */
char *display2; /* Display value returned from input modules for choice2*/ char scan;       /* The scan code returned by getscan                  */
int inway;       /* The method for input of information                */
int first;       /* First array member for display_criteria            */
                 /* NOTE - need to change initial screen display       */
                 /* so user presses GREEN to start                     */
                 /*      SEE V2MAIN.C FOR INITIAL SCREEN DISPLAY       */
int r,c,c2;      /* cursor position */
unsigned int hold;        /* For debugging      */
long atoi();
char *rindex(), *tx;

/*****************************************************************/ if (*db == -1) {                    /*get db choice or RED, setup db*/
    deal_list( sl );                  /* release search list */
    sl = 0;
    if (setup_db (db, t, e, s) == -1) { /*tables, open indexes, all init's*/
        return(-1);                   /* RED in setup_db sends out 0   */
    }
  }
  s->redraw = 1;

crittop(db);                        /* Always draw top and bottom    */
  legend1();

first = chosen = 0;                 /* Used in display_categories    */
                                      /* Be sure in create_vector so only choice wiped*/
  c = 2;                              /* Sorry, but hard code was real easy */ while ((scan = display_categories (t, *e, &first, &chosen, s)) != SRCH) {
       choice = alloc(50);
       choice2 = alloc(50);
       display = alloc(150);
       display2 = alloc(150);
```

```c
           r = (chosen - first) + s->topline;
           comp = t[chosen].compare_length;
        switch (scan) { case (RED):
           %db = -1;
           deal_list( sl );                     /* release search list */
           sl = 0;
           if (setup_db (db, t, e, s) == -1) { /* request db and init tables */
                return(-1);                    /* RED in setup_db sends out 0 */
           }
           s->redraw = 1;
           crittop(db);                         /* Redraw top and bottom       */
           legend1();
           first = chosen = 0;
              break;

case (BLUE):
             no_op_entry(&t[chosen]);     /*inactivate search vector entry for chosen*/
             break;

case (RTARROW):
          case (GREEN):
              inway = input_method (t[chosen].input_methods, s);

switch (inway) { case(-1):                          /*RED - none chosen*/
               break;               /* No choice given, so back to criteria */ case (0):                          /*type-in in format given in table*/
                c2 = c + 2 + strlen(t[chosen].f_display_msg) ;
                moveto(r,c2);
                printf (' is ');
                if (!typ_in (&t[chosen], r, c2+=4,choice, display))
                   {
                       *display = '\0';
                       moveto(r,23);
                       clearendline();
                       s->redraw = 1;
                       break;
                   }
                if (t[chosen].f_search_action == 3)
                   {
                     moveto(r,c2+=strlen(display));
                     printf (' to ');
                     if(!typ_in (&t[chosen], r, c2+=4, choice2, display2))
                        {
                          movmem(choice, choice2, 50);     /* Hard coded, watch out */
                          strcpy (display2,display);
                          clearendline();
                          whiteonred();
                          printf('%s',display2);
                          green();
                        }
                     if(atoi(display) > atoi(display2))
                        {
                          pswap(choice,choice2);
                          pswap(display,display2);
                        }
                    strcat (display,' to ');
                    strcat (display,display2);
                   }
                break;
              case (1):                          /*menu created from BTRIEVE file*/
                page_flip (t[chosen].btr_file,t[chosen].field_num, choice, display, s);
                s->redraw = 1;
                comp = strlen(choice);
                break;

case (2):                          /* Input color values           */
                color_input(   choice, display);
                s->redraw = 1;
                break;
```

```
    case (3):                           /* Input the size parameters      */
      page_flip (t[chosen].btr_file,t[chosen].field_num, choice, display, s);
      if (*display == '\0')
      {
            s->redraw = 1;
            break;
      }
      if ((tx = rindex(display, '\\')) && tx != display)
      {
            sprintf(display,'...%s',tx);    /* add ellipse */
      }
      movmem(choice,choice2,4);
      clrwindow(s);
      draw_screen(t,*e,first,chosen,s);
      moveto(r,c2 = c + 4 + strlen(t[chosen].f_display_msg));
      clearendline();
      printf(' is %s',display);
      if(!size_in(&t[chosen],r,c2+strlen(display)+2,&choice[4],
              &choice2[4],display + strlen(display)))
      {
            moveto(r,c2 = c + 2 + strlen(t[chosen].f_display_msg));
            *display = '\0';
            clearendline();
      }
      s->redraw = 0;
      break;

case (4):                           /* type in the name desired       */
      typ_in_name (&t[chosen], r, c, choice, display);
      break;

case (5):                           /* Reserved for future use        */
    default:
      printf('Illegal return |%d| from input_method\n', inway);
      break;

} /* end of input_method switch */
    moveto( r, c );
    if( strlen(display) > 0 )
        sl = buildsl(&t[chosen], choice, choice2, display, sl, comp);
      break;      /* This is the break for GREEN */ default:
        printf('Illegal return from display_categories\n');
        break;

} free(choice);
    free(choice2);
    free(display);
    free(display2);
}
      return(sl);                       /* Search key was pressed, main calls  */

}
/* File: VCMIO.C          (VCM-1000 board interface functions)
 *
 *
 * Version: 1.0
 * Release:
 * System:   I/O utilties
 * Contact: Carlyle Reeder
 *---------------------------------------------------------------
 * History: (reverse chronology)
 * Date (Version)   Who/Action
 * ---------------------------------------------------------------
 * 04-23-84         cr  BUG FIX: changed global variable 'delay' to 'dellay',
 *                      since there is a function named 'delay'.
 * 04-14-84         CR  Modified to maintenance standards
 * 04-10-84 (0.1)   SB  Created by Skip Berne
 *
```

```
/* ================================================================
 * Abstract:
 * ---------
 * Purpose: Provide functional access to the Video Interface Board (VCM-1000
 * Inputs:  Byte array containing player command integers, terminated with
 *          a -1 value.
 * Outputs: The Bytes, to the player, seperated by hex FF.
 * Entry Points: char vcmio(bytstr)
 *               char *bytstr;
 *                      returns last status byte from the player.
 *                      thus call with a single byte to read status
 * Called Routines:
 * Special Notes:
 * ================================================================
 */ line 1
define BMAX    22              /* number of command bytes plus 2 */
                                /* allowed in test routine        */ define BASE    0x378           /* base address of vcm-1000 board */
define VCM_OUT 0x378           /* output port address            */
#define VCM_IN  BASE+0x10       /* status port address            */

/*
 * video(scr_num,delay)
 * long int scr_num,delay;
 *   will cause player to search to screen scr_num, and freeze frame.
 *   delay specifies the time between commands to the player.
 */ long int dellay;                        /* global delay value, set by video
video(scr_num,delval)
long int scr_num;
long int delval;
{
    int k;
    static int search[2] = { 0xf7, 0 };      /* search command bytes */ dellay = 500;                   /* set transmission delay value */
    if ( scr_num < 0 )              /* and get out, if thats all */
        return(0);

vcmarg(scr_num);                /* else set the screen number */ vcmio(search);                  /* search to it */
    return(0);
}

0xOf,           /* 1 */
        0x8f,           /* 2 */
        0x4f,           /* 3 */
        0x2f,           /* 4 */
        0xaf,           /* 5 */
        0x6f,           /* 6 */
        0x1f,           /* 7 */
        0x9f,           /* 8 */
        0x5f            /* 9 */
    };
    char s_buf[14];                 /* digits buffer */
    int s_num[28];                  /* integer translation, sent to vcm */
    int kk, k;

kk = ltoa ( argnum,s_buf ) ;            /* set up digits string */
    for (k=0 ; k < kk ; ++k )       /* jog through the digits */
    {
        s_num[k] = numtbl[ (int) ( s_buf[k]-48 ) ]; /* converting to ld-v1000 char */
    } s_num[kk] = 0;                  /* mark end of translated digits */
    return( vcmio(s_num) );         /* send 'em to vcmio */
}
```

```
/*
 * int vcmio(bytes)
 *    int bytes[]
 *
 *    where bytes is an array of bytes to be sent to player, with a 0 value used
 *    to terminate the list of bytes.
 *    function returns status byte from player.
 *    call with an array with single value of 0 to get status.
 */ vcmio(bytes)
int bytes[];
{
    long int kk;
    int k, fill;

for ( k=0; bytes[k]; ++k ) {                /* loop thru bytes */
        outportb( VCM_OUT, 0xff );              /* filler */
        for ( kk=0; kk < dellay; kk++);         /* wait long enuf for strobe */ outportb( VCM_OUT, bytes[k] );          /* output the byte */
        for ( kk=0; kk < dellay; kk++);         /* wait long enuf for strobe */
    }
    return( 0 );
}

/*
 * File:  VERCRIT.C
 *
 *
 * Version: 1.0
 * Release:
 * System:  Search & Source
 * Contact: Sylvia Lasky
 * History: (reverse chronology)
 * Date (Version)    Who/Action
 * August 10, 84     Sylvia/ Update version to 2.4
 * July 6, 84        Sylvia/ Update version to 2.3
 * June 14, 84       Sylvia/ Update version to 2.2
 * June 6, 84        Sylvia/ Update version to 2.1B
 * May 31, 84        Sylvia/ Update version to 2.1A
 * May 17, 84        Sylvia/ Update version to 2.1
 * May 7, 1984       Sylvia/ Created.
 *
 * Purpose:
 *   This function prints the version number of the software component
 *   CRIT.LIB, an object library, on the screen at the indicated spot.
 * Inputs:  row and column where msg should appear
 * Outputs: message on screen
 * Called Routines: moveto - position the cursor
 * Special Notes: The actual version number of the library is changed by
 *                modifying and recompiling this program, then adding
 *                the new object module to CRIT.LIB
 */
vercrit(row, col)

int row, col;                    /*where to print msgs*/
{
moveto (row,col);

* July 6, 1984     Sylvia/ updated version to 2.3
* June 14 1984     Sylvia/ updated version to 2.2
* June 6 1984      Sylvia/ updated version to 2.1B
* May 31, 1984     Sylvia/ updated version to 2.1A
1
* May 7, 1984      Sylvia/ Created.
*
* Purpose:
*     This function prints the version number of the software component
*     DISPLAY.LIB, an object library, on the screen at the indicated spot.
* Inputs:  row and column where msg should appear
* Outputs: message on screen
* Called Routines: moveto - position the cursor
```

```
*   Special Notes: The actual version number of the library is changed by
*                  modifying and recompiling this function then adding
*                  the new object module to DISPLAY.LIB
*/
verdisp(row, col)

int row, col;                  /*where to print msgs*/
{
moveto (row,col);
puts ('   Display:    2.4    (August 10, 1984)');
return;
}
/*
*  File:  VERMISC.C
*
*
*  Version: 1.0
*  Release:
*  System:  Search & Source
*  Contact: Sylvia Lasky
*
*  May 31, 1984  Sylvia/ changed version to 2.1A
*  May 17, 1984  Sylvia/ changed version to 2.1
*  May 7, 1984   Sylvia/ Created.
*
*   Purpose:
*      This function prints the version number of the software component
*      MISC.LIB, an object library, on the screen at the indicated spot.
*   Inputs:  row and column where msg should appear
*   Outputs: message on screen
*   Called Routines: moveto - position the cursor
*   Special Notes: The actual version number of the library is changed by
*                  modifying and recompiling this function then adding
*                  the new object module to MISC.LIB
*/
vermisc(row, col)

int row, col;                  /*where to print msgs*/
{
moveto (row,col);
puts ('   Misc.lib.  2.4    (August 10, 1984)');
return;
}
/*
*  File:  VERSRCH.C
*
*
*  June 6, 1984 Sylvia/ updated version to 2.1B
*  May 31, 1984 Sylvia/ updated version to 2.1A
*  May 17, 1984 Sylvia/ updated version to 2.1
*  May 7, 1984   Sylvia/ Created.
*
*   Purpose:
*      This function prints the version number of the software component
*      SEARCH.LIB, an object library, on the screen at the indicated spot.
*   Inputs:  row and column where msg should appear
*   Outputs: message on screen
*   Called Routines: moveto - position the cursor
*   Special Notes: The actual version number of the library is changed by
*                  modifying and recompiling this function, then adding
*                  the new object module to SEARCH.LIB
*/
versrch(row, col)

int row, col;                  /*where to print msgs*/
{
moveto (row,col);
puts ('   Search:    2.4    (August 10, 1984)');
return;
}
```

```
**        07-06-84     Sylvia / Modified function key labels to agree with S&S.
**        07-06-84     Matt B./ Modified external variables to be static.
**        06-12-84     Modified to stand alone for Search & Source project
**                          usage; i.e., all externs declared herein
**        05-22-84     Modified to use assembly function getstat() in gs.asm
**                          to get status from LDV and wait for certain
**                          status bytes to indicate end of autostop
**                          and search before continuing with course.
**        05-07-84     Modified to utilize an LD-V1000 Video Disc Player
**        03-17-84     Modified to reflect version control standards
**        01-22-84     AMF - Ported from Cromemco System from version
**                          under developement 10/83 through 1/84
**        12-22-83     Initial version interfacing a Pioneer 7820-3
**        =========================================================
**     Abstract:
**
**                                 for selection of video player commands
**        Student Mode      -      Char array containing string of video
**                                 commands
**
tudent mode
**
**     Called Routines:
**     Special Notes:    Linked to Student.c in front and gs.asm in back
**
**
**     =========================================================
*/ include 'stdio.h'
define VCM_OUT 0x378           /* parallel port addresses */
define VCM_IN  0x0379 static int   i, init;
static char  c, userid[], c_code[], stat2[];
static int   videbug, ddebug, ldskon, savbo;
static FILE *ftiv;

static char  cmdbuf[80];
static struct regs {
        unsigned char    al, ah;
        unsigned char    bl, bh;
        unsigned char    cl, ch;
        unsigned char    dl, dh;
        unsigned int     si, di, ds, es; };
static struct regs brv, arv;
static struct cmdhex {
        char    *cmd;
        int      hex;
}  cmds[] = {
        '0',            0x3f,
        '1',            0x0f, 'AUDIO2',       0XFC,
        'AUTOSTOP',     0XF3,
        'DISPLAY',      0XF1,
        'CLEAR',        0XBF,
        'LOAD',         0XCC,
9,
        'SCANFWD',      0XF0,
        'SCANREV',      0XF8,
        'SEARCH',       0XF7,
        'SLOWFWD',      0XA2,
        'STEPFWD',      0XF6,
        'STEPREV',      0XFE,
        'STOP',         0XFB,
        'STORE',        0XF5,
        'TOFF',         0XFF,
        'TON',          0XFF,
        'VOFF',         0XFF,
        'VON',          0XFF,
```

```
                    'WAIT',           0XFB,
                    '',               0,
};
static struct   cmdhex  *stptr;

/***********************************************************/
/**************  menu structure definitions   *******/
/***********************************************************/

/*    set up defines for proper       */
#define F1       0x3b       /*            scan codes              */
#define F2       0x3c
#define F3       0x3d
#define F4       0x3e
define F5       0x3f 'F5 ',            'F6 ',
                 'F7 ',            'F8 ',
                 'F9 ',            'F10 ',
                 '<---',           'Fwd'  };
static struct list {
        char *entrys;
} menu[] = {
        ' Play',                         ' Stop',
        ' Display',                      ' Slow',
        ' Audio1',                       ' Step',
        ' Audio2',                       ' Scan',
        ' Autostop',                     'Search',
        'Rev',                           '---)'
};

static struct  rwcl {
        int *rows;
        int *cols;
} cursrs[] = {
7,10,   7,40,    9,10,   9,40,   11,10,   11,40,   13,10,   13,40,   15,10,   15,40
};
        static unsigned char aa;

static int     tog, key, audisp[4], which, slast = 3;
        static int     soff, sncod, sncmd, savfr, sselct = 3;
        static int     row, column;
        static int     last;  /*    extern   */

/*
**
**   vidmen() builds the video preview menu and then goes
**           into an infinite loop interpreting command
**           keys until two (ESC)s in a row are pressed
**           at which point it returns to the calling
**           function.
**   No arguments or returned values.
*/
vidmen()
{ last = 1;

clear();
        row = 1;
        column = 29;
        movec();
        yellow2();
        printf('VIDEODISK PREVIEW MENU');
                            /* clear screen and print initial menu */
        for (i=0; i<=9; i += 2) {
                row    = cursrs[i].rows;
                column = cursrs[i].cols;
                movec();
                yellow2();
                printf ('%s %s',keys[i].numbs, menu[i].entrys);

row    = cursrs[i+1].rows;
                column = cursrs[i+1].cols;
                movec();
```

```
                printf ('%s %s',keys[i+1].numbs, menu[i+1].entrys);
        }
        row    = cursrs[2].rows;
        column = cursrs[2].cols;
        movec();
                printf ('%s %s  ON ',keys[2].numbs, menu[2].entrys);
        row    = cursrs[4].rows;
        column = cursrs[4].cols;
        movec();
                printf ('%s %s  OFF',keys[4].numbs, menu[4].entrys);
        row    = cursrs[6].rows;
        column = cursrs[6].cols;
        movec();
                printf ('%s %s  OFF',keys[6].numbs, menu[6].entrys);
        row = 22;
        column = 28;
        movec();
        printf('(PRESS RED KEY TWICE TO EXIT)');
for (;;) {
                clearpromptline();        /* clear prompt-line */
    key = get_sckey();
    switch (key) {
    case 1:
        if ((key = get_sckey()) == 1) {
                        ftiv = fopen ('active','w');
                        fprintf(ftiv,'%s %s %s',userid,stat2,c_code);fclose(ftiv);
            /*        no_ret();      */
                        return;
        }
        break;
                                         /*  return if ESC is pressed twice */
case F3:
case F5:
case F7:
        switch (key) {
                case F3:             /*  frame display */
                        tog = 1;
                        which = 2;
                        break;
                case F5:             /*  audio 1 */
                        tog = 2;
                        which = 4;
                        break;
                case F7:             /*  audio 2 */
                        tog = 3;
                        which = 6;
                        break;
        }
        row    = cursrs[which].rows;
        column = cursrs[which].cols;
        movec();
        audisp[tog] ^= 01;
        if (audisp[tog]) {
                yellow2();
                hi_int();
                printf ('%s %s  ON ',keys[which].numbs, menu[which].entrys);
                lo_int();
        }
        else {
                lo_int();
                yellow2();
                printf ('%s %s  OFF',keys[which].numbs, menu[which].entrys);
                lo_int();
        }
                                        /* flag for slow  fwd/rev display */
```

```
                soff = 0;
                break;
        case F2:
                switch (key) {          /*   which for display sselct for code */
                        case F2:                /*      stop selected     */
                                which = 1;
                                break;
                }
                lo_int();
                yellow2();
                row    = cursrs[last].rows;
                column = cursrs[last].cols;
                movec();
                printf ("%s %s",keys[last].numbs, menu[last].entrys);
                last = which;
                hi_int();
                yellow2();
                row    = cursrs[which].rows;
                column = cursrs[which].cols;
                movec();
                printf ("%s %s",keys[which].numbs, menu[which].entrys);
                lo_int();
                soff = 1;
                break;
        case F4:
        case F6:
        case F8:
                lo_int();
                yellow2();
                row    = cursrs[sselct].rows;
                column = cursrs[sselct].cols;
                movec();
                printf ("%s %s",keys[sselct].numbs, menu[sselct].entrys);
                printf ("                            ");

switch (key) {
                        case F4:                /*      slow selected     */
                                soff = 0;
                                sselct = 3;
                                which = 3;
                                break;
                        case F6:                /*      step selected     */
                                soff = 1;
                                sselct = 5;
                                which = 5;
                                break;
                        case F8:                /*      scan selected     */
                                soff = 1;
                                sselct = 7;
                                which = 7;
                                break;
                }
                lo_int();
                yellow2();
                row    = cursrs[last].rows;
                column = cursrs[last].cols;
                movec();
                printf ("%s %s",keys[last].numbs, menu[last].entrys);

last = which;
                hi_int();
                yellow2();
- Rev    Fwd --- ) ");
                lo_int();
        break;

case 75:
        case 77:
                switch (key) { case 75:                /*      reverse selected     */
                                which = 10;
                                break;
```

```
                    case  77:                      /*      forward selected           */
                            which = 11;
                            break;
        } if (savfr != which) soff = 1;
                                    else soff = 0;

strcat (cmdbuf,menu[sselct].entrys);
                    frpos();
                    hi_int();
                    yellow2();
                    printf ('%s %s',keys[which].numbs, menu[which].entrys);

if ((sselct == 7) !! (sselct == 3))
                            break;   /* dont turn hi-int off
                                            if slow or scanning   */
                    frpos();
                    lo_int();
                    yellow2();
                    printf ('%s %s',keys[which].numbs, menu[which].entrys);
                    lo_int();
            break;
    case F1:
    case F9:
    case F10:
            switch (key) {
                    case F1:                      /*      play selected      */
                            which = 0;
                            break;
                    case F9:                      /*      autostop selected        */
                            which = 8;
                            break;
                    case F10:                     /*      search selected */
                            which = 9;
            break;
            }
                    soff = 1;
                    lo_int();
                    yellow2();
                    row    = cursrs[last].rows;
                    column = cursrs[last].cols;
                    movec();
                    printf ('%s %s',keys[last].numbs, menu[last].entrys);
                    last = which;
                    hi_int();
                    yellow2();
                    row    = cursrs[which].rows;
                    column = cursrs[which].cols;
                    movec();
                    printf ('%s %s',keys[which].numbs, menu[which].entrys);
                    lo_int();

do {
                            clearpromptline();
                                            /* clear line in case of backspace */
                            row    = 17;
                            column = 25;
                            movec();
                            printf ('Frame Number ? ');

i=0;
                            do {
                                    c = get_akey();
                                    if (isdigit(c) == 1) {
                                            cmdbuf[i++] = c;
                                            putchar (c);
                                    }
                                    if (c == 8)   break;
                                    if (c == 13)  break;
                                    if (c == 10)  break;
                            } while (c != '\n');
                    } while (c == 8);        /* re-get frame number if backspace */
                    cmdbuf[i] = '\0';
```

```
                if (cmdbuf[0] != '\0') {  /* if frame number & play selected */
                        if (which == 0)           /* add search to cmdbuf */
                                strcat (cmdbuf,menu[9].entrys);
                }
                else
                        which = 0;        /* play only if nul frm nmbr  */
                break;
default:
        continue;
}               /* closes first switch */ if (which == 11)
                strcat (cmdbuf,keys[which].numbs);
        else
                strcat (cmdbuf,menu[which].entrys);

if ((savfr != 0) & (sselct == 3) & (soff != 0)) { frpos();
                if (which == 11)
                                movb12();
                if ((savfr == 11) & (which != 11))
                                movf12();
                lo_int();
                yellow2();
                printf ('%s %s',keys[savfr].numbs, menu[savfr].entrys);
                lo_int();
                soff = 0;

}
        if ((sselct == 3) && ((which == 10) || (which == 11)))
                        savfr = which;

if ((sselct == 7) && ((which == 10) || (which == 11)))
                        doascan();

if (!(ldskon))
                video_cmd();

cmdbuf[0] = '\0';
/*      poscurs(); */ break;
                case 5:
                        row = 11;
                        break;
                case 7:
                        row = 13;
                        break;
                }
                column = 52;
                movec();
                if (which == 11)
                        movf12();
}

/*******************************************************************/
/*****************    end of menu functions     ********************/
/*******************************************************************/

/*******************************************************************/
/*****************    begin video cmd functions  *******************/
/*******************************************************************/ video_cmd()
{
        int i, j;
        int   hexbuf[80];
                i = 0;                            /* upify cmdbuf */
                while (cmdbuf[i] != '\0') {
                        cmdbuf[i] = toupper(cmdbuf[i]);
                        i ++;
                }
```

```
/***************************************************************/
        i = 0;
        j = 0;
        while(cmdbuf[i] != '\0') {
                if(cmdbuf[i] == ' ') i++;
                hexbuf[j] = preview(&cmdbuf[i]);
                if(hexbuf[j] != 0) {
                        j ++;
                        i += strlen(stptr->cmd);
                }
                if (hexbuf[0] == 0) break;
        }
        hexbuf[j] = 00;
        i = 0;

if (videbug) {
        printf('cmdbuf has %s \n',cmdbuf);
        printf('hexbuf[0] has %d \n',hexbuf[0]);
} vcmio2(hexbuf);

} return(0);
} clearpromptline()
{                                       /* clear prompt line */
        row     = 17;
        column  = 25;
        movec();
        printf ('                                            ');
}
/***************************************************************/
/***************************************************************/
/*******         environment dependent functions       *********/
/*******            for video disk command menu        *********/
/***************************************************************/ dosscan()               /*  if command is scan fwd or rev, keep  */
                        /*  checking key and keep scanning       */
{
int scanbuf[3];
                switch (which) {
                        case 10:
                                sncmd = 248;
                                sncod = 75;     /* sncod = 8;  */
                                break;
                        case 11:
                                sncmd = 240;
                                sncod = 77;     /* sncod = 12; */
                                break;
                }
                scanbuf[0] = sncmd;
                scanbuf[1] = 0;
                for (i=1; i<=7; i++)
                        if (!(ldskon))
                                vcmio2(scanbuf);
/******* need to check status and if scan is still pressed, keep sending
                            scan cmd to provide smooth scan *********/ brv.ah = 0x01;
                while (!(sysint (0x16, &brv, &arv) & 0x0040)) {
                                    /*  if((arv.ah!=08)&(arv.ah!=12)) */
                        if ((arv.ah != 75) & (arv.ah != 77))
                                                break;
                        brv.ah = 0x00;
                        sysint (0x16, &brv, &arv);

brv.ah = 0x01;
                        vcmio2(scanbuf);
                        for (i=0;i<=1900;i++); /* delay until next key scan */
                }
```

```c
                    frpos();
                    lo_int();
                    yellow2();
                    printf ('%s %s',keys[which].numbs, menu[which].entrys);
                    lo_int();
}
waitstop()
{
        unsigned char bytin;

if (videbug)
                printf('Result bytes are:');

do {                                    /* await status */
                for (i=0; i<=3000; i++);        /* delay (don't ask me why) */ bytin = getstat(VCM_IN);
                if (videbug)
                        printf(' %x ',bytin);
                if (key_stat() == 27) {
                        get_akey();
                        return;
                }
        } while (!(bytin & 0x80) !! ((videbug == 77) && (savbo == 243)));
}
yellow2()
{
        printf('%c[33;40m',ESC);
}
get_sckey()
{
                brv.ah = 0x00;
                sysint (0x16, &brv, &arv);
                return (arv.ah);
}
get_akey()
{
    (arv.al);
}
clear()
{
                printf ('%c[2J',ESC);
}
                printf ('%c[12C',ESC);
}
/*********    added to eliminate need for ibmpc.env    *********/
save()
{
                row = arv.dh;
                column = arv.dl;
}

/************************************************************
* int vcmio2(bytes)
*    int bytes[]
*
*/ vcmio2(bytes)
int bytes[];
{
    long int kk;
    int k, fill;

long    delay = 500;

if (videbug)
                printf('bytes being sent are:');
        for ( k=0; bytes[k]; ++k ) {             /* loop thru bytes */ outportb( VCM_OUT, 0xff );       /* filler */
                for ( kk=0; kk < delay; kk++);   /* wait long enuf for strobe */
                if (videbug)
```

```
                          printf(" %x ",bytes[k]);
                outportb( VCM_OUT, bytes[k] );   /* output the byte */
                for ( kk=0; kk < delay; kk++);   /* wait long enuf for strobe */ outportb( VCM_OUT, 0xff );   /* clear bus for proper status */
                if ((savbo = bytes[k]) == 247)
                        waitstop();
                if ((savbo == 253) && (init == 0))
                        waitstop();      /* wait for player to start */
                if (videbug)
                        printf(" %x ",bytes[k]);
        }
}
/*
 * File:    WALLIND.C
 * Version: 1.0
 * Release:
 * System:
 * Contact  Tom Corner
 *-----------------------------------------------------------------
 * History: (reverse chronology)
 * Date (Version)    Who/Action
 * -----------------------------------------------------------------
 * 21-mar-84 ( 1.0 ) Created
 *
 * =================================================================
LLSTY.IND - styles
 *                       WALLPM.IND  - preferred materials
 *                       WALLPAT.IND - patterns
 *                       WALLSCO.IND - subdominant colors
 *                       WALLDCO.IND - dominant colors
 *  Entry Points:
 *  Called Routines:
 *                 bld_ind in sslib. This calls other routines in sslib and
 *                 btrcall.
 *  Special Notes:
 * =================================================================
 */ include 'bldind.inc' main()

{
static struct index defind[MAXIND] ={
{
   {'wallsty.ind'},        /* file name */
   0,                      /* pointer to Btrieve position block */
tsID/
   10,                     /*   index of 1st char 1st field */
   3                       /*   length of each field */
   },
   &strins                 /* function to insert record */
},
{
   {'wallpm.ind'},         /* file name */
   0,                      /* pointer to Btrieve position block */
   IDLEN+3,                /*   record length */
   1,                      /*   number of keys */
   {3},                    /*     key lengths */
   {DUP},                  /*     key flags */
   {                       /* definition of field in search record */
   3,                      /*   number of field repeats */
   16,                     /*   index of 1st char 1st field */
   3                       /*   length of each field */
   },
   &strins                 /* function to insert record */
},
{
   {'wallpat.ind'},              /* file name */
   0,                      /* pointer to Btrieve position block */
   IDLEN+4,                /*   record length */
   1,                      /*   number of keys */
```

```
     {4},                       /*      key lengths */
     {DUP},                     /*      key flags */
     {                          /* definition of field in search record */
        3,                      /*    number of field repeats */
        27,                     /*    index of 1st char 1st field */
        4                       /*    length of each field */
     },
     &strins                    /* function to insert record */
  },
  {
     {'wallsco.ind'},                    /* file name */
     0,                         /* pointer to Btrieve position Block */
     IDLEN+2,                   /*   record length */
     1
        45,                     /*    index of 1st char 1st field */
        3                       /*    length of each field */
     },
     &scolins                   /* function to insert record */
  },
  {
     {'walldco.ind'},                    /* file name */
     0,                         /* pointer to Btrieve position Block */
     IDLEN+2,                   /*   record length */
     1,                         /*   number of keys */
     {2},                       /*      key lengths */
     {DUP+BIN},                 /*      key flags */
     {                          /* definition of field in search record */
        6,                      /*    number of field repeats */
        45,                     /*    index of 1st char 1st field */
        3                       /*    length of each field */
     },
     &dcolins                   /* function to insert record */
  }
};
/*
 * build indexes for wall coverings search file
 *    from
 *    5 indexes defined in defind
 */
bld_ind('wall1.btr',defind,5);
/* File      : words.c
 * Version   : 2.0
 * Release   :
 * System    : Search & Source
 * Contact   : Phil Evans
 * Date      : 4-19-84
 *===============================================================
 *
 * Purpose   : this routine will return a pointer to commonly
 *             used words (null terminated)
 *
 * Called
 * routines  :
 */ char   *words(n)
int n;
{
static char   *wname[] = {
     ' ',                  /*  0 */    'all types',         /*  1 */
     'Address',            /*  2 */    'Available',         /*  3 */
     'Block',              /*  4 */    'border',            /*  5 */
     'coarse',             /*  6 */    'Bottom',            /*  7 */
     'Carpet and rugs',    /*  8 */    'Collection name',   /*  9 */
     'Colors',             /* 10 */    'Construction',      /* 11 */
     'commercial',         /* 12 */    'Custom',            /* 13 */
     'Delivery',           /* 14 */    'Depth',             /* 15 */
     'Description',        /* 16 */    'central',           /* 17 */
     'cast',               /* 18 */    'Dominant',          /* 19 */
     'Entire',             /* 20 */    'diagonal',          /* 21 */
     'Fabrics',            /* 22 */    'Features',          /* 23 */
     'carved',             /* 24 */    'Finishes',          /* 25 */
     'horizontal',         /* 26 */    'From',              /* 27 */
```

```
'Furniture',          /* 28 */    'Group',              /* 29 */
'high',               /* 30 */    'Height',             /* 31 */
'I.D.',               /* 32 */    'Inches',             /* 33 */
'Information',        /* 34 */    'Item',               /* 35 */
'low',                /* 36 */    'Lamp',               /* 37 */
'Material',           /* 38 */    'Maximum',            /* 39 */
'Miscellaneous',      /* 40 */    'Most',               /* 41 */
'no ',                /* 42 */    'Nonupholstered',     /* 43 */
'N/L',                /* 44 */    'object',             /* 45 */
'Options',            /* 46 */    'Orientation',        /* 47 */
'medium',             /* 48 */    'Overall',            /* 49 */
'Page',               /* 50 */    'Pattern',            /* 51 */
'Phone',              /* 52 */    'Piece',              /* 53 */
'painted',            /* 54 */    'P.O.',               /* 55 */
'Preferred',          /* 56 */    'Products',           /* 57 */
'Quantity',           /* 58 */    'Reflectance',        /* 59 */
'residential',        /* 60 */    'Rep. Name',          /* 61 */
/* 69 */
'Stocked',            /* 70 */    'Style',              /* 71 */
'smooth',             /* 72 */    'Sub ',               /* 73 */
'Texture',            /* 74 */    'Trim',               /* 75 */
'Upholstered',        /* 76 */    'Usage',              /* 77 */
'yes',                /* 78 */    'vertical',           /* 79 */
'Vendor Name',        /* 80 */    'Video Frame',        /* 81 */
'Volume',             /* 82 */    'Wallpaper',          /* 82 */
'Width',              /* 84 */    'early',              /* 85 */
'late',               /* 86 */
};
return((n < 1 || n > 84) ? wname[0]: wname[n]);
}
include 'stdio.h' atsay(row,col,s)
int row,col;
char *s;
{
        moveto(row,col);
        while(*s)
                putchar(*s++);
}
```

While a presently preferred form of the present invention has been set forth here and above, it is to be understood that the invention is not limited thereby. In particular, the steps of the inventive process are interchangeable, may be interchanged and are equivalent. It is to be understood that the specific details shown are merely illustrative and that the invention may be carried out in other ways without departing from the true spirit and scope of the following claims.

What is claimed is:

1. A process of operating a video archieve system for selection and display of design component information with the aid of a digital computer, comprising:

a. providing said video archive system with an optical videodisk image database comprising a plurality of addressable images of design components on at least one side;

b. providing said computer with a characteristics database comprising a plurality of records corresponding to each of said design components, each said record comprising a plurality of characteristic identifiers describing said corresponding design component and including at least characteristic identifiers in categories of price, color, manufacturer and location of an image of said corresponding design component on the optical videodisk;

c. providing said computer with a selection of one or more desired product component characteristics, including color, said color being provided to said computer through machine-readable color input means which indicates said color as digitized quantities of hue, chroma and value so that each color falls within a predetermined block of color coordinates and means for selection of personal color preference from among a plurality of colors derived from a color module using an order of color dominance, said colors being adapted to be displayed by said video archive system;

d. choosing, in said computer, records from said characteristics database having characteristic identifiers corresponding to said desired component characteristics;

e. extracting from each said chosen product record, in said computer, a location of said design component image corresponding to said chosen record;

f. transferring said location of said image corresponding to said chosen record from said computer to said video archive system, and causing said video archive system to display said image corresponding to said chosen record; and g. displaying said plurality of characteristic identifiers of said chosen record corresponding to said displayed image of said design component.

2. A process as claimed in claim 1 wherein steps e through g are repeated a number of times equal to a number of records chosen in step d.

3. A process as claimed in claim 1 wherein step c further comprises providing said computer with a dictionary of valid characteristic identifiers, displaying said valid responses, and providing said computer with at least one said valid response, each said valid response in each said dictionary having a one-to-one correspondence to a number and said records of said characteristics database comprise at least one of said numbers.

4. A processs as claimed in claim 1 wherein said machine- readable color input means is a colorimeter and step c of claim 1 further comprises providing said computer with a physical sample of desired color, exposing said sample to said colorimeter, and providing desired color quantification from said colorimeter to said computer.

5. A process as claimed in claim 1 wherein step f further comprises displaying said corresponding image on a first video monitor, and step g further comprises displaying said plurality of characteristics on a second video monitor.

6. A process as claimed in claim 1 wherein said corresponding image and said plurality of characteristics of said chosen record are displayed on a single video monitor.

7. A process as claimed in claim 1 wherein said computer and said video archive system are stand-alone devices.

8. A process as claimed in claim 1 wherein said characteristics database further comprises a binarytree file structure with a plurality of key files, each said key file corresponding to one said common category.

9. A method of operating a random-access video archive system for selection and display of design component information with the aid of a digital computer, comprising:
   a. providing said computer with a design component type selected from a plurality of predetermined design component type options;
   b. providing said computer with a dictionary database corresponding to said selected design component type and comprising a plurality of category dictionaries, each said category dictionary comprising a plurality of valid characteristic identifiers;
   c. providing said video archive system with an image database contained on a laser videodisk corresponding to said selected design component type and comprising a plurality of addressable images of design components;
   d. providing said computer with a characteristics database corresponding to said selected design component type and comprising a plurality of records having a one-to-one correspondence to said images of design components, each said record comprising a plurality of said characteristic identifiers describing said corresponding image and including at least a color and a location of said corresponding design component image on said laser videodisk;
   e. providing said computer with a selection of desired component characteristic identifiers including color derived from a color field having digitized references for hue, chroma and value using an order of color dominance by way of machine-readable color-input means;
   f. choosing, in said computer, records from said characteristics database, each said chosen record comprising at least said selection of desired component characteristic identifiers;
   g. extracting from each said chosen record, in said computer, said location of said corresponding design component image within said image database;
   h. providing each said location of each said corresponding image from said computer to said video archive system, and displaying each said corresponding image; and
   i. displaying said group of characteristic identifiers corresponding to each said displayed image from each said chosen record.

* * * * *